US012205484B1

(12) United States Patent
Hunter et al.

(10) Patent No.: US 12,205,484 B1
(45) Date of Patent: Jan. 21, 2025

(54) SYSTEMS AND METHODS FOR ACTIVE-LIGHT BASED PRECISION LOCALIZATION OF AIRCRAFTS IN GPS-DENIED ENVIRONMENTS

(71) Applicant: Archer Aviation, Inc., San Jose, CA (US)

(72) Inventors: Anthony Hunter, San Jose (CA); Timothy Mclain, Provo, UT (US); Joshua Mangelson, Spanish Fork, UT (US); Gary Long, Dorchester, MA (US); Pablo Hopman, Mountain View, CA (US); Siddhartha Kumar, Campbell, CA (US); David Christopher Akagi, Poway, CA (US); Kalliyan Velasco, Magna, UT (US)

(73) Assignee: ARCHER AVIATION, INC., San Jose, CA (US)

( * ) Notice: Subject to any disclaimer, the term of this patent is extended or adjusted under 35 U.S.C. 154(b) by 0 days.

(21) Appl. No.: 18/451,055

(22) Filed: Aug. 16, 2023

Related U.S. Application Data

(60) Provisional application No. 63/420,616, filed on Oct. 30, 2022, provisional application No. 63/381,571, filed on Oct. 31, 2022.

(51) Int. Cl.
*G08G 5/02* (2006.01)
*G06V 10/10* (2022.01)
*G08G 5/00* (2006.01)

(52) U.S. Cl.
CPC ............. *G08G 5/025* (2013.01); *G06V 10/10* (2022.01); *G08G 5/0021* (2013.01)

(58) Field of Classification Search
USPC ............................................ 382/103; 701/16
See application file for complete search history.

(56) References Cited

U.S. PATENT DOCUMENTS 5,351,077 A 9/1994 Lee et al.
6,157,876 A * 12/2000 Tarleton, Jr. ......... G05D 1/0676
342/63

(Continued)

FOREIGN PATENT DOCUMENTS

KR 102556077 B1 7/2023
WO WO_2024097457 * 5/2024 ............. G08G 5/025

OTHER PUBLICATIONS

Morais et al., Trajectory and Guidance Mode for autonomously landing an UAV on a naval platform using a vision approach, 2015 IEEE 978-1-4799-8736-8/15, pp. 1-7. (Year: 2015).*

(Continued)

*Primary Examiner* — Ishrat I Sherali
(74) *Attorney, Agent, or Firm* — Finnegan, Henderson, Farabow, Garrett & Dunner, LLP

(57) ABSTRACT

Systems and methods of providing guidance to assist eVTOL aerial vehicles in performing landing and takeoff operations at landing locations in GPS-denied environments are disclosed. An exemplary system includes an aerial vehicle comprising a camera configured to generate images based on information transmitted by a plurality of light sources located adjacent a landing surface for the aerial vehicle and a controller circuit configured to receive the generated images and determine a position and an orientation of the aerial vehicle based on the received images, wherein the light sources are arranged in a predetermined pattern on the landing surface, and wherein a characteristic of light emitted from each of the light sources is modulated with respect to time.

27 Claims, 70 Drawing Sheets

(56) References Cited

U.S. PATENT DOCUMENTS

| | | | |
|---|---|---|---|
| 8,768,542 | B2 | 7/2014 | Garrec et al. |
| RE45,452 | E | 4/2015 | Kerr et al. |
| 9,244,147 | B1 | 1/2016 | Soundararajan et al. |
| 10,395,544 | B1 | 8/2019 | Harris et al. |
| 10,913,532 | B2 | 2/2021 | Carthew et al. |
| 11,064,184 | B2 * | 7/2021 | Choi ............... G01B 11/2545 |
| 11,194,344 | B2 * | 12/2021 | Li ........................ B64C 39/024 |
| 11,416,008 | B2 | 8/2022 | Petersen et al. |
| 11,670,181 | B2 * | 6/2023 | S ............................ G06T 11/00 701/16 |
| 11,693,428 | B2 * | 7/2023 | Li ........................ B64C 39/024 701/16 |
| 2009/0009596 | A1 | 1/2009 | Kerr et al. |
| 2011/0273324 | A1 | 11/2011 | Petillon |
| 2014/0204360 | A1 | 7/2014 | Dowski et al. |
| 2016/0122038 | A1 | 5/2016 | Fleischman et al. |
| 2016/0257424 | A1 | 9/2016 | Stabler et al. |
| 2017/0129603 | A1 | 5/2017 | Raptopoulos et al. |
| 2017/0225800 | A1 | 8/2017 | Holt et al. |
| 2017/0261975 | A1 | 9/2017 | Liu et al. |
| 2019/0197908 | A1 | 6/2019 | Mozer et al. |
| 2019/0248511 | A1 | 8/2019 | Lewis et al. |
| 2020/0012296 | A1 * | 1/2020 | Gurdan ................. B64C 39/024 |
| 2020/0226937 | A1 | 7/2020 | Petersen et al. |
| 2020/0301445 | A1 * | 9/2020 | Jourdan ........... G06K 19/06037 |
| 2021/0027488 | A1 | 1/2021 | Liu |
| 2021/0082295 | A1 | 3/2021 | Surace |
| 2021/0157336 | A1 * | 5/2021 | Kwak .................. B64C 39/024 |
| 2021/0303003 | A1 * | 9/2021 | Delgado ............... B64C 39/024 |
| 2021/0319709 | A1 | 10/2021 | Rose et al. |
| 2022/0017235 | A1 * | 1/2022 | Lee ........................ G06V 20/56 |
| 2022/0036746 | A1 | 2/2022 | Petersen et al. |
| 2022/0324587 | A1 | 10/2022 | Holmer et al. |
| 2022/0413519 | A1 * | 12/2022 | Christensen ........... B64U 70/95 |

OTHER PUBLICATIONS

Burns, William Robert, "A Vision-Based Algorithm for UAV State Estimation During Vehicle Recovery", Thesis submitted to the graduate degree program in Aerospace Engineering and the Graduate Faculty of the University of Kansas in partial fulfillment of the requirements for the degree of Master of Science, Aug. 2011, 93 pages.

Doer, Christopher et al. "Autonomous Precision Takeoff and Landing System for VTOLs in Degraded Visual and GNSS Denied Environments", Deutscher Luft- und Raumfahrtkongress Conference, Sep. 2020, 12 pages.

Verbandt, M. et al., "Robust Marker-Tracking System for Vision-Based Autonomous Landing of VTOL UAVs", IMAV 2014: International Micro Air Vehicle Conference and Competition, Aug. 2014, 8 pages.

Abu Jbarra, Khaled "A Robust Vision-based Runway Detection and Tracking Algorithm for Automatic UAV Landing", Thesis submitted for the Degree of Masters of Science King Abdullah University of Science and Technology, Thuwal, Kingdom of Saudi Arabia, Apr. 2015, 68 pages.

Veneruso, Paolo et al., "Extending Enhanced Visual Operations to Urban Air Mobility: Requirements and Approaches", 2021 IEEE/AIAA 40th Digital Avionics Systems Conference (DASC), Oct. 2021, pp. 1-9.

Lazebnik, S. et al., "Beyond Bags of Features: Spatial Pyramid Matching for Recognizing Natural Scene Categories", Conference on Computer Vision and Pattern Recognition, 2006 IEEE Computer Society, New York, NY, USA, Jun. 17-22, 2006, IEEE Piscataway, NJ, USA, vol. 2, Jun. 17, 2006, pp. 2169-2178, XP010923120, DOI: 10.1109/CVPR.2006.68 ISBN: 978-0-7695-2597-6.

International Search Report and Written Opinion for PCT application No. PCT/US2023/073067, dated May 16, 2024, 25 pages.

* cited by examiner

SYSTEMS AND METHODS FOR ACTIVE-LIGHT BASED PRECISION LOCALIZATION OF AIRCRAFTS IN GPS-DENIED ENVIRONMENTS

CROSS-REFERENCE TO RELATED APPLICATIONS

This disclosure claims priority to U.S. Provisional Patent Application No. 63/420,616, titled "SYSTEMS AND METHODS FOR ACTIVE-LIGHT BASED PRECISION LOCALIZATION OF AIRCRAFTS IN GPS-DENIED ENVIRONMENTS," filed Oct. 30, 2022, as well as to U.S. Provisional Patent Application No. 63/381,571, titled "SYSTEMS AND METHODS FOR ACTIVE-LIGHT BASED PRECISION LOCALIZATION OF AIRCRAFTS IN GPS-DENIED ENVIRONMENTS," filed Oct. 31, 2022, the contents of which are incorporated herein in their entirety for all purposes.

The invention was made with Government support under Department of Defense Contract Number FA8649-22-P-0797. To correct a scrivener's error, the words "FA8649-21-P-0038" in the two earlier filed provisional patent applications (Ser. Nos. 63/420,616 and 63/381,571) should be replaced, and is hereby replaced, with "FA8649-22-P-0797." The Government has certain rights in the invention.

TECHNICAL FIELD

This disclosure relates generally to the field of powered aerial vehicles. More particularly, and without limitation, the present disclosure relates to electric vertical takeoff and landing (eVTOL) aerial vehicles and methods of providing high-accuracy, high-reliability, active-light based landing and takeoff localization guidance therefor. Certain aspects of the present disclosure generally relate to precision landing and take-off systems that may be used in other types of vehicles but provide particular advantages in aerial vehicles.

SUMMARY

Embodiments of the present disclosure generally relates to the field of electric powered vertical takeoff and landing (eVTOL) aerial vehicles. Moreover, and without limitation, this disclosure relates to systems and methods of providing guidance to assist eVTOL aerial vehicles in performing landing and takeoff operations at landing locations in GPS-denied environments or in areas where GPS is degraded and has limited accuracy. This disclosure further relates to methods of providing landing and takeoff guidance and estimating pose of an aerial vehicle with respect to the landing surface. The methods may include utilizing an active constellation of infrared or visible spectrum fiducial light sources distributed at known fixed locations around the designated landing site. These light sources are viewed by an onboard camera as the vehicle approaches the landing site. The pattern from the light sources projected onto the camera image plane can be used to reliably calculate the camera pose (position and attitude) to appropriate levels of accuracy required for precise eVTOL landing.

One aspect of the present disclosure is directed to a system comprising a landing surface for an aerial vehicle. The landing surface may comprise a plurality of light sources arranged in a predetermined pattern, wherein a characteristic of light emitted from each of the light sources is configured to be modulated with respect to time.

Another aspect of the present disclosure is directed to an aerial vehicle comprising a camera configured to generate images based on information transmitted by a plurality of light sources located adjacent a landing surface for the aerial vehicle; and a controller circuit configured to receive the generated images and determine a position and an orientation of the aerial vehicle based on the received images. The light sources are arranged in a predetermined pattern on the landing surface, and wherein a characteristic of light emitted from each of the light sources is modulated with respect to time.

Yet another aspect of the present disclosure is directed to a system, comprising a plurality of light sources arranged at a landing surface for an aerial vehicle, the arrangement of the light sources defining a set of intersecting virtual lines, the light sources arranged on each virtual line, wherein a distance between adjacent light sources on each virtual line is non-uniform.

Yet another aspect of the present disclosure is directed to a method for estimating a pose of an aerial vehicle. The method may comprise providing a landing surface comprising light sources arranged in a predetermined pattern, modulating a characteristic of light emitted from the light sources with respect to time, receiving, using a camera mounted on the aerial vehicle, an input signal associated with the light emitted from the light sources, generating an image of the light sources based on the received input signal, determining a location and an orientation of the aerial vehicle based on the image. Determining the location and the orientation of the aerial vehicle comprises detecting at least one of the light sources in the image, determining which of the at least one of the light sources arranged in the predetermined pattern the detected light source is, and determining the location and the orientation of the aerial vehicle based on the determination of which of the at least one of the light sources arranged in the predetermined pattern the detected light source is.

Yet another aspect of the present disclosure is directed to a computer-implemented system for estimating a pose of an aerial vehicle. The system may comprise a landing surface comprising light sources arranged in a predetermined pattern and at least one processor. The processor may be configured to: modulate a characteristic of light emitted from the light sources with respect to time; activate a camera mounted on the aerial vehicle to receive an input signal associated with the light emitted from the light sources; enable the camera to generate an image of the light sources based on the received input signal; determine a location and an orientation of the aerial vehicle based on the generated image. Determining the location and the orientation comprises: detecting at least one of the light sources in the image; determining which of the at least one of the light sources arranged in the predetermined pattern the detected light source is; and determining the location and the orientation of the aerial vehicle based on the determination of which of the at least one of the light sources arranged in the predetermined pattern the detected light source is.

Yet another aspect of the present disclosure is directed to a computer-implemented method of estimating a pose of an aerial vehicle, the method comprising the following operations performed by at least one processor: modulating, with respect to time, a characteristic of light emitted from light sources arranged in a predetermined pattern on a landing surface for the aerial vehicle; activating a camera mounted on the aerial vehicle to enable receiving an input signal associated with the light emitted from the light sources; enabling the camera to generate an image of the light sources based on the received input signal; determining location and an orientation of the aerial vehicle based on the image. Determining the location and the orientation comprises: detecting at least one of the light sources in the image; determining which of the at least one of the light sources arranged in the predetermined pattern the detected light source is; and determining the location and the orientation of the aerial vehicle based on the determination of which of the at least one of the light sources arranged in the predetermined pattern the detected light source is.

Yet another aspect of the present disclosure is directed to a non-transitory computer-readable medium that stores a set of instructions that is executable by at least one processor of an apparatus to cause the apparatus to perform a method. The method may comprise: modulating, with respect to time, a characteristic of light emitted from light sources arranged in a in predetermined pattern on a landing surface for the aerial vehicle; activating a camera mounted on the aerial vehicle to enable receiving an input signal associated with the light emitted from the light sources; enabling the camera to generate an image of the light sources based on the received input signal; determining a location and an orientation of the aerial vehicle based on the image. Determining the location and the orientation comprises: detecting at least one of the light sources in the image; determining which of the at least one of the light sources arranged in the predetermined pattern the detected light source is; and determining the location and the orientation of the aerial vehicle based on the determination of which of the at least one of the light sources arranged in the predetermined pattern the detected light source is.

Yet another aspect of the present disclosure is directed to an aerial vehicle. The aerial vehicle may comprise: a camera configured to generate images based on information received from a plurality of light sources located on a landing surface for the aerial vehicle; a processor associated with the camera. The processor may be configured to receive the images and to perform the following operations: detecting, using a detection algorithm, light sources in the image, the light sources arranged on the landing surface and configured to emit light detectable by the camera; performing association of locations in the image representing the detected light sources to corresponding locations of the light sources on the landing surface, wherein the processor is configured to perform the association in a first mode of operation and a second mode of operation; executing one or more association algorithms in the first mode of operation and generating a confidence score of the association; executing one or more tracking algorithms in the second mode of operation, based on the confidence score obtained from the first mode of operation; and determining one of a location or orientation of the aerial vehicle based on the performed association.

Yet another aspect of the present disclosure is directed to a method of operating an aerial vehicle. The method may comprise: generating images with a camera based on information received from a plurality of light sources located on a landing surface for the aerial vehicle; detecting, using a detection algorithm, light sources in the image, the light sources arranged on the landing surface and configured to emit light detectable by the camera; performing association of locations in the image representing the detected light sources to corresponding locations of the light sources on the landing surface, wherein performing the association comprises a first mode of operation and a second mode of operation, wherein the first mode of operation comprises executing one or more association algorithms and generating a confidence score of the association; the second mode of operation comprises executing one or more tracking algorithms based on the confidence score obtained from the first mode of operation; and determining one of a location or orientation of the aerial vehicle based on the performed association.

Yet another aspect of the present disclosure is directed to a navigation system for an aerial vehicle. The navigation system may comprise: a camera configured to generate images based on information received from a plurality of light sources arranged in a predetermined pattern on a landing surface for an aerial vehicle; a processor associated with the camera and configured to receive the images and to perform the following operations: activating, using the processor, a camera mounted on the aerial vehicle to enable receiving an input signal associated with light emitted from light sources arranged in a predetermined pattern on the landing surface for the aerial vehicle, the light having a characteristic that is modulated with respect to time; enabling the camera to generate at least two images of the light sources based on the received input signal; detecting, using a detection algorithm, the light sources in the at least two images; performing an association of locations in the image representing the detected light sources to corresponding locations of the light sources on the landing surface, wherein the processor is configured to perform the association in a first mode of operation and a second mode of operation; executing one or more association algorithms in the first mode of operation; executing one or more tracking algorithms in the second mode of operation, based results obtained from the first mode of operation; and determining one of a location or an orientation of the aerial vehicle based on the performed association.

Yet another aspect of the present disclosure is directed to a system. The system may comprise: a landing surface for an aerial vehicle; and a plurality of light sources arranged in a predetermined pattern, a characteristic of light emitted from each of the light sources is configured to be modulated with respect to time, wherein the plurality of light sources comprises linear light sources and point light sources, and wherein the landing surface comprises a portable landing surface.

BRIEF DESCRIPTIONS OF FIGURE AND APPENDIX IMAGES

FIGS. 13A, 13B, 13C, and 13D illustrate an exemplary matching and association process using a Thin Plate Spline algorithm, consistent with some disclosed embodiments.

Figure 14A:

FIG. 14A illustrates an exemplary camera image with detected points, consistent with some disclosed embodiments.

Figure 14B:
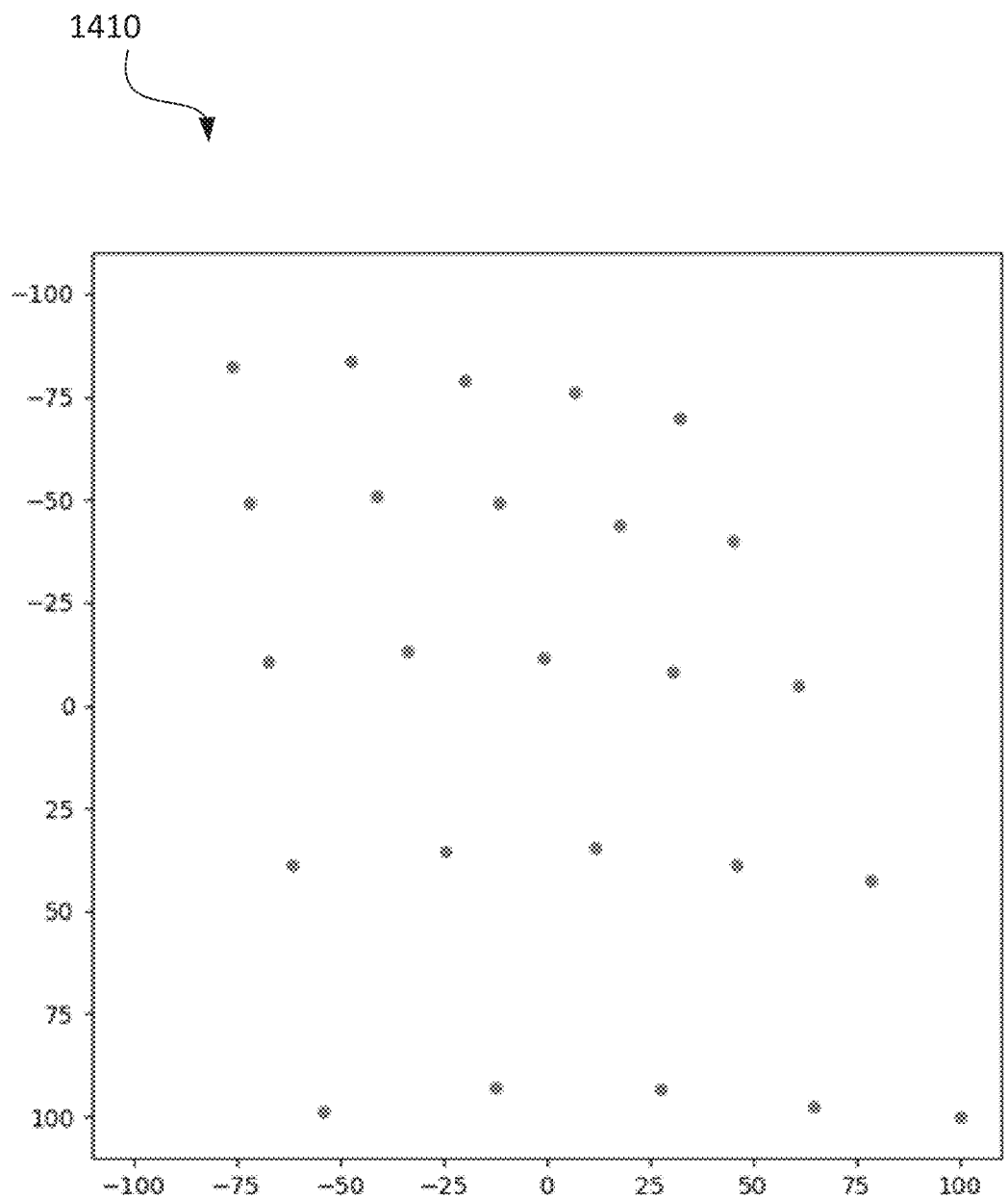

FIG. 14B illustrates a schematic diagram of detected points normalized within a pre-defined space, consistent with some disclosed embodiments.

Figure 4A:
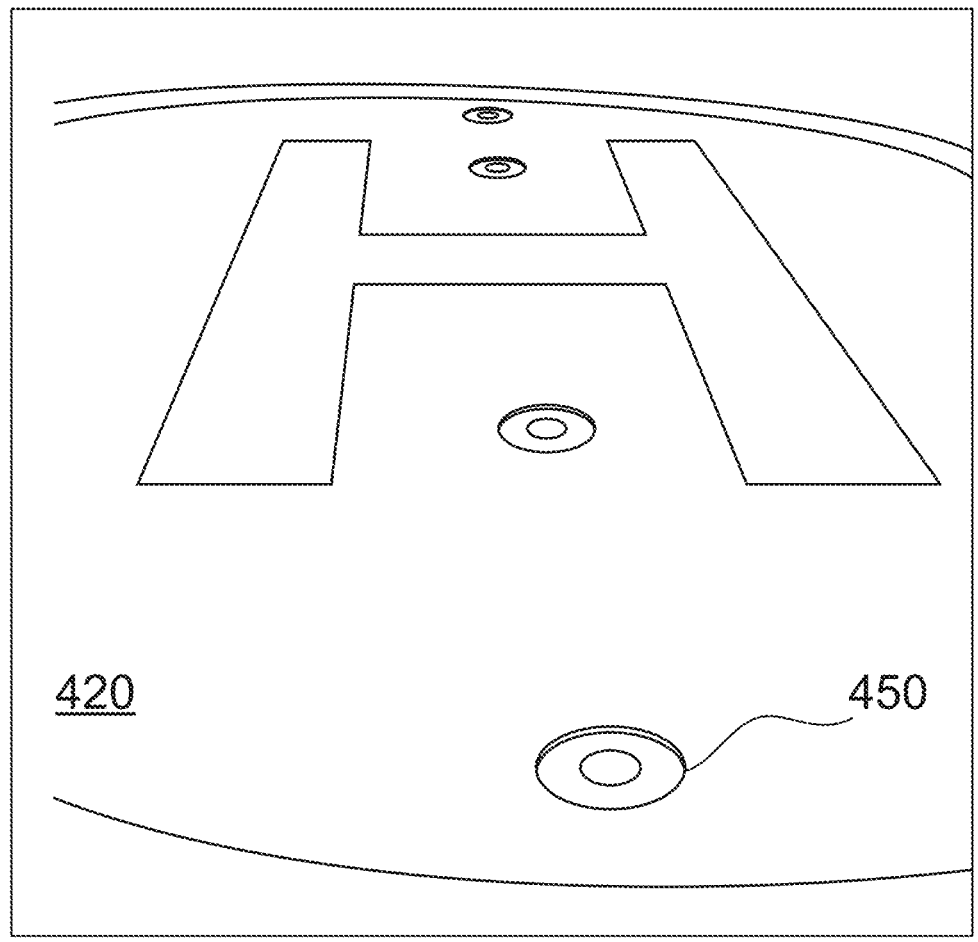
FIGS. 4A and 4B illustrate an exemplary landing surface or a vertiport and an exemplary light source, respectively, consistent with some disclosed embodiments.
Figure 4B:
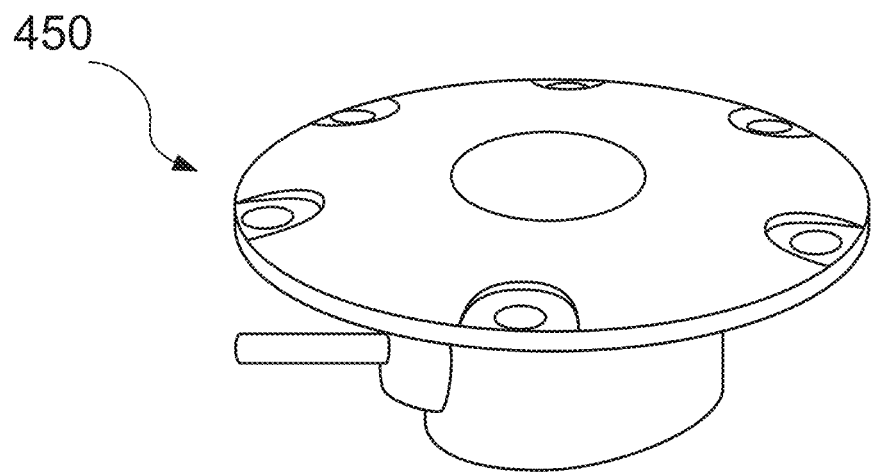
Figure 14C:
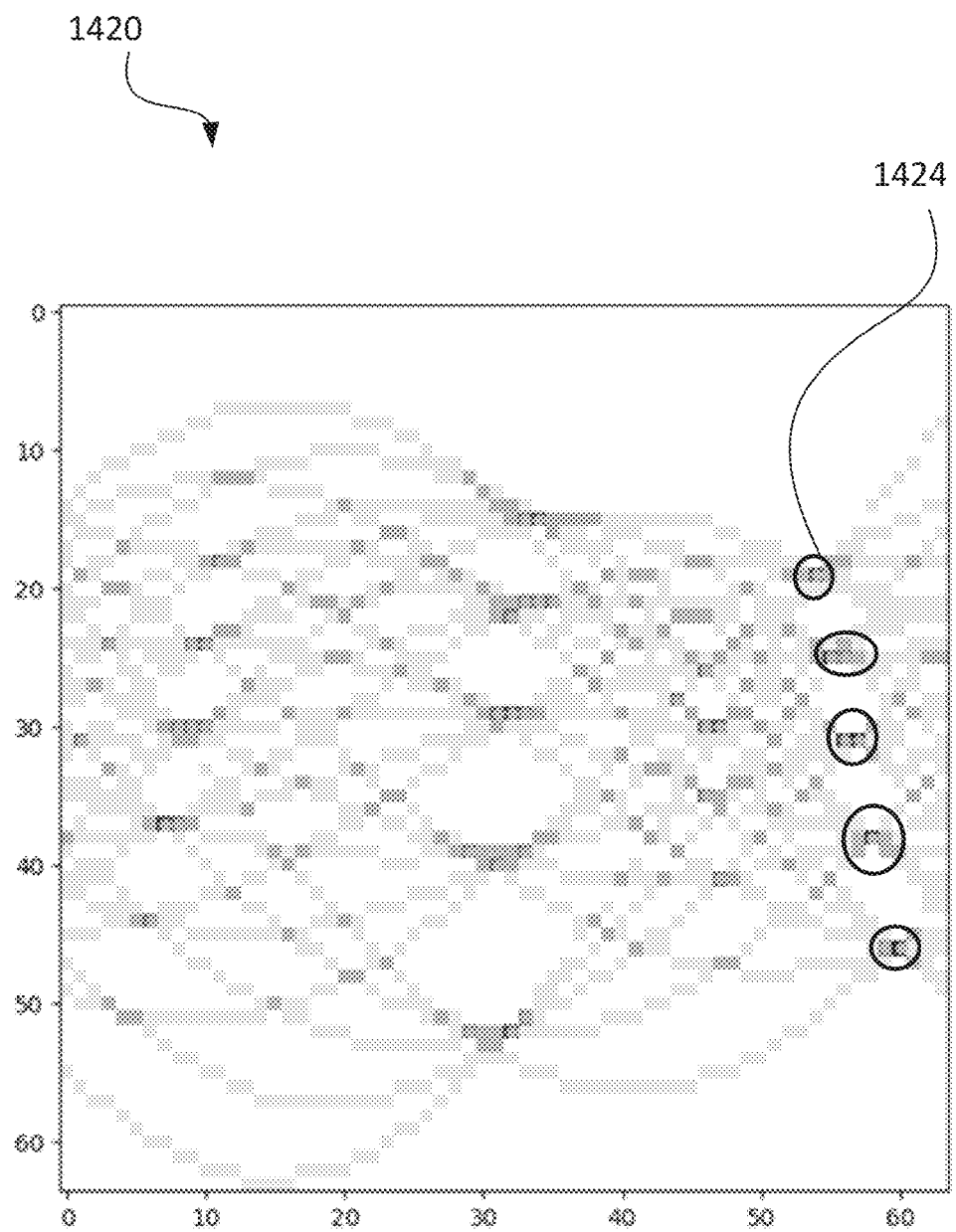

FIG. 14C illustrates an exemplary Hough Transform space including a mapping of lines passing through a given point in FIG. 4B, consistent with some disclosed embodiments.

Figure 14D:
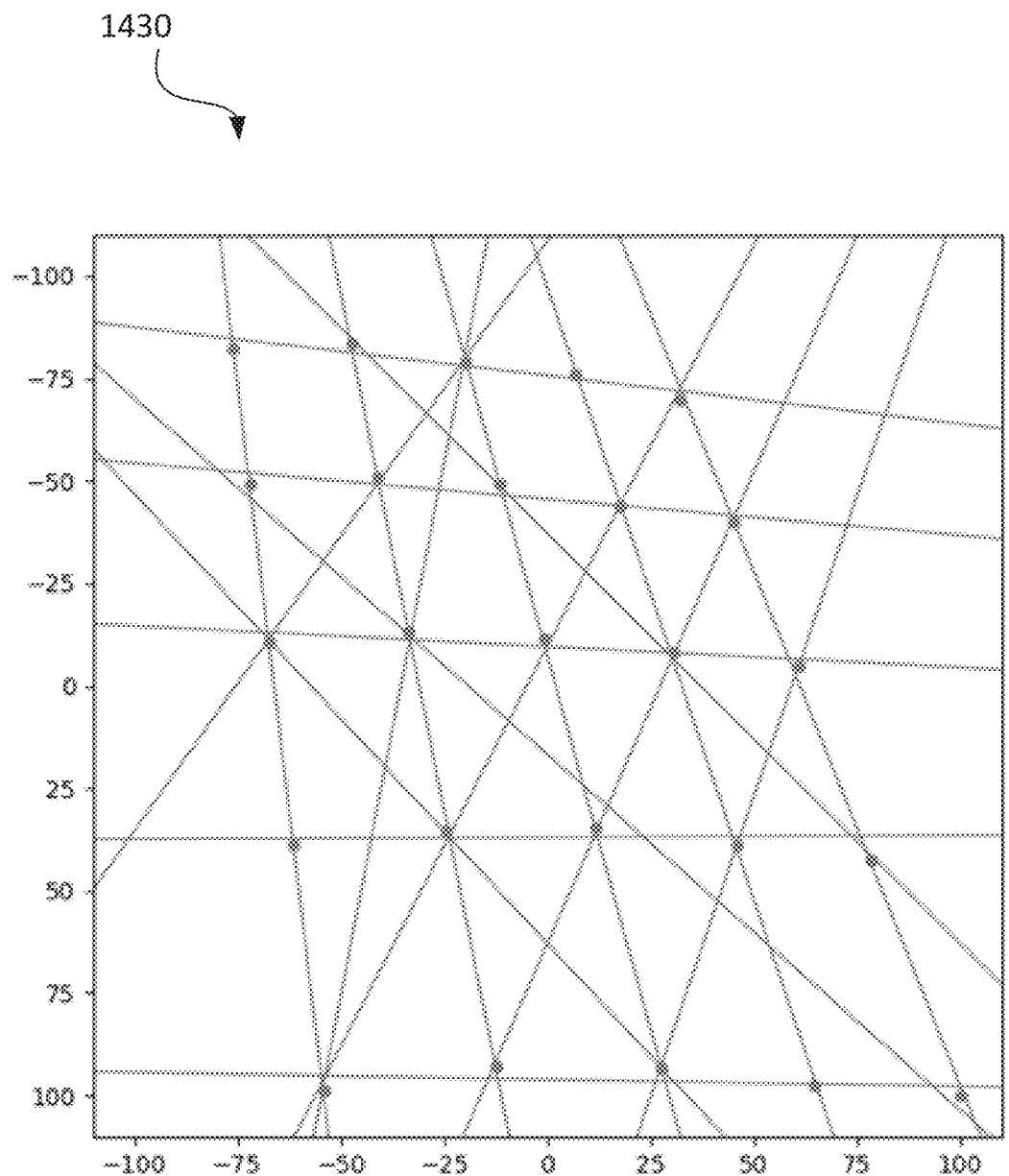

FIG. 14D illustrates a schematic diagram of lines formed by discretization of points in FIG. 14C in Hough space, consistent with some disclosed embodiments.

Figure 14E:
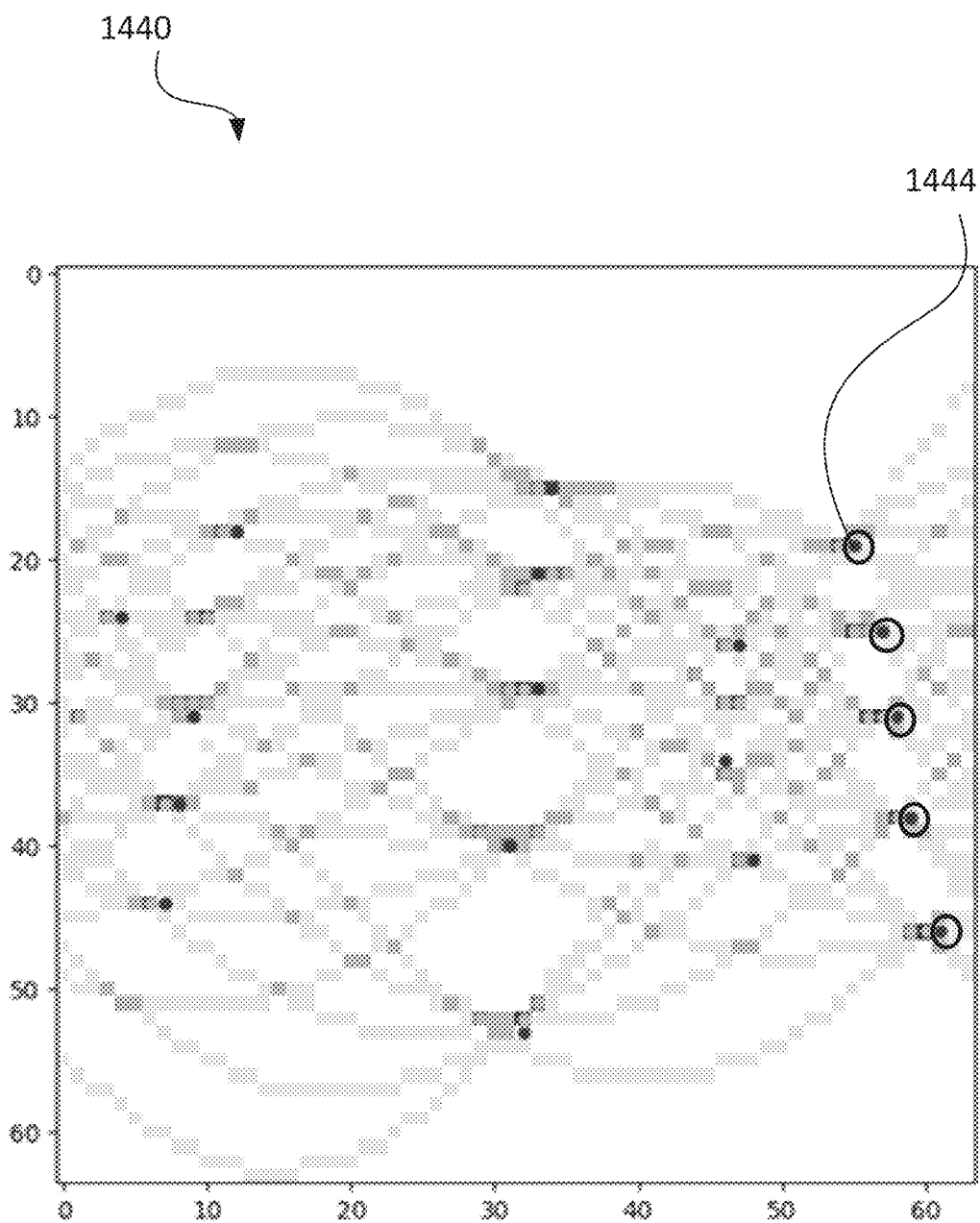

FIG. 14E illustrates an exemplary Hough Transform space with line refinement, consistent with some disclosed embodiments.

Figure 14F:
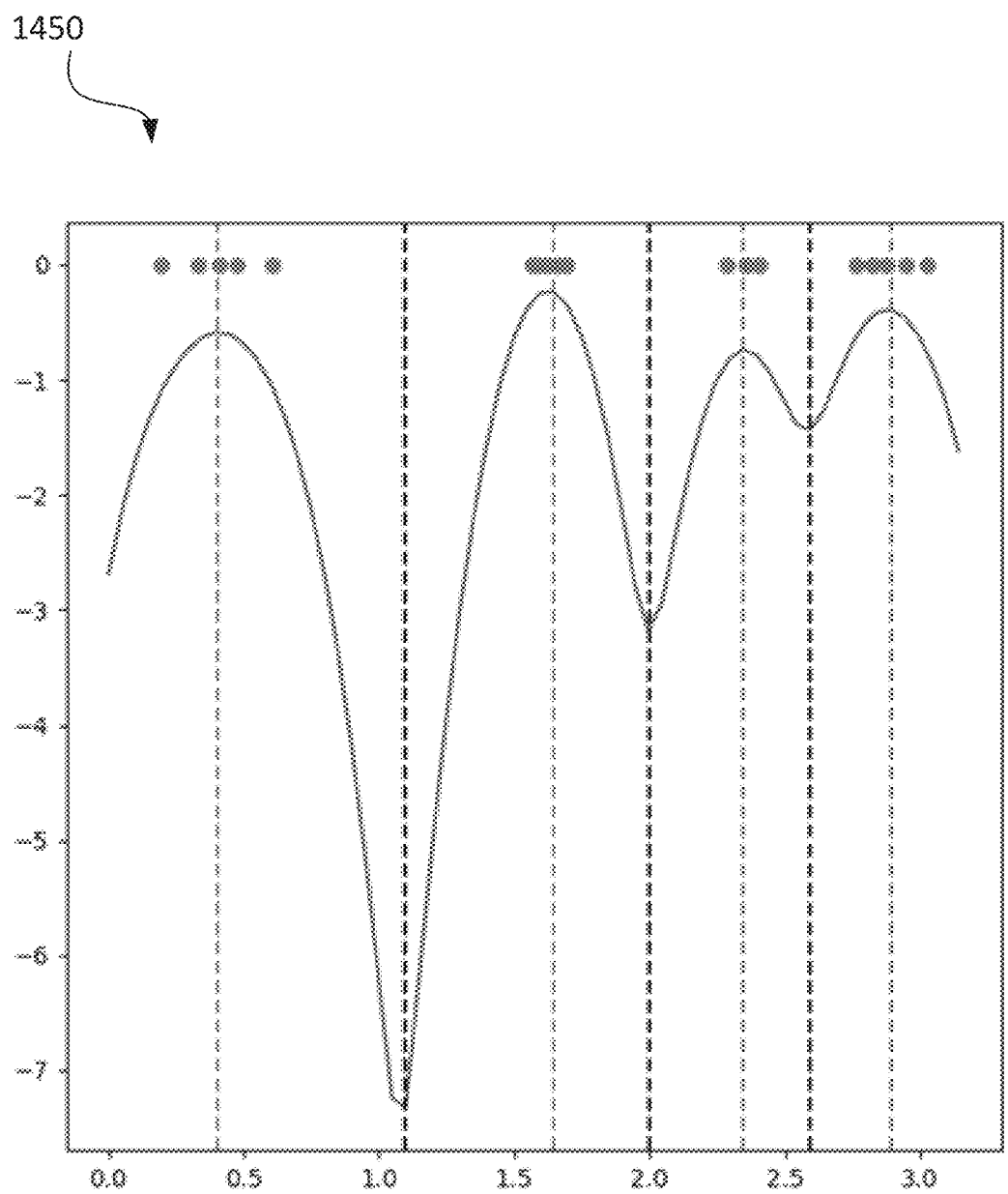

FIG. 14F illustrates an exemplary k-means clustering representation of refined lines in FIG. 14E, consistent with some disclosed embodiments.

Figure 14G:
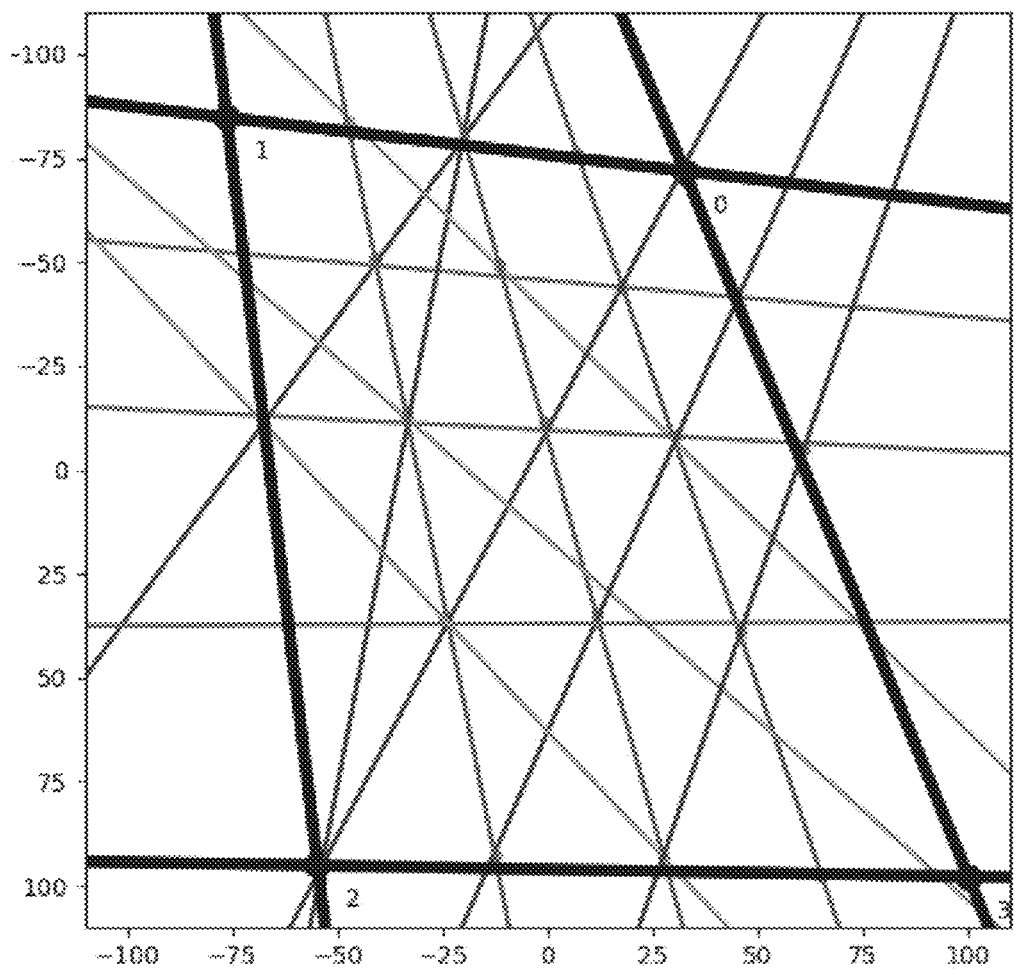

FIG. 14G illustrates an exemplary representation of mapped points in a two-dimensional space, consistent with some disclosed embodiments.

Figure 14H:
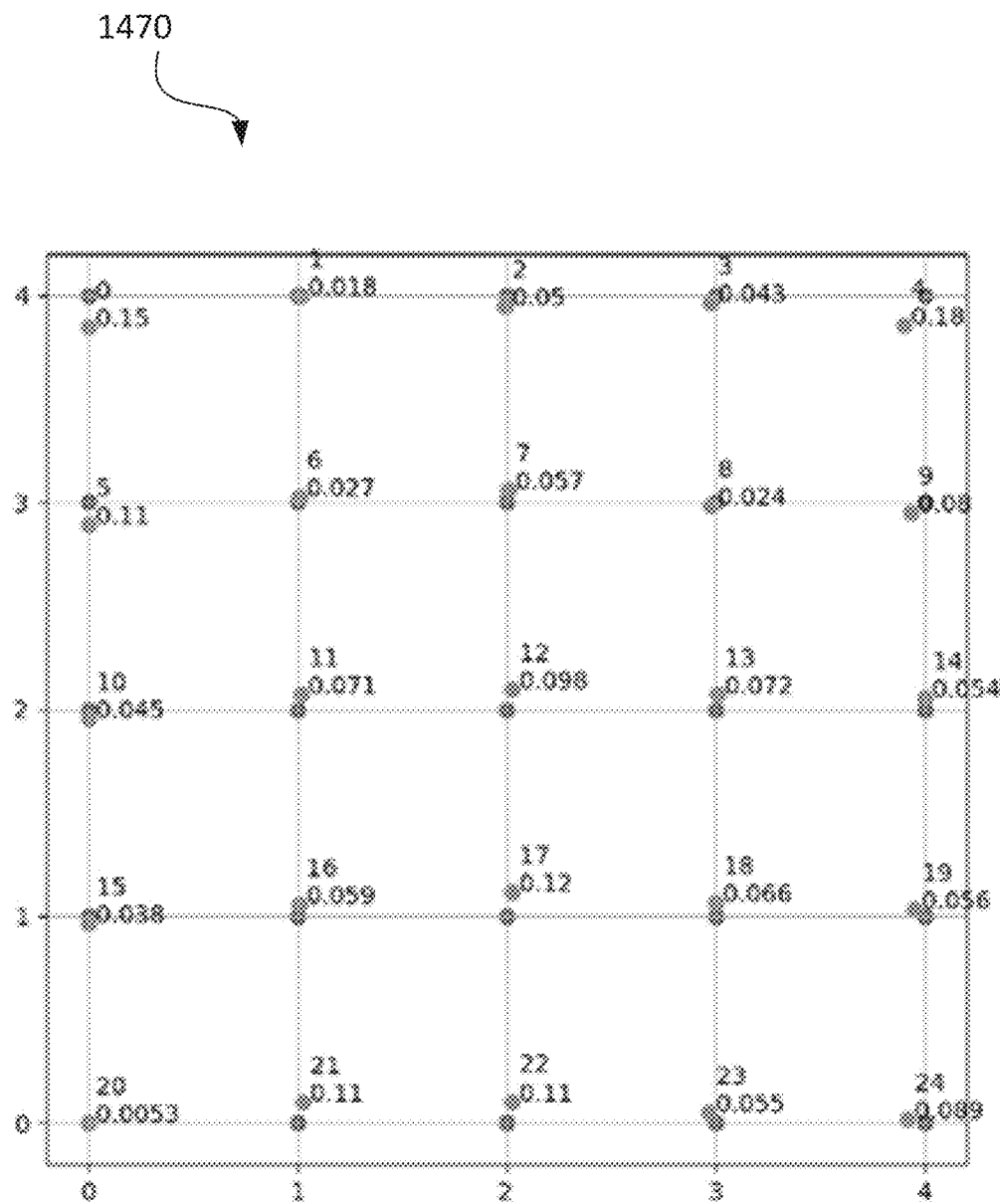

FIG. 14H illustrates an exemplary projection of points in FIG. 14G on to an integer grid space, consistent with some disclosed embodiments.

Figure 14J:

FIG. 14J illustrates an exemplary detection with association annotations of light sources based on information from FIG. 14H, consistent with some disclosed embodiments.

Figure 15A:
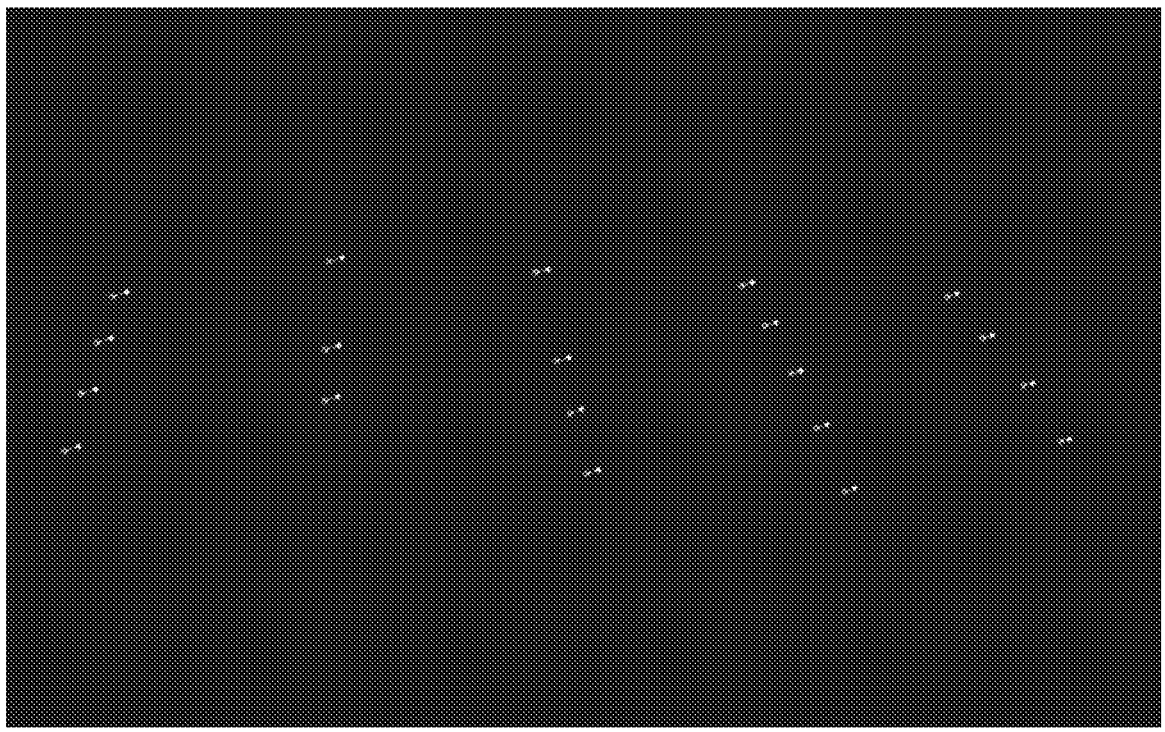

FIG. 15A illustrates an exemplary image showing a shift between frame points and the corresponding new predicted locations using the homography, consistent with some disclosed embodiments.

Figure 15B:

FIG. 15B illustrates an exemplary image generated by using a nearest-neighbor based search to identify the corresponding detection to a tracked known association, consistent with some disclosed embodiments.

Figure 16A:

FIG. 16A illustrates an exemplary constellation linear pattern of light sources, consistent with some disclosed embodiments.

Figure 16B:
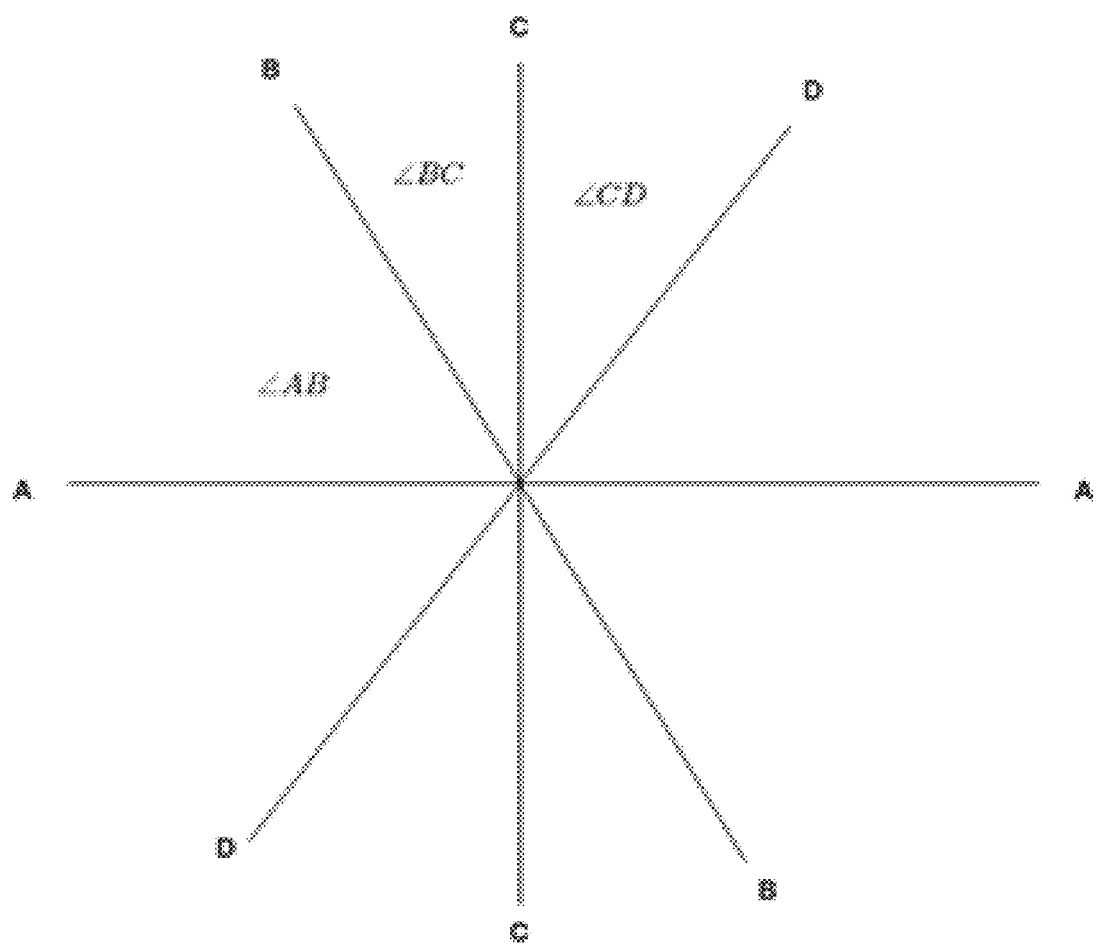

FIG. 16B illustrates an exemplary constellation star pattern of light sources, consistent with some disclosed embodiments.

Figure 17A:
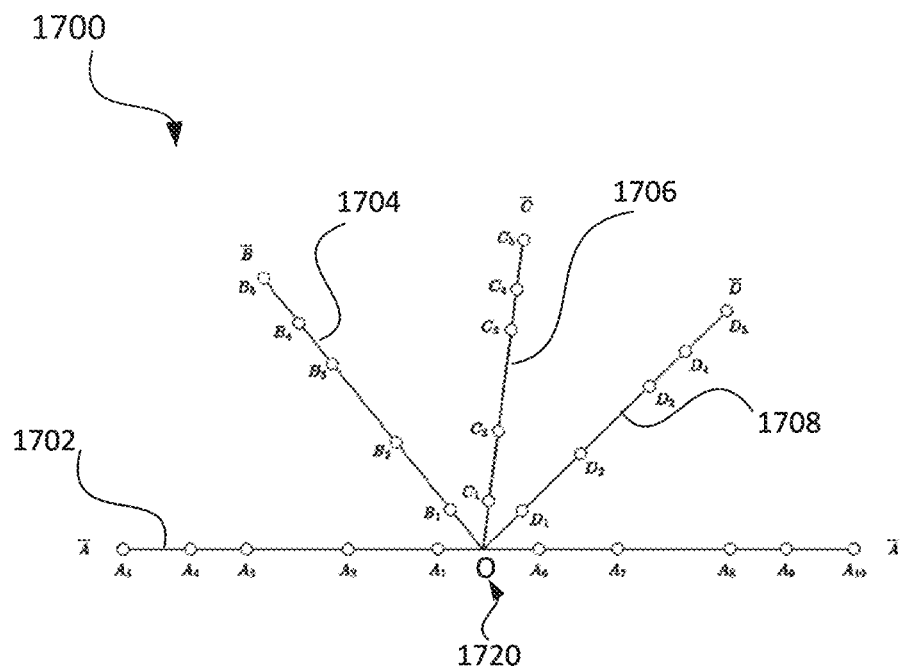
Figure 17B:
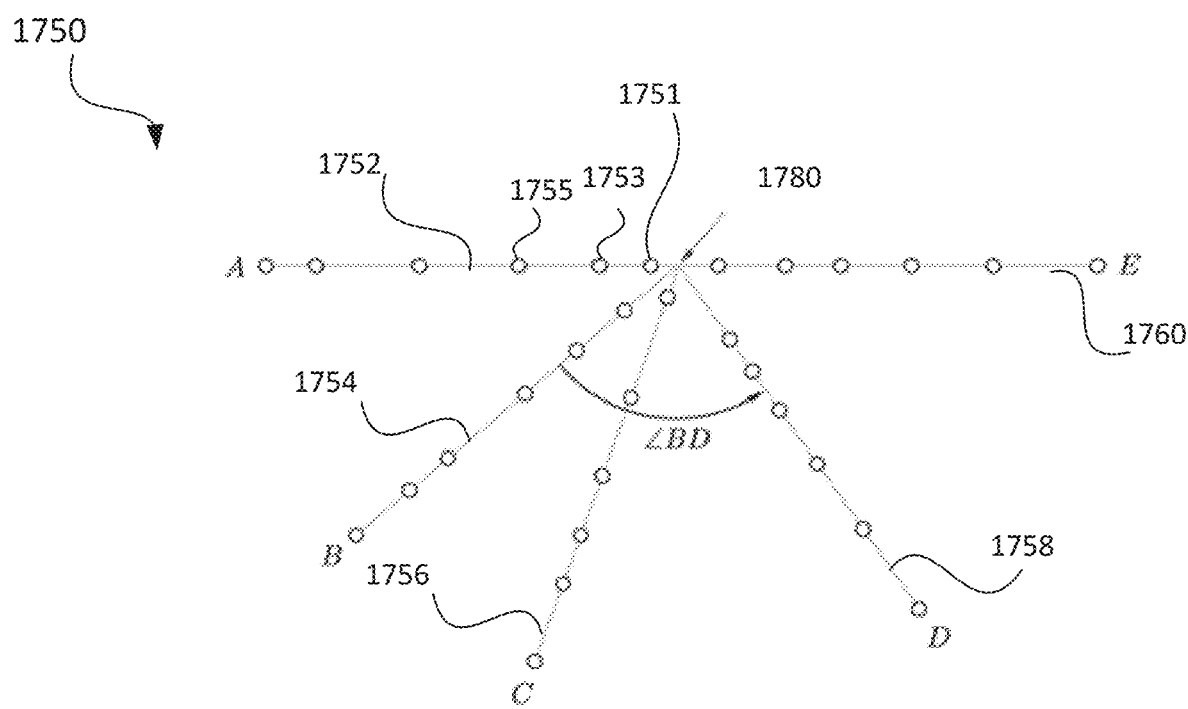

FIGS. 17A and 17B illustrates an exemplary constellation pattern of light sources, consistent with some disclosed embodiments.

Figure 18A:
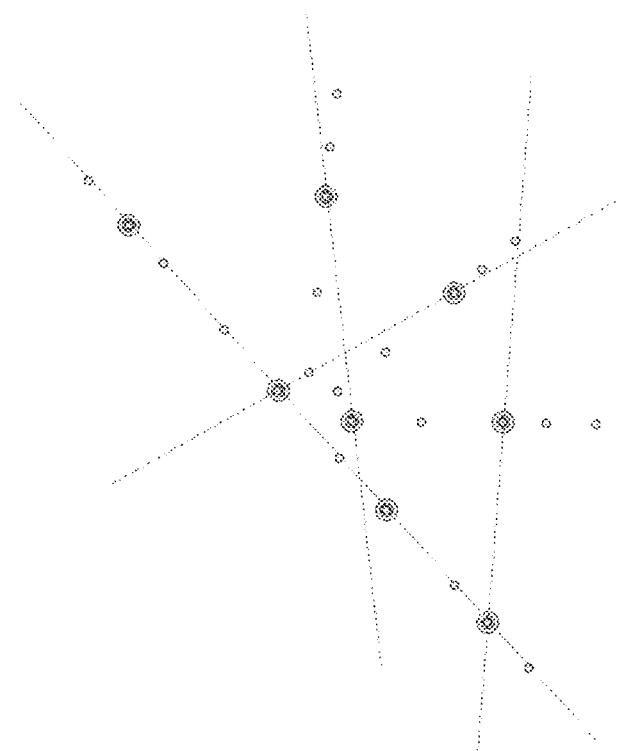
Figure 18B:
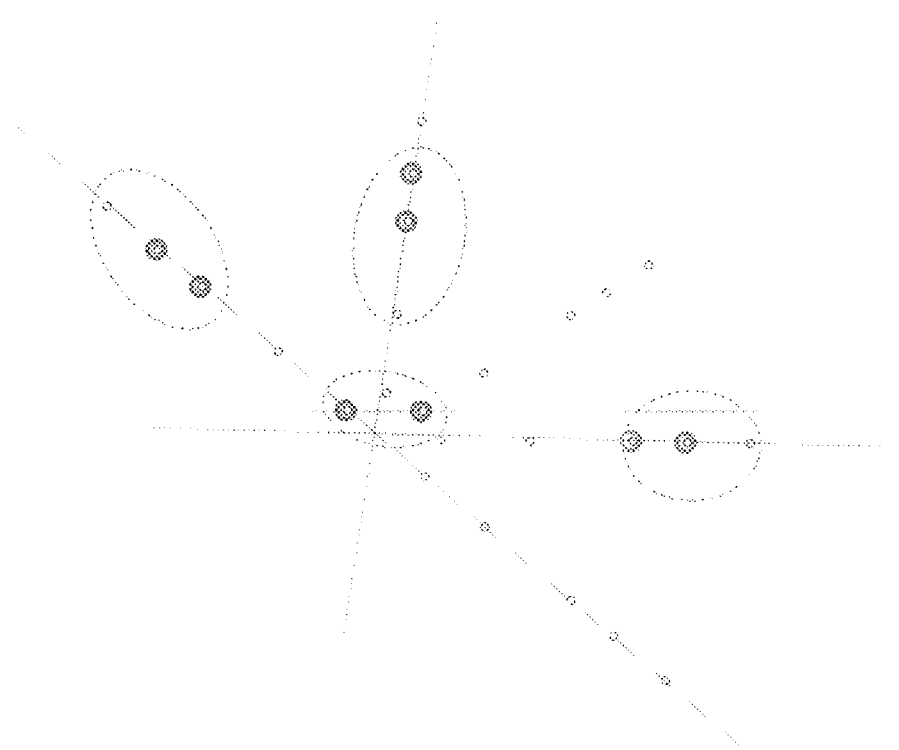

FIGS. 18A and 18B illustrate an exemplary set of lines using Random Sampling Consensus (RANSAC) sampling method, consistent with some disclosed embodiments.

Figure 18C:
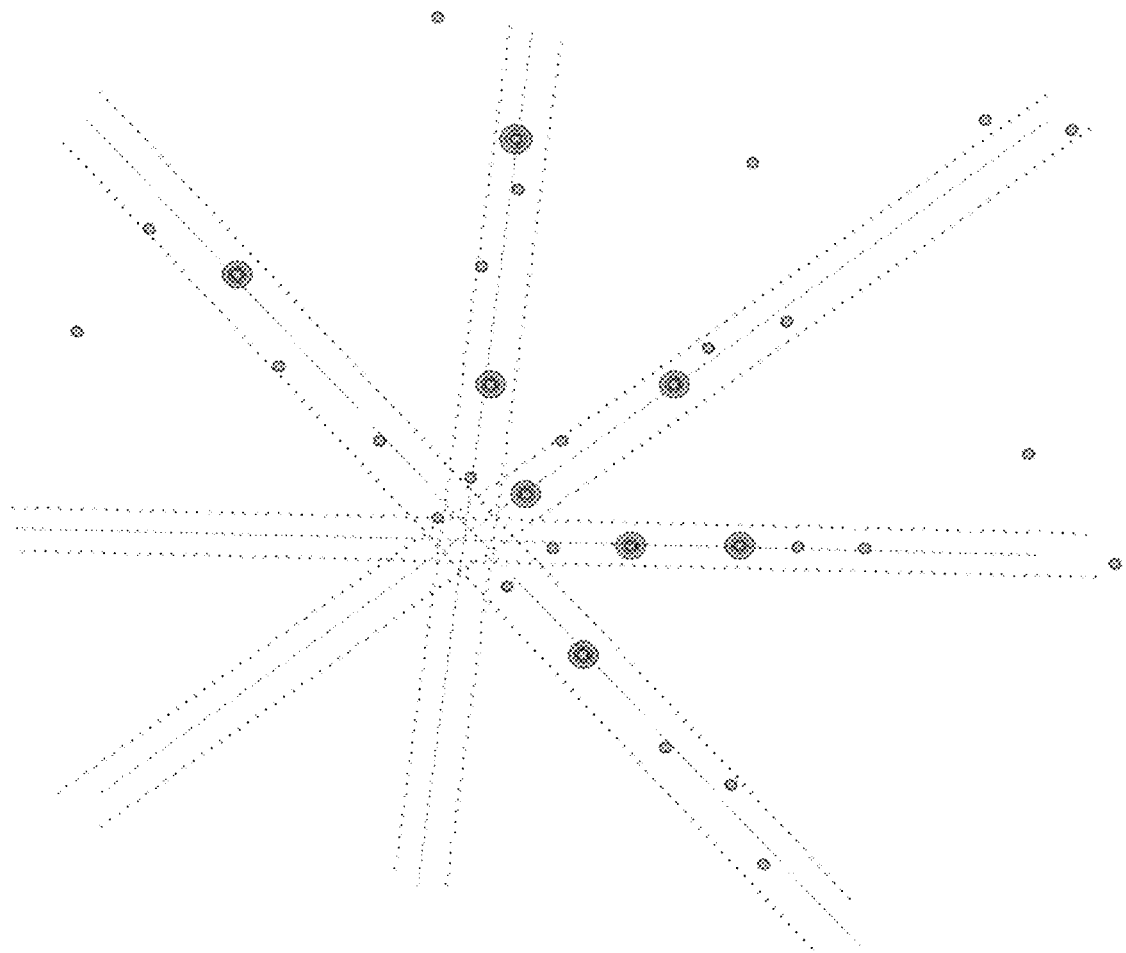

FIG. 18C illustrates visualization of a process for calculating inliers after finding a suitable candidate set of lines, consistent with some disclosed embodiments.

Figure 18D:
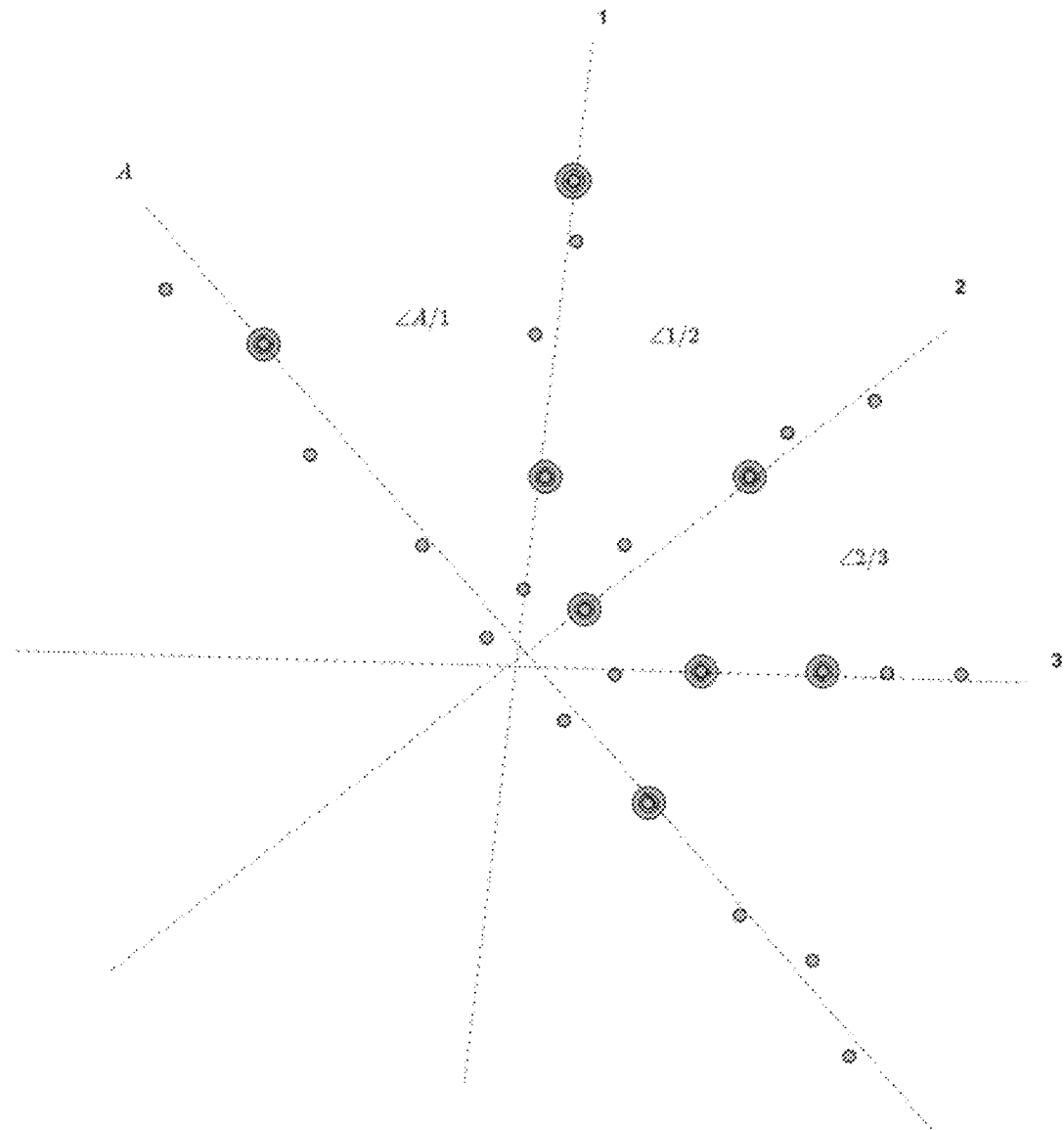

FIG. 18D illustrates an example of using angular cross-ratios to determine identity of lines in the constellation, consistent with some disclosed embodiments.

Figure 19:
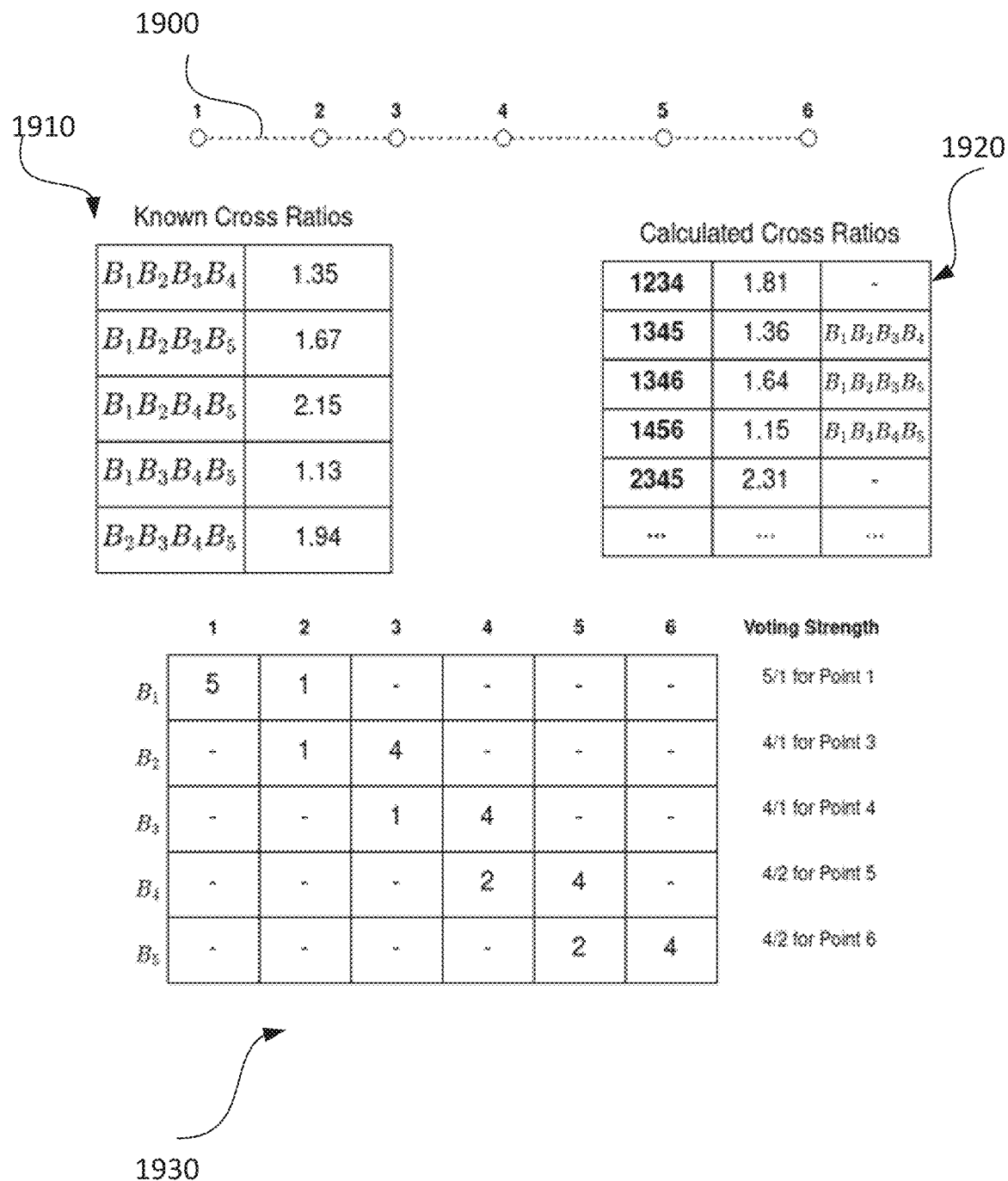

FIG. 19 illustrates an exemplary voting scheme using linear cross-ratios to determine identity of points, consistent with some disclosed embodiments.

Figure 20A:
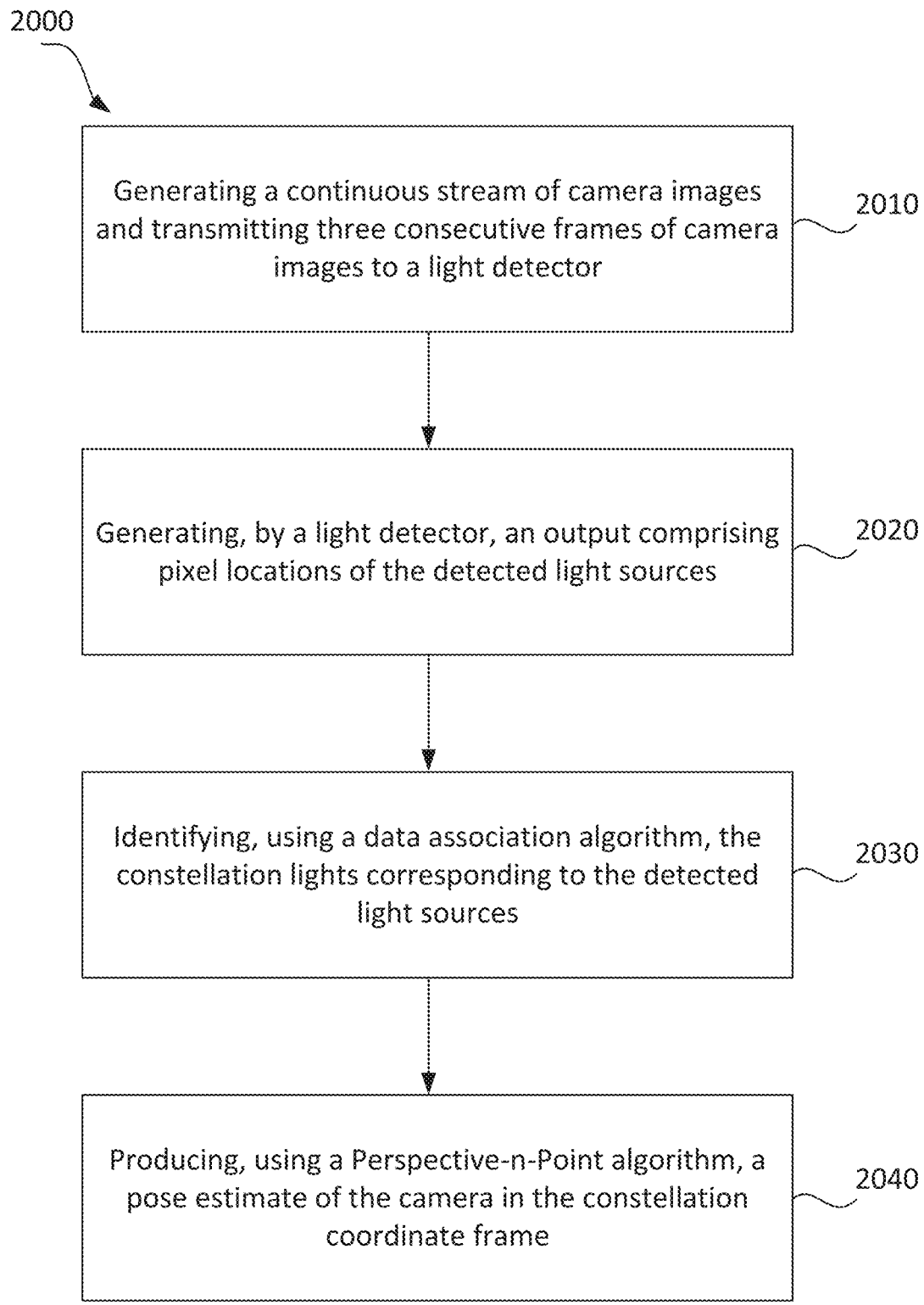

FIG. 20A is a flowchart illustrating an exemplary method for pose estimation using data association algorithm, consistent with some disclosed embodiments.

Figure 20B:
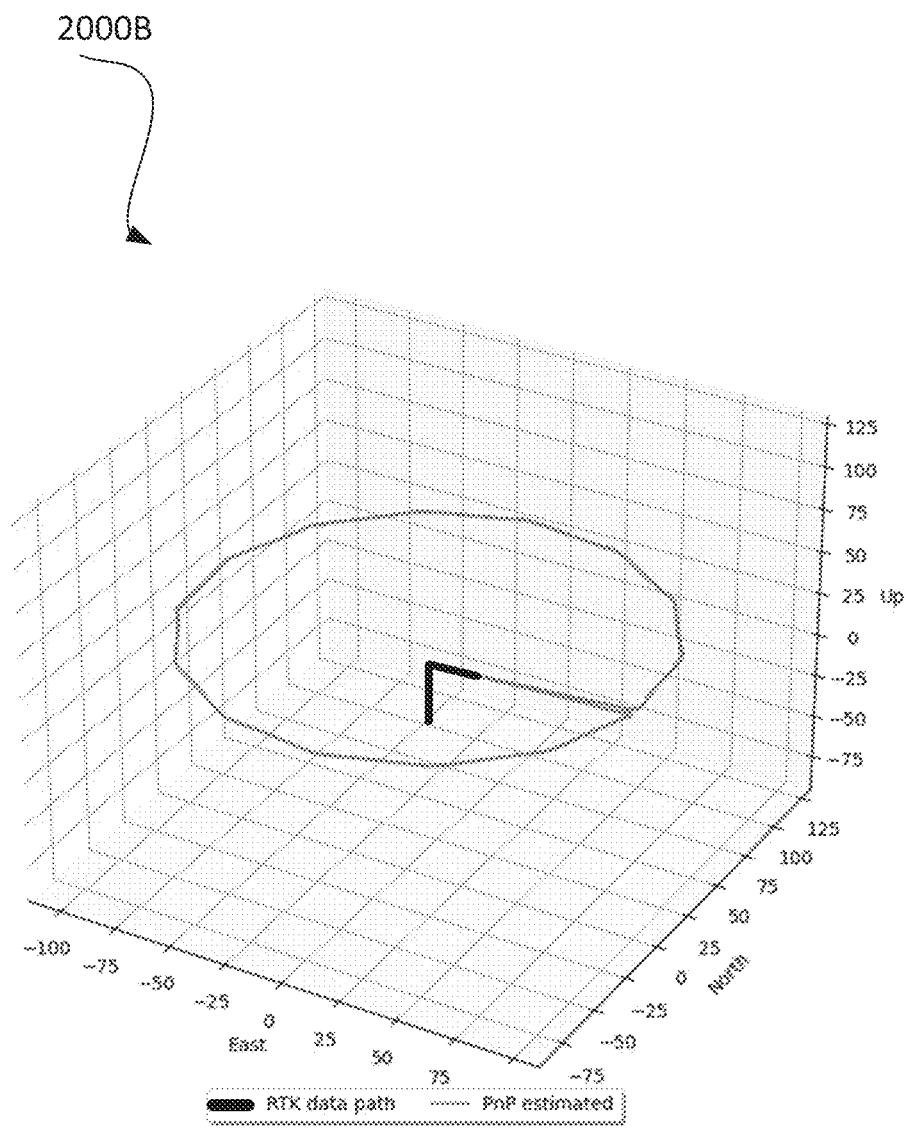

FIG. 20B illustrates an exemplary plot showing a simulated circular trajectory flown around constellation, consistent with some disclosed embodiments.

Figure 21:
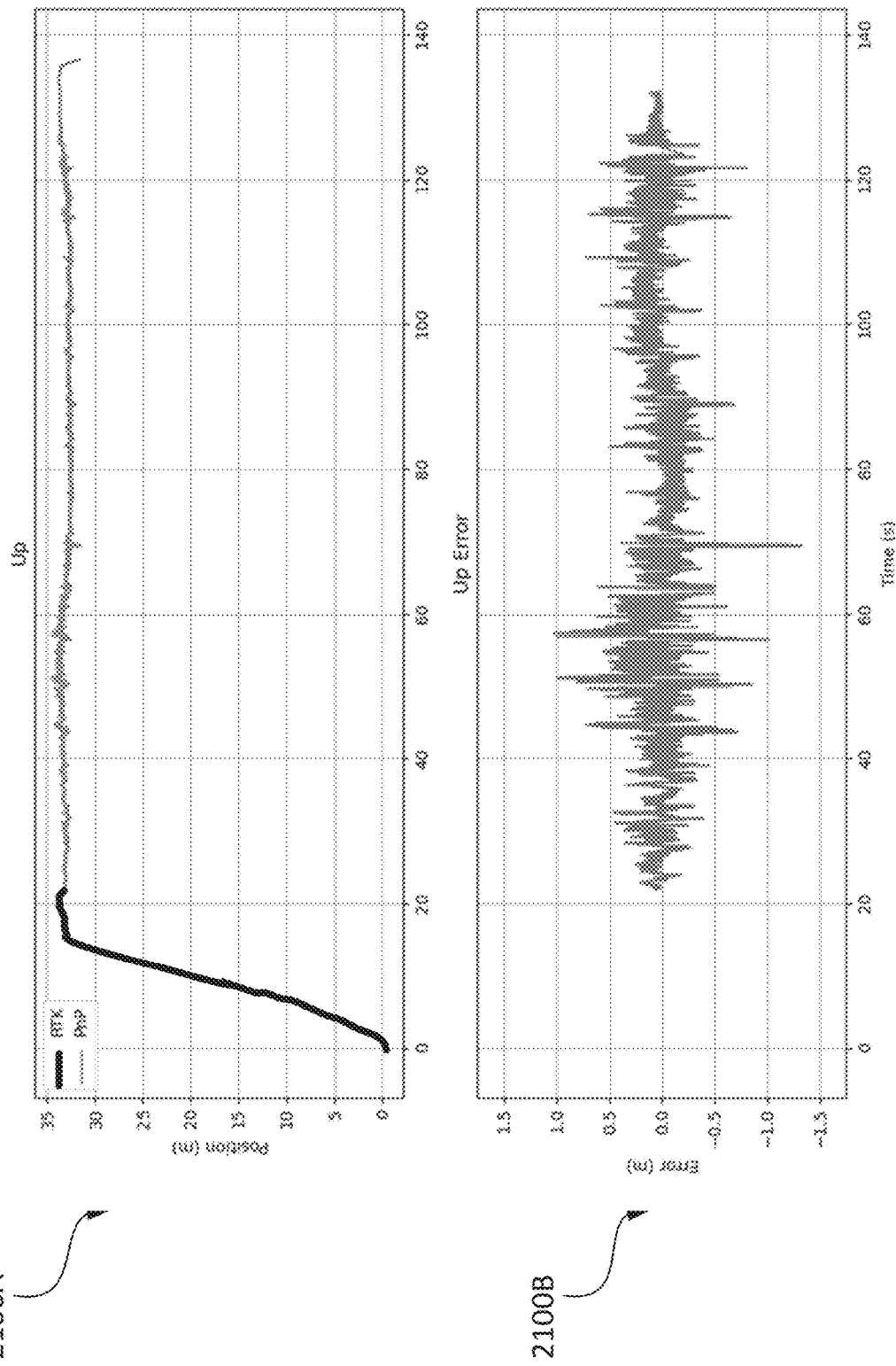

FIG. 21 illustrates data plots 2100A and 2100B indicating altitude estimates and corresponding error, respectively, for the flight trajectory shown in FIG. 20, consistent with some disclosed embodiments.

Figure 22:
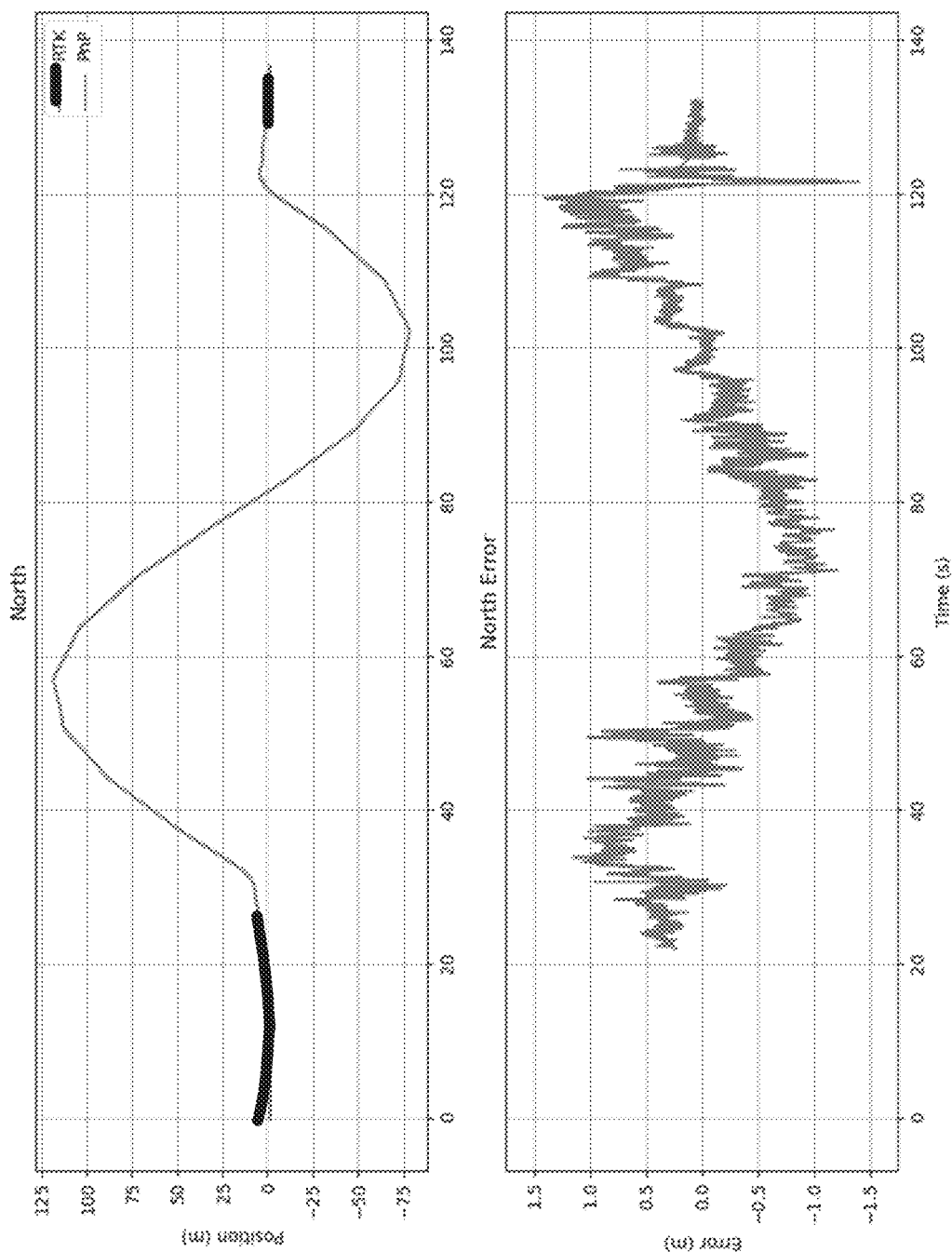

FIG. 22 illustrates data plots 2200A and 2200B indicating north estimates vs. ground truth and corresponding error, respectively, for the flight trajectory shown in FIG. 20, consistent with some disclosed embodiments.

Figure 23:
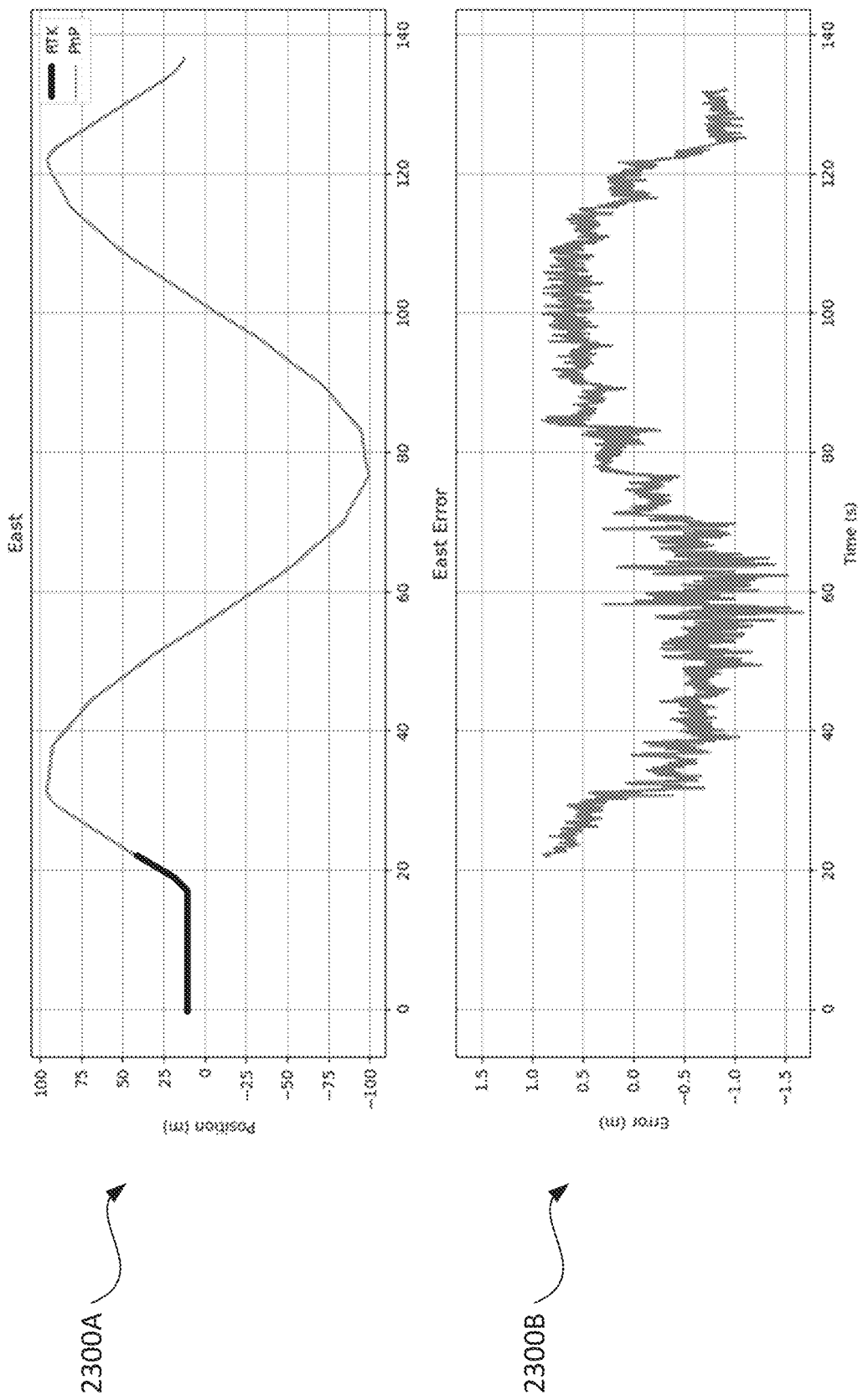

FIG. 23 illustrates data plots 2300A and 2300B indicating east estimates vs. ground truth and corresponding error, respectively, for the flight trajectory shown in FIG. 20, consistent with some disclosed embodiments.

Figure 24A:
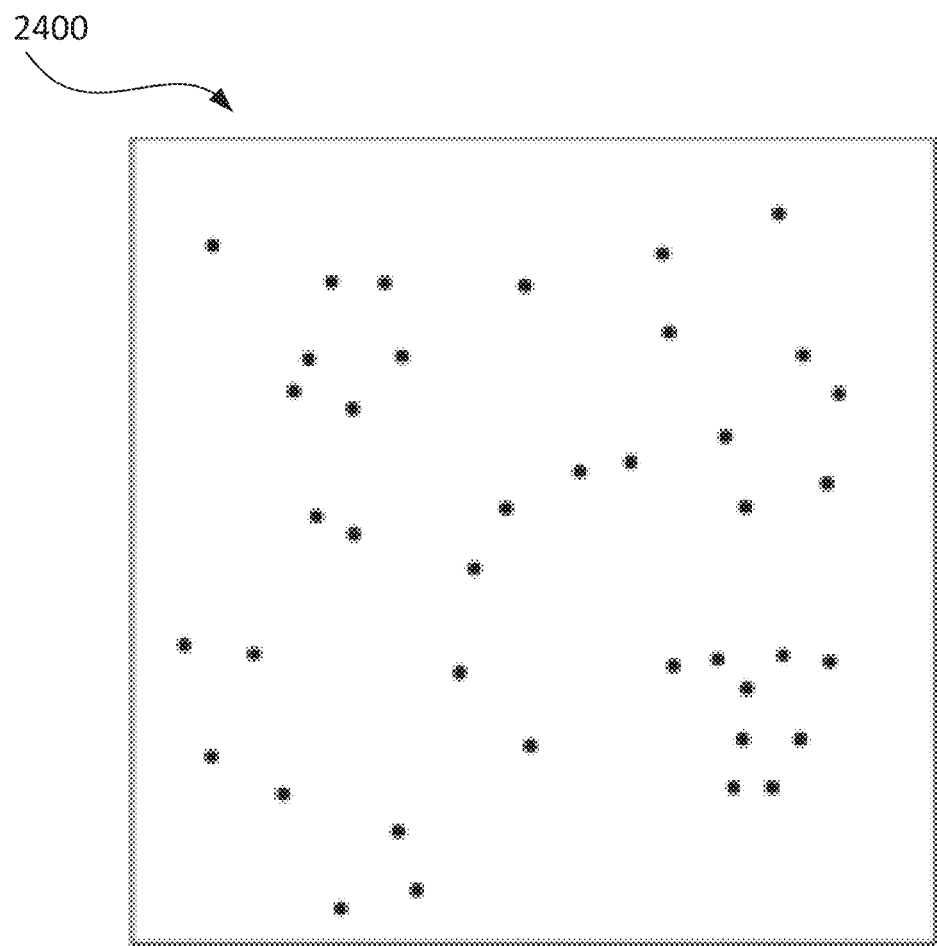

FIG. 24A illustrates a schematic of an exemplary random dot marker, consistent with some disclosed embodiments.

Figure 24B:
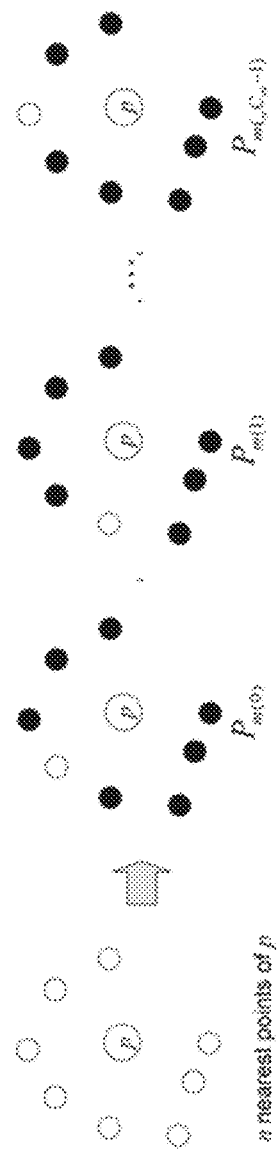
Figure 24C:
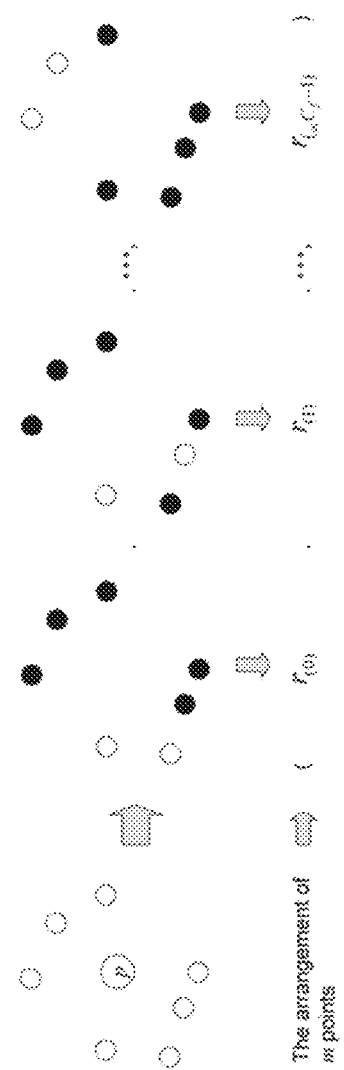

FIGS. 24B and 24C illustrate exemplary point identification approach using Locally Likely Arrangement Hashing (LLAH) algorithm, consistent with some disclosed embodiments.

Figure 24D:
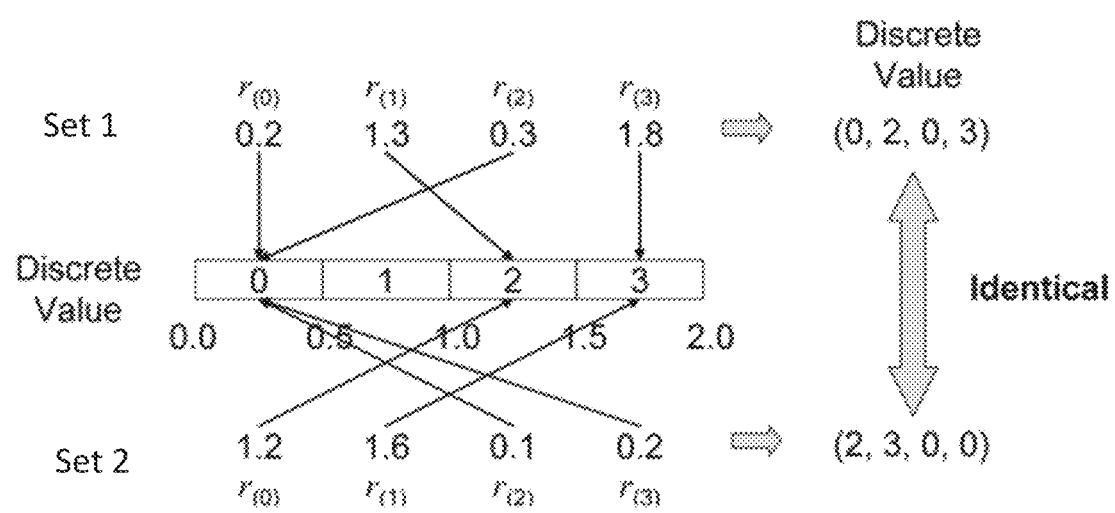

FIG. 24D illustrates an exemplary discretization method of cross-ratios to create discretized cross-ratio sequence, consistent with some disclosed embodiments.

Figure 24E:
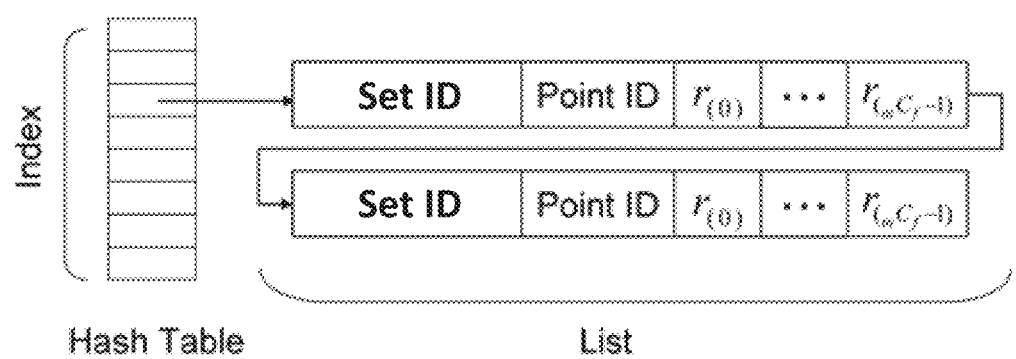

FIG. 24E illustrates an exemplary hashtable for keypoint registration, consistent with some disclosed embodiments.

Figure 25:
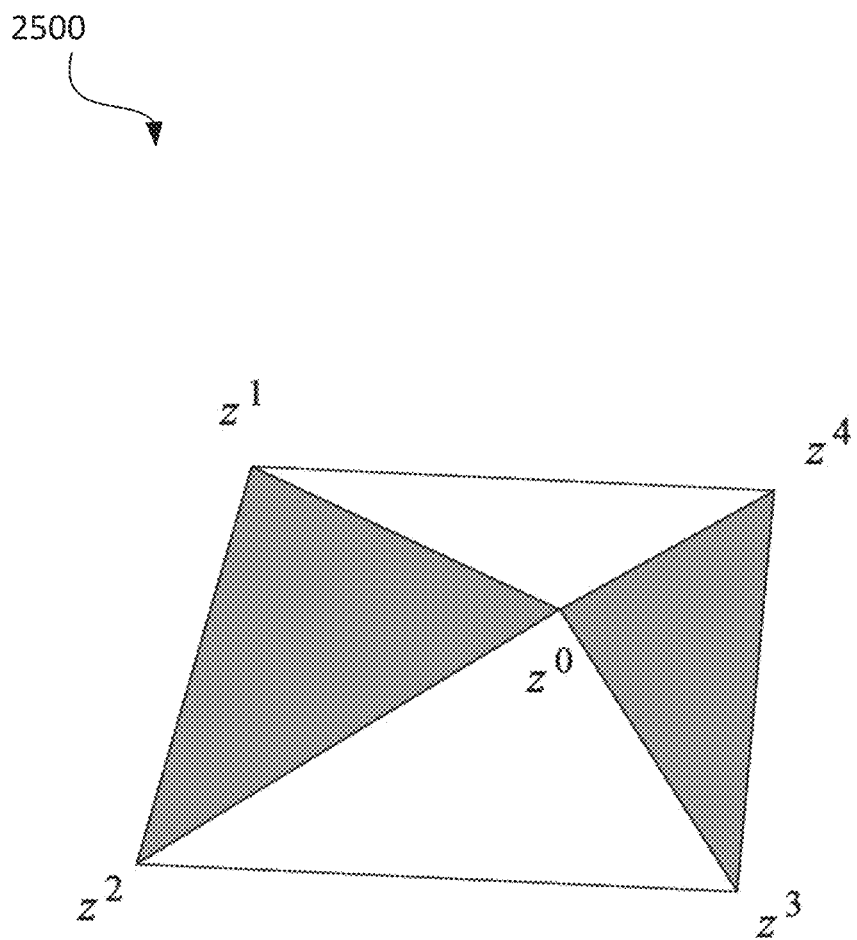

FIG. 25 illustrates an exemplary area cross-ratio calculation for a subset of coplanar lights, consistent with some disclosed embodiments.

Figure 26A:
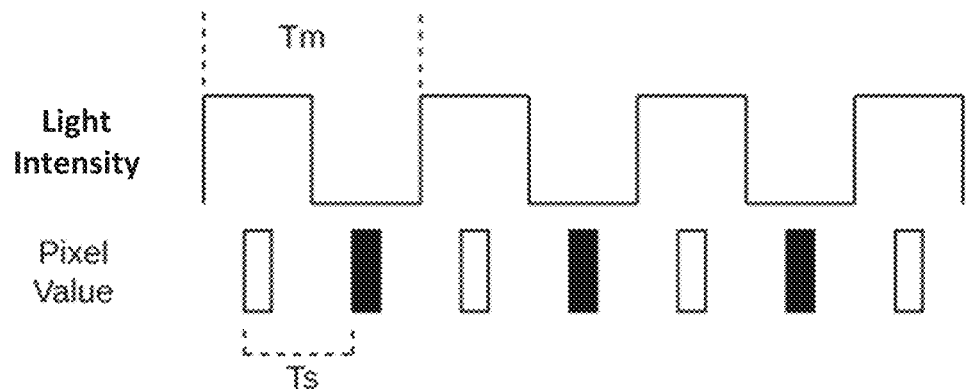
Figure 26B:
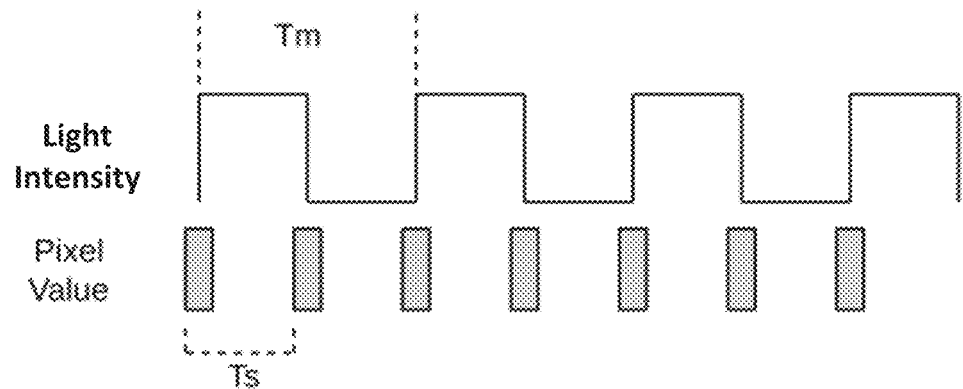
Figure 26C:
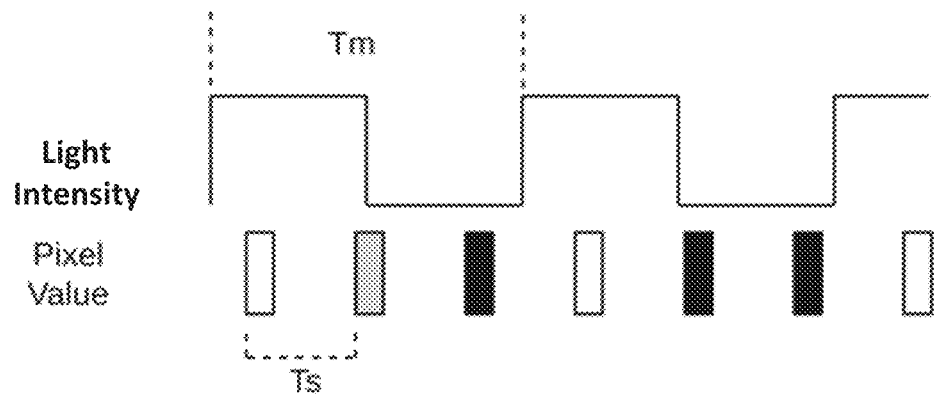

FIGS. 26A, 26B, and 26C illustrate exemplary waveforms representing intensity modulation and camera shutter speed operation used for encoding/decoding information algorithms, consistent with some disclosed embodiments.

Figure 27A:
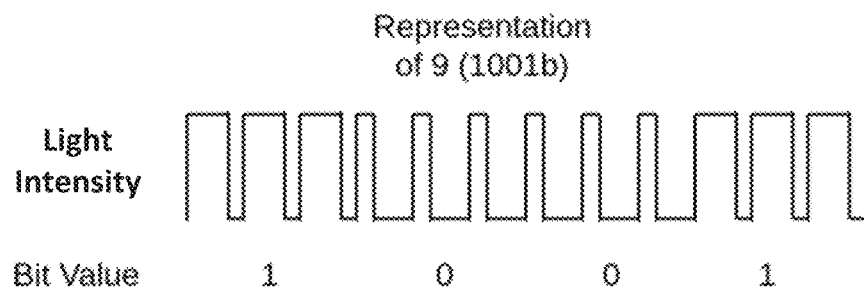
Figure 27B:
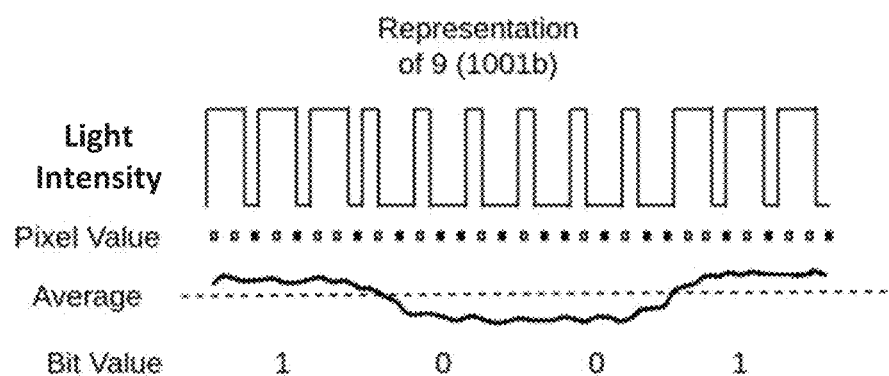
Figure 27C:
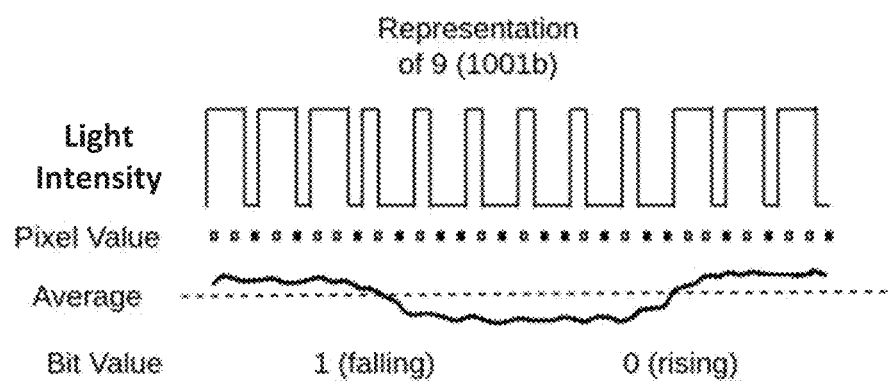

FIGS. 27A, 27B, and 27C illustrate exemplary modulation schemes for data transmission using the light sources, consistent with some disclosed embodiments.

Figure 28:
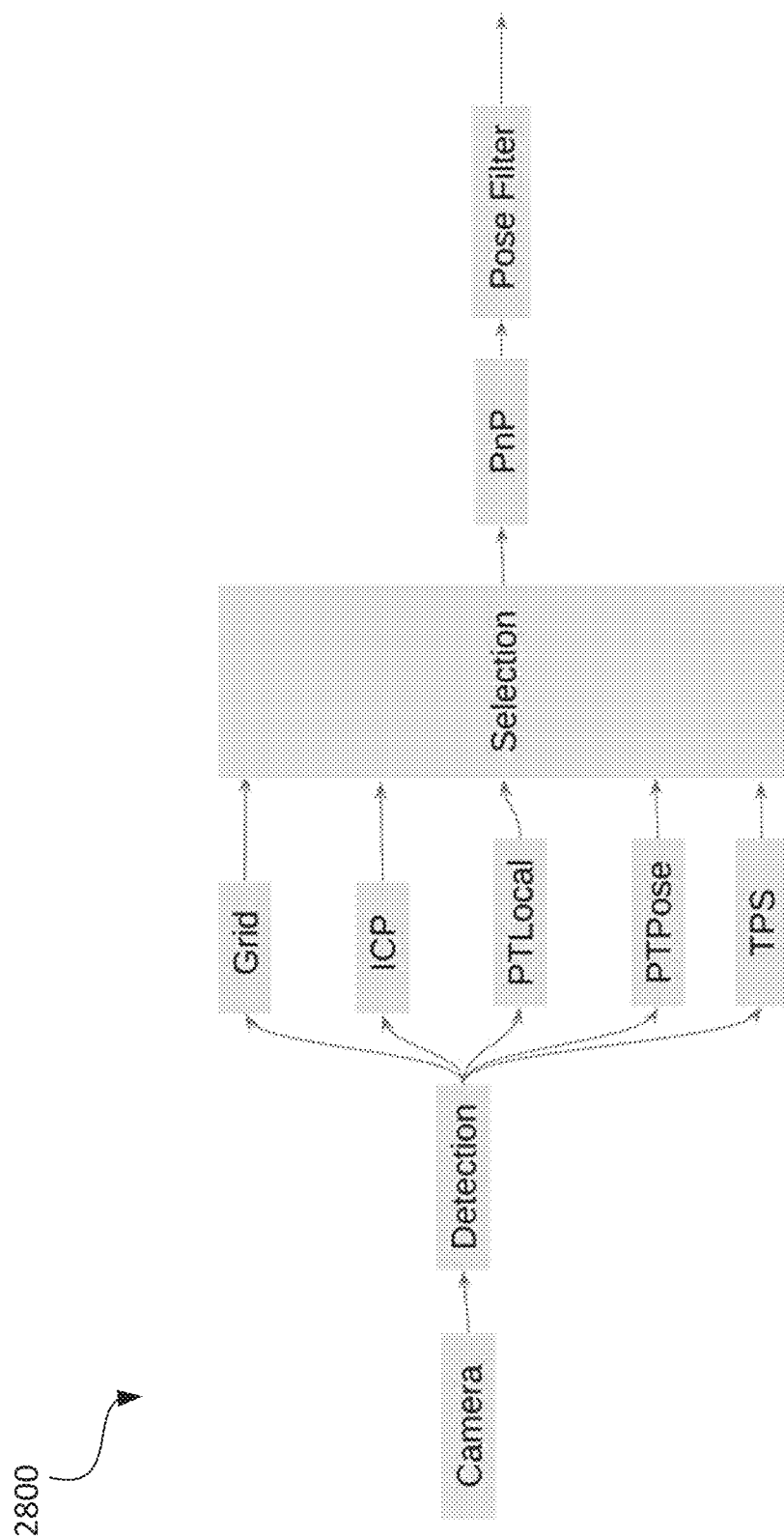

FIG. 28 is a flowchart illustrating an example method for data association synthesis, consistent with some disclosed embodiments.

Figure 29:
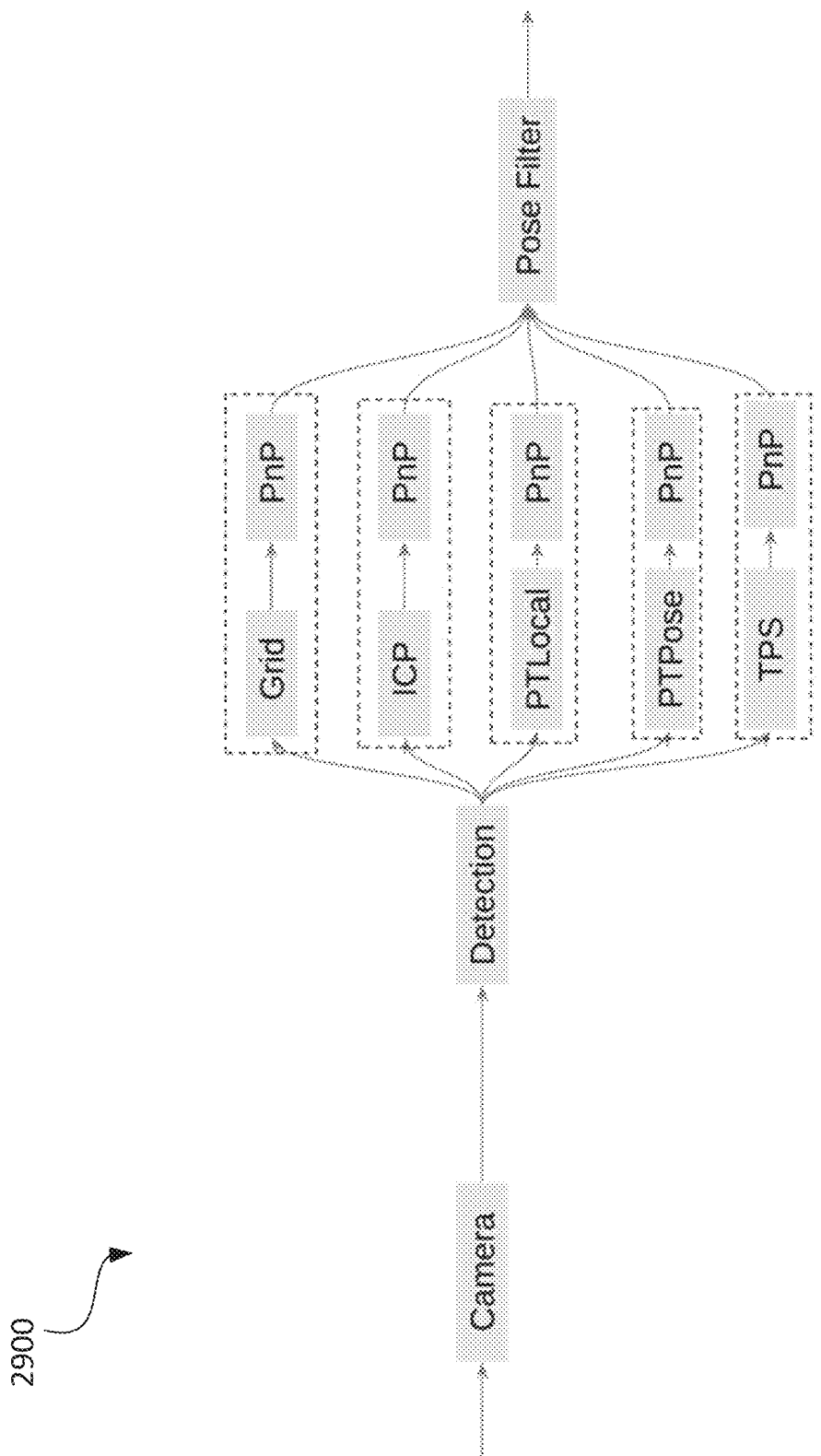

FIG. 29 is a flowchart illustrating an example method for data association synthesis, consistent with some disclosed embodiments.

Figure 30:
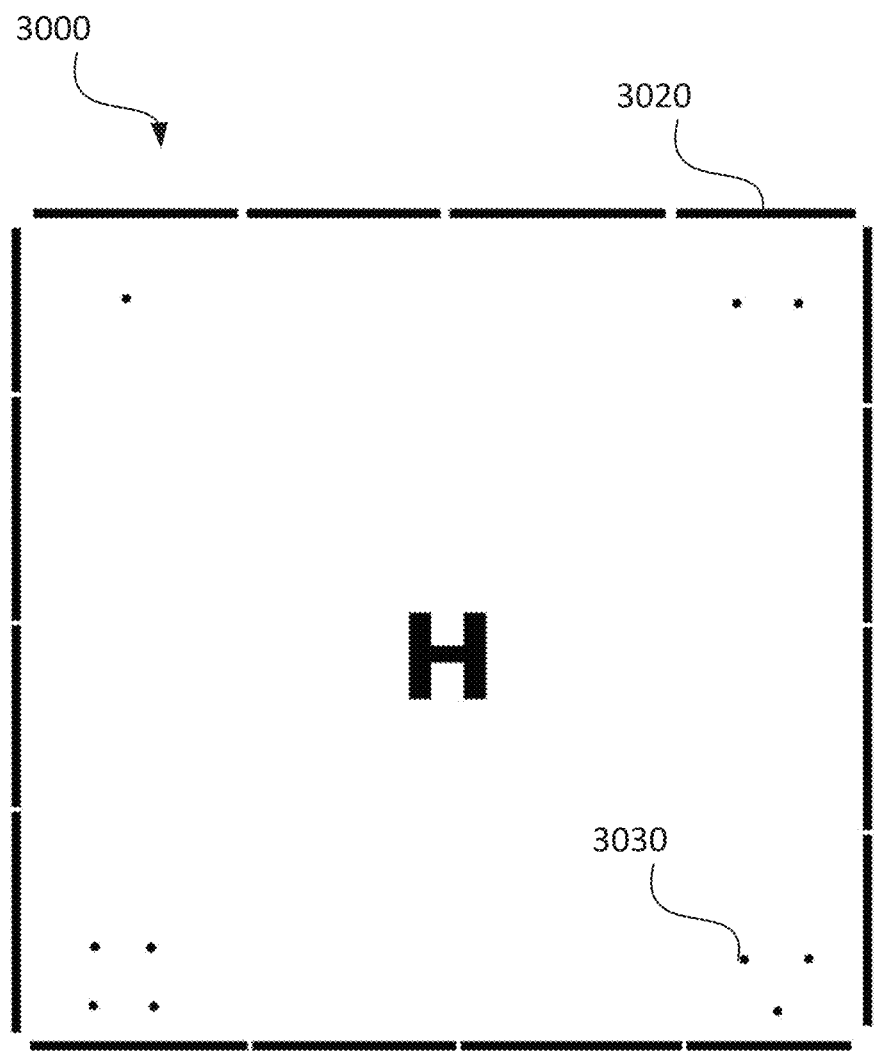

FIG. 30 is a schematic illustration of an exemplary arrangement of line-shaped lights in a constellation of light sources, consistent with some disclosed embodiments.

Figure 31A:
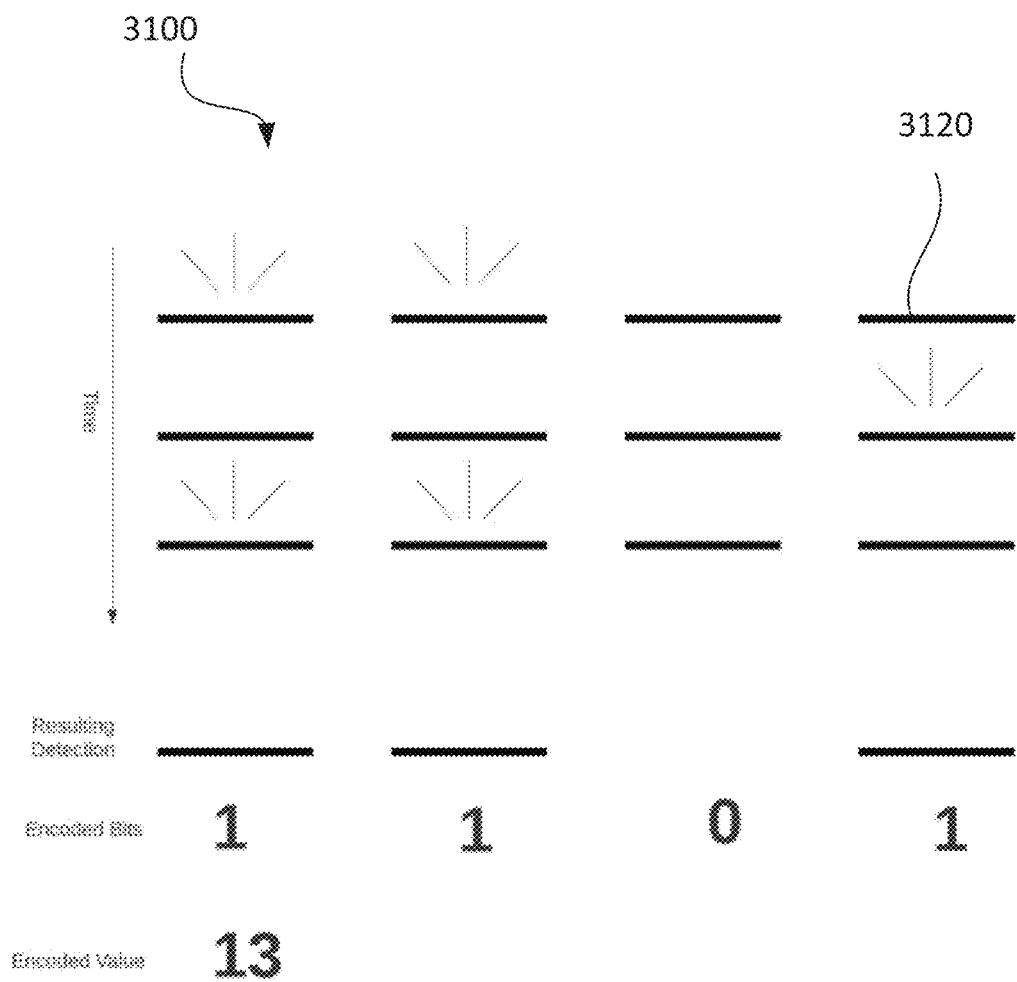

FIG. 31A is a schematic illustration of an exemplary data encoding scheme, consistent with some disclosed embodiments.

Figure 31B:
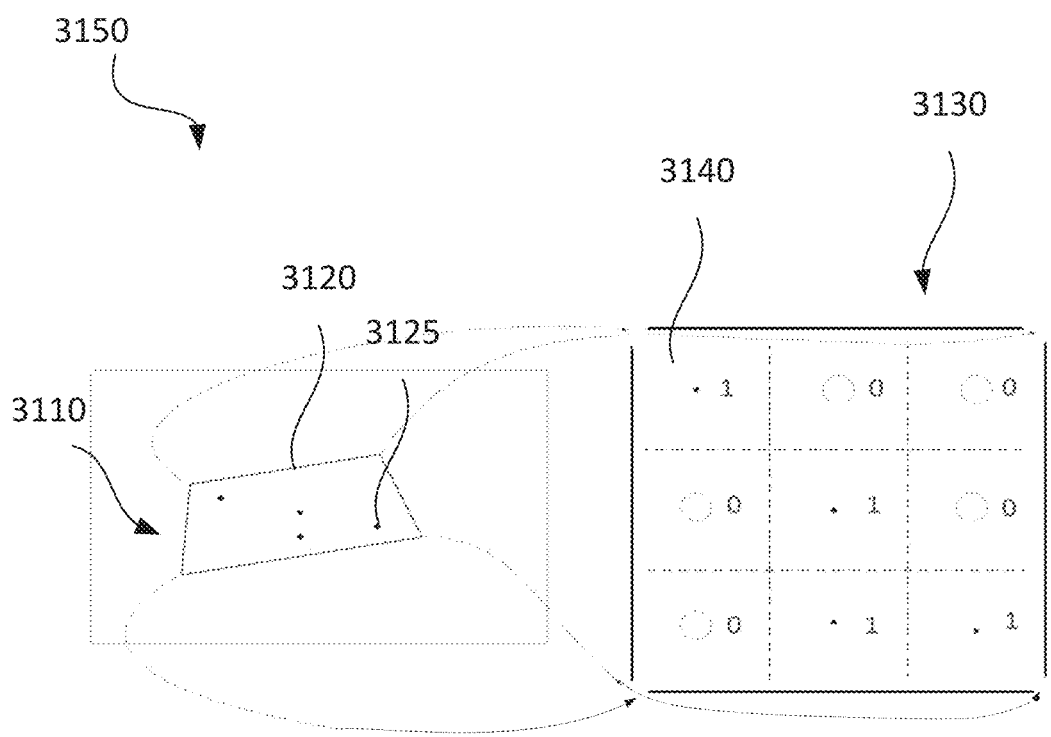

FIG. 31B is a schematic illustration of an exemplary encoding scheme for data transmission using a combination of linear shaped lights and point sources, consistent with some disclosed embodiments.

Figure 31C:
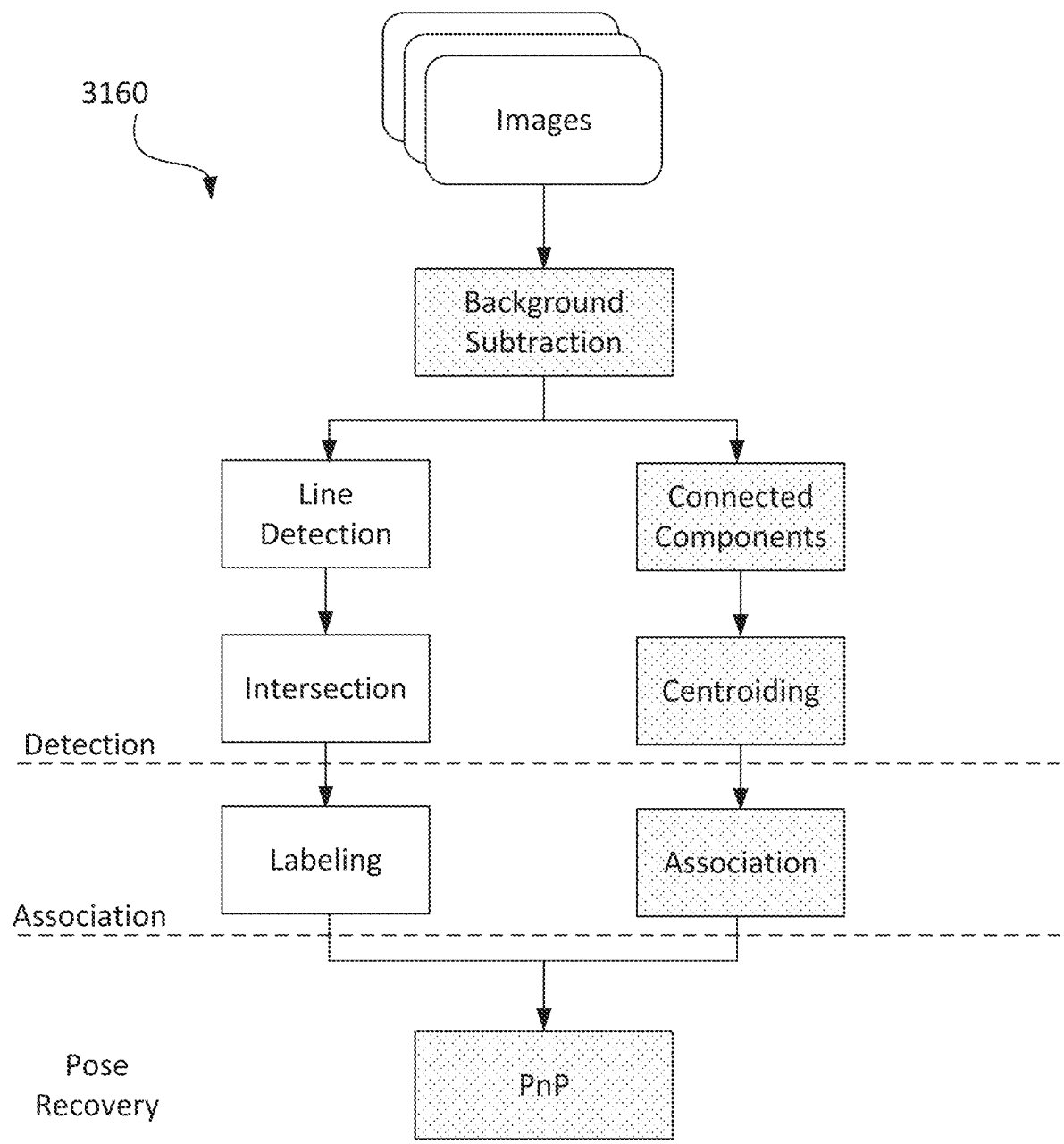

FIG. 31C illustrates a flow chart for an exemplary method for pose estimation using linear light sources, consistent with some disclosed embodiments.

Figure 32A:
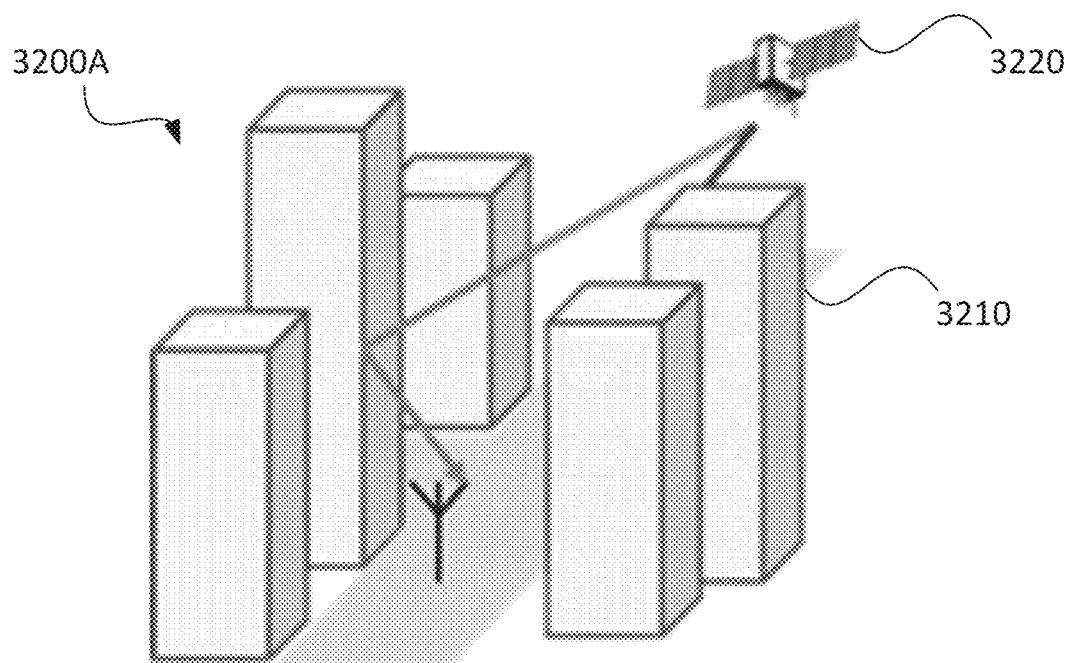
Figure 32B:
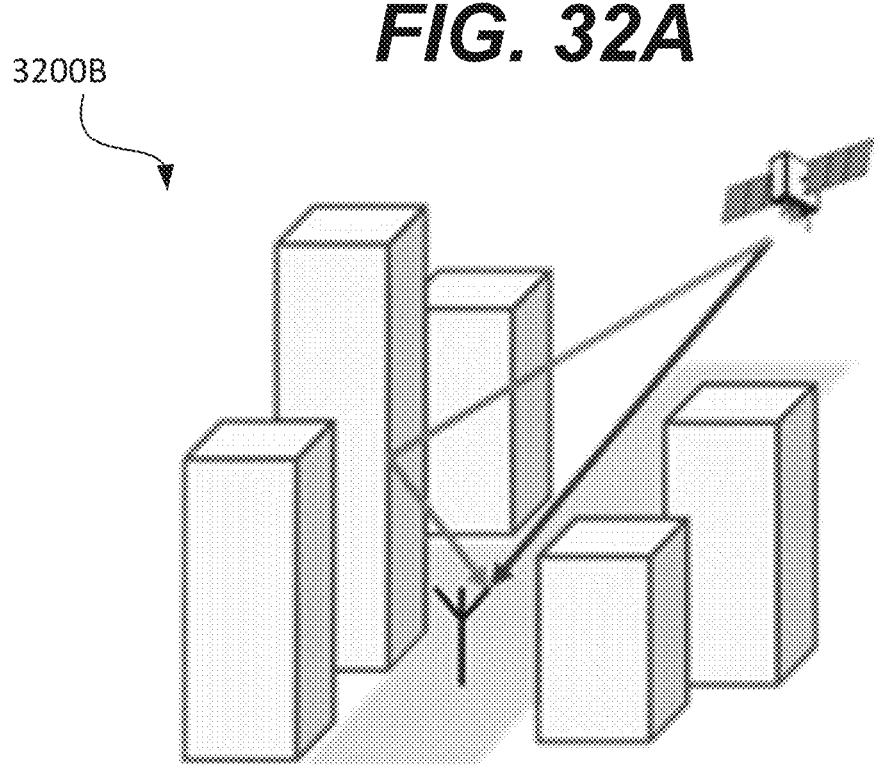

FIGS. 32A and 32B are schematic illustrations of exemplary GPS multipath errors, consistent with some disclosed embodiments.

Figure 33:
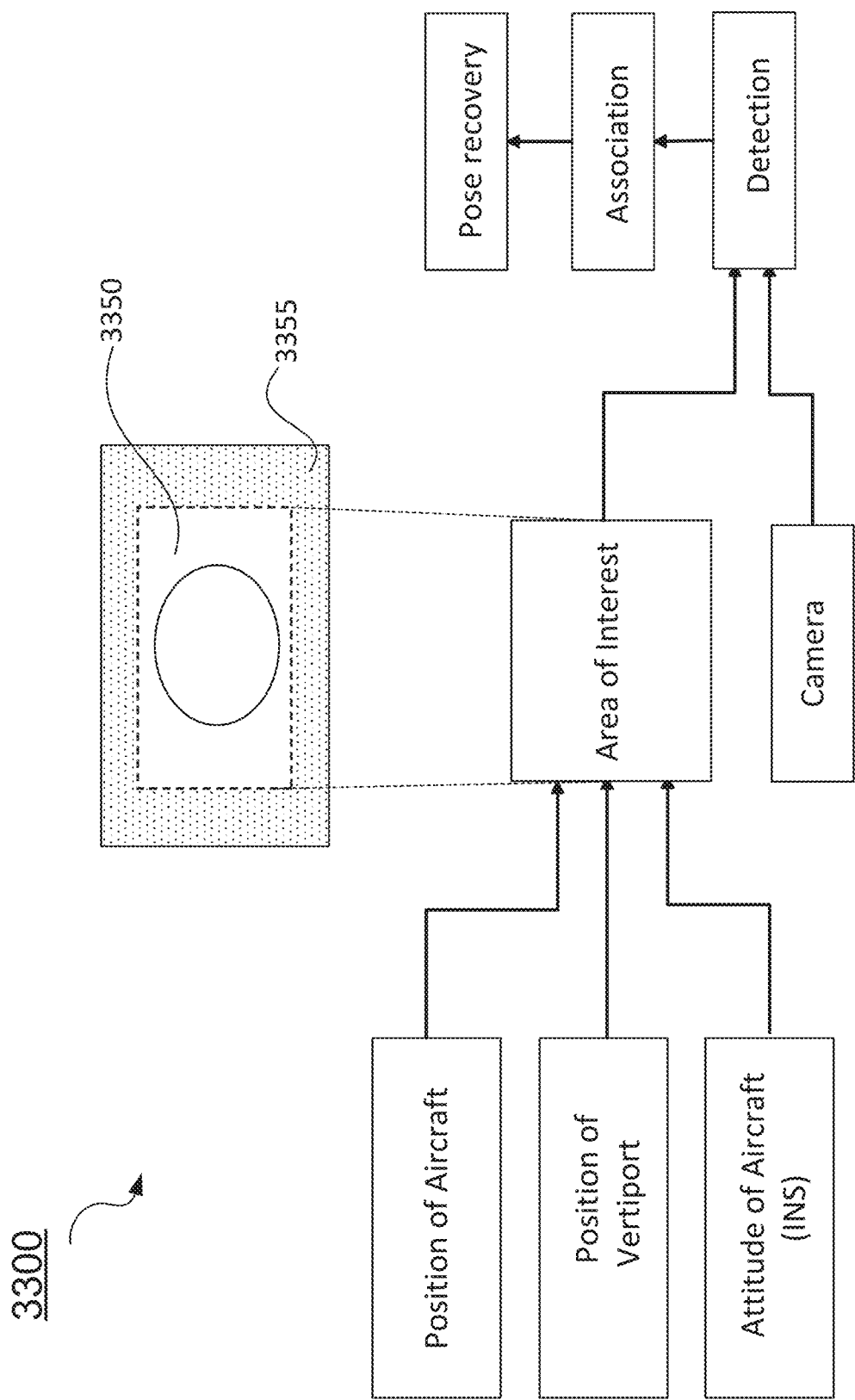

FIG. 33 is a schematic illustration of an exemplary pipeline for data augmentation configured to augment the Precision Landing and Takeoff (PLaTO) system using GPS, consistent with some disclosed embodiments.

Figure 34:
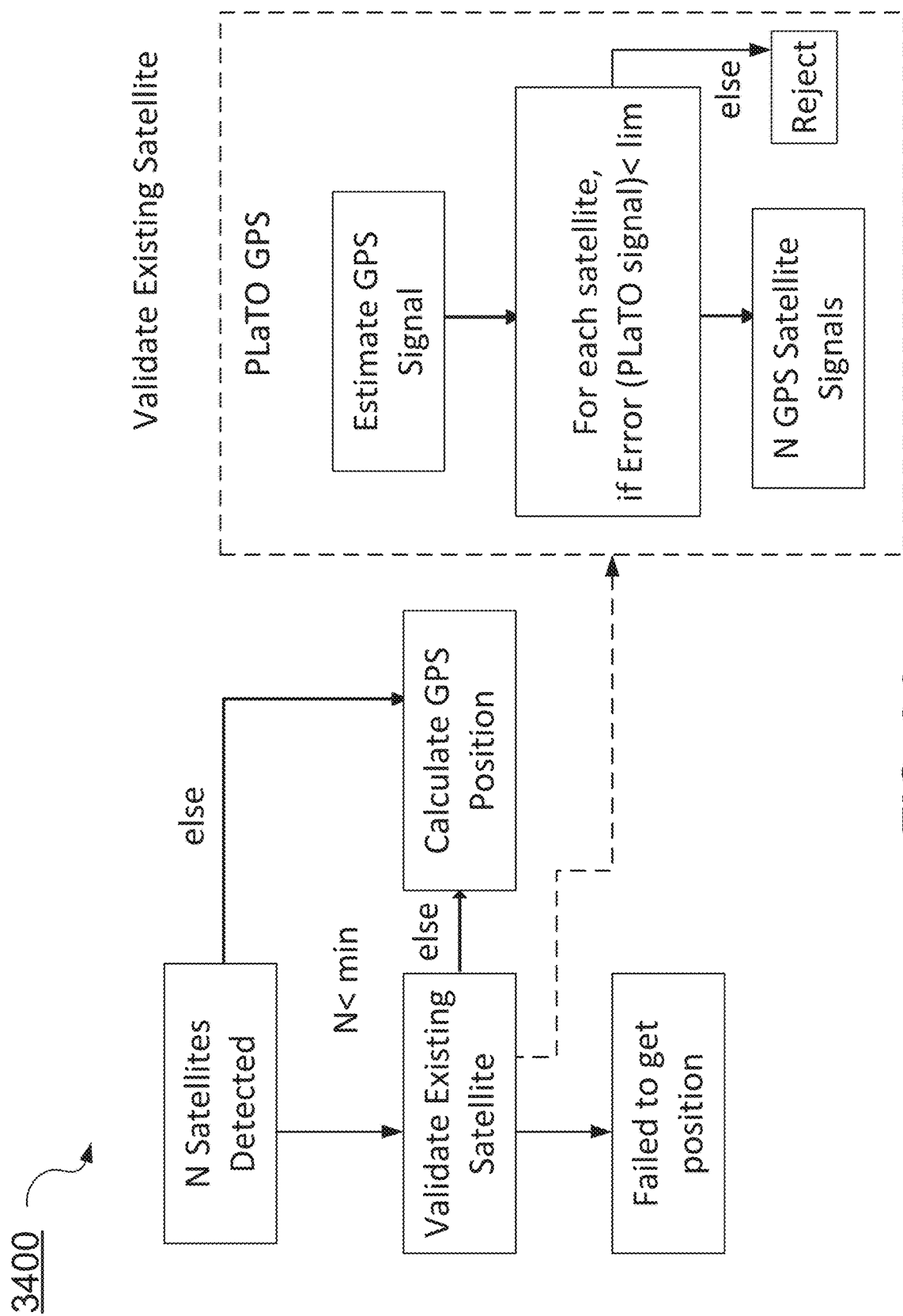

FIG. 34 is a schematic illustration of an exemplary pipeline for data augmentation configured to augment the GPS using PLATO system, consistent with some disclosed embodiments.

Figure 35:
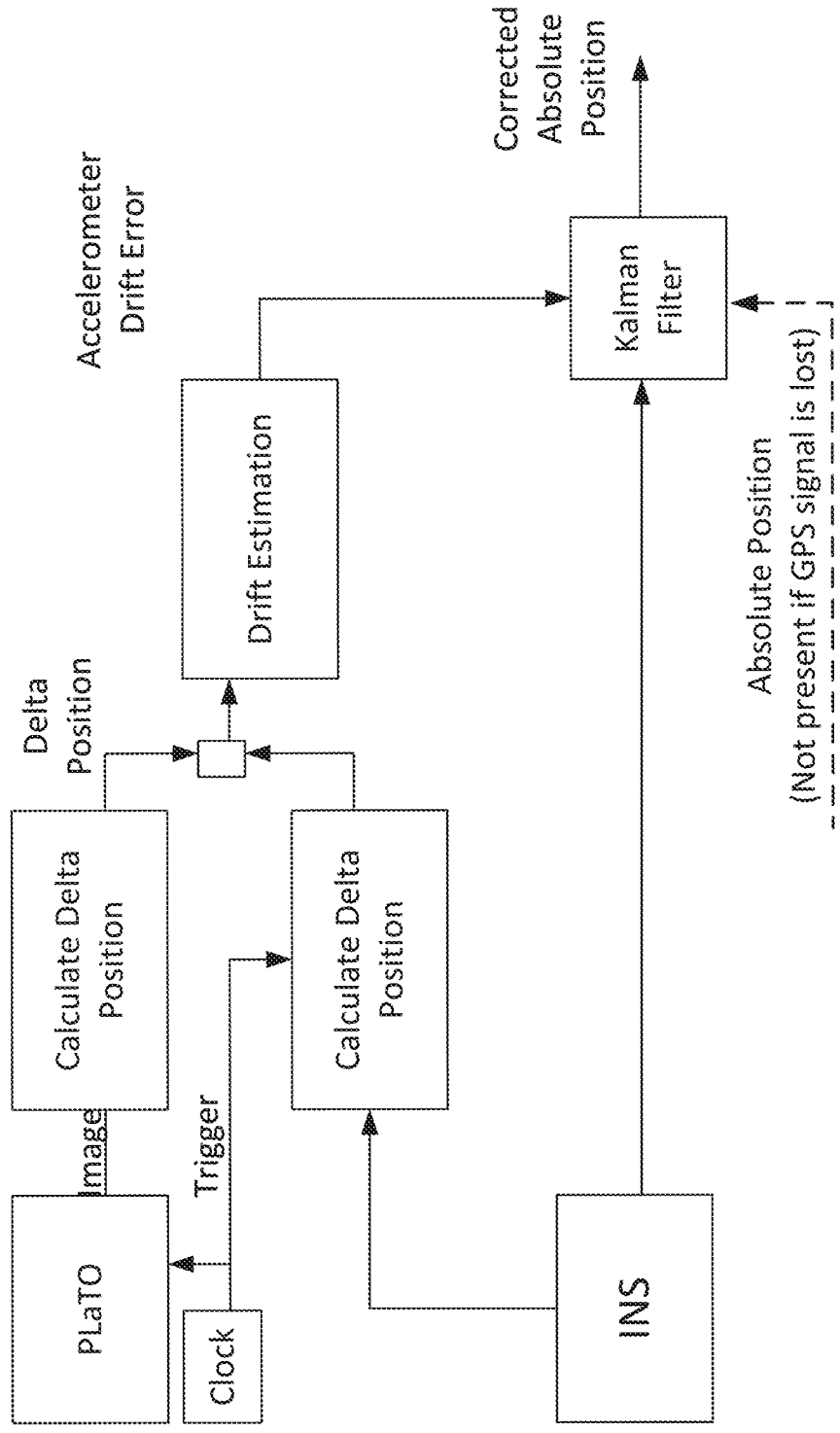

FIG. 35 is a is a schematic illustration of an exemplary pipeline for data augmentation configured to augment the INS using PLaTO system, consistent with some disclosed embodiments.

Figure 36:
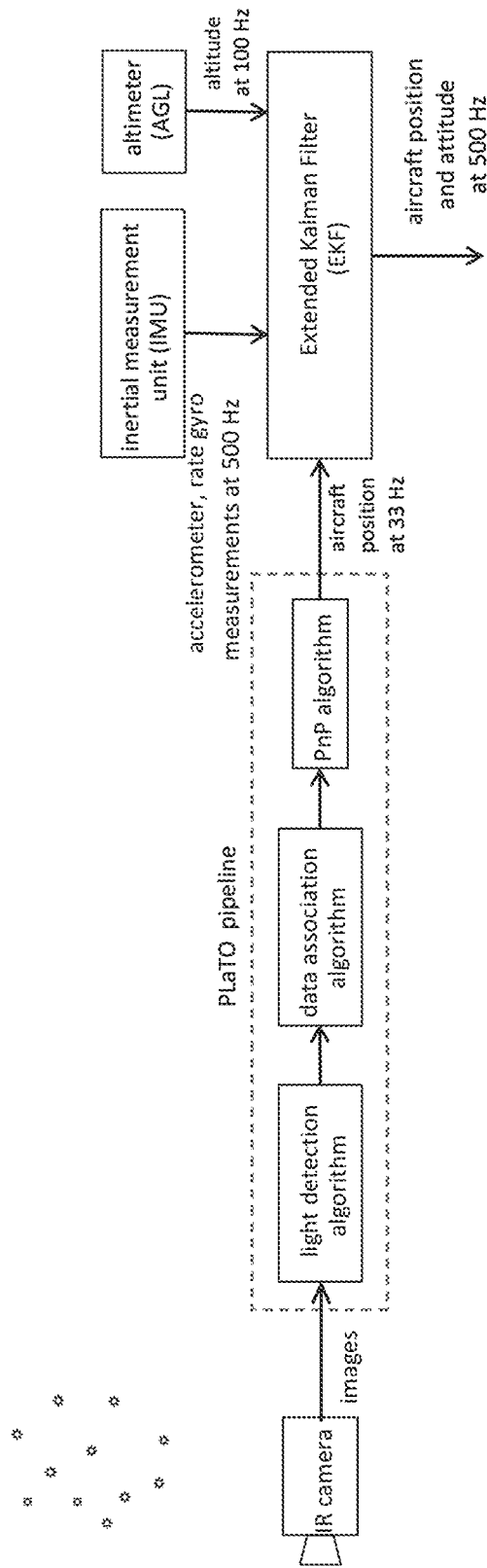

FIG. 36 is a schematic illustration of an exemplary pipeline for data augmentation configured to augment the INS using a light-localization system using an Extended Kalman Filter (EKF), consistent with some disclosed embodiments.

Figure 37:
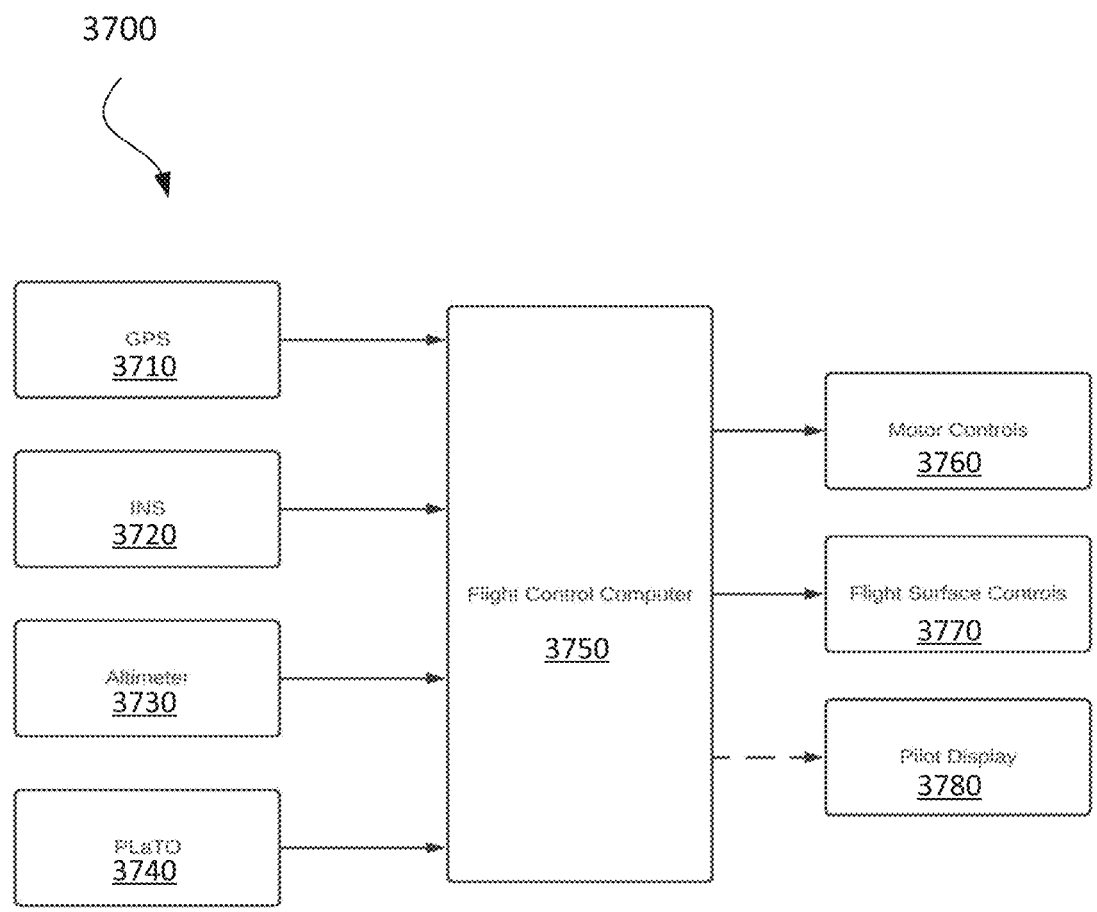

FIG. 37 illustrates an exemplary system showing integration of PLaTO system with an aircraft to support piloted or pilotless flights, consistent with some disclosed embodiments.

Figure 38:
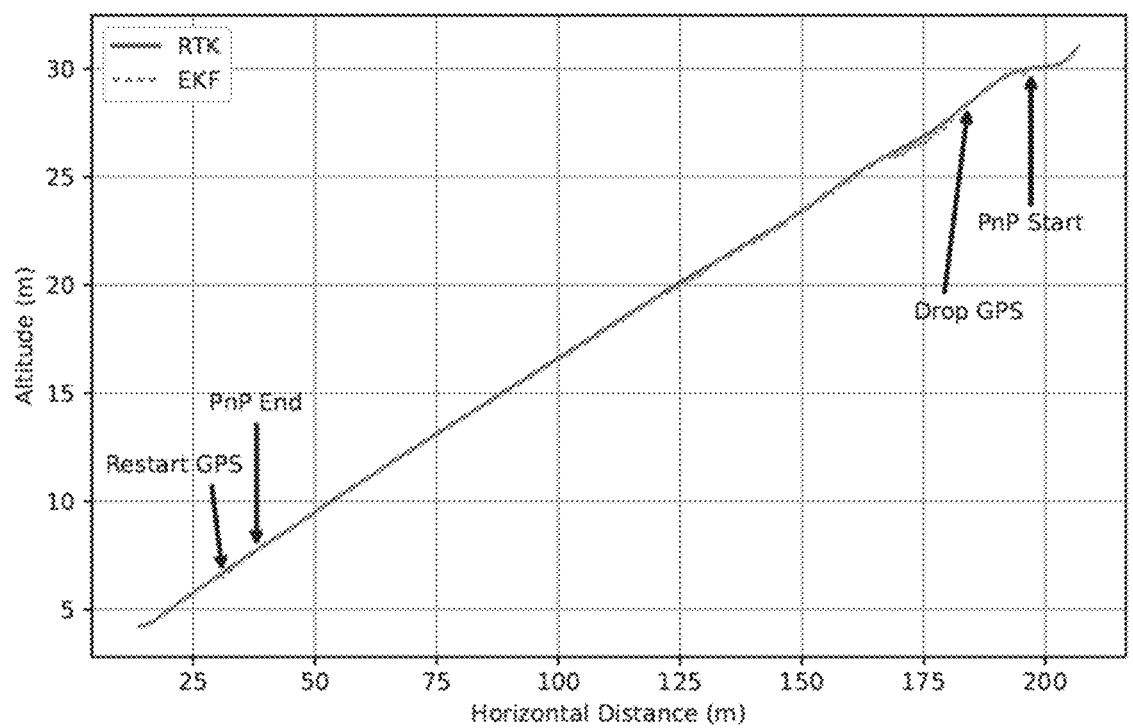

FIG. 38 illustrates a data plot indicating altitude of the aircraft as a function of horizontal distance when the system is used to augment INS, consistent with some disclosed embodiments.

Figure 39:
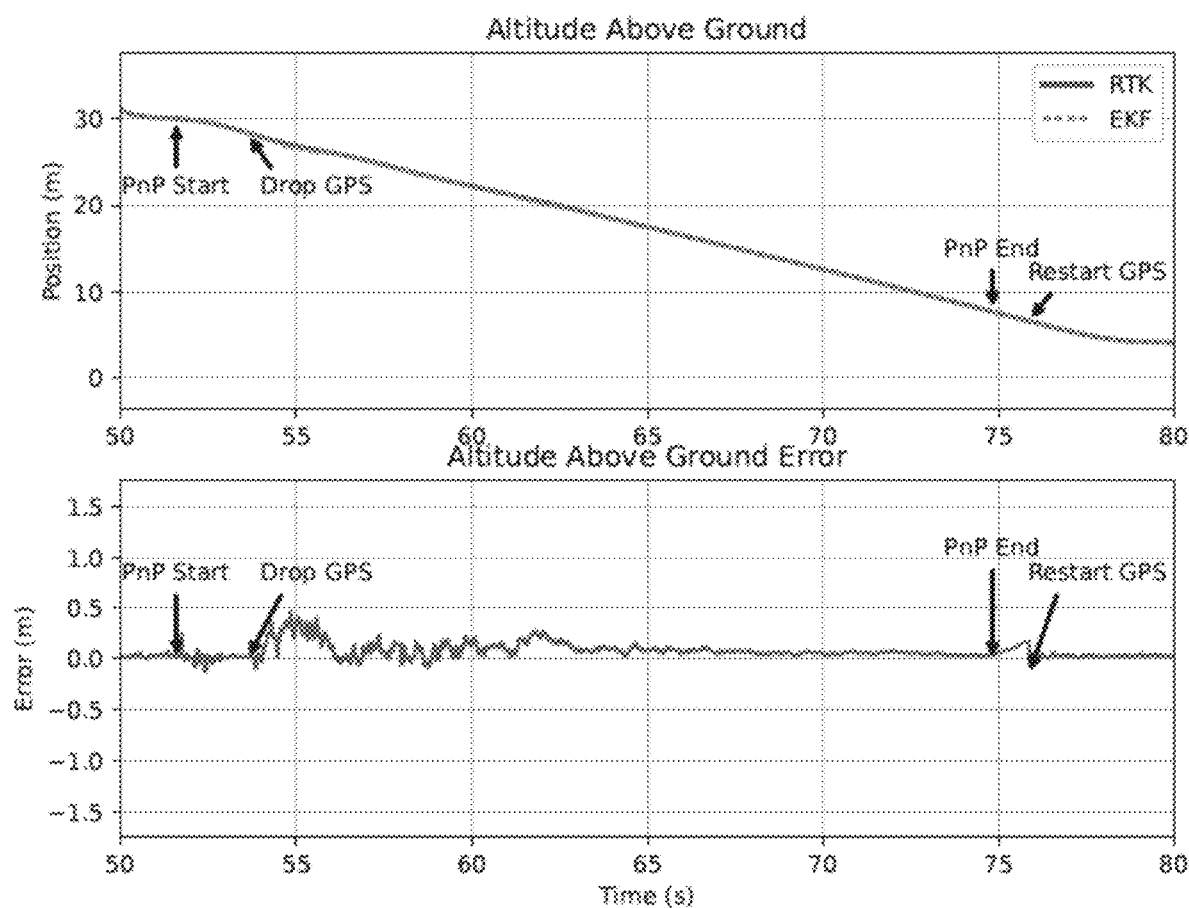

FIG. 39 illustrates data plots indicating altitude above ground vs. time and corresponding error when the system is used to augment INS, consistent with some disclosed embodiments.

Figure 40:
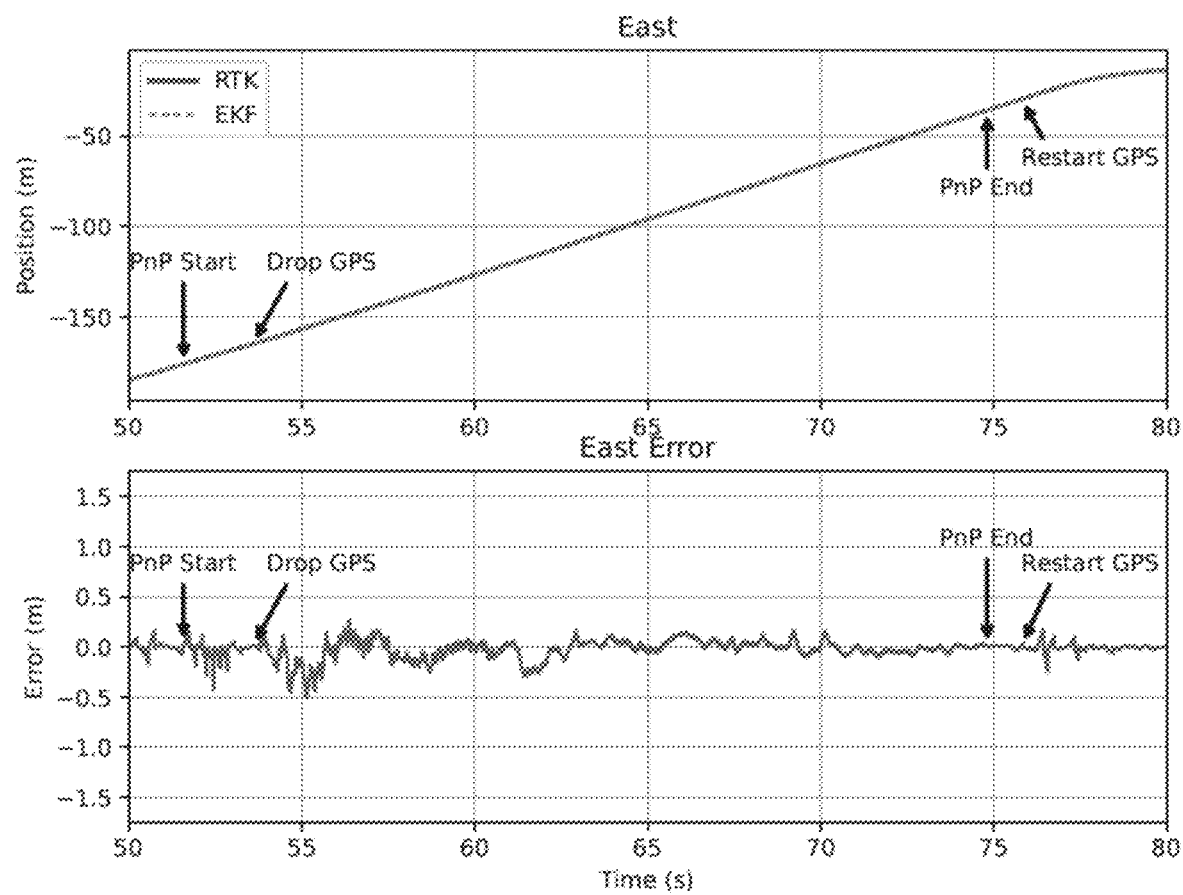

FIG. 40 illustrates data plots indicating east estimates vs. time and corresponding error when the system is used to augment INS, consistent with some disclosed embodiments.

Figure 41:
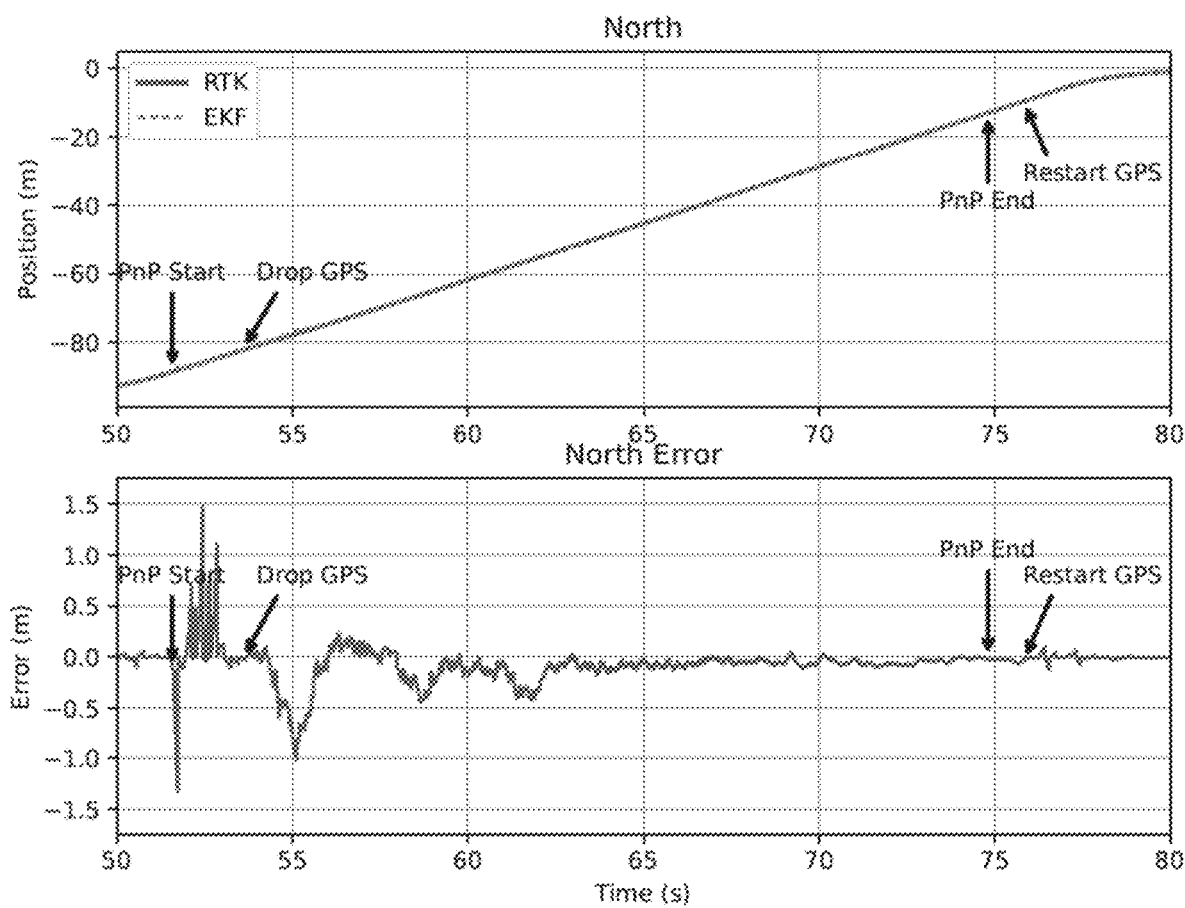

FIG. 41 illustrates data plots indicating north estimates vs. time and corresponding error when the system is used to augment INS, consistent with some disclosed embodiments.

Figure 42:
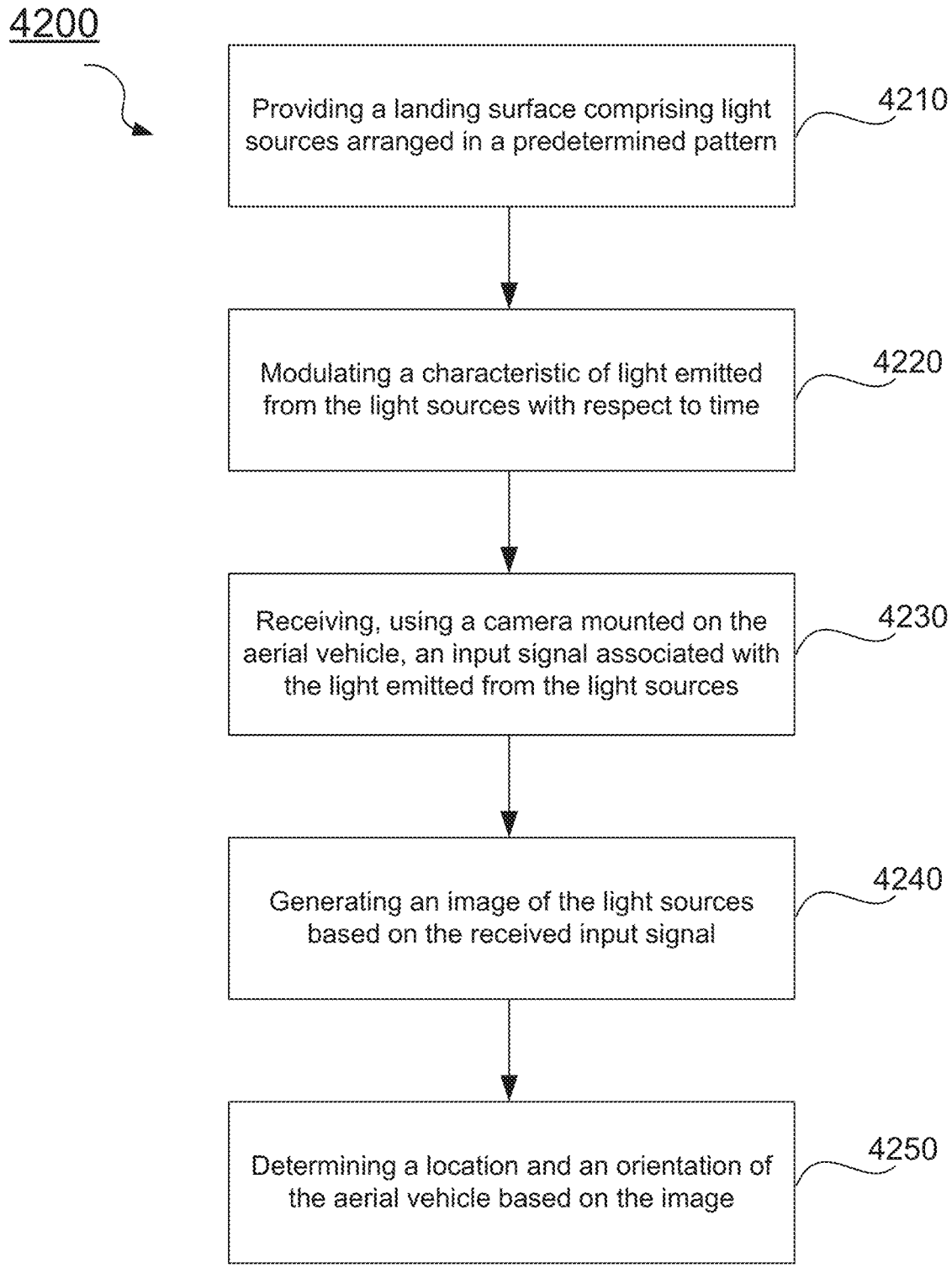

FIG. 42 is a flowchart illustrating an exemplary method for determining a location and an orientation of an aerial vehicle, consistent with some disclosed embodiments.

Figure 43A:
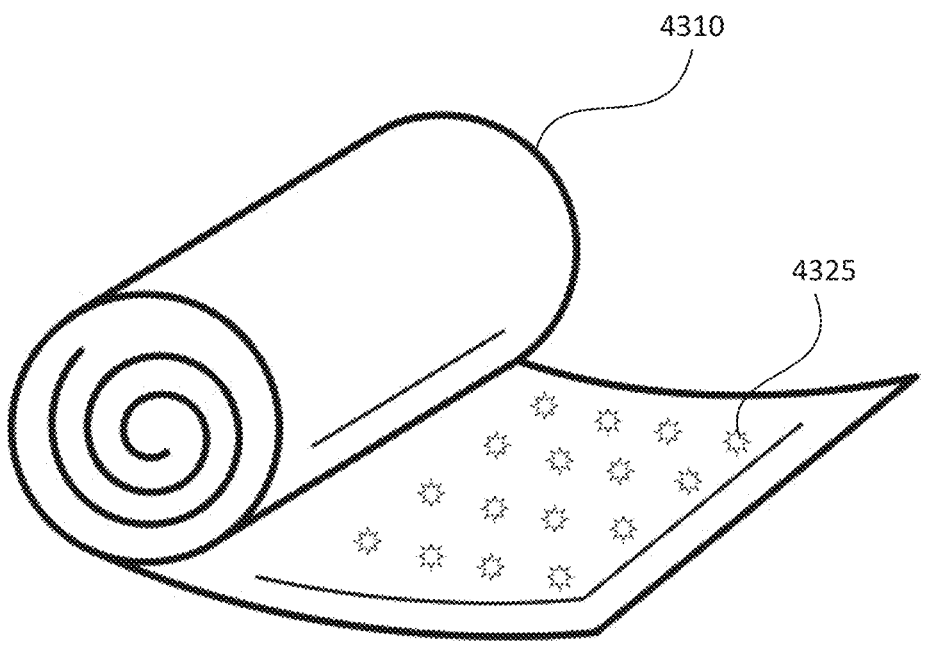
Figure 43B:
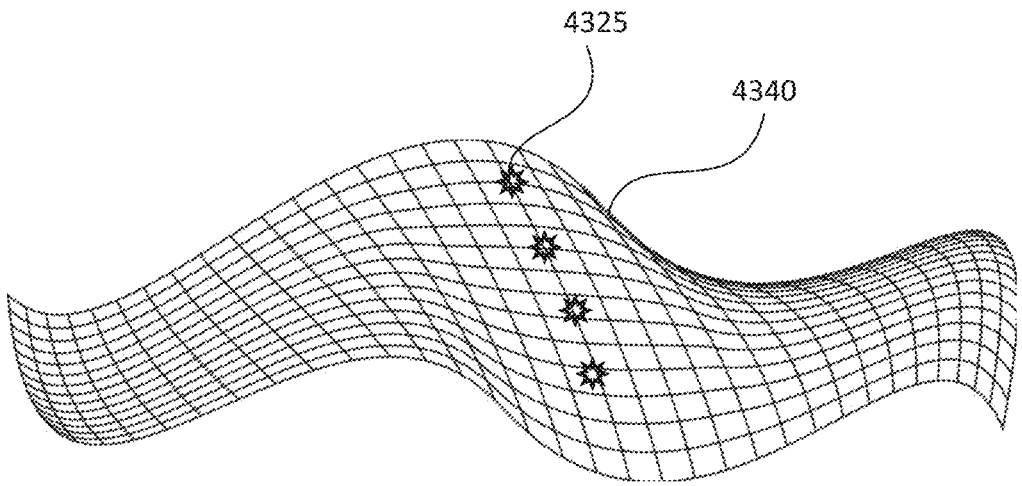

FIGS. 43A and 43B illustrate exemplary rapidly deployable constellations of light sources, consistent with some disclosed embodiments.

Figure 44:
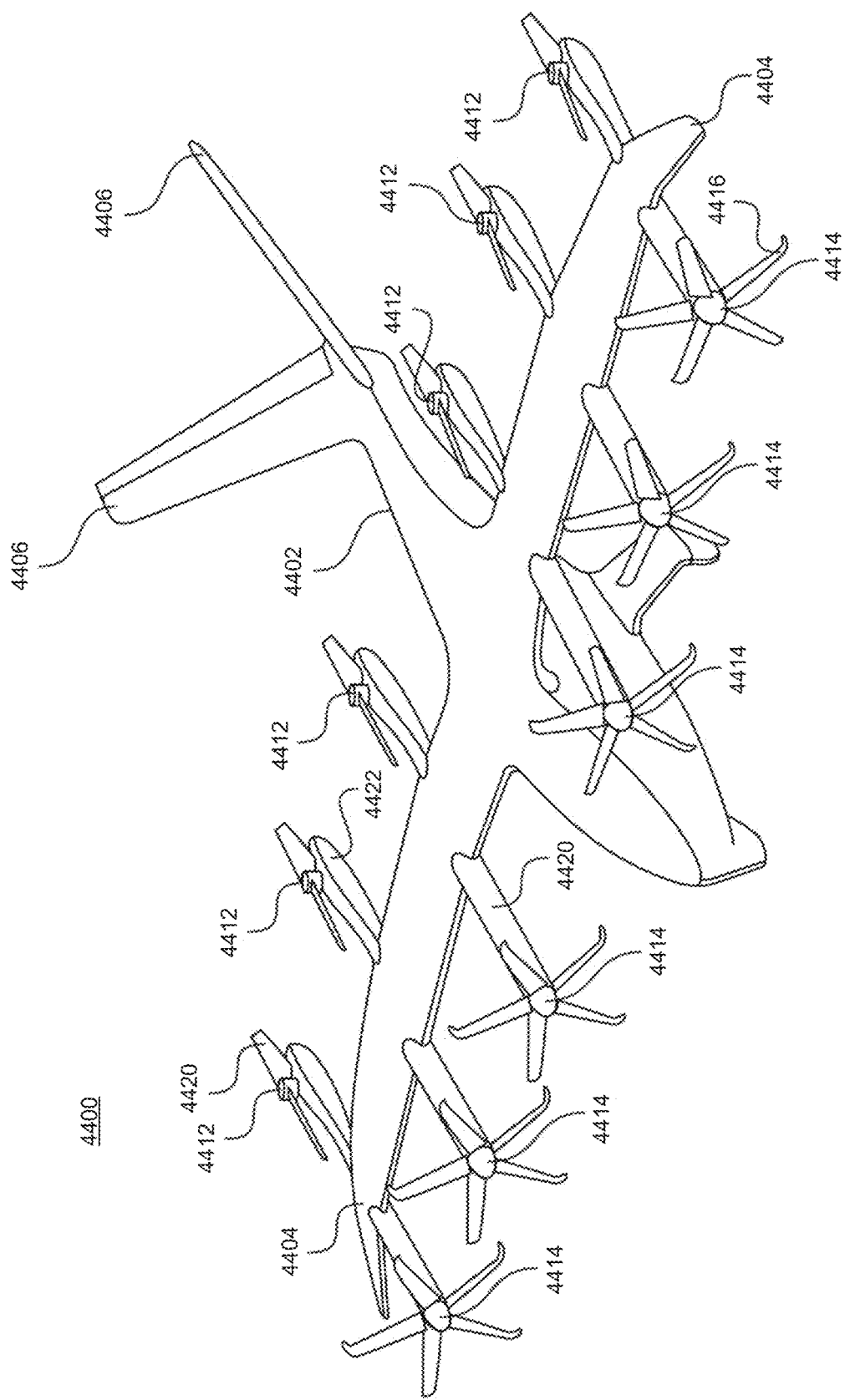

FIG. 44 shows an exemplary VTOL aircraft, consistent with disclosed embodiments.

Figure 45:
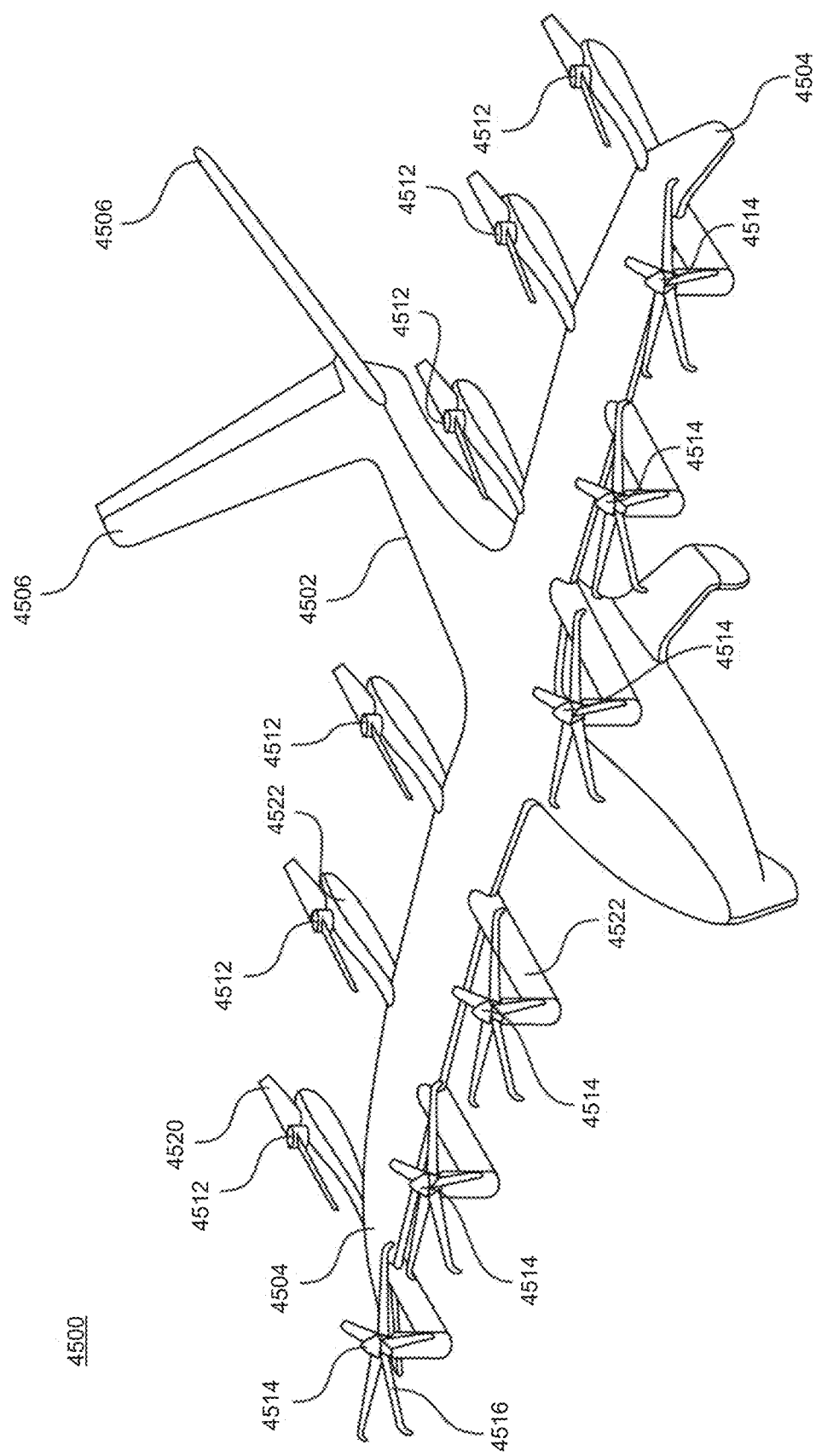

FIG. 45 shows an exemplary VTOL aircraft, consistent with disclosed embodiments.

Figure 46:
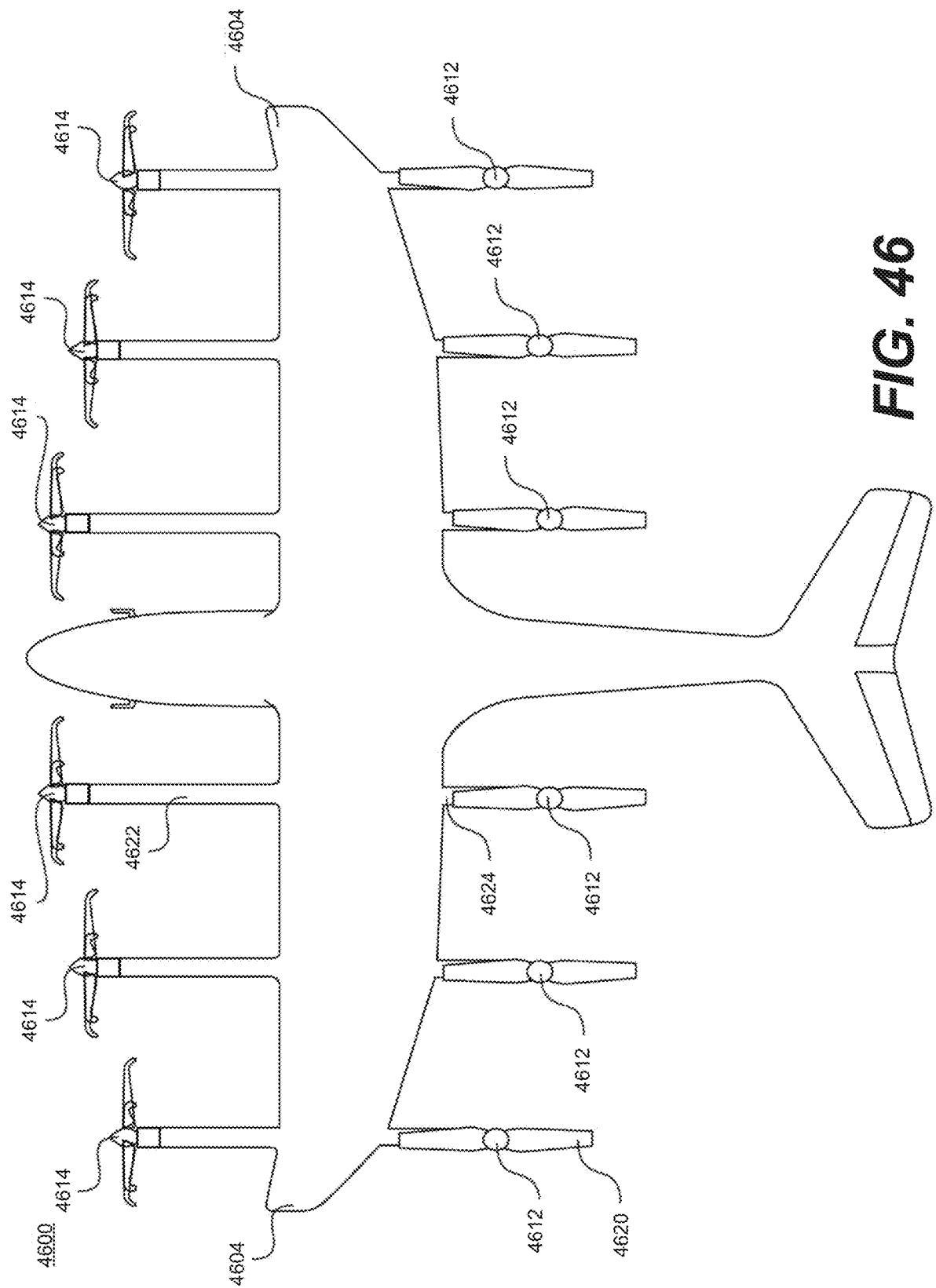

FIG. 46 shows an exemplary top plane view of a VTOL aircraft, consistent with disclosed embodiments.

Figure 47:
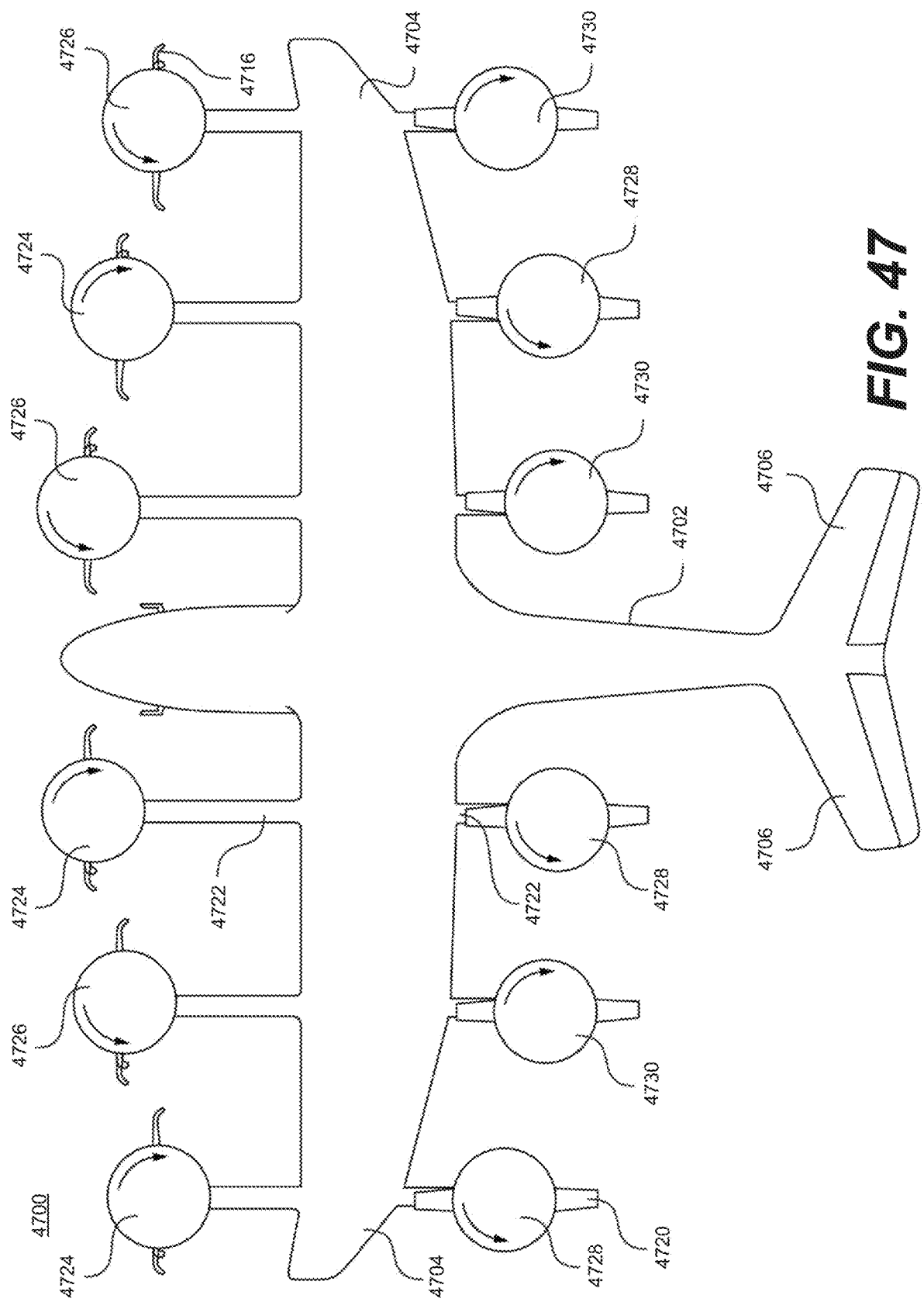

FIG. 47 shows exemplary propeller rotation of a VTOL aircraft, consistent with disclosed embodiments.

Figure 48:
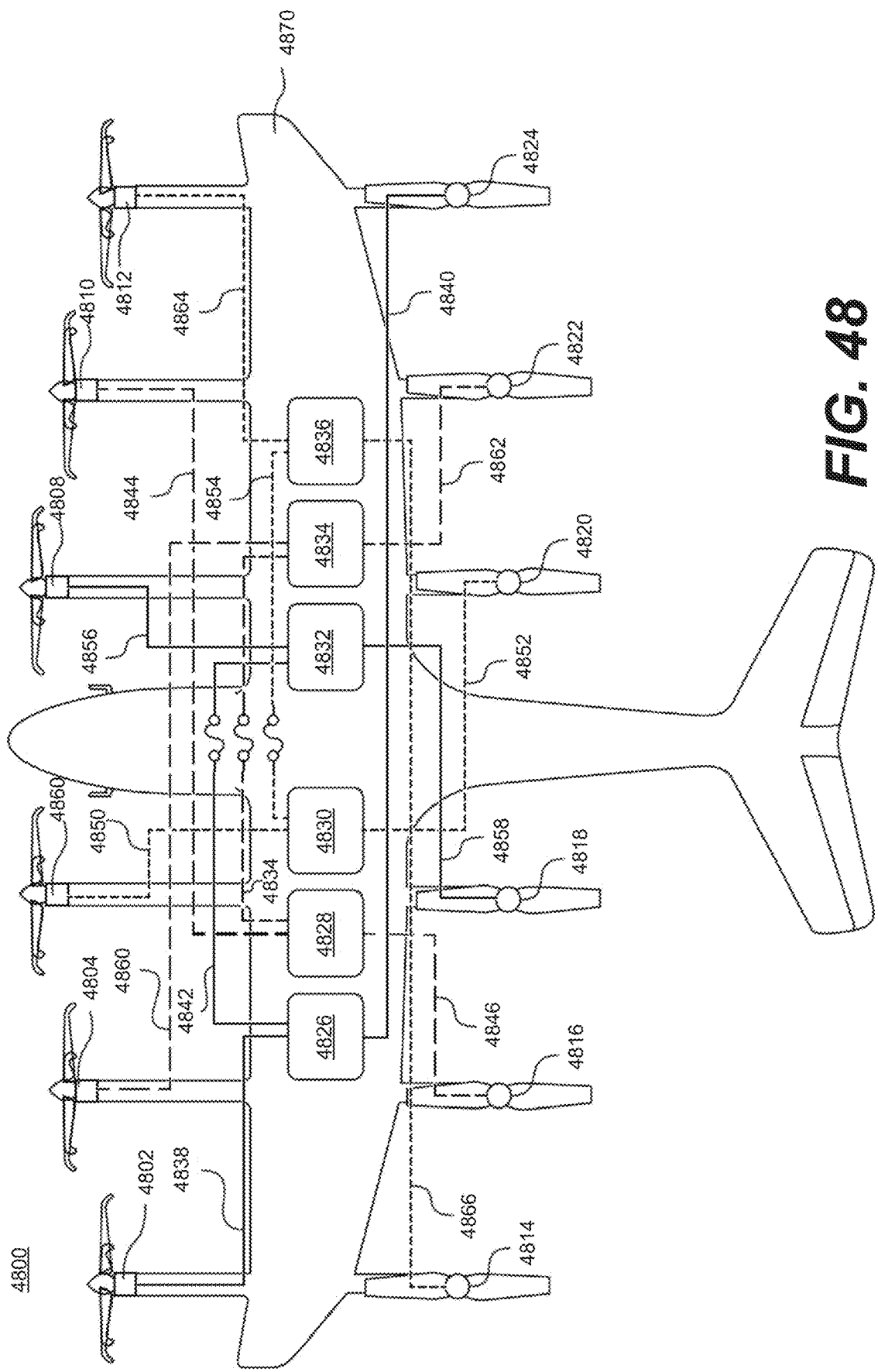

FIG. 48 shows exemplary power connections in a VTOL aircraft, consistent with disclosed embodiments.

Figure 49:
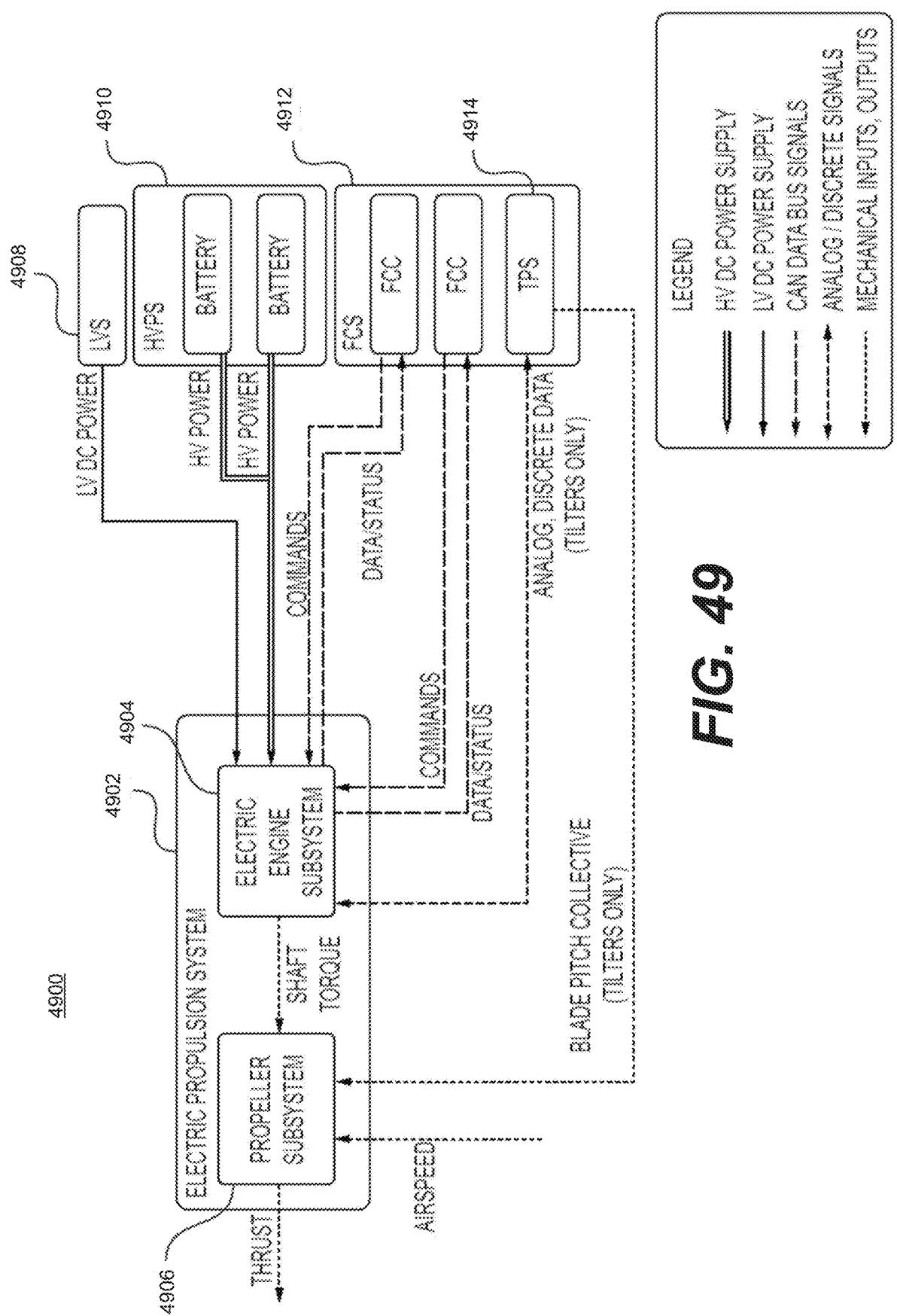

FIG. 49 shows an exemplary architecture of an electric propulsion unit, consistent with disclosed embodiments.

Figure 50:
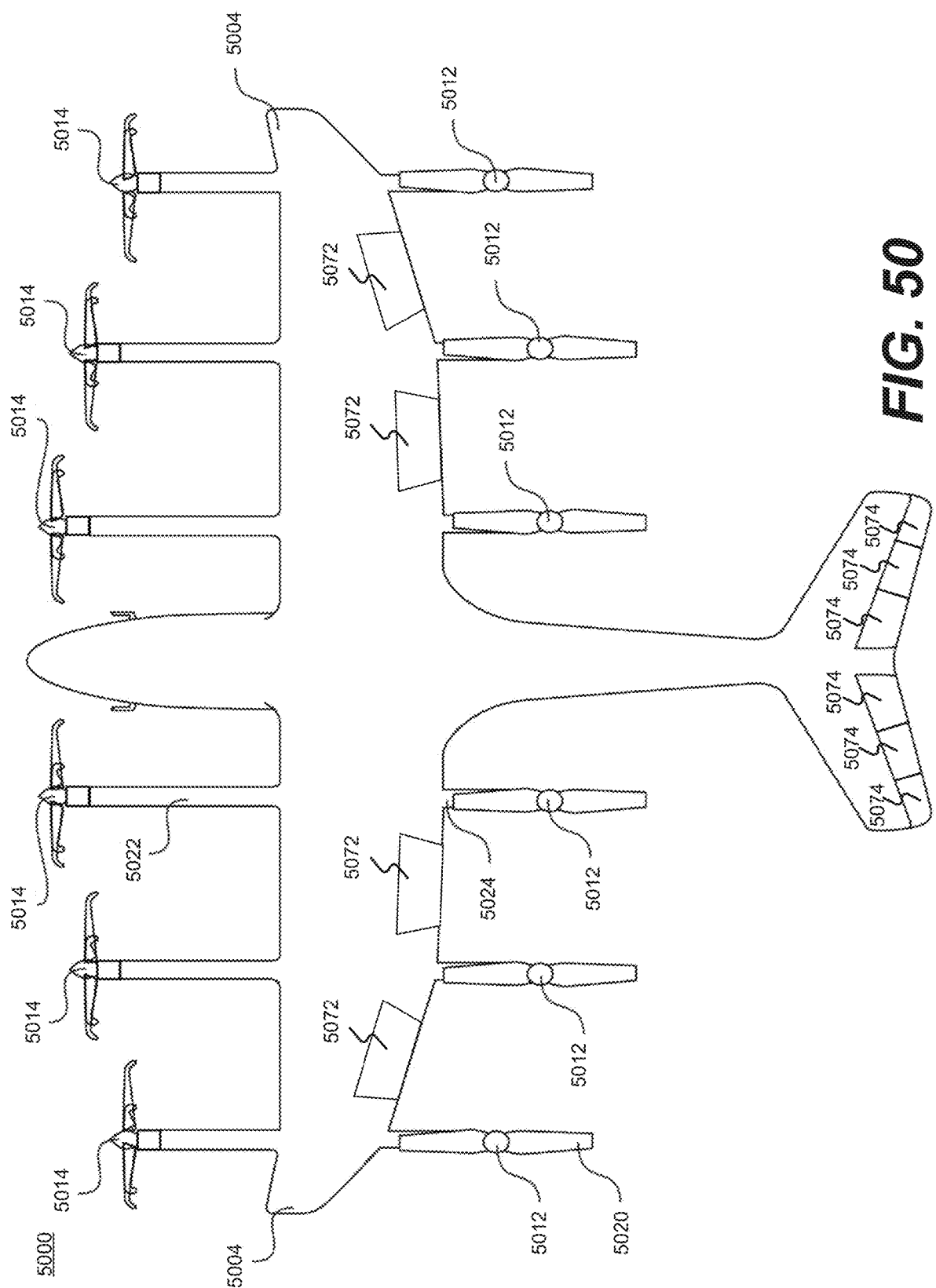

FIG. 50 shows an exemplary top plane view of a VTOL aircraft, consistent with disclosed embodiments.

DETAILED DESCRIPTION

The present disclosure addresses components of electric vertical takeoff and landing (eVTOL) aircraft primarily for use in a non-conventional aircraft. For example, the eVTOL aircraft of the present disclosure may be intended for frequent (e.g., over 50 flights per workday), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that their components are configured and designed to withstand frequent use without wearing, that they generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft are propelled by a distributed propulsion system, avoiding the risk of a single point of failure, and that they are capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of eVTOL aircraft components.

In some embodiments, the eVTOL aircraft of the present disclosure may be designed to be capable of both vertical and conventional takeoff and landing, with a distributed electrical propulsion system enabling vertical flight, forward flight, and transition. Thrust may be generated by supplying high voltage electrical power to the electrical engines of the distributed electrical propulsion system, which each may convert the high voltage electrical power into mechanical shaft power to rotate a propeller. Embodiments disclosed herein may involve optimizing the energy density of the electrical propulsion system. Embodiments may include an electrical engine connected to an onboard electrical power source, which may include a device capable of storing energy such as a battery or capacitor, or may include one or more systems for harnessing or generating electricity such as a fuel powered generator or solar panel array Some disclosed embodiments provide for weight reduction and space reduction of components in the aircraft, thereby increasing aircraft efficiency and performance. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations. For example, the Federal Aviation Administration enforces federal laws and regulations requiring safety components such as fire protective barriers adjacent to engines that use more than a threshold amount of oil or other flammable materials.

In preferred embodiments, the distributed electrical propulsion system may include twelve electrical engines, which may be mounted on booms forward and aft of the main wings of the aircraft. The forward electrical engines may be tiltable mid-flight between a horizontally oriented position (e.g., to generate forward thrust) and a vertically oriented position (e.g., to generate vertical lift). The forward electrical engines may be of a clockwise type or counterclockwise type in terms of direction of propeller rotation. The aft electrical engines may be fixed in a vertically oriented position (e.g., to generate vertical lift). They may also be of a clockwise type or counterclockwise type in terms of direction of propeller rotation. In some embodiments, an aircraft may possess various combinations of forward and aft electrical engines. For example, an aircraft may possess six forward and six aft electrical engines, four forward and four aft electrical engines, or any other combination of forward and aft engines, including embodiments where the number of forward electrical engines and aft electrical engines are not equivalent. In some embodiments, an aircraft may possess four forward and four aft propellers, where at least four of these propellers comprise tiltable propellers.

In preferred embodiments, for a vertical takeoff and landing (VTOL) mission, the forward electrical engines as well as aft electrical engines may provide vertical thrust during takeoff and landing. During flight phases where the aircraft is in forward flight-mode, the forward electrical engines may provide horizontal thrust, while the propellers of the aft electrical engines may be stowed at a fixed position in order to minimize drag. The aft electrical engines may be actively stowed with position monitoring. Transition from vertical flight to horizontal flight and vice-versa may be accomplished via the tilt propeller subsystem. The tilt propeller subsystem may redirect thrust between a primarily vertical direction during vertical flight mode to a mostly horizontal direction during forward-flight mode. A variable pitch mechanism may change the forward electrical engine's propeller-hub assembly blade collective angles for operation during the hover-phase, transition phase, and cruise-phase.

In some embodiments, in a conventional takeoff and landing (CTOL) mission, the forward electrical engines may provide horizontal thrust for wing-borne take-off, cruise, and landing. In some embodiments, the aft electrical engines may not be used for generating thrust during a CTOL mission and the aft propellers may be stowed in place.

Example embodiments are described herein with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It should also be noted that as used herein and in the appended claims, the singular forms "a," "an," and "the" include plural references unless the context clearly dictates otherwise.

Throughout this disclosure there are references to "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

Embodiments described herein include non-transitory computer readable medium containing instructions that when executed by at least one processor, cause the at least one processor to perform a method or set of operations. Non-transitory computer readable mediums may be any medium capable of storing data in any memory in a way that may be read by any computing device with a processor to carry out methods or any other instructions stored in the memory. The non-transitory computer readable medium may be implemented to include any combination of software, firmware, and hardware. Software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include any mechanism for storing electronic data or instructions, including Random Access Memory (RAM), a Read-Only Memory (ROM), a hard disk, an optical disk, a magnetic medium, a flash memory, other permanent, fixed, volatile or non-volatile memory. The memory may include one or more separate storage devices collocated or disbursed, capable of storing data structures, instructions, or any other data. The memory may further include a memory portion containing instructions for the processor to execute. The memory may also be used as a working memory device for the processors or as a temporary storage.

Some embodiments may involve at least one processor. "At least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically, or by other means that permit them to interact.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

In the following description, various working examples are provided for illustrative purposes. However, is to be understood the present disclosure may be practiced without one or more of these details. Reference will now be made in detail to non-limiting examples of this disclosure, examples of which are illustrated in the accompanying drawings. The examples are described below by referring to the drawings, wherein like reference numerals refer to like elements. When similar reference numerals are shown, corresponding description(s) are not repeated, and the interested reader is referred to the previously discussed figure(s) for a description of the like element(s).

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Consistent with the present disclosure, some implementations may involve a network. A network may constitute any combination or type of physical and/or wireless computer networking arrangement used to exchange data. For example, a network may be the Internet, a private data network, a virtual private network using a public network, a Wi-Fi network, a mesh network, a local area network (LAN), a wide area network (WAN), and/or other suitable connections and combinations that may enable information exchange among various components of the system. In some implementations, a network may include one or more physical links used to exchange data, such as Ethernet, coaxial cables, twisted pair cables, fiber optics, or any other suitable physical medium for exchanging data. A network may also include a public, wired network and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the subject matter recited in the appended claims. Without limiting the scope of the present disclosure, some embodiments may be described in the context of providing systems and methods in electric vertical takeoff and landing (eVTOL) aircrafts or aerial vehicles. However, the disclosure is not so limited. Other types of aerial vehicles such as, but not limited to, unmanned aerial vehicles (UAVs), manned aerial vehicles, conventional vertical takeoff and landing (VTOL) aircrafts, hybrid VTOLs, among other aerial vehicles, may utilize the systems and methods disclosed herein.

Advanced Air Mobility (AAM) is an emerging field of aeronautics that involves utilizing small aircraft for everyday transportation and other services, and many AAM aircraft are envisioned to take off and land at new infrastructure termed vertiports. A vertiport, as described herein refers to a landing location or a landing surface for an aerial vehicle such as an eVTOL to land on or takeoff from. In some embodiments, a vertiport may also be referred to as a vertiplex, or a vertistop. The location of a vertiport may be determined based on numerous factors including, but not limited to, physical obstacles, federal and state or local regulatory restrictions, surrounding uses, among other things. The physical obstacles may be fixed, anticipated, mobile, or temporary obstacles. An example of an anticipated physical obstacle may be an adjoining property that has development rights for a 40-story building but is currently a vacant lot. Some examples of physical obstacles may include nearby high-rise buildings, antennas, towers (cell and water), trees, power lines, power poles, billboards, land-use designation of vertiport site, property owner rights, etc.

In some instances, regulatory restrictions may include both the current land use designation of the vertiport site and the rights of the property owner. By way of example, in air rights transactions or transfers of development rights, owners may sell their rights to build in the space above their property to buyers who want to construct something larger than they would otherwise be allowed to build. For example, if a parking garage operator sold the air rights above their garage, a proposed vertiport terminal that would extend into this space could likely not be built without the approval of the owner of the air rights. Height districts are geographical areas where maximum building heights are limited, and this should be considered when siting a vertiport as well. The physical considerations including physical obstacles may be weighed and balanced with consideration of anticipated future development patterns and the vision of the jurisdiction as it seeks to accommodate population shifts, increases, or decreases in density, and development such as the current trend towards mixed use neighborhoods where residential and commercial buildings are in proximity with each other.

Mobile or temporary physical obstacles include structures of a changing or a temporary nature. Mobile or temporary physical obstacles may include considerations that are both planned for and anticipated. Planned considerations are those that involve a process where the vertiport operator could have the opportunity to provide input whereas anticipated considerations are those for which there is no or minimal prior notification but would likely occur over the life of a vertiport. Some examples of temporary structures may include a temporary vertiport, building cranes, blowing debris, construction staging, noise, lightning protection equipment, non-acoustic annoyance factors, static discharge, urban wind shadows, or future local land use. While these considerations reflect events that are temporary and potentially insignificant over the operational life of a vertiport, they still merit consideration to support safe and efficient operations. Furthermore, vertiport siting decisions may also be impacted by the anticipated frequency of certain temporary considerations. For example, locating a vertiport adjacent to tall trees increases the likelihood of debris entering the vertiport movement areas on a regular frequency to include at some point in the future, as the trees grow, they may penetrate the vertiport's airspace and become a hazard to navigable airspace.

Consideration of the surrounding areas may be critical when selecting vertiport locations and designing vertiport operations. The surrounding uses encompass considerations arising off the vertiport property, but within the local vicinity. Such considerations may impact the vertiport during site selection, design, or operations and may also change over the life of a vertiport. The vertiport can also impact the surrounding area and modify these considerations. Some examples of surrounding uses that may impact the vertiport site selection include critical infrastructure, local fire station, metro or a bus stop, local land use, distance to maintenance or repair facility, downwind of wind farm, etc. In some cases, surrounding uses may be affected by the vertiport. Some examples of this scenario are school in vicinity, property under approach and departure paths, noise sensitive area, visual distractions e.g., solar panel reflectivity, zoos, protected wildlife habitats, privacy of vertiport neighbors, etc. The proximity of a vertiport to existing infrastructure may be a primary siting factor. Infrastructure considerations include current local land use (e.g., school, hospital, park, or other noise sensitive areas), emergency response (e.g., fire stations), and direct connection to other transportation options (i.e., intermodality). For early vertiport siting, proximity to these types of existing infrastructure can enable timely development and operations by reducing the development lead time of these ancillary criteria (e.g., land use designated for transportation). On the other hand, flight operations may be hindered if vertiports are sited too close to other types of infrastructure. For example, proximity to a wind turbine farm may limit approach and departure paths and cause disturbances to airflow that could hinder safe flight operations. There may be several other factors in designing or configuring a vertiport, including but not limited to, aircraft performance in the vertiport environment, passenger comfort, economic considerations such as development costs, maintenance costs, and revenue generation, environmental considerations, airspace considerations, demand considerations, contingency considerations, communications and data management, security considerations, safety and utility, automation, etc.

For use in urban air mobility, landing and taking off eVTOL aircraft in urban environments may require high-accuracy and high-integrity localization capable of operating in GNSS-challenged environments. A GPS-denied or a GPS-challenged environment as used herein refers to an environment that lacks reliable access to Global Positioning System (GPS) or Global Navigation Satellite System (GNSS) signals. In a GPS-denied environment, GPS signals may be degraded, interrupted, denied, jammed, hacked, or simply disabled due to multipath effects or obstruction of satellite signals. The satellite signals can be denied in difficult environments due to a lack of a clear line of sigh path between the satellites and the user antenna. The signals may be interrupted or degraded due to adverse weather conditions, low or poor visibility, high-density of high-rise buildings in an urban setting, adversarial or non-cooperative landing conditions, among other things.

An aerial vehicle (e.g., aerial vehicle 310 of FIG. 3) may comprise an electric powered aerial vehicle or an eVTOL vehicle. An eVTOL vehicle, which may be used for an on-demand urban air transportation service may provide alternative transportation means in urban settings with low direct operating costs, low noise and zero tailpipe emissions. Further, eVTOL aircraft offer an alternative form of air transportation that promises to be versatile (able to take off and land vertically from rudimentary landing zones), economical (reduced acquisition and operating costs), accessible (enabling operators with little to no flight training or experience) and safe (designed to better tolerate failure modes). In this regard, the development of distributed electric propulsion (DEP) may enable cheap, quiet, and reliable short-range VTOL aircraft. The use of DEP may offer significant flexibility, potentially allowing new aircraft configurations, architectures and control methods. Further, electric propulsion is scale-free in terms of being able to achieve highly similar levels of motor power to weight and efficiency across large scaling ranges. For example, redundant DEP may be used to improve fault tolerance and safety in flight. The use of electric motors can also improve safety on ground through a reduction in noise, heat dissipation and possible toxic fumes, as well as turning off rotating propellers or rotors before passengers' ingress or egress. Additionally, although propellers or ducted fans of the DEP still generate noise (level and frequency would depend on the tip speed, disk loading, and other design parameters), through a combination of DEP configuration (multiple smaller rotors with direct electric motor drives), tip speed limitation, the removal of or minimizing engine/turbine/gearing noise sources, and the potential use of fixed wings for efficient forward flight, eVTOLs are anticipated to have a modified and reduced noise signature compared with conventional helicopters of similar size, with a target noise reduction of 15 dB or more. Battery powered eVTOL aircraft also have a reduced environmental impact with zero operational emissions. Furthermore, using DEP in place of complex shafts, cross couplings and gearing arrangements is expected to reduce both acquisition, maintenance, and operating costs. When extended range is needed, aircraft can be designed with hybrid-electric propulsion systems, which can take advantage of operating smaller engines at peak efficiencies. Running the hybrid power unit engine at idle or off during takeoff and landing can further reduce the noise signature of the aircraft at lower altitude.

Figure 1A:
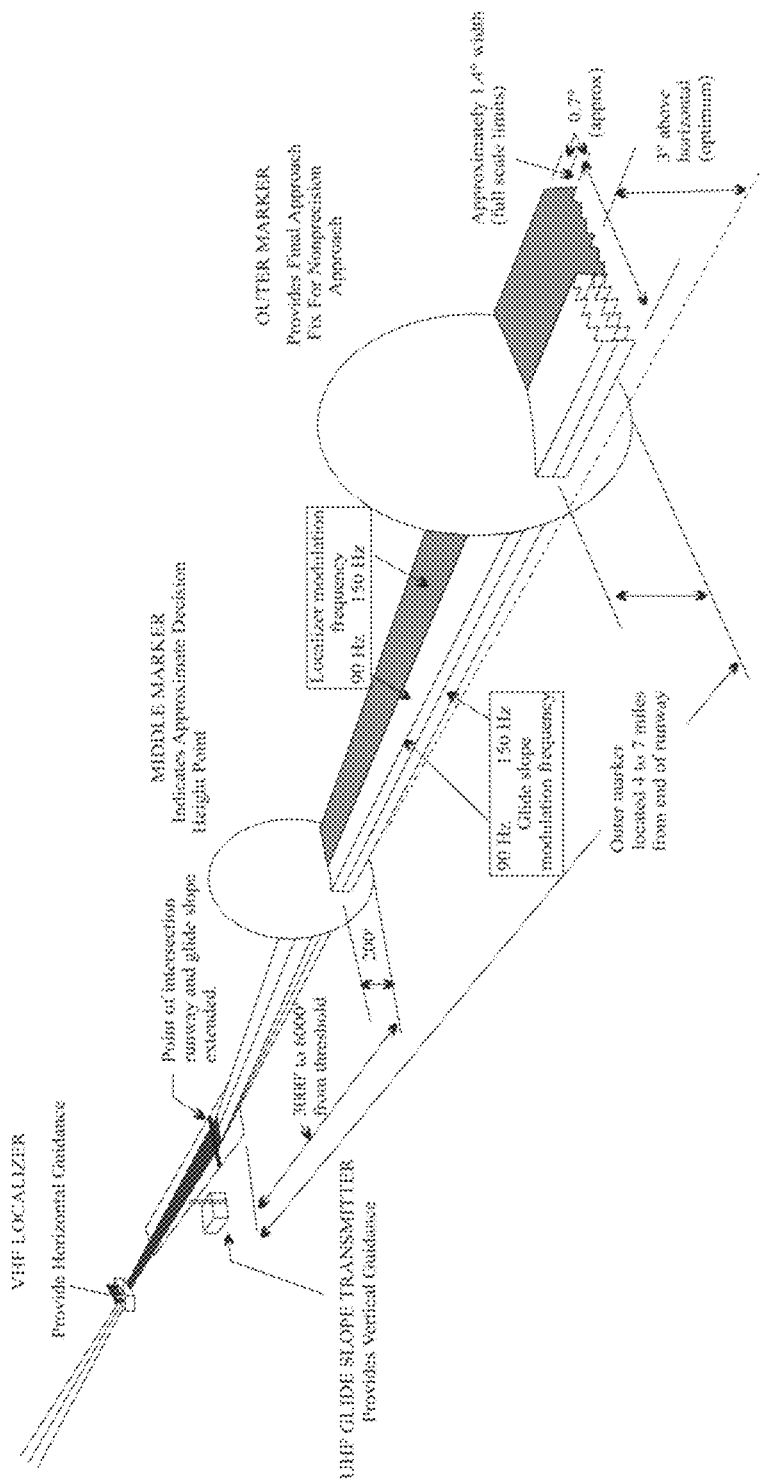
FIG. 1A illustrates a schematic of a conventional Instrument Landing System (ILS) providing horizontal and vertical guidance for guiding an aircraft along a runway.
Figure 1B:
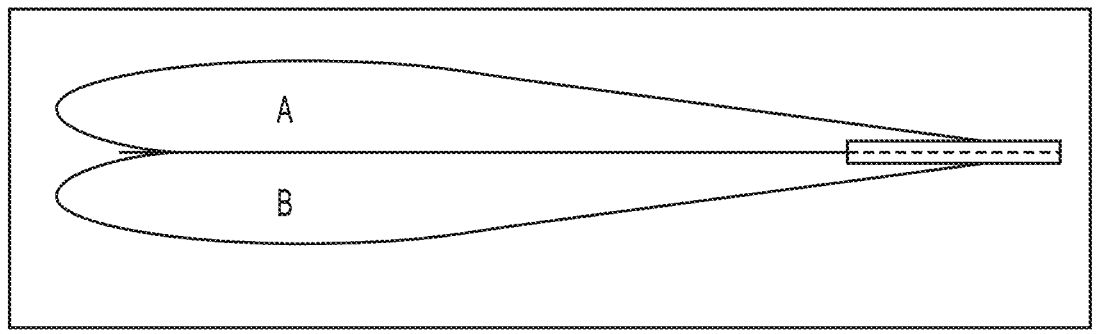
FIGS. 1B and 1C illustrate the localizer and the glideslope signal emissions, respectively, assisting the pilot with horizontal and vertical guidance for landing.
Figure 1C:
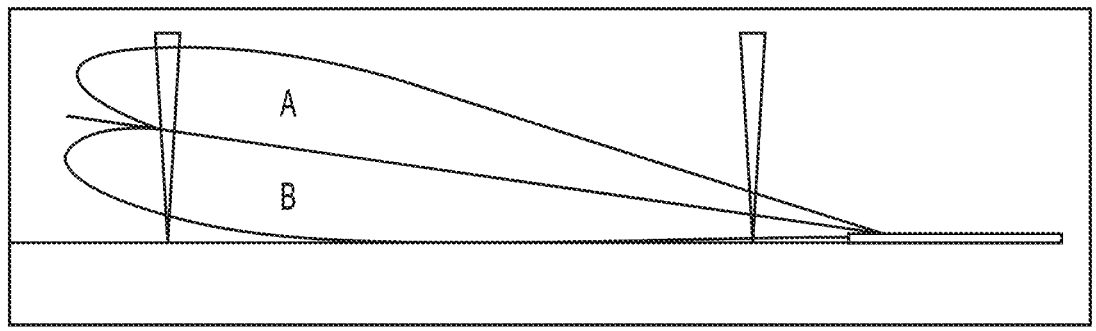

FIG. 1A illustrates a schematic of a conventional Instrument Landing System (ILS) providing horizontal and vertical guidance for guiding an aircraft along a runway. The ILS is a standard precision landing aid that is used to provide accurate azimuth and descent guidance signals for guidance to aircraft for landing on the runway under normal or adverse weather conditions. The ILS may comprise three subsystems, namely, a localizer, a glideslope, and marker beacons. The localizer, as illustrated in FIG. 1B, provides horizontal guidance to an approaching aircraft, the glideslope, as illustrated in FIG. 1C, provides vertical guidance to an approaching aircraft, and the marker beacons provide distance information as the approach proceeds. In some cases, marker beacons may be replaced by Distance Measuring Equipment (DME) In addition, the ILS may further include a high-intensity lighting at the end of the runway to help the pilot locate the runway and transition from the approach to a visual landing.

In the ILS system, as shown in FIGS. 1B and 1C, two or more radio frequencies (RF) are broadcast, one spatially offset from the other. The spatially offset RF signals are duplicated in the horizontal and the vertical directions. In some cases, the signal sensors associated with the aircraft may measure the strength of two signals. If one signal is larger than the other, the aircraft is off-center from the configured landing trajectory. Based on the information, the pilot may course-correct to constantly align with the centerline, to ride the glideslope to the runway. While the ILS and the associated systems are well-established for conventional passenger aircrafts, they may not be suitable for eVTOL aerial vehicles in urban settings due to nonstandard flight approach trajectories, interference with nearby ILS systems or all buildings, or ILS's large footprints.

Figure 2:
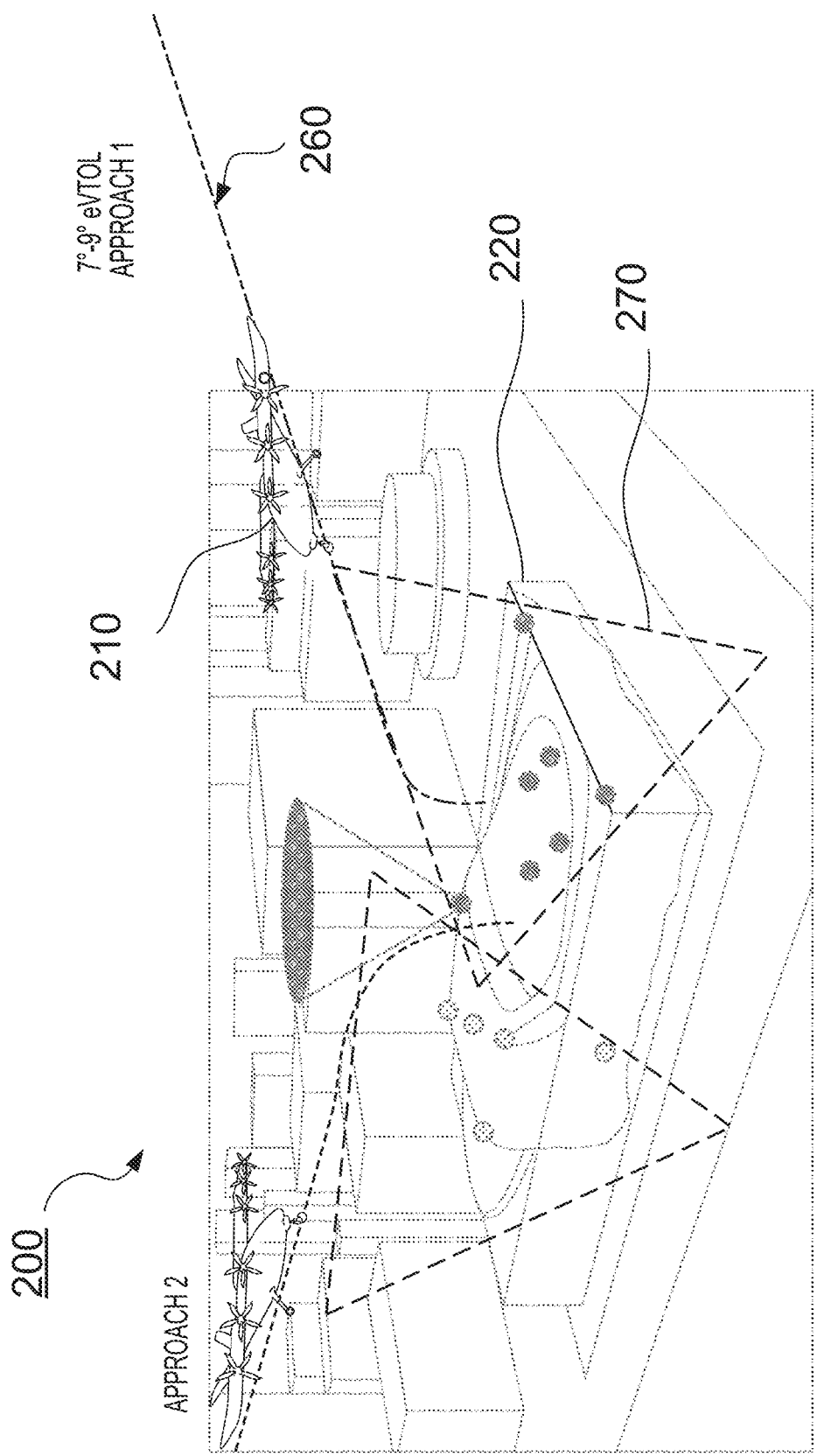
FIG. 2 illustrates a schematic diagram of exemplary landing/takeoff approaches using optical navigation in a GPS-denied environment, consistent with disclosed embodiments.

Reference is now made to FIG. 2, which illustrates a schematic diagram of exemplary landing/takeoff approaches using optical navigation in a GPS-denied environment, consistent with some embodiments of the present disclosure. An example view 200 of an eVTOL aircraft approaching the landing site or landing location with active markers in its camera field of view in a GPS-denied environment such as an urban setting with a high-density of tall structures is shown in FIG. 2. An exemplary aerial vehicle 210, such as an eVTOL, may approach a vertiport 220 using one or more approach paths 260. One of several advantages of using eVTOLs is that the aerial vehicle may approach a vertiport from any direction, unlike the conventional corridor-based landing approaches in the ILS system. By way of example, view 200 illustrates another approach direction (approach 2). In some embodiments, the approach angle may vary from 7°-9°, as illustrated. Aerial vehicle 210 may include a camera (not illustrated in FIG. 2 but discussed in later sections) with a field of view 270.

Figure 3:
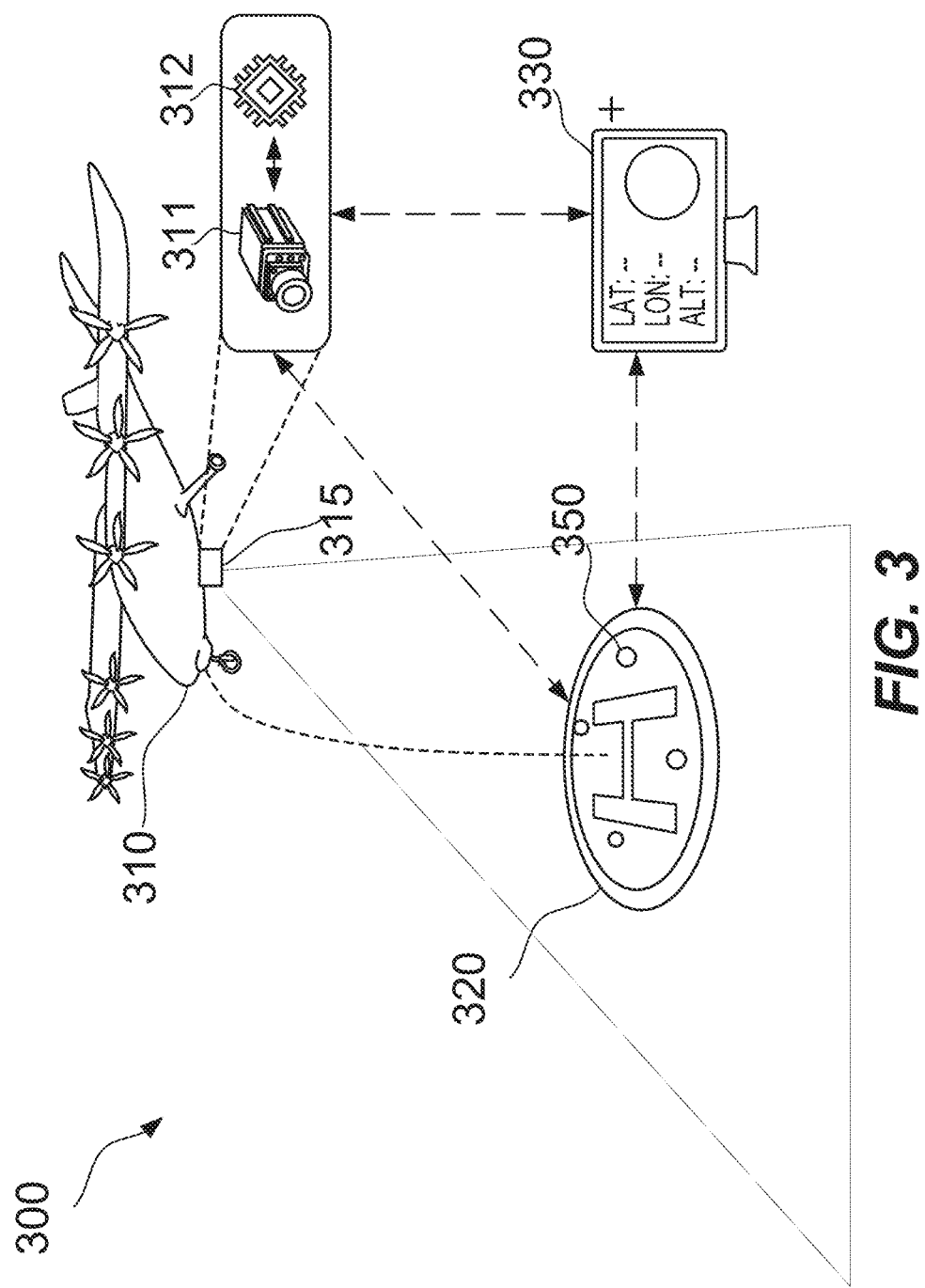
FIG. 3 illustrates an exemplary precision landing and takeoff system and data communication pathways between the aircraft, a vertiport, and a control unit, consistent with disclosed embodiments.

Reference is now made to FIG. 3, which illustrates an exemplary precision landing and takeoff system and data communication system, consistent with some embodiments of the present disclosure. The precision landing and takeoff system, as described herein, refers to an optical navigation based eVTOL localization system operating in GPS-denied environments. As discussed previously, eVTOL aerial vehicles, such as aerial vehicle 310 may be used in urban air mobility (UAM) applications spawning commercial passenger services such as air taxis, or in public service applications such as firefighting, medical aid delivery, emergency search and rescue operations, disaster relief operations, law enforcement, etc. In some embodiments, the aerial vehicles may be autonomous, i.e., pilotless.

The precision landing and takeoff system may include an aerial vehicle 310 comprising an on-board optical detection device 315, a vertiport 320 comprising markers 350, and a ground control unit 330. Optical detection device 315 may include a camera 311 and a processor 312. In some embodiments, optical detection device 315, ground control unit 330, and one or more vertiports 320 may wirelessly communicate with each other during a landing or a takeoff operation of the eVTOL aerial vehicle 310. Communication between optical detection device 315, ground control unit 330, and one or more vertiports 320 may include reception and transmission of data or information associated with providing landing or takeoff guidance to aerial vehicle 310.

The precision landing and takeoff system may include one or more vertiports 320 (also illustrated as vertiport 420 in FIG. 4). In some embodiments, vertiport 320 or vertiport 420 may comprise a landing surface or a landing location for an eVTOL vehicle such as aerial vehicle 310. Vertiport 320 may include a plurality of light sources arranged in a predetermined pattern, wherein a characteristic of light emitted from each of the light sources is configured to be modulated with respect to time. Each vertiport may include an active constellation of markers 350 or active light sources. As used herein, an active light source (ALS) refers to a light source, a characteristic of which may be modulated over time. For example, an intensity of the light emitted from the active light source may be modulated over time. Other characteristics that may be modulated over time include, but are not limited to, a frequency, an amplitude, a wavelength, a phase, a bandwidth, or a duty cycle of the emitted light. An example of active light sources may include, but are not limited to, light emitting diodes (LEDs).

In some embodiments, the touchdown and liftoff area of vertiport 320 may be rectangular, circular, triangular, substantially rectangular, substantially circular, or substantially triangular, or a combination thereof, or other suitable shapes. The touchdown and liftoff area, as used herein, refers to a region of the vertiport on which aerial vehicle (e.g., aerial vehicle 310) may perform a touchdown or a takeoff/liftoff. In some embodiments, the predetermined pattern in which the active light sources are arranged may be similar to the shape of the touchdown and liftoff area such that the active light sources define the boundaries of the touchdown and liftoff area. In some embodiments, the predetermined pattern of the active light sources defining the boundaries of the touchdown and the liftoff area may comprise the low-intensity light sources which are in the camera field of view when the aerial vehicle is close to the landing target to assist with landing or takeoff.

In some embodiments, the active light sources may be arranged in a substantially axisymmetric shape such as a circle, a square, or a rectangle. In some embodiments, the active light sources may be arranged in an elliptical, a triangular, a trapezoidal, or other shape. In some embodiments, the active light sources may be equally or unequally spaced in an axisymmetric shape. In an unequally spaced arrangement in an axisymmetric shape, the distance between neighboring active light sources may be non-uniform. In some embodiments, the active light sources may be arranged in a grid-based pattern where the light sources are uniformly spaced across the landing platform. Other arrangements, as suitable, are possible as well.

Figure 5:
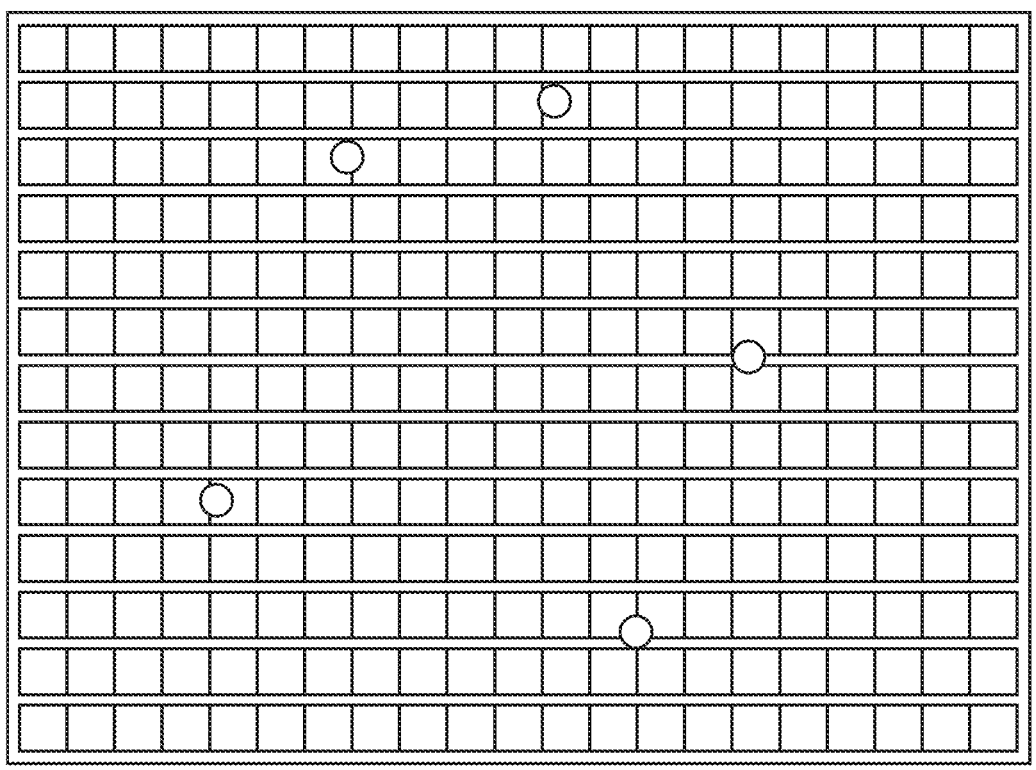
FIG. 5 illustrates an exemplary focal plane array (FPA) camera image of the light source of an exemplary vertiport, consistent with some disclosed embodiments.

In some embodiments, the active light sources may be arranged in an asymmetric shape to maximize detectability, uniqueness, or spoofing and jamming resistance of a vertiport with which the active light sources are associated. An example of an asymmetric shape of the arrangement of active light sources is shown in FIG. 5 (discussed later).

In some embodiments, markers 350 may include a constellation of infrared (IR) or visible spectrum fiducial light sources (e.g., active light sources) distributed at known locations in vertiport 320. In this regard, the precision landing and takeoff system may be referred to as an active fiducial light pattern localization (AFLPL) system. Some of several advantages of using active light sources as markers in a vertiport for optical navigation of an eVTOL aerial vehicles include:

i. Authentication and security-One or more characteristics of the emitted light may be modulated to enable authentication and improve security.
  ii. Easily distinguishable from the surrounding environment, allowing mitigation or rejection of visual clutter in an urban setting.
  iii. Enhanced range, detectability, and data transmission-One or more characteristics may be modulated to enhance range, detection, and data transmission including conveying messages to the aircraft or enable low-bandwidth communications.
  iv. Day/night capability—The aerial vehicles may be operated both in the daytime and at night.
  V. Jamming and spoofing resistance—The optical-based AFLPL approach is inherently more robust to jamming and spoofing than radio-frequency (RF) signals. The modulation capability of AFLPL may further allow authentication codes to be implemented.
  vi. No significant regulatory hurdles—The AFLPL approach may offer an easier path to certification by the FAA, enhancing the acceptability and feasibility of implementing active light sources in public service applications. Further, unlike RF-based ranging and communication approaches, AFLPL will not require FCC allocation of limited-availability RF spectrum. Furthermore, in military applications, AFLPL narrow-band near IR lighting could provide lower detection levels than RF emissions.
  vii. High positioning and guidance accuracy-Positioning accuracy compared to GPS or GNSS may be equal to or higher in the vicinity of the vertiport, particularly in GPS-challenged or GPS-denied environments. Position accuracy error may be less than 1 m within 100 m of the vertiport and reducing as the vehicle approaches the vertiport. In some instances, the position accuracy error may be less than 10 cm within 10 m of the vertiport.
  viii. High redundancy and high reliability-Active light sources may be relatively low-cost options and have no in-air weight, allowing employment of multiple light sources at the vertiport to provide uninterrupted guidance.
  ix. Enhanced visibility-Infra-red (IR) wavelengths of emitted light may enhance visibility and detectability in adverse weather conditions such as fog, rain, storm, lightning, etc.
  X. Low implementation complexity-Minimum infrastructure may be required at the vertiport. Visible and infrared light sources can be integrated into the vertiport structure and recessed into the landing pad with relatively low technical complexity and cost.

In some embodiments, the location of active light sources in a constellation in a vertiport may be designed to provide optimized localization across the entire landing trajectory. In some embodiments, the constellation may include a first set of light sources arranged in a first predetermined pattern, and wherein each of the first set of light sources is configured to be in a field of view of a camera associated with the aerial vehicle when the aerial vehicle is at a first distance from the landing surface. The first set of light sources may include light sources with a higher intensity and located at a larger distance from the landing target may improve performance when the aerial vehicle is at longer distances from the vertiport. The first set of light sources may be in the camera field of view at larger distances and out of camera field of view when the aerial vehicle is close to the vertiport or the landing target. The constellation may further include a second set of light sources arranged in a second predetermined pattern, and wherein each of the second set of light sources is configured to be in the field of view of the camera when the aerial vehicle is at a second distance from the landing surface. The second set of light sources may include light sources with a lower intensity and located within a smaller distance such that the second set of light sources remain in camera field of view when the aerial vehicle is in its final approaches or within a predetermined approach distance. The intensity of the light sources of the second set may be different from the first set of light sources so as to avoid interference with the detection of the first set of light sources from larger distances. In some embodiments, the intensity of the first set of light sources may be higher than the intensity of the second set of light sources. In some embodiments, the area covered by the first set of light sources may be larger area than an area covered by the second set of light sources. In other words, the first set of light sources may be distributed over a larger area in comparison to the second set of light sources to enable detection of only the second set of light sources when the aerial vehicle is within a predetermined approach distance.

In some embodiments, the light sources in a constellation may be arranged to maximize the detectability of each location by maximizing the spacing between each light source. In some embodiments, the light sources may be arranged to maximize the ability to identify a light source from the multiple light sources such as by minimizing symmetry of the arrangement pattern. In some further embodiments, the predetermined pattern of the light sources may be associated with the landing surface. For example, the constellation may comprise a uniquely identifiable pattern for each vertiport such that the vertiport may be identified based on the arrangement pattern of the light sources in the vertiport.

In some embodiments, additionally or alternatively, the active light sources (e.g., fiducials) may be located on the ground, atop buildings, or other objects along a common flight path. Some possible locations include, but are not limited to, on roads, atop light poles, atop buildings, atop antennas or other tall structures. This would allow obtaining precise position information throughout the course of the flight and not just when the landing surface or the landing pad is in view. In addition, the same algorithms may be used to calculate position, but since the light source pattern is spread across a much larger area, the system can operate for the entirety or a substantial portion of the flight duration and not just on final approach to the landing pad.

In some embodiments, the size and dimensions of one or more vertiports may be dissimilar. The size of the vertiport may determine a degree of performance when the aerial vehicle is far from the vertiport. While the fiducial patterns within a constellation may not need to be the same for every vertiport, it may be desirable to know the layout or the arrangement of the fiducial light markers beforehand. In some embodiments, however, the light sources may be configured to transmit information associated with their own location, in which case, the prior knowledge of the location or the arrangement of light sources may not be needed. In some embodiments, the constellation patterns or the arrangements may be stored in a database or a server of the system. The information stored in the database may be accessible and updatable in real-time or based on an input from a user.

In some embodiments, one or more characteristics of the emitted light may be modulated to transmit information. The modulation may be performed by one or more methods including, but not limited to, on or off switching, frequency modulation, amplitude modulation, duty cycle modulation, synchronization options, among other things. The transmitted information may include an identity of the vertiport, a location of the light source, an identity of the light source, an operational status of a vertiport. In some embodiments, the transmitted information may include an encoded signal authenticating the landing surface or the vertiport. It is to be appreciated that a combination of modulation methods and the information transmitted by the modulation may be applied, as appropriate. For example, the frequency of light emission from the light source may be modulated to transmit information associated with an identity of the light source and the duty cycle may be modulated to transmit information associated with an identity of the vertiport. In another example, the frequency of light emission from the light source may be modulated to transmit information associated with an identity of the vertiport. In some embodiments, the frequency may be modulated to indicate an operational status of a vertiport, such as functional, non-functional, under maintenance, etc.

In some embodiments, the wavelength of the light emitted from one or more light sources may be determined based on several factors including, but not limited to, improving detectability by maximizing the difference between the emitted light and the background light, minimizing absorption of the emitted light by the atmosphere or weather effects, maximizing sensitivity to be detected by the camera, or reducing the visible light pollution around the landing target, among other things.

In some embodiments, the wavelength of the light emitted from one or more light sources is in a range from 800 to 1550 nm. In some embodiments, the wavelength of the light emitted from one or more light sources is in a range from 800 to 850 nm. In a preferred embodiment, the wavelength of the light emitted from one or more light sources is 810 nm. In some embodiments, the wavelength of the light emitted from one or more light sources is 1310 nm. In some embodiments, the wavelength of the light emitted from one or more light sources is 1550 nm.

In some embodiments, as illustrated in FIG. 4A, one or more light sources 450 may be recessed with respect to the landing surface of vertiport 420. An exemplary light source 450 is illustrated in FIG. 4B. In some embodiments, one or more light source may be recessed, protruded, or co-planar with the landing surface. In some embodiments, light source 450 may comprise a protective or an encapsulation cover to prevent ingress of moisture, dust, or other particles that may affect the performance of the light source. In some embodiments, the protective cover may be configured to transmit substantially all the light emitted from the light source, such that there is negligible or no absorption by the protective cover.

In some embodiments, each light source may further include an optical sensor configured to detect a portion of the light emitted from at least one other light source of the light sources. This may be desirable to synchronize the camera capture rate with the modulation of the light sources to reduce errors that may occur if the image is captured during a transition (discussed in later sections). In some embodiments, the landing surface or the vertiport may further include a controller circuit configured to operate the light sources. In this context, operating a light source may include activating, deactivating, or modulating a characteristic of the light source, by for example, adjusting the electric signal applied to the corresponding light source. The controller circuit may further comprise time management circuitry, power management circuitry, sequencing circuitry, etc. In some embodiments, one or more processors may be configured to remotely control the operation of the light sources.

In some embodiments, the wavelength of the emitted light may be modulated to increase detectability or the range of a light source, or to transmit data from the corresponding fiducials. The inventors recognize that while the wavelength may be adjusted, it may negatively impact the simplicity and implementability of the system. For example, to detect wavelength variations, a hyperspectral camera may be needed. Though such cameras exist and are commercially available, they may be complex, less reliable, and compute intensive. Further, because the wavelength of a LED is primarily determined by the material composition and transmission media, such light sources may be experimental, less reliable, and expensive.

In some embodiments, vertiport 320 (or vertiport 420) may be a portable landing surface. A portable vertiport (not illustrated herein) may include a re-deployable landing mat, a fabric, or a tarp. This may be particularly useful where landing at non-cooperative sites with limited or temporary landing infrastructure may be required, such as a military operation, a firefighting effort, a disaster relief operation, a medical aid dispensing operation, etc. In some embodiments, the portable vertiport may include battery-powered active light sources incorporated within such that they may be activated, deactivated, or modulated remotely.

In some embodiments, vertiports may include a plurality of landing surfaces, wherein each landing surface comprises a plurality of light sources arranged in a predetermined pattern, and wherein a characteristic of light emitted from each of the light sources is configured to be modulated with respect to time.

In some embodiments, one or more landing surfaces of a vertiport may be horizontally displaced from each other, for example, in a vertiport hub, or a vertiplex, or a large area including multiple vertiports. Horizontally displaced vertiports may be coplanar or substantially coplanar. As used herein, the terms "coplanar" or "substantially coplanar" refer to the landing surface of the vertiport being on the ground, analogous to cars parked in a car parking lot. In some embodiments, one or more vertiports may be vertically displaced from each other such that they are non-coplanar, for example, in a vertiport garage including multiple levels of vertiports. In some embodiments, one or more vertiports may be horizontally and vertically displaced from each other such that they are offset in the horizontal and the vertical axes from each other, allowing for a higher density of vertiports.

Referring back to FIG. 3, aerial vehicle 310 may include optical detection device 315, which further includes camera 311 and processor 312. Camera 311 may be configured to capture or generate images based on information transmitted by the light sources (e.g., active light sources 350) located adjacent a landing surface for the aerial vehicle. Processor 312 may comprise a controller circuit configured to receive the generated images and determine a position and an orientation of the aerial vehicle based on the received images.

In some embodiments, camera 311 may include a color, a monochrome, a hyperspectral camera. Camera 311 may be mounted on the aerial vehicle 310 such that the camera 311 may provide a plan view of the light sources on the landing surface. The plan view of the light sources may be desirable when the aerial vehicle is within landing distance where the vertical descent is from the height of 50 ft above ground level (AGL) to 0 AGL, or when the aerial vehicle is taking off. In some embodiments, camera 311 may be mounted on the aerial vehicle 310 such that the camera 311 may provide a forward-looking view of the light sources on the landing surface. This may be desirable to maximize visibility during approach. In some embodiments, one or more cameras may be mounted on the aerial vehicle to capture multiple frames or views from different angles during landing or takeoff.

In some embodiments, camera 311 may be always turned ON but activated to capture images and/or report measurement when detecting fiducials or active light sources on the landing surface. Alternatively, camera 311 may be turned ON or activated when the aerial vehicle is within detection distance to conserve power. In alternate embodiments, camera 311 may be turned ON or activated for a predetermined duration, at a predetermined time, or by an activation signal from an external processor (e.g., flight control computer, or ground control unit 330), or by an operator of the aerial vehicle. In some embodiments, camera 311 may be configured to be activated after the aerial vehicle is within a predetermined distance from the landing surface. The predetermined distance may be based on several factors including, but not limited to, weather conditions, landing surface conditions, among other things. In a preferred embodiment, the predetermined distance may be 500 m or less.

In some embodiments, camera 311 may include an optical filter configured to permit a range of wavelengths of the light emitted from each of the light sources. In other words, the optical filter of camera 311 may be configured to reject wavelengths substantially different from the fiducial transmission wavelength. As used herein, the fiducial transmission wavelength refers to the wavelength or a range of wavelengths of the light emitted by one or more of the fiducial markers (e.g., active light sources on the landing surface). For example, if the active light sources are configured to emit a light of wavelength 810 nm, the optical filter may permit a wavelength range of 808 nm-812 nm and reject wavelengths outside of the allowable transmission range. In some embodiments, the sensitivity of the optical detection of camera 311 may be adjusted to perform filtering of incoming wavelengths.

In some embodiments, the permitted range of wavelengths is in a range of 800 nm-850 nm. In a preferred embodiment, the permitted range of wavelengths is about 810 nm. In some embodiments, the permitted range of wavelengths is about 1310 nm. In some embodiments, the permitted range of wavelengths is about 1550 nm. In some embodiments, the optical filter may be configured to permit the wavelength corresponding to the emitted light. As used herein, the term "about" refers to an approximation such that the range of allowable wavelengths is within +2 nm or less. The optical filter may be a lowpass, a high pass or a bandpass filter. Based on the light sources detected, camera 311 may generate a FPA image, as illustrated in FIG. 5.

Figure 6:
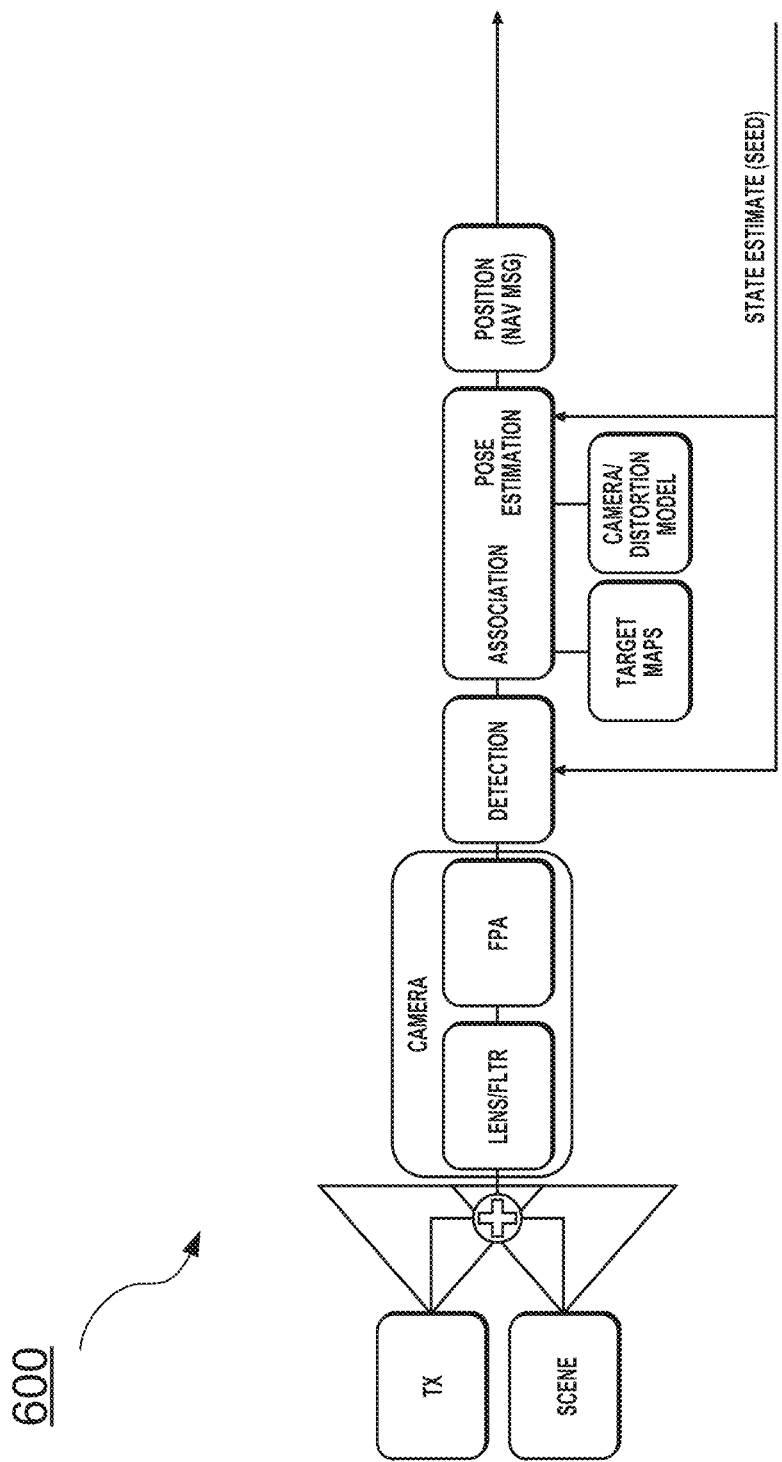
FIG. 6 illustrates an exemplary overview of algorithms and data pipeline during an operation of the precision landing and takeoff system, consistent with some disclosed embodiments.

Reference is now made to FIG. 6, which illustrates an exemplary overview of algorithms and data pipeline 600 during an operation of the precision landing and takeoff system, consistent with some embodiments of the present disclosure. As illustrated, camera (e.g., camera 311) may be configured to receive optical signal from the light sources on the vertiport and background information such as scene information. The camera, comprising an optical filter, may be configured to output a series of still images, or a video stream, or an FPA image. Based on the generated output signal, a processor may be configured to execute one or more algorithms to detect, associate, estimate a pose of the aerial vehicle, and decoding information in the encoded signal from the active light sources. The detection algorithm allows identification of the location of an active light source in an image frame captured by the camera. The association algorithm allows association or mapping an identified active light source in the image to a corresponding active light source on the landing surface. The pose estimation algorithm allows determining a pose of an aerial vehicle based on the associated active light sources.

Detection

Identifying the location of an active light source in an image frame may include distinguishing the received signal from the background noise signal. This may be performed using background subtraction and thresholding operations. If the active light sources are modulated in such a way as to be fully on in one frame and fully off in another frame, the frame in which the light source is fully off may be used as a background image to remove the background from the fully on image through subtraction. An exemplary subtraction algorithm is provided here. It is to be appreciated that other suitable subtraction and thresholding techniques may be used to identify the location of an active light source in an image.

By way of example, if I_n is an M×N matrix of pixel values corresponding to the nth image, then I_diff=abs (I_n−I_(n−1)) is the difference in pixel values of consecutive images. The resulting difference frame (I_diff) can be thresholded to generate a mask which identifies what pixels in the original image correspond to the active light source. So, I_mask=where (I_diff>Threshold). With the active light source identified in the image, the location can be calculated via centroiding math which can calculate the location of the light source with sub pixel accuracy.

$$\text{Centroid} = \Sigma(P_i * X_i)/\Sigma P_i$$

Where $P_i$ is the value of the $i_{th}$ pixel indicated by the mask and X is the location (xy pair) of the pixel. Additionally, or alternatively, image filtering techniques such as temporal filtering and spatial filtering may be used to detect and localize active light sources in an image.

In some embodiments, improving the detection or localization of an identified location of an active light source in an image frame may include performing a registration method. This may be desirable for images where the background is moving quickly due to motion of the camera, such as the camera mounted on a moving aerial vehicle. The active light source may change location in the image between the on frame and the off frame. In this case, the images may need to be shifted in order to line up from frame to frame in order to align the background for subtraction. To accomplish this, one of several techniques including feature matching, translation matching, or current state estimation may be used. In feature matching, features common to each frame may be identified and their location in each frame may be determined. The image may be translated and/or distorted to align the features. In translation matching, for small changes, two images may be shifted one pixel at a time to determine where the background most closely matches. In current state estimation, if the positional and rotational velocity of the camera is known or can be estimated from preceding images, the image distortion needed to align each frame may be estimated. Further, the registration may be performed globally or locally on one or more regions of interest around the active light sources. It is to be appreciated that other techniques of improving detection may be employed as alternatives or in combination with the described techniques herein.

In some embodiments, identifying the location of an active light source in an image frame or improving the detection may include tracking the location of an identified active light source to reduce the computation of subsequent calculations. In order to adequately predict the position of an active light source, some measurement of velocity or change of time may be useful. This may be obtained by using aircraft position and velocity from external systems such as GPS or internal navigation system (INS), using internal estimates of aircraft position and velocity derived from changes in position over time, or using changes in pixel location over time such as tracking an active light source change between frames and extrapolating in time. Tracking may be used to reduce compute by calculating regions of interest over which to perform detection rather than the whole image, to improve accuracy by providing estimates for registration, or to calculate additional information such as velocity or acceleration which can be reported to other devices on the aircraft.

Figure 7:
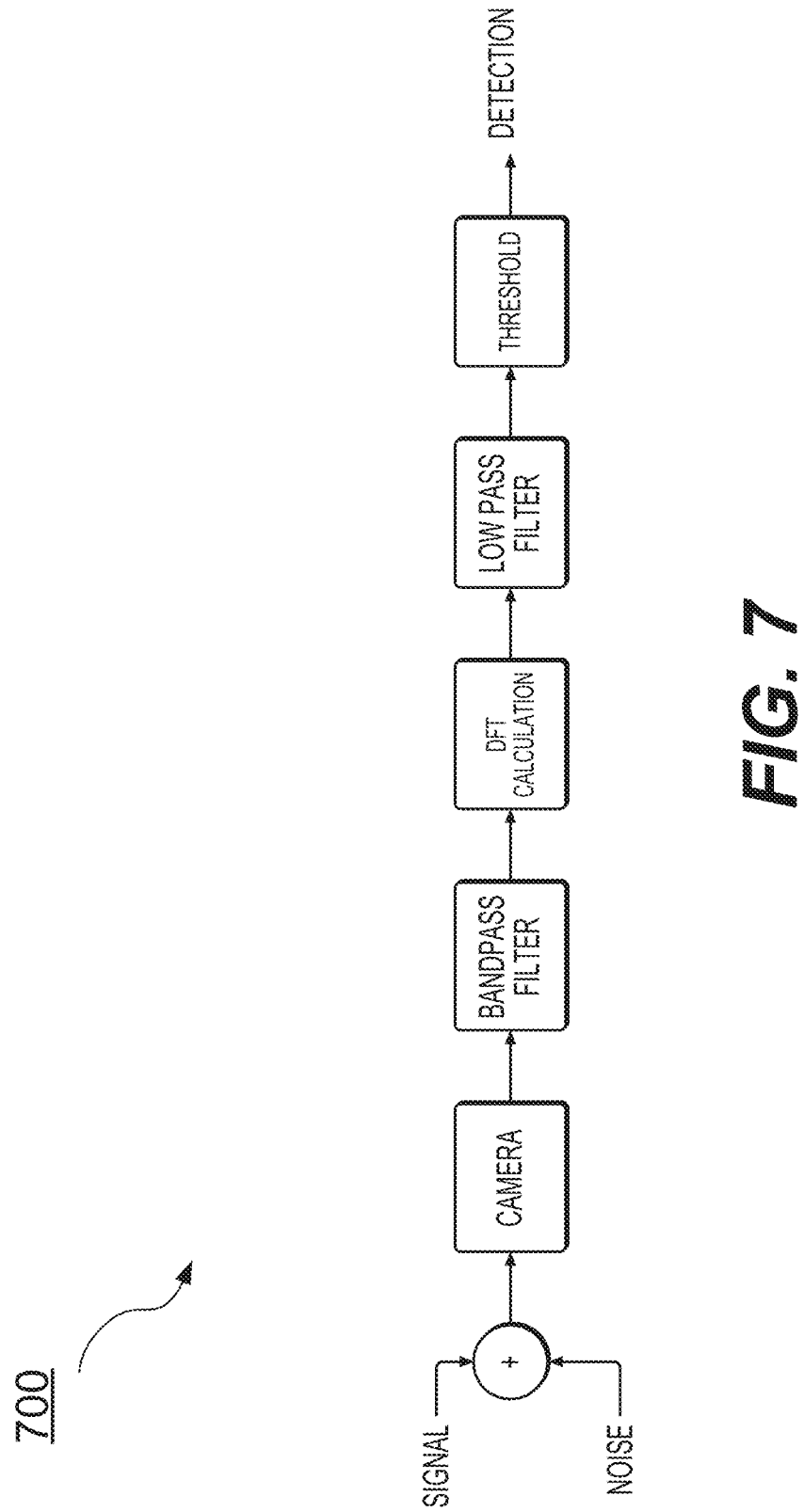
FIG. 7 illustrates an exemplary detection algorithm to identify the location of a light source in an image captured by a camera, consistent with some disclosed embodiments.
Figure 8:
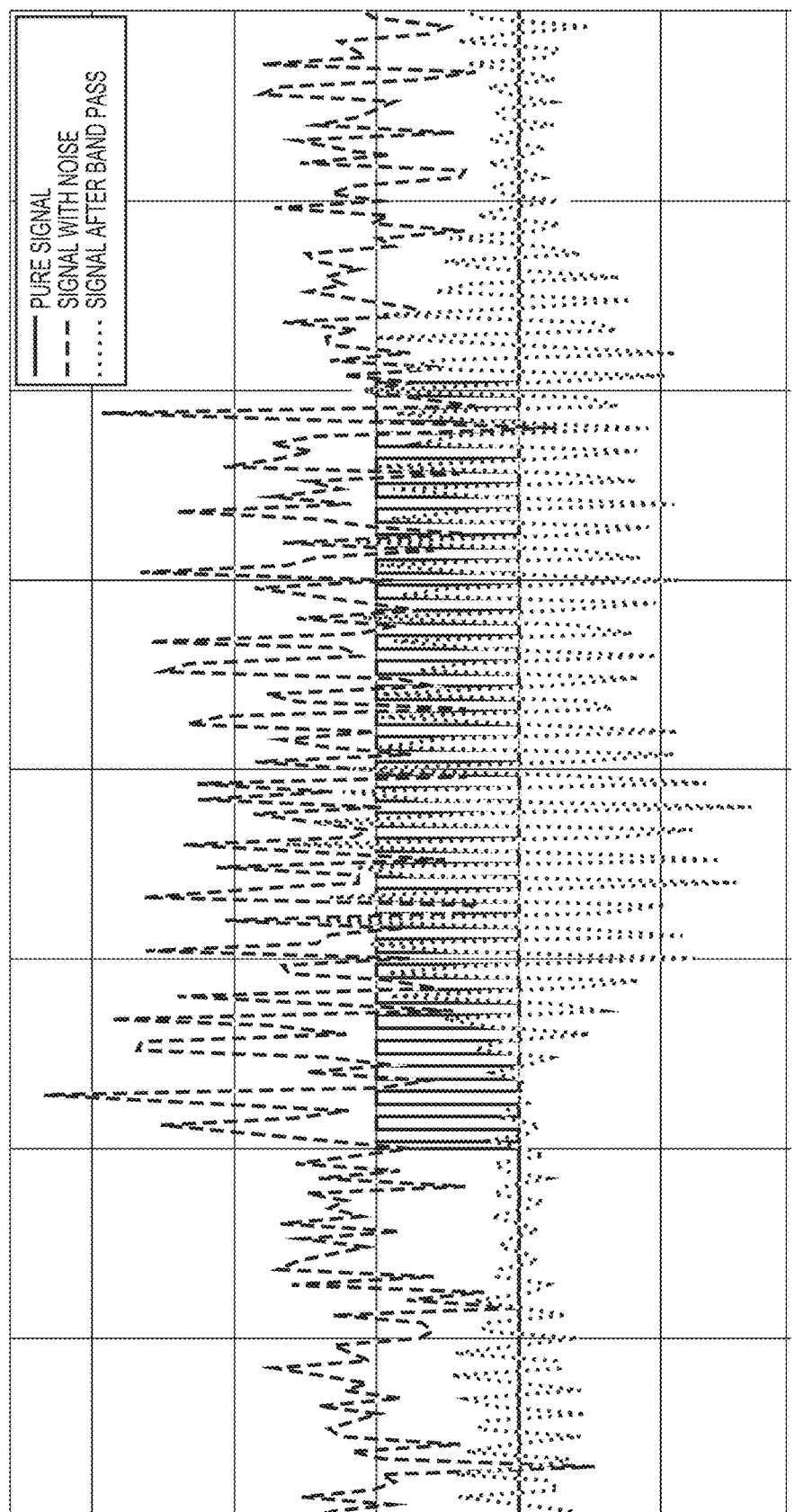
FIG. 8 illustrates a data plot showing comparison of signals before and after signal processing using a bandpass filter, consistent with some disclosed embodiments.
Figure 9:
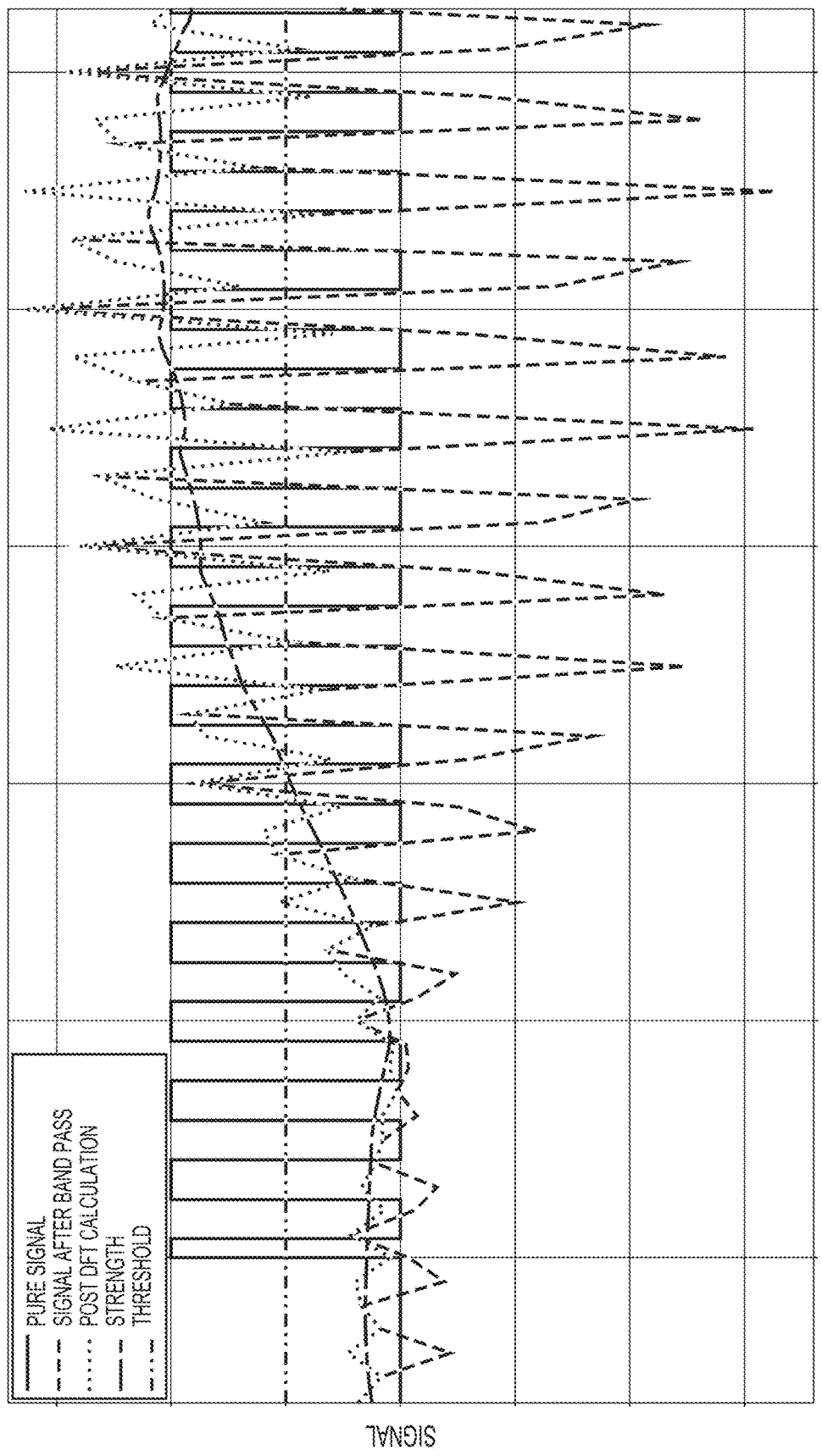
FIG. 9 illustrates a data plot showing comparison of signals before and after Discrete Fourier Transform (DFT) calculation, consistent with some disclosed embodiments.

FIG. 7 illustrates an exemplary detection algorithm 700 to identify the location of a light source in an image captured by a camera, consistent with some embodiments of the present disclosure. As illustrated, the camera may receive a noisy signal and generate an output, typically in the form of an image or a stream of images. The image may be processed using applying bandpass filter, Discrete Fourier Transform (DFT) calculation on the filtered image, low pass filter, and thresholding. FIGS. 8 and 9 illustrate data plots showing comparison of signals before and after signal processing using a bandpass filter and DFT calculations, respectively, consistent with some embodiments of the present disclosure. In some embodiments, one or more characteristics of active light sources may be modulated with respect to time to improve detection of active light source in a captured image.

Data Association

Data association, as used in the context of this disclosure, refers to the process of matching a detected point in a camera image to a known point in a database of known locations of the active light source or optical marker or fiducial on the landing surface. Some of the existing techniques for data association may include modulating one or more light sources to communicate a unique identification of the light source and determining the position based on the light modulation. However, such an approach may have challenges such as, but not limited to, inaccurate identification due to cross-signaling, poor signal-to-noise ratio (SNR), high background noise, etc. As previously mentioned and as disclosed in some embodiments in this disclosure, one or more data association algorithms may be executed to map the detected points in a camera image to a known location of the active light source. The choice of data association algorithm may depend on several factors including, but not limited to, whether an acceptable data association exists, reliability, accuracy, robustness, etc. of the obtained association results. As an example, after finding an acceptable and correct association, the points may be tracked from image to image, for example, by a Point Tracking method (discussed in detail later). As another example, while the Grid Association algorithm may not rely on an initial association, the algorithm may not always produce a solution. Accordingly, it may be desirable to execute two or more data association algorithms in parallel, or sequentially, to establish an acceptable data association and associate each identified fiducial in the camera image to a three-dimensional (3D) location of the identified fiducial. Some aspects of this present disclosure are directed to methods and systems for data association and the advantages thereof.

a. Iterative Closest Point Algorithm

In some embodiments, an Iterative Closest Point (ICP) algorithm may be used. The algorithm may include the following steps.

1. Given a location estimation, estimate where in an image the ALS would be located.
2. For each detected point find the nearest (geometric distance) estimated point.
3. Sum the distances between each point pair (measured vs estimated).
4. Determine a small perturbation (x-y translation and rotation) to the estimated points. which reduces the error distance calculated in step 3.
5. Update the estimated location of the points based on the perturbation calculated in step 4.
6. Return to step 2 until the error has converged.
7. The resulting association is taken from step 2 (nearest neighbor) after the solution has converged.

While simple to perform, ICP may be sensitive to inaccuracies in the initial estimation of the pose. In some cases where the step size may be too small, it may take a long time to converge, and can be very compute intensive.

b. Thin-Plate Spline Robust Point Matching Algorithm

A spline is a numeric function that is defined by polynomial functions. A spline function possesses a high degree of smoothness at the places where the polynomial pieces connect, known as nodes. Feature-based methods for non-rigid registration may face challenges associated with correspondence of points between two or more sets of features. In this context, the correspondence between two sets of features refers to association between each identified fiducial in a two-dimensional picture to a 3D location of a fiducial (e.g., active light source on the ground). The framework of a non-rigid point matching or Robust Point Matching (RPM) algorithm may be extended to include spline-based deformations, and in particular, the thin-plate spline. Some methods that solve for both the correspondence and the transformation include ICP (discussed previously). The ICP algorithm utilizes the nearest-neighbor relationship to assign a binary correspondence at each step. This estimate of the correspondence is then used to refine the transformation, and vice versa. While the ICP algorithm is simple and fast which is guaranteed to converge to a local minimum, it may be insufficient for non-rigid transformations, particularly when the deformation is large. In addition, the correspondence quickly deteriorates with outliers, rendering the ICP algorithm inadequate. The generation of a smoothly interpolated spatial mapping with adherence to two sets of landmark points is a general problem in spline theory. This is because once non-rigidity is allowed, there is an infinite number of ways to map one point-set onto another. The smoothness constraint is desired because it discourages mappings which are too arbitrary, or are outliers. In other words, the behavior of the mapping can be controlled by choosing a specific smoothness factor, based on prior knowledge.

Reference is now made to FIGS. 13A-13D, which illustrate the correspondence and matching process using the Thin-Plate Spline Robust Point Matching algorithm, consistent with some disclosed embodiments.

Figure 13A:
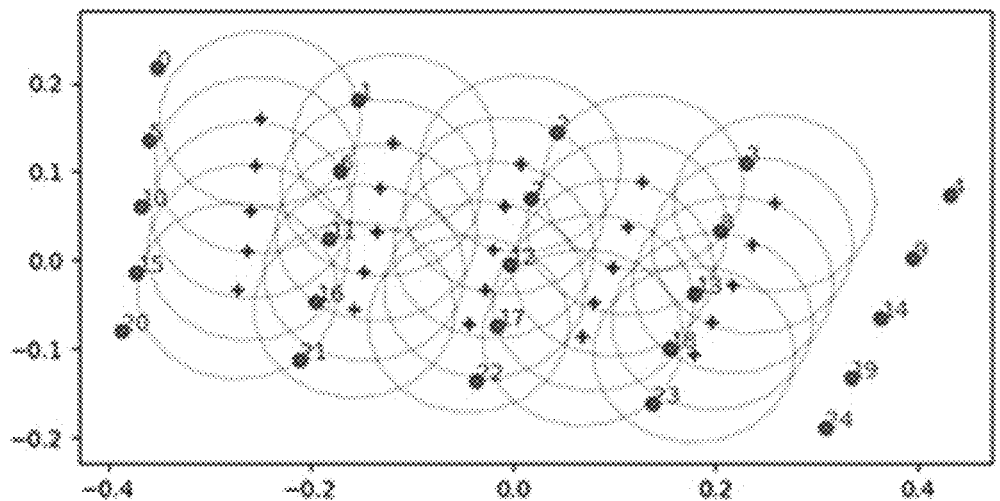

FIG. 13A shows a coordinate space including a normalized grid ordered in accordance with the ordering of the ground active light sources. The exemplary normalized grid, as shown in FIG. 13A, contains 25 points in a 5×5 arrayed format. Each point in the normalized grid is numbered from 0-24, in accordance with the ordering of the lights on the ground. In some embodiments, the normalized grid may be rotated based on the heading of the aerial vehicle approaching a landing surface. The coordinate space further shows normalized detected points as received from the detection algorithm. The normalized detected points are indicated with a "+" marker. The normalized detected points may be overlaid with the normalized grid points. The circular boundaries indicate the radius of potential matches to be evaluated with Robust Point Matching.

Figure 13B:
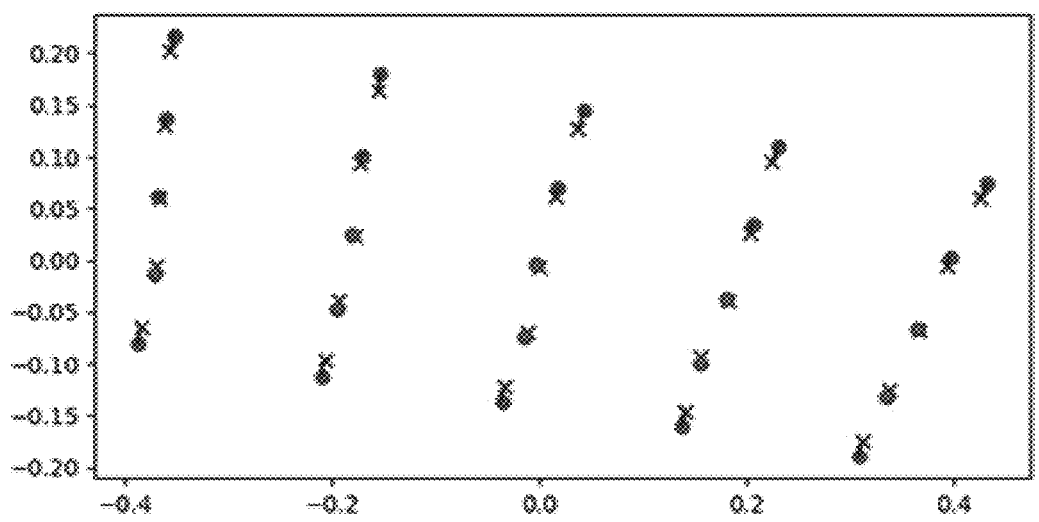
Figure 13C:
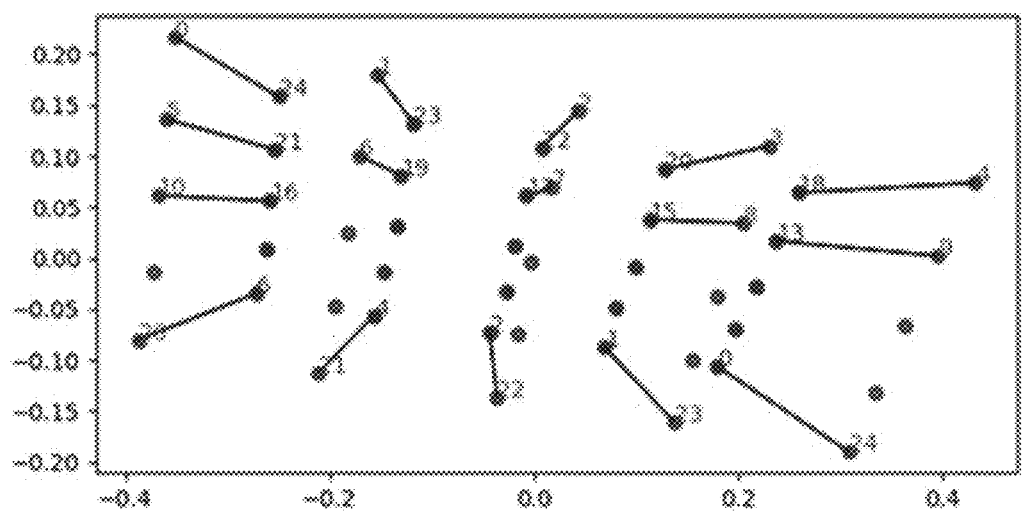
Figure 13D:
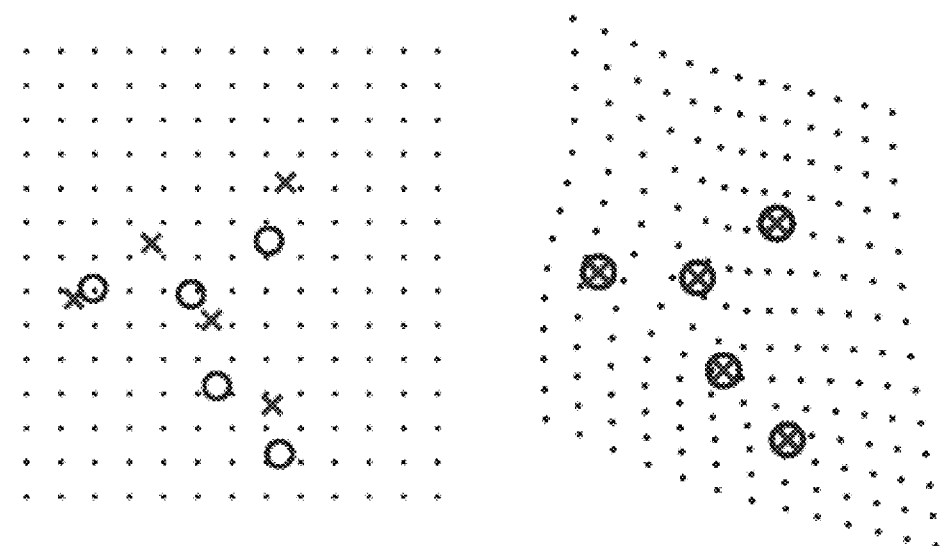

The TPS-RPM algorithm may include performing a distance-based point matching and association for a larger search region. FIG. 13B shows the coordinate space including the normalized grid points and the location of the detected points after the thin-plate spline warping (e.g., as illustrated in FIG. 13D). A line may be drawn to connect the normalized grid point with a corresponding normalized detected point, if present, after the thin-plate spline warping.

The TPS-RPM algorithm may further include determining the TPS distortion which may be used to reduce the error for associated points. The algorithm may further include reducing the size of the search region and iteratively performing TPS distortion until the normalized detected points and the normalized grid points converge. FIG. 13C shows the association of normalized grid points connected with the normalized detected points, indicated by the lines connecting the two.

In some embodiments, given the iterative nature of the TPS-RPM algorithm, using a normalized initial guess to match the known pattern to the detected points may take an extremely long time. Therefore, to improve overall performance of the algorithm, in particular, when the aircraft is closer to the vertiport where there are larger changes between frames, TPS-RPM algorithm may be run in two modes. The first mode would use a normalized initial guess to estimate a pose of the system. Based on the confidence metric in the estimated pose, other association algorithms such as ICP, Cross Ratios, Grid Associations, etc. may be used to supplement or assist by seeding the TPS-RPM with the current pose of the aircraft and use that to project the known pattern into the camera frame, and use that projection as our initial guess before we normalize. This method, in practice, may drastically reduce the number of iterations required to converge on a solution, thereby allowing the use of TPS-RPM at full rate.

c. Grid Based Association Algorithm

Reference is now made to FIG. 14A, which represents an exemplary camera image 1400 with detected points (denoted by a grid of squares), consistent with disclosed embodiments. Camera image 1400 may be an image captured by a camera mounted on an aerial vehicle closer to a landing surface and approaching at a non-zero angle with respect to the plane normal to the landing surface. In some embodiments, image 1400 may comprise any number of detected points in an arrayed or a non-arrayed arrangement. Is it to be appreciated that although image 1400 illustrates a 5×5 grid of detected points, other grid patterns, or random patterns including any number of detected points, may be used as well. In some embodiments, the detected fiducials or the points may be numbered in a known, recognizable order. For example, the detected points in image 1400 may be numbered 0-24 starting from the top row moving from top-left to top right, and repeating the left-to-right numbering for every row. It is to be appreciated that the numbering order, by no means, should be construed as limiting. The numbering format is exemplary and non-limiting.

FIG. 14B represents a normalized image space 1410 comprising normalized detected points of image 1400. In some embodiments, the detected points may be normalized such that the detected points fit within a pre-defined image space, for example, −100 to +100 arbitrary units (a.u.), as illustrated in FIG. 14B. In some embodiments, normalization may include mean centering the detected points, and making the variance of the detected points equal to unity (value of 1), by constructing a transformation matrix using the mean and variance of the points. Some advantages of normalizing the detected points within a normalized image space are that all the points are within a unit distance and that the points to not have any offset. Additionally, any processing (e.g., data manipulation) performed on one or more points may affect the remaining points equally.

After normalization of detected points, as shown in normalized image space 1410 of FIG. 14B, lines in the normalized image space 1410 which pass through multiple detected points may be identified, by performing a Hough Transformation technique. As referred to herein, the Hough Transform technique may be used to isolate features of a particular shape within an image comprising multiple points in a parametric form, such as, lines, circles, ellipses, etc. In line detection using Hough Transformation, each input measurement (e.g., a coordinate point) indicates its contribution to a globally consistent solution (e.g., the physical line which gave rise to that image point). As an example, in fitting a set of line segments to a set of discrete image points (e.g., pixel locations), the lack of knowledge about the number of desired line segments may not constrain the possible solutions of fitting line segments through the image points.

In an image analysis context, the coordinates of the point(s) of edge segments (i.e., x, y) in the image are known and therefore serve as constants in the parametric line equation $x \cos \theta + y \sin \theta = r$, while $r$ and $\theta$ are the unknown variables. Plotting the possible $(r, \theta)$ values defined by each $(x, y)$, points in cartesian image space, map to curves (i.e. sinusoids) in the polar Hough parameter space, as illustrated by Hough Transform image 1420 in FIG. 14C. This point-to-curve transformation is the Hough transformation for straight lines. When viewed in Hough parameter space, points which are collinear in the cartesian image space yield curves which intersect at a common $(r, \theta)$ point.

The Hough Transform may be used to identify one or more parameters of a curve which fits a set of given points. In some cases, the Hough Transform may also help determine what the features are (i.e., to detect the feature for which it has a parametric description) and how many of them exist in the image. Curves generated by collinear points in a gradient image intersect in peaks $(r, \theta)$ in the Hough Transform space. These intersection points characterize the straight-line segments of the original image. An extractor mechanism may be employed to extract the local maxima (e.g., the intersection points) from an accumulator array. For example, one of several methods may include applying thresholding and thinning to the isolated clusters of local maxima in the accumulator array image or the Hough Transform image 1420. Thresholding, in this context of Hough Transform, refers to setting a predefined limit for the maxima in the accumulator array, the values for which may be equal to or greater than a predefined maximum value.

In some embodiments, identifying the lines in the normalized image space 1410 which pass through multiple detected points may include, among other steps, using a Hough Transform to map all the lines passing through a given point in a single sinusoid in Hough Transform image 1420, discretize Hough space into a number of bins 1424 and increment a bin 1424 by one if the sinusoid passes through that bin 1424. Each detected point in the normalized image space 1410 is transformed in Hough space, and if a bin 1424 in Hough space has a value above a predetermined threshold, then that point in Hough space, upon de-Houghing, will map to a line that passes through at least that many points in the image. As an example, in the 5×5 grid array of detected points shown in normalized image space 1410, the binning threshold may be set to 4. The point in Hough space represented by the bin 1424 which has a binning threshold of 4, will map to a line that passes through at least four points in the normalized image space 1410.

In some embodiments, the data association algorithm may further include refining the lines by, for example, rejecting or deleting the lines with a poor fit to the detected points. The discretization in Hough space may result in lines (as shown in image space 14130 of FIG. 14D) that may be slightly off from the best-line fit through a set of detected points. Alternatively, or additionally, discretization may also result in multiple lines that are close to each other. The data association algorithm may include refining the set of best-fit lines by rejecting lines with a poorer fit. The steps for refining may include, selecting a line from the set of lines and drawing the line in image space, determining all the points that lie within a predefined distance of the line, performing a simple linear regression to define a line that most closely fits the points, and removing other lines which lie within some distance in the Hough Transform space. These steps may be repeated any number of times, as desired.

FIG. 14E represents a Hough Transform image 1440 after the line refinement step discussed with reference to FIG. 14D above. In Hough Transform image 1440, clusters 1444 correspond to lines present after the refinement step. One or more cycles of line refinement may be performed iteratively, as desired.

In some embodiments, associating each identified fiducial in an image to a point in the 2D image of detected points may include de-Houghing, i.e., mapping the points from polar coordinate image space (e.g., Hough Transform space) to a regular grid (e.g., cartesian coordinate image space). Doing so may allow identification of missing points as well as identification of points that are not contained on the grid. De-Houghing may include the steps of identifying groups of parallel lines by identifying groups of all Hough points with similar theta (θ) values, and using a clustering algorithm (such as k-means clustering) to identify groups of lines with similar theta (θ) values. FIG. 14F illustrates an exemplary k-means clustering representation 1450 of refined lines in FIG. 14E, consistent with disclosed embodiments. It is to be appreciated that other clustering algorithms may be used as well. In representation 1450, clusters of lines having a similar slope (or theta) value may be formed, and the spread in the distribution of the points in representation 1450 indicates the range of the slopes of the lines in the cluster. Accordingly, representation 1450 illustrates four groups of substantially parallel lines with one-dimensional (θ) based clustering. For example, first group of parallel substantially parallel lines may be represented as having a slope in the range of 0 to 1 radians, second group of parallel substantially parallel lines may be represented as having a slope in the range of 1 to 2 radians, third group of parallel substantially parallel lines may be represented as having a slope in the range of 2 to 2.5 radians, and a fourth group of parallel substantially parallel lines may be represented as having a slope in the range of 2.5 to 3 radians.

From representation 1450, two points from the most populous group and two lines having different theta values may be selected. The intersection of four lines in image space may be used to generate four points forming a rectangular frame, as illustrated in representation 1460 of FIG. 14G. The vertices of rectangular frame may be labeled as 0, 1, 2, and 3 (starting from top right vertex going counterclockwise to the bottom right corner). In some embodiments, a homography matrix may be calculated that would move the points in the image space to an integer grid, preferably a square grid. In the context of this disclosure, a homography is a transformation occurring between two planes. In other words, it is a mapping between two planar projections of an image using a transformation matrix which allows the shifting of one view to another view of the same scene by multiplying the Homography matrix with the points in on view to find their corresponding locations in another view. As it relates to this disclosure, at least four points may be needed to calculate the homography because the homography matrix has 8 free variables (each point may contain a x and a y, for a total of 8 equations).

After calculating the homography, all the points may be mapped to the integer grid using the calculated homography. In some embodiments, the mapped points may be rescaled such that the minimum and the maximum values lie at the edges of the integer grid 1470 shown in FIG. 14H.

One of several ways to determine the successful mapping by the association algorithm is to determine if each point in image 1460 is mapped to an individual and discrete location on the square integer grid 1470. Each reference location on the square integer grid (e.g., integer grid 1470) may be labeled or numbered with a reference character (e.g., numbers, alphanumeric, letter, or other suitable characters) based on a predefined sequence. The mapping of points from image 1460 on to integer grid 1470 may indicate the distance or the "offset" between the reference location of integer grid 1470 and the mapped point. The offset may be presented in arbitrary units or may indicate an actual offset distance between the reference location and the mapped points.

In some embodiments, association of identified fiducials in an image to the 3D location of the fiducial may further include excluding false detections and out-of-range detections. A false detection may include detection of a light source that does not comply with or identify as a validated light source such as, but not limited to, a reflection from an object, a temporary light source with similar characteristics, etc. Excluding false detections may include rejecting a point that is more than a predetermined threshold offset distance away from the reference location. In some embodiments, the predetermined threshold offset distance may be an absolute integer value, or a fraction, or a percentage of distance between two adjacent reference locations, or other number.

Further, in some embodiments, the data association resulting in mapped integer grid (e.g., integer grid 1470 with mappings) may be rejected based on the number of false detections identified. For example, if the number of false detections exceeds a predetermined threshold number of false detections, the data association may be rejected, resulting in no association at all, thereby rendering this data association algorithm a reliable data association algorithm. FIG. 14J represents a detection image 1480 including annotations of detected light sources based on data association.

d. Point Tracking Algorithm

Reference is now made to FIG. 15A, which illustrates an exemplary image showing a shift between frame points and the corresponding new predicted locations using the homography for point tracking, consistent with disclosed embodiments. Point tracking may be used to produce an association for a new set of detected points. One of several ways to perform point tracking may include propagating an existing association from one image frame to the subsequent image frame based on a previous set of associated points and the corresponding pose estimate. In some embodiments, point tracking may include, but is not limited to, extracting corresponding features between two frame sets, calculating a homography using the corresponding features, applying the homography to the previously known associations, and using a nearest neighbor type search to map the associations to the new detections.

In some embodiments, point tracking may include extracting features or unique features from a previous frame set and identify corresponding features in the current frame set. In this context, a previous frame set and a current frame set may refer to an (n−1) th frame set and a (n)th frame set, where n is an integer. A previous frame set ((n−1) th frame set) may include a plurality of pixels of an image captured by a camera, e.g., a camera mounted on an aerial vehicle, when the aerial vehicle is at a position (p−1) at a given time (t−1), and a current frame set ($n_0$) may include a plurality of pixels of an image captured by the camera, when the aerial vehicle is at a position ($p_0$) at a given time ($t_0$). Current frame set, as used herein, refers to the immediately subsequent frame set after the previous frame set such that there are no frame sets between the two.

In some embodiments, the two sets of features extracted from two frame sets may be used to determine a homography matrix, which may be configured to transform any point in one image to a corresponding point in the other image. The determined homography may be configured to shift a point from a previous frame set to a predicted location in the subsequent frame set.

In some embodiments, point tracking may be implemented as local association tracking by applying the determined homography to the previously associated detection points in the previous frame set. Alternatively, or additionally, point tracking may be determined as pose-based tracking. An exemplary pose-based tracking technique may include using a previously known position estimate, projecting the known fiducials using the pose estimate into the image frame, and applying the homography to the projected points as a prediction to where the points would lie in the current frame.

In some embodiments, as illustrated in FIG. 15B, a nearest neighbor search step may be used to find the correspondences between the detected points from the detection step and the predicted points from the tracking step to enable finding the associated identification for each detection. Image 1520 represents an exemplary image generated by using a nearest-neighbor based search to identify the corresponding detection to a tracked known association, consistent with disclosed embodiments.

Temporal filtering, in the context of this disclosure and in optical signal processing, refers to isolating the frequency content of a time series of images into a specific band or a range. The filters used for temporal filtering may be of any canonical form, e.g., Finite Impulse Response or Infinite Impulse Response. Spatial filtering refers to a process by which properties of an optical image may be altered by selectively removing certain spatial frequencies that make up an object. In spatial filtering techniques, the Fourier transform of an input function may be manipulated by a filter. The spatial filters may be convolutional filters (where a kernel is moved across an image) or some other form of spatially oriented filter. As an example, a gaussian blur may be applied to the image to remove high spatial frequencies.

As previously described, the active fiducial light pattern localization (AFLPL) approach, also referred to herein as Precision Landing and Takeoff (PLaTO), presents significant advantages for eVTOL aircrafts localization during the approach and landing phase when GPS is either challenged, compromised, or totally unavailable. However, to best utilize AFLPL, an understanding of its potential limitations and approaches for mitigating them must be addressed and developed. A brief description of limitations and mitigation strategies is provided herein.

i. Geometry limitations-A primary geometric limitation for AFLPL is the dilution of precision that occurs as range to the lighting constellation increases. For a fixed focal-length camera, the maximum useful horizontal range is approximately 100 times the size of the lighting constellation. A second geometric limitation is that camera field of view (FOV) constraints place limits on the approach trajectory to the landing site. This limitation can be mitigated through the use of multiple cameras with different viewing directions and FOVs. Given that cameras have small size and weight and low power usage, two or three cameras could be utilized with minimal impact on aircraft cost and performance.

ii. Detection and SNR limitations—For visual and near infrared systems, background light from the sun and other artificial sources can be significant compared to the intensity of the proposed constellation lighting. AFLPL light sources need to possess a combination of sufficient brightness, modulation capability, and distinct wavelengths to enable detection from a cluttered and backlit, but predominantly static, background. By employing a combination of visible, near-infrared, and long-wavelength-infrared sources and detectors, a high proportion of GPS-denied landing scenarios can be enabled.

iii. Data association—The perspective-n-point algorithms require that the positions of constellation light sources be known and that the point source detections in the focal plane of the camera be associated with the individual light sources of the constellation. This data association problem is further complicated as point sources leave the field of view due to camera motion or looming. This problem is well studied and fundamental to many computer vision applications and there are numerous standard algorithms, such as RANSAC, that have been developed to solve the association problem. It is important to note that association with fiducials made up of active point sources is considerably less complex than for visual features from unstructured passive imagery. In the AFLPL approach, we are dealing with a small number of distinct point sources having high detection probability with favorable placement. Additionally, association can be facilitated by temporally modulating each fiducial source with a unique code, or through spectral matching by having each source emit a different wavelength of light.

A simulation study and associated analysis has been performed to validate the feasibility of the AFLPL approach by exploring the accuracy of localization solutions produced by various perspective-n-point (PnP) algorithms under a variety of operating conditions including the number of constellation light sources, the physical size of the constellation, and the imaging quality of the camera system. Two approaches were used to model the fiducial-based localization of the eVTOL aircraft. Equations modeling pin-hole camera with a 4 k imager (3840×2160 resolution) and a 90-degree field of view lens were implemented. Aircraft trajectories corresponding to the landing profile shown in FIG. 2 and lighting constellation configurations were also implemented. These models were used to examine the sensitivity of localization accuracy to variations in the number of constellation light sources, the constellation size, and camera imaging error, as discussed with reference to FIGS. 10A, 10B, 11A, 11B, 12A, and 12B.

Figure 10A:
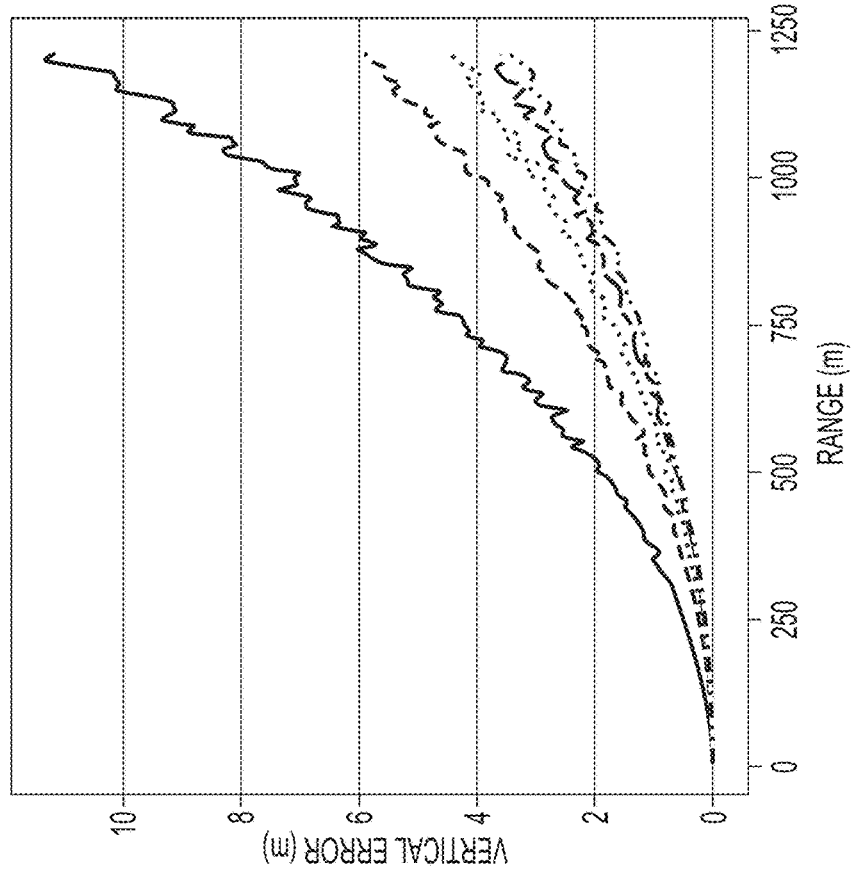
FIGS. 10A and 10B illustrate simulated data plots demonstrating the effect of number of light sources on localization accuracy in the horizontal and vertical directions, respectively, consistent with some disclosed embodiments.
Figure 10B:
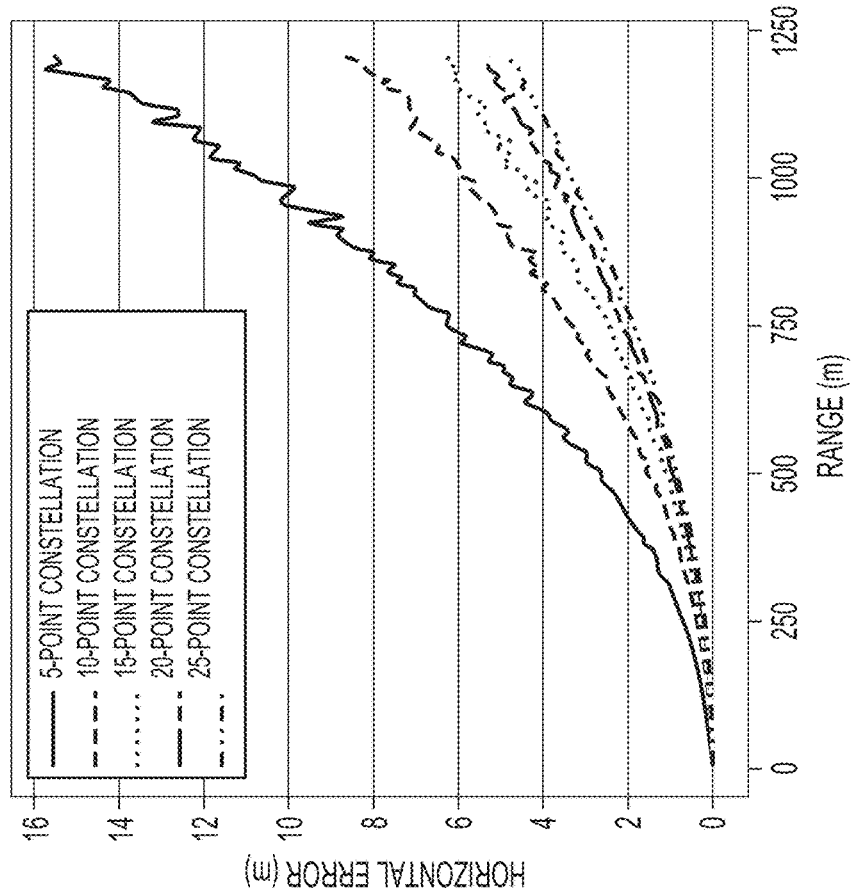

Reference is now made to FIGS. 10A and 10B, which illustrate the simulated data plots representing the effect of constellation size on localization accuracy in the horizontal and vertical directions, respectively, consistent with some embodiments of the present disclosure. To study the effect of the number of constellation points on localization accuracy, the eVTOL camera was positioned at discrete positions along the landing profile of FIG. 2. At each position an embodiment of the proposed system was used to calculate the position and altitude of the camera. To generate the plots in FIGS. 10A and 10B, the number of light sources was varied. For each number of light sources at each range, the light sources were uniformly distributed in a 40 m×40 m×20 m rectangular volume. 1000 randomly positioned light configurations were used to compute the mean localization error. The camera position was compared to the true camera position and horizontal and vertical components of the localization error were calculated and averaged over the 1000 runs to produce the plots. Light point locations in the image frame were rounded to the nearest pixel. As shown in the figures, the localization error decreases with the number of light sources imaged. Localization error is below 10 m at 1200 m range if at least 15 sources are used and falls below 5 m at 500 m. Localization errors fall to the centimeter-level range as the aircraft approaches the landing target.

Figure 11A:
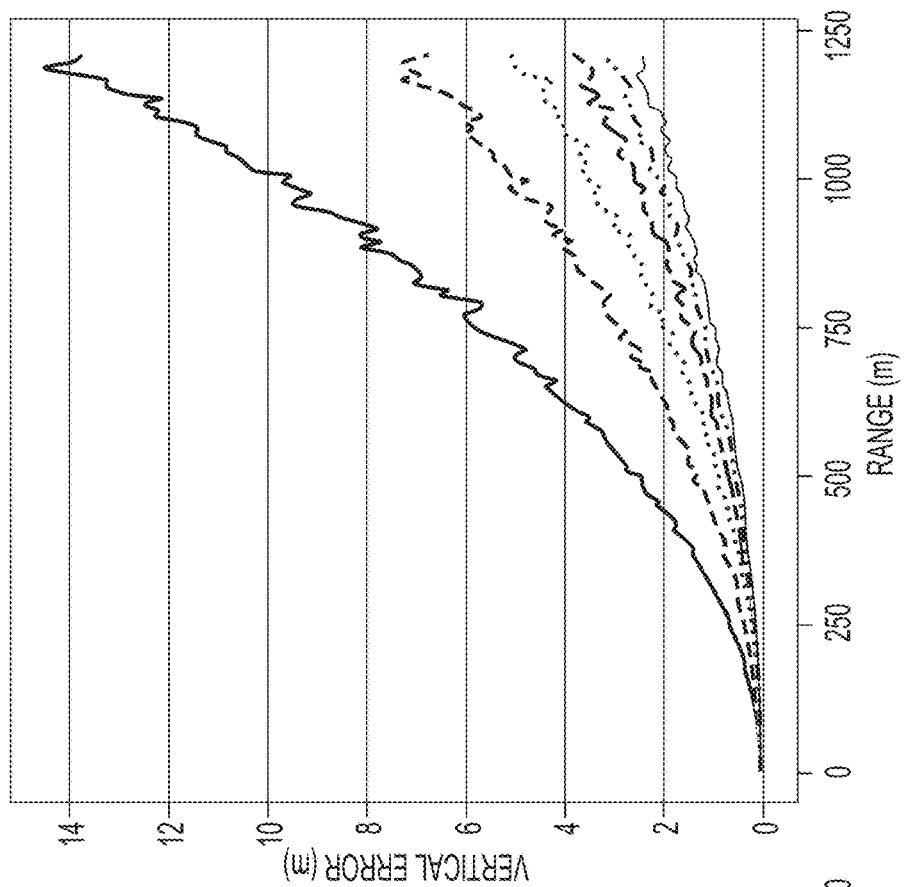
FIGS. 11A and 11B illustrate simulated data plots demonstrating the effect of the size of a constellation of light sources on localization accuracy in the horizontal and vertical directions, respectively, consistent with some disclosed embodiments.
Figure 11B:
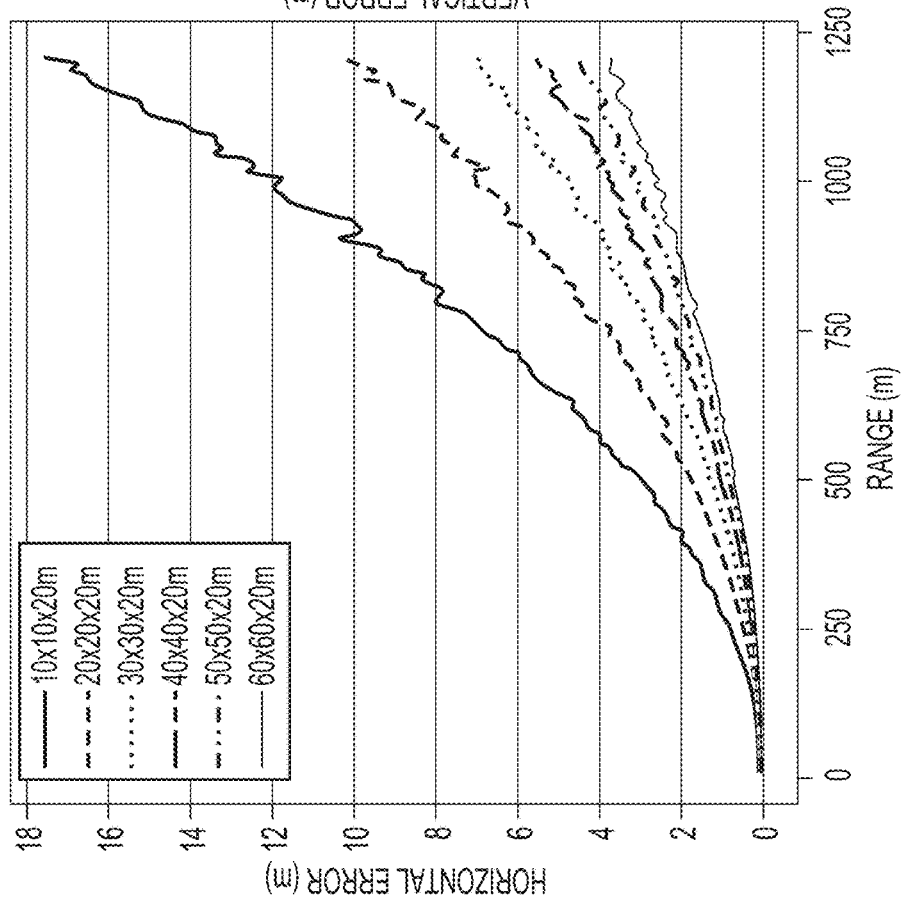

FIGS. 11A and 11B illustrate simulated data plots demonstrating the effect of the size of a constellation of light sources on localization accuracy in the horizontal and vertical directions, respectively, consistent with some embodiments of the present disclosure. The simulated data plots were generated by varying the horizontal size of the light source constellation, while holding the number of light sources and the vertical size of the constellation constant. The vertical dimension of the constellation was 20 m and 20 light sources were used. For each constellation size at each camera position, the 20 light sources were uniformly distributed in the constellation volume. One thousand randomly positioned light configurations were used to compute the mean localization error. The camera position was compared to the true camera position and horizontal and vertical components of the localization error were calculated and averaged over the 1000 runs to produce the plots. As shown in the figures, the localization error decreases with the size of the constellation. Localization error is below 10 m at 1200 m range if a horizontal baseline of at least 30 m is used and falls below 1 m at 500 m. Localization errors fall to the centimeter-level range as the aircraft approaches the landing target.

Figure 12B:
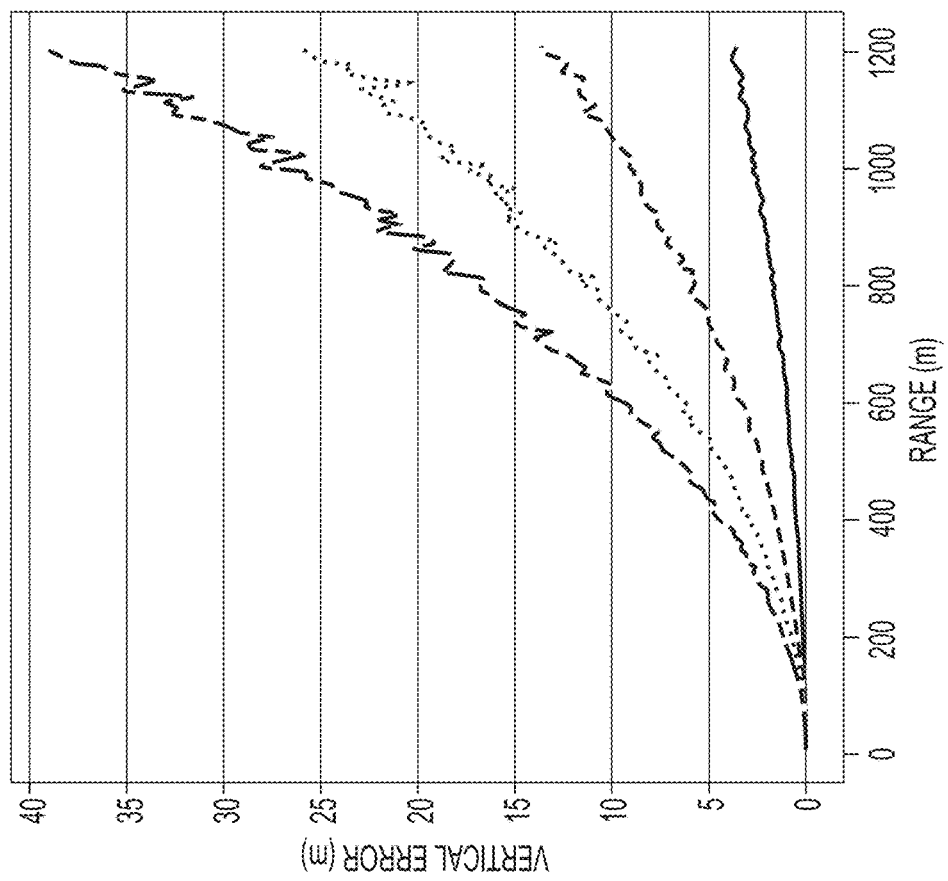
FIGS. 12A and 12B illustrate simulated data plots demonstrating the effect of centroiding error on algorithm robustness in the horizontal and vertical directions, respectively, consistent with some disclosed embodiments.
Figure 12A:
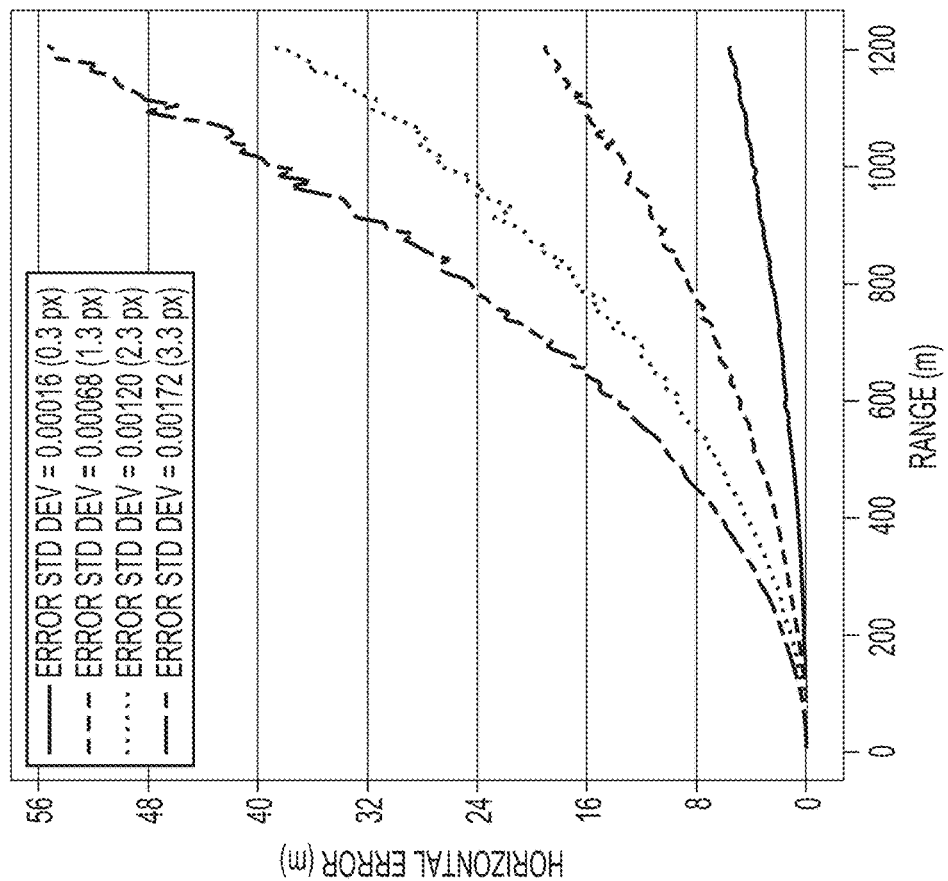

FIGS. 12A and 12B illustrate simulated data plots demonstrating the effect of centroiding error on algorithm robustness in the horizontal and vertical directions, respectively, consistent with some embodiments of the present disclosure. As light points are imaged by the camera small errors can be introduced by the optics and imaging sensor. The plots shown in FIGS. 12A and 12B depict the effect of these errors on localization accuracy. The plots were generated by rounding the floating-point pixel locations of the light sources (their true centroid locations on the image plane) to the nearest integer (0.3 pixels of error on average) and then adding varying amounts of normally distributed error with means of 0, 1, 2, or 3 pixels. This was done at each range while holding the number of light sources (20) and the size of the constellation (40×40×20 m) constant. 1000 randomly positioned light configurations with imaging error added were used to compute the mean localization error. The camera position was compared to the true camera position and horizontal and vertical components of the localization error were calculated and averaged over the 1000 runs to produce the plots. As shown in the figures, the localization error increases with the error in centroid positions. Localization error is below 10 m at 1200 m range if a horizontal baseline of at least 30 m is used and falls below 1 m at 500 m. Localization errors fall to the centimeter-level range as the aircraft approaches the landing target. The cases with 0.3 pixels and 1.3 pixels of error satisfy the horizontal error requirements.

Figure 12D:
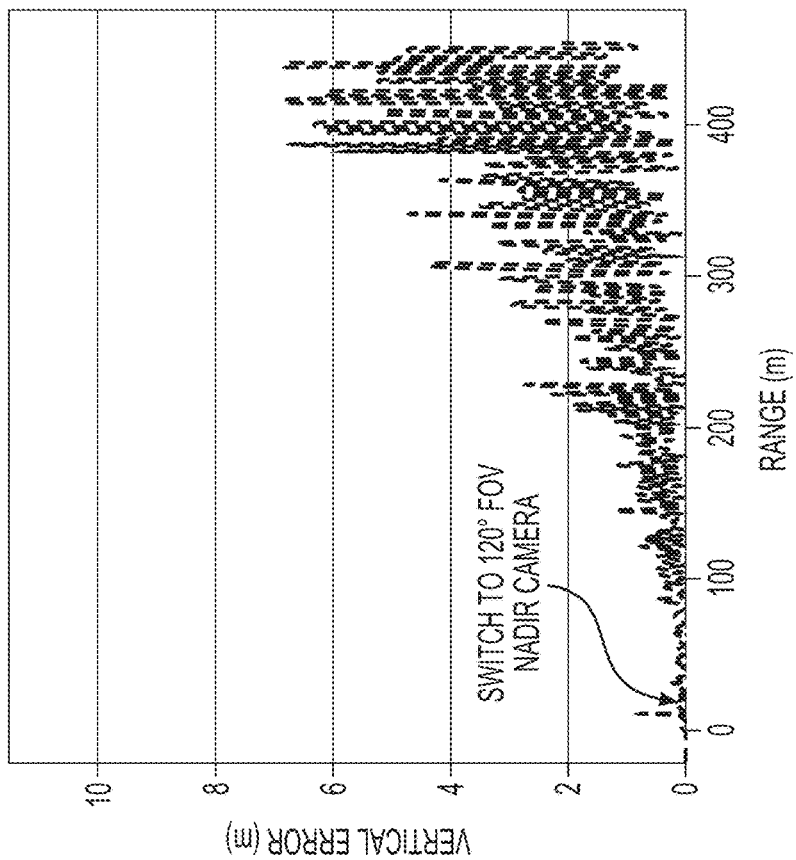
FIGS. 12C and 12D illustrate simulated data plots demonstrating the horizontal and vertical localization errors, respectively, for landing trajectory during a simulated approach of an aerial vehicle, consistent with some disclosed embodiments.
Figure 12C:
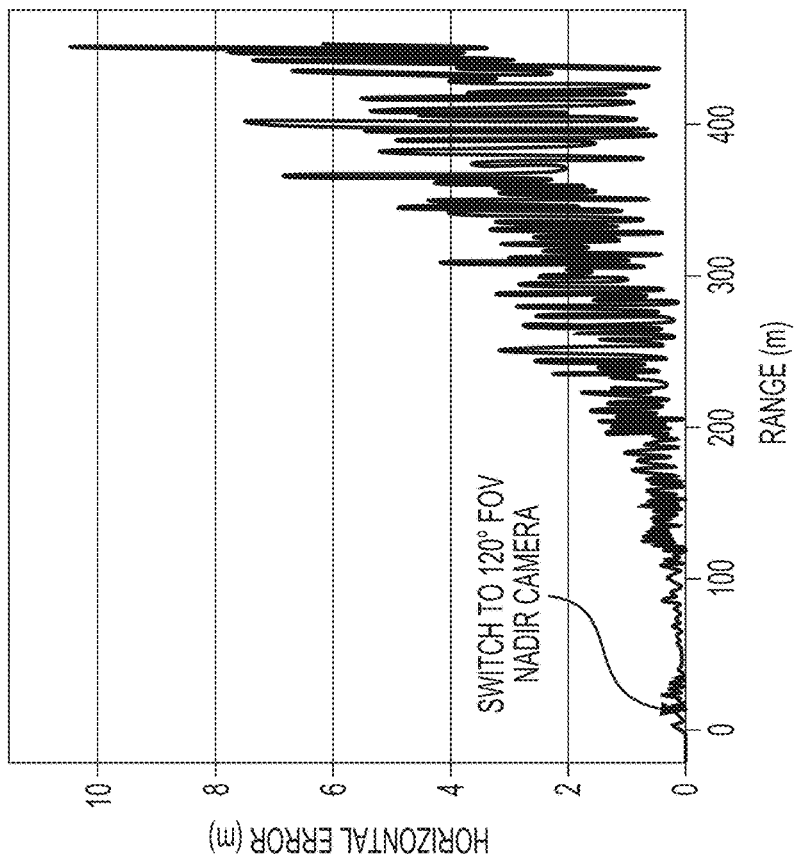

Reference is now made to FIGS. 12C and 12D, which illustrate simulated data plots demonstrating the horizontal and vertical localization errors, respectively, for landing trajectory during a simulated approach of an aerial vehicle, consistent with some embodiments of the present disclosure. The algorithms were tested using an eVTOL simulation environment. an increase in localization error during transition from the forward camera to the nadir camera. We anticipate that this transition error can be resolved by running the nadir localization algorithm prior to the transition and fusing the results with those from the forward camera, rather than making an abrupt switch between the two.

Light Constellation Designs

In some embodiments, the accuracy of data association may be affected by the distortions of the pattern of the light sources due to the perspective of viewing. For example, the pattern of light sources seen from directly above the landing surface may have a distinct shape in comparison to when the pattern of light sources is viewed from a shallow viewing angle. This disparity in the shape of the pattern of light sources based on the viewing angle may be referred to as "perspective transformation." Under the perspective transformation many identifying features may be lost. Therefore, it may be desirable do design a fiducial pattern of active light sources and develop an accompanying data association algorithm for identifying the fiducial pattern points in images captured by a camera installed on an aerial vehicle. It is further desirable to create a software pipeline for producing high accuracy pose estimates using bursts of aerial images of the fiducial pattern of active light sources laid out on the ground. In some cases, such as dense urban environments or poor weather conditions, obtaining an estimate of the aircraft position or orientation may be challenging. In such situations, performing data association and subsequent pose estimations with no prior knowledge or estimate of the aircraft position and/or orientation may further accentuate the problems. Therefore, it is further desirable to design fiducial pattern and data association algorithm with the ability to perform data association and subsequent pose estimation based on an isolated snapshot burst of the fiducial pattern of lights sources taken from an arbitrary perspective and without additional sensors or measurement mechanisms. The proposed fiducial pattern designs and data association algorithms are designed to address one or more of the challenged identified herein. In some embodiments of the present disclosure, the proposed fiducial pattern designs and data association algorithms may allow the pose estimation pipeline to continue to function despite obstructions or malfunctions that prevent observation of some constellation light sources in the fiducial pattern or when additional ambient light sources are visible in the camera image.

Many geometric properties existing in three-dimensional space are inconsistent when mapped to a two-dimensional space under a projective transformation. For example, lengths, areas, centroids, and parallelism in a camera image are all dependent on the position and orientation of the camera relative to the image subject. Cross-ratios, however, are constant regardless of the perspective from which a camera image is taken and serve as the primary principle of the fiducial constellation design. In some embodiments, the fiducial constellation design utilizes the projective invariant property of cross-ratios. Cross-ratios are perspective invariant properties that may be used for accurate data association. As used herein, "cross-ratio" refers to a ratio of 4 values, each calculated from a unique subset of features, wherein the product of two of these values is divided by the product of the other two. For example, a linear cross-ratio is a ratio of length ratios between collinear points, and an angular cross-ratio is a ratio of angle ratios between intersecting lines.

Reference is now made to FIG. 16A, which illustrates an exemplary line with 4 points A, B, C, and D located at different distances from each other, the linear cross-ratio may be calculated as below:

$$\frac{\overline{AC} * \overline{BD}}{\overline{BC} * \overline{AD}} = CrossRatio_{ABCD}$$

The cross-ratio is a constant value for the line segments independent of the viewing angle. The choice of line segments used in the calculation can result in different cross-ratios, though they still remain the same regardless of the viewing perspective. Cross-ratios are perspective invariant. For example, for a given set of four points on a line, a total of six cross-ratios may be computed. The six cross-ratio values may be used to calculate a single invariant unique to a spatial distribution of the four points on a line.

Reference is now made to FIG. 16B, which illustrates an exemplary constellation star pattern of light sources, consistent with disclosed embodiments. The light sources may be located along line segments A-A, B-B, C-C, and D-D arranged in a star configuration such that different angles may be formed by intersecting lines. In such a configuration, angular cross-ratio may be calculated as follows:

$$\frac{\sin\angle AC * \sin\angle BD}{\sin\angle BC * \sin\angle AD} = CrossRatio_{LABCD}$$

or as:

$$\frac{\sin\angle BD * \sin\angle CA}{\sin\angle CD * \sin\angle BA} = CrossRatio_{LBCDA}$$

In some embodiments, the landing surface may comprise a constellation of light sources. The plurality of light sources may be arranged at a landing surface for an aerial vehicle, the arrangement of the light sources defining a set of intersecting virtual lines, the light sources arranged on each virtual line, wherein a distance between adjacent light sources on each virtual line is non-uniform, as shown in FIG. 17A, which illustrates a constellation design 1700 of active light sources which is perspective invariant, consistent with embodiments of the present disclosure. As shown in FIG. 17A, the geometric features of constellation design 1700 include four lines (AOA, OB, OC, and OD) which intersect at a single point O and are labelled as lines 1702, 1704, 1706, and 1708. Each of the lines 1704, 1706, and 1708 may be virtual lines connecting five light sources B1-B5, C1-C5, and D1-D5, respectively. Line 1702 may connect ten light sources A1-A10. Different lines in the constellation and light sources belonging to those lines can be detected by Random Sample Consensus (RANSAC) or other means. Two unique angular cross-ratios may exist given this set of lines, one calculated using the ordered lines ABCD and the other using the order BCDA. Because line AOA may be distinguished from the other lines by the number of lights (i.e., ten compared to five light sources on OB, OC, and OD) the correct identity of each of the other lines can be ascertained by calculating the cross-ratio obtained using the three lines in clockwise or a counterclockwise order from line OA.

To associate lights detected in camera images with specific lights in the fiducial constellation (e.g., constellation design 1700), a data association algorithm such as grid association, ICP, Thin Plate Spline, or point tracking, or a combination thereof, may be configured to fit lines to the cloud of detected points in a camera image, identify specific lines in the constellation, and identify specific points within each identified line. The data association algorithm may include one or more of the following steps.

In some embodiments, data association algorithm may include the step of using RANSAC to determine the best-fit set of four lines with a single point of intersection and correct angular cross-ratio among the cloud of points detected in the camera image. Some examples of potential RANSAC sampling methods such as Random Pair Sampling and k-nearest neighbor (k-NN) Sampling are illustrated in FIG. 18A and FIG. 18B, respectively.

In some embodiments, using a RANSAC sampling method may include the following steps: (a) sampling four pairs of points from the point cloud of detected lights and drawing a line through each pair to form four lines. Sampling of point pairs may be done randomly, or pairs can be drawn from a set of k-nearest neighbors to increase the likelihood of finding pairs of points that lie on the same line of the constellation. The type of sampling used for RANSAC (Random Pair or k-NN sampling) may depend on how efficiently a set of k-nearest neighbors can be calculated, possibly using a K-dimensional (KD) tree, versus sampling pairs of points randomly. (b) calculating the intersection point that is represented by the least squares solution for the system of equations describing the set of four lines sampled in step (a). If the error associated with the solution is above a predetermined threshold, i.e., the point that best fits the set of the four lines is far from each of the lines, the set of lines does not have a sufficiently close intersection point and the algorithm may return to step (a). Step (c) includes calculating an angular cross-ratio of the set of lines, upon determining that the set of lines intersect at a single point, by starting at any line and including the other three lines in clockwise or counterclockwise order. As previously described, only two possible angular cross-ratios may exist within the constellation design 1700. So, if the calculated cross-ratio falls outside of a predetermined error threshold of the expected cross-ratios, the algorithm may return to step (a). In step (d), upon determining the set of four lines which intersect at a single point and matching the expected angular cross-ratio of the constellation, the number of points which are inliers to the set of lines are determined, as illustrated in FIG. 18C. If the number of inlier points is greater than the current best inlier count, the current set of lines may become the best line set and the current inlier count may become the new best inlier count. Step (d) may further include assigning each inlier point to the line it lies the closest to in the image.

In some embodiments, data association algorithm may further include the step of using known angular cross-ratios of the constellation design to determine the identity of each of the lines in the set of lines obtained during determining the best-fit of four lines and correct angular cross-ratios. The step of using known angular cross-ratios of the constellation design to determine the identity of each of the lines in the set of lines may include performing a line fit for each of the four liens in the best line set using the inlier points assigned to each in step (d) above. Based on the line fit, the line with the largest number of inlier points may be identified as the base line (AOA) of the constellation design 1700 and calculating the angular cross-ratio obtained using the lines ordered either clockwise or counterclockwise from the constellation base line. This cross-ratio will match with one of the two possible known constellation angular cross-ratios, and therefore, the set of lines used to compute this cross-ratio should be identified as the lines used for the matching precomputed cross-ratio, as illustrated in FIG. 18D.

In some embodiments, data association algorithm may further include the step of using known linear cross-ratios of the constellation design for each line in the constellation to cast votes for each point in the line 1900 and determine the identity of each point, as illustrated in FIG. 19. Line 1900 may connect at least four light sources. In other words, line 1900 may contain at least four points. In some embodiments, line 1900 may contain five points or more, six points or more, seven points or more, eight points or more, nine points or more, ten points or more, or any suitable number of points. As illustrated in FIG. 19, line 1900 connects six points (points 1-6). For each line, the points may be sorted in the order of distance from a constellation vertex or intercept (e.g., point 1 in line 1900). For every subset of four points on line 1900, a linear cross-ratio may be calculated and compared to the precomputed known linear cross-ratios of the constellation line. FIG. 19 illustrates a table 1910 of known cross-ratios and a table 1920 of computed cross-ratios of subsets of four points. The table 1910 of known cross-ratios may include cross-ratios of subsets of four points on each line 1702, 1704, 1706, or 1708. The table 1920 of computed or calculated cross-ratios may include cross-ratios of subsets of four points on line 1900.

In comparing the known cross-ratios with the calculated cross-ratios, a vote table 1930 may be generated. A vote table is a grid comprising rows and columns of vote counts. If the calculated linear cross-ratio (e.g., cross-ratios of line 1900) is within a predetermined threshold of any of the known cross-ratios of lines 1702, 1704, 1706, or 1708, each point used in calculating the cross-ratio receives a vote for its corresponding point in the set used for the known cross-ratio.

In some embodiments, a vote strength may be calculated for each fiducial point. A "vote strength," as used herein, is the ratio of the vote count for the highest voted candidate point to the second highest voted candidate point. If the vote strength for a fiducial point is greater than a predetermined threshold of vote strength, that fiducial point may be assigned the identity of the candidate point which received the highest number of votes. As an example, the known cross-ratio of a line B1B2B3B4 is 1.35 is the closest in value to the calculated cross-ratio of line 1900 connecting points 1, 3, 4, and 5 (labeled as line 1345 in table 1920) of 1.36. If the difference between the known and the calculated cross-ratio (1.35−1.36=−0.1) may be within a predetermined threshold difference value, each point used in calculating the cross-ratio (e.g., points 1, 3, 4, and 5) may receive a vote for its corresponding point in the set used for the known cross-ratio. A corresponding point refers to the location of the point on the line with respect to a vertex. Point B1 on line 1704 corresponds with point 1 on line 1900, point B2 on line 1704 corresponds with point 2 on line 1900, point B3 on line 1704 corresponds with point 3 on line 1900, point B4 on line 1704 corresponds with point 4 on line 1900, and point B5 on line 1704 corresponds with point 5 on line 1900.

Referring back to FIG. 17B, which illustrates an exemplary constellation design 1750 of light sources, an equal number of light sources (e.g., light source 1751, 1753, and 1755) may be arranged on each virtual line 1752, 1754, 1756, 1758, and 1760, intersecting at a point 1780. The plurality of light sources may be arranged at a landing surface for an aerial vehicle, the arrangement of the light sources defining a set of intersecting virtual lines, the light sources arranged on each virtual line, wherein a distance between adjacent light sources on each virtual line is non-uniform, as shown in FIG. 17B, which illustrates a constellation design 1750 of active light sources which is perspective invariant, consistent with embodiments of the present disclosure. It is to be appreciated that although only three light sources are labeled on line 1752, there may be more light sources (indicated as small circles, not labeled in FIG. 17B) on each line. The linear cross-ratio for each virtual line may be independent of a viewing angle. It is to be appreciated that though each virtual line is illustrated as containing an equal number of light sources, other combinations and permutations are possible as well. For example, five light sources may be arranged on one virtual line and six light sources may be arranged on an adjacent virtual line.

Each of the lines 1752, 1754, 1756, 1758, and 1760 may be a virtual line connecting light sources. For example, virtual line 1752 may connect at least light sources 1751, 1753, and 1755. All the virtual lines may intersect at a virtual intersection point 1780. In this case, the cross-ratio of the angles formed by the intersecting lines is invariant in projection. Different lines in the constellation and light sources belonging to those lines can be detected by RANSAC or other means. The intersection point can be determined by the intersection of the multiple lines. The cross-ratios for (A,B,C,D) and (B,C,D,E) can be used to determine ordering of the angular distribution of lines. The ordering of points along individual lines can also be calculated using linear cross-ratios, as previously described with reference to FIG. 17A.

In some embodiments, each active light source (e.g., light source 350 of FIG. 3) may be configured to self-identify via a modulation scheme. For example, the light source may be modulated to communicate data. The data may, in some embodiments, include an encoded authentication or identification signal, which when received by the optical detector or camera 311, may be used to identify the location of the active light source, or identify the landing surface, among other things.

Rapidly Deployable Constellation of Lights

In some embodiments, a landing surface may comprise a portable landing surface. A portable vertiport, as illustrated in FIGS. 43A and 43B may include a re-deployable landing mat, a fabric, or a tarp, or a rapidly-deployable landing surface 4310 comprising a plurality of light sources 4325. In some embodiments, the rapidly-deployable landing surface 4310 may comprise a constellation of IR light sources. In some embodiments, the rapidly-deployable landing surface 4310 may comprise a combination of point light sources and linear light sources (described with reference to FIGS. 30 and 31). This may be particularly useful where landing at non-cooperative sites with limited or temporary landing infrastructure may be required, such as a military operation, a firefighting effort, a disaster relief operation, a medical aid dispensing operation, etc. In some embodiments, the portable vertiport may include battery-powered active light sources incorporated within such that they may be activated, deactivated, or modulated remotely.

In some embodiments, a rapidly-deployable landing surface 4310 may comprise constellation of light sources placed on a rollable mat, which may be carried around in a backpack, for example. Rapidly-deployable landing surface 4310 may be deployed at an ad-hoc landing site in emergency situations, adverse situations, rescue operations, etc., In FIG. 43B, rapidly-deployable landing surface 4340 may be a flexible netting or a mesh comprising light sources 4325 knit or clipped into.

In some embodiments, estimating a pose of an aircraft based on images captured from a camera mounted on the aircraft may include communicating constellation configuration of light sources 4325 arranged on or disposed in rapidly-deployable landing surface 4310 or 4340 to an on-board processor associated with the aircraft. The constellation configuration may be determined by performing autoranging between light sources using ultrawideband (UWB) signals to calibrate the relative positions of light sources. As used herein, ultra-wideband signals may be used for transmitting information across a wide bandwidth (>500 MHz). This allows for the transmission of a large amount of signal energy without interfering with conventional narrowband and carrier wave transmission in the same frequency band.

In some embodiments, light sources 4325 may be knit on to a rapidly-deployable landing surface 4340 (e.g., a netting or a flexible mesh), which may be spread out at an ad-hoc landing site. The landing site may be uneven, contoured, or non-coplanar and the rapidly-deployable landing surfaces 4310 or 4340 may conform to the landing site. The arrangement of light sources 4325 may be at known locations on the rapidly-deployable landing surface 4340, accordingly, approximate configuration or location of light constellation may be known. In some embodiments, a plurality of overhead images such as, for example, obtained by the aircraft, to calibrate light location. Alternatively, or additionally, autoranging between lights using UWB signals to calibrate the relative positions of the lights may be performed to learn the constellation configuration.

Automatic Generation of Light Constellation Patterns

In some embodiments, a light constellation pattern may be automatically generated to maximize one or more properties of the constellation. For example, using pre-defined metrics, constellations may be designed to maximize the ability to discriminate between lights for purposes of detection and data association, effectively maximizing the correctness and robustness of the data association process. One possible metric would be the variance in linear cross-ratios or angular cross-ratio between multiple lines.

Incorporating Uncertainty into Light Position Estimates

As previously described, data association step involves associating locations of light sources in an image plane with physical light locations on the ground. In some cases, association of light sources between the image and the ground may face challenges because there may be uncertainty in the physical light locations due to measurement error or uncertainty in light image locations (on the image plane) due to imaging errors. In some embodiments, incorporating uncertainty information from these position measurements into data association algorithms may enable the probability of a correct match to be calculated, thus allowing confidence metrics to be utilized in the data association algorithms and facilitating decision making process.

Pose Recovery/Pose Estimation

In some embodiments, determining the location and the orientation of the aerial vehicle may include detecting at least one of the light sources in the image, determining which of the at least one of the light sources arranged in the predetermined pattern the detected light source is, and determining the location and the orientation of the aerial vehicle based on the determination of which of the at least one of the light sources arranged in the predetermined pattern the detected light source is. In a preferred embodiment, the localization algorithms (e.g. PnP) may require that at least four light sources be detected in the image plane (and their pixel locations be determined), and that those light source pixel locations be correctly associated with their corresponding physical light sources arranged in the predetermined pattern (and known locations) on the ground, to produce an estimate of the pose of the camera and/or the aerial vehicle (e.g., camera 311, aerial vehicle 310).

In a further preferred embodiment, the localization algorithms may require that at least five light sources be detected in the image plane, and that those light source pixel locations be correctly associated with their corresponding physical light sources arranged in the predetermined pattern. Generally, the accuracy of pose estimation of the camera and/or the aerial vehicle improves as the number of light sources that are detected in the image plane and correctly associated with their corresponding physical light source locations in the predetermined pattern increases, as previously discussed with reference to FIGS. 10A and 10B.

In some embodiments, determining the location and the orientation of the aerial vehicle may include detecting three light sources in the image plane and correctly associating with their corresponding physical light source locations in the predetermined pattern. Standard triangulation methods may be used to identify two potential locations with three points. In case of landing surfaces and vertiports, one of the two potential solutions may be eliminated as it would be below the landing surface, thereby potentially narrowing the solution to one location.

In some embodiments, determining the location of the aerial vehicle may include detecting two light sources in the image plane and correctly associating with their corresponding physical light source locations in the predetermined pattern, if the orientation information such as yaw, pitch, and roll, or a 3D gravity vector, is known. In some embodiments, determining the location and/or orientation of the aerial vehicle may include detecting one light source in the image plane and correctly associating with its corresponding physical light source location in the predetermined pattern, if the altitude information of the aircraft is known.

In some embodiments, one or more light sources in the constellation design (e.g., design 1700 or 175) may not be observable and accurately identifiable due to adverse conditions such as, but not limited to, severe weather, dense urban environment, poor light transmissivity, additional ambient lights, etc. In such scenarios, it may be desirable to still be able to perform data association and pose estimation of the aerial vehicle approaching a landing surface or taking off from the landing surface. The proposed pose-estimation algorithm and system addresses some of the above-mentioned challenges.

Reference is now made to FIG. 20A, which is a process flow chart illustrating an exemplary method 2000 for estimating the pose of an aerial vehicle, consistent with embodiments of the present disclosure. The method 200 may be performed using a pose-estimation algorithm in a precision landing and takeoff system and data communication system (e.g., PLaTO system 300 of FIG. 3). For example, a processor (e.g., processor 312 of FIG. 3) may be configured to execute a pose-estimation algorithm and may be programmed to implement the pose-estimation algorithm steps. It is appreciated that steps performed in method 2000 may be reordered, added, removed, or edited, as appropriate. The computer-implemented pose-estimation algorithm may cause the system 300 (including a camera mounted on the aircraft, light detectors, microprocessors, memory, or storage devices) to perform the following steps of pose-estimation method 2000.

In step 2010, a camera (e.g., camera 311 of system 300) is configured to capture a continuous stream of images. The camera application programming interface (API) may be configured to receive the continuous stream of camera images at a frame rate of 100 frames per second (fps). The camera API may be further configured to transmit three consecutive frames of camera images to a light detector. In some embodiments, the fiducial lights of the constellation design may be flashed at a frequency such that each constellation light is on in at least one of the three frames and off for at least one frame.

In step 2020, the light detector is configured to generate an output comprising pixel locations of the detected light sources based on the received frames from the camera in step 2010. Generating an output comprises constructing maximum and minimum images consisting of the respective maximum and minimum grayscale intensities at each pixel between the three images and subtracting the minimum image from the maximum image to remove any ambient background light. Due to the flashing on and off of the lights, the constellation appears in high contrast to the background and is readily detected in the minimum-maximum image. Subtracting the minimum image from the maximum image comprises subtracting intensities of each pixel in the minimum image from the intensities of each corresponding pixel in the maximum image. In some embodiments, the flashing may include adjusting the intensity of lights between a "minimum" intensity and a "maximum" intensity. The minimum intensity may include zero (lights are OFF), or any intensity lower than the maximum intensity of the light source such that the difference between the maximum and the minimum is discernible by the detector.

In step 2030, a data association algorithm is used to identify which constellation light corresponds to the detected light source based on the received pixel locations of the detected lights in the min-max image from the light detector. The data association algorithm performed in this step may be the algorithm previously described with respect to FIGS. 18A-D and 19, or other suitable data association algorithms. In some embodiments, determining the best-fit set of four lines with a single point of intersection and correct angular cross-ratio among the cloud of points detected in the camera image using RANSAC sampling method may be performed in parallel to enhance the efficiency and reduce the time needed for RANSAC to determine the high confidence set of lines.

In step 2040, a pose estimator API is configured to receive pixel locations of the identified constellation points in the camera image and perform an iterative Perspective-n-Point (PnP) algorithm to produce a pose estimate of the camera in the constellation coordinate frame.

The pose estimation pipeline is configured to run end-to-end in less than 30 milliseconds (i.e., a frequency of >33 Hz), allowing for generation of real-time pose measurements when acquiring camera images at a 100 fps. During operation in real-time, the camera API may be configured to run separately from the data association and the pose-estimation APIs, so that the next burst of images may be acquired while the light detection, data association, and pose estimation algorithms are executed on the current set of images, thereby rendering the pipeline more efficient.

Example—Simulation and Hardware Testing of Fiducial Constellation, Data Association, and Pose Estimation Pipeline The fiducial constellation, data association algorithm, and pose estimation pipeline described above have been tested both in simulation and on hardware. The hardware results were obtained by running the pose estimation pipeline on an Intel NUC mounted to a hexacopter which used a camera fitted with an infrared (IR) filter to image IR light sources laid out on the ground in the shape of the fiducial constellation. Several types of trajectories were flown around the constellation at distances of up to 200 meters to test robustness of the data association algorithm and pose estimation pipeline to camera perspective. Position estimates calculated by the pose pipeline were compared to ground truth measurements provided by a Real Time Kinematics (RTK) GPS sensor mounted on the hexacopter, with the results from one tested trajectory shown in FIG. 20B. As seen in FIGS. 21, 22, and 23, the accuracy of the pose pipeline was within a few percent of the camera's distance from the constellation, which was typical for the other trajectories tested as well.

FIG. 21 illustrates the altitude estimates 2100A plotted with RTK GPS truth data and corresponding error 2100B for the flight trajectory shown in FIG. 20B. FIG. 22 illustrates the north estimates plot 2200A as a function of ground truth and corresponding error plot 2200B for the flight trajectory shown in FIG. 20B. FIG. 23 illustrates east estimates plot 2300A as a function of ground truth and corresponding error plot 2300B for the flight trajectory shown in FIG. 20B.

Reference is now made to FIG. 24A, which illustrates an exemplary random constellation pattern of active light sources on the ground, consistent with some disclosed embodiments. In some embodiments, the constellation design 2400 may comprise randomly arranged light sources on the ground. The randomly placed light sources may be IR light sources. In the context of autonomous landing, such as landing of eVTOL aerial vehicles, dense urban environments, or hindered visibility due to poor weather and low light conditions may present significant challenges with safe landing and take-off operations.

The random point constellation design 2400, as illustrated in FIG. 24A, may be based on a fiducial marker called Random Dot Marker (RDM), which implements a Locally Likely Arrangement Hashing (LLAH) algorithm to identify randomly placed points. LLAH algorithm is a naturally robust algorithm against occlusions due to the clustering nature of the method used to compute the descriptors. In the context of eVTOL landing and take-off operations in dense environments, occlusions may occur due to dead lights, covered lights, or some lights temporarily moving out of frame as the aircraft approaches the landing surface. In addition, constellation placement on a landing pad may be viable since the dots are randomly placed and are not restricted to a square tag, or a rectangular tag, or any specific shape.

In some embodiments, the LLAH random point identification method may include steps of constellation design, keypoint registration, and keypoint retrieval. Designing a constellation may include creating a Random Dot Marker by generating random x and y coordinates for N dots to fit within a chosen marker size. In some embodiments, newly generated dots that overlap with existing dots may be rejected or excluded from consideration. Due to the sensitivity of the cross-ratio equation to dot positions, the random distribution of dots leads to naturally unique cross-ratios. While other fiducial markers may be restricted to a shape, random dot markers can take on any shape as long as the dots are arranged on a planar surface.

In some embodiments, the keypoint registration in LLAH algorithm may benefit from the cross-ratios to ensure invariance under perspective transformations. While affine invariant may be used because it uses less feature points to compute a descriptor, using cross-ratios may offer several advantages over affine invariance. For example, in this context, the low angle of approach to the landing pad may lead to severe perspective distortion of the points, and it may be desirable to not assume affine transformations for local clusters of points. In addition, because the number of fiducial points (e.g, IR light sources on the ground) may be relatively low, the affine invariance may be superfluous, or in some cases, even inefficient.

In some embodiments, to uniquely identify points using LLAH algorithm, descriptors may be computed for each keypoint in the constellation. As used herein, the descriptors are sequences of discretized cross-ratios. FIG. 24B illustrates an exemplary constellation comprising a keypoint p and n nearest points. Computing a descriptor may include determining n nearest neighbors for each keypoint p in the constellation, and selecting combinations of m points from the n nearest neighbors, as illustrated in FIG. 24B. Of the selected m points, combinations of five points may be used to compute the cross-ratio. As implemented herein, keypoint p may be one of the five points used for computing the cross-ratio.

FIG. 24C illustrates creating a discretized cross-ratio sequence using the combination of five points from m=7 points to calculate the cross-ratio. In some embodiments, the cross-ratio may be discretized and the sequence of discretized cross-ratios from each combination may be used as a descriptor for the keypoint p. In this method, the bounds for the discretization may be chosen by computing all cross-ratio combinations for a constellation, sorting them, and splitting them between a chosen number of buckets. The upper and lower bounds of the bucket may be defined by the cross-ratios with the lowest and highest values in that bucket. This method of discretizing the cross-ratios is used because for a single constellation, the values of cross-ratios are not represented by a uniform distribution. Usually, there are many cross-ratios with low values (less than 20), and very few cross-ratios with high values (>100). As a result, finer ranges may be desired when discretizing lower values.

Reference is now made to FIG. 24D which illustrates discretization of cross-ratios to create discretized cross-ratio sequences, consistent with some disclosed embodiments. In some embodiments, using the sequence of discretized cross-ratios as the descriptor instead of the cross-ratio values. As illustrated in FIG. 24D, two sequences of cross-ratios (e.g., set 1 and set 2) may be generated. Upon discretizing the cross-ratios, sets 1 and 2 have the exact same values of cross-ratios. However, the sequence in which the values appear may be unique. For example, though the discretized cross-ratios for set 1 are (0, 2, 0, 3) and for set 2 are (2, 3, 0, 0) equal, the sequence of the cross-ratios in the sets are different. To make the sequence easy to replicate upon retrieval, the nearest neighbors of each keypoint are sorted into a clockwise order before any combinations or descriptors are computed. Each descriptor may have a dimension of mC5 and each point will have nCm descriptors. A hash index, as shown in FIG. 24E, may be computed from each descriptor, and the keypoint ID and marker ID may be saved at the hash index along with the descriptors.

In some embodiments, LLAH algorithm may further include keypoint retrieval. To perform marker retrieval using matching, descriptors may be computed for each detected point in an image using the same methods as previously described. However, because the orientation of the constellation in the camera view is likely different than during the registration step, only sorting the points in a clockwise order before computing the sequence may not produce accurate results. The first point among the sorted nearest neighbors in the saved constellation may be different from that of the live constellation. As a result, all n clockwise orders will be computed and used to cast votes. For example, if the original clockwise order of points was a, b, c, d, e, f, live retrieval must also compute descriptors for b, c, d, e, f, a, and so on.

The descriptors may be used to calculate the hash index needed to reference the table. Votes may be cast for each keypoint ID and marker ID candidate found in the table. For each marker candidate, homography is then computed using RANSAC to confirm a match. In this case, there is only one marker candidate, so we can compute homography once the votes cast for each keypoint and/or the number of keypoints identified surpass a predetermined threshold. At this point, we have identified our keypoints.

In some embodiments, all the points (e.g., the active light sources) may be non-coplanar or non-collinear. In such cases, an area cross-ratio (ACR) may be used. For example, using any five arbitrary points, the ACR may be calculated from the ratio of the area of the triangle defined by three of the five points as below:

$$\frac{\Delta(Z_0 Z_1 Z_2) * \Delta(Z_0 Z_3 Z_4)}{\Delta(Z_0 Z_2 Z_3) * \Delta(Z_0 Z_1 Z_4)}$$

where $Z_0$, $Z_1$, $Z_2$, $Z_3$, and $Z_4$ are arbitrary points forming the triangles, as illustrated in FIG. 25.

As shown above, one example cross-ratio value may be determined using the equation. Similar to linear cross-ratios, six unique area cross-ratios may be determined for a given constellation of five non-collinear and non-coplanar points. A single invariant value may be calculated from the six (6) area cross-ratios.

In some embodiments, an area cross-ratio algorithm may be used for data association. The algorithm may include the following steps:

1. Given a set of points to associate, pick 5 unassociated or arbitrary points.
2. Calculate the single invariant value described above.
3. Find the invariant in a precalculated table that most closely matches the calculated value.
4. Follow the associated entry to a second precalculated table unique to that single invariant value.
5. Using the cross-ratio values calculated in step 2, find the set of most closely matched values to determine the ordering of the points.
6. Based on the ordering of the points used in steps 1 and 5, the identity of all 5 points may be determined.

7. Remove those 5 points from consideration and repeat at step 1.
8. If fewer than 5 points exist, then you can use a previously identified point to complete a set of 5 points.

In some embodiments, in a table matching technique for data association, the precalculated table may be formed by enumerating all possible sets of 5 points in the 3D constellation with known geometry. A j-invariant area cross-ratio may be calculated that results when each point in each set of 5 is selected as the central point. These values form a table where the rows correspond to the ID of the center point and the columns correspond to the set of 4 non-central points in the group of 5. It is to be appreciated that some cells in the table are empty because individual points cannot be both a central and non-central point in a group of 5. One method for completing the data association process may include searching through this table and match j-invariant values calculated from observed 2D image points to those pre-calculated values in the table. By utilizing the points that have already been matched in a table traversal algorithm, the possible j-invariant values in the table that are potential matches at a given time step may be reduced. This enables us to efficiently solve for the best match in a region growing-like method where we first find and identify a single set of 5 points and then incrementally increase the set we consider by one point at a time. Furthermore, uncertainty propagation techniques may be used to account for pixel and constellation calibration uncertainty when determining a threshold for matching j-invariant values.

In some embodiments, data association may be performed using a Hungarian Association matrix or the Munkres algorithm. In the Hungarian Association Matrix technique, an example 5×5 matrix of scores, as shown below in Table 1 may be used.

TABLE 1

5 × 5 matrix of scores

| 0.95 | 0.76 | 0.62 | 0.41 | 0.06 |
| 0.23 | 0.46 | 0.79 | 0.94 | 0.35 |
| 0.61 | 0.02 | 0.92 | 0.92 | 0.81 |
| 0.49 | 0.82 | 0.74 | 0.41 | 0.01 |
| 0.89 | 0.44 | 0.18 | 0.89 | 0.14 |

A large number, e.g., 1.0 may be subtracted from all to turn into costs, and the result may be obtained as shown below in Table 2.

TABLE 2

| 5 | 24 | 38 | 59 | 94 |
| 77 | 54 | 21 | 6 | 65 |
| 39 | 98 | 8 | 8 | 19 |
| 51 | 18 | 26 | 59 | 99 |
| 11 | 56 | 82 | 11 | 86 |

In the next step, the minimum cost may be subtracted from all rows, as shown in Table 3 below.

TABLE 3

| 0 | 19 | 33 | 54 | 89 |
| 71 | 48 | 15 | 0 | 59 |
| 31 | 90 | 0 | 0 | 11 |
| 33 | 0 | 8 | 41 | 81 |
| 0 | 45 | 71 | 0 | 75 |

In the next step, the minimum cost may be subtracted from all columns, as shown in Table 4 below.

TABLE 4

| 1 | 19 | 33 | 54 | 78 |
| 71 | 48 | 15 | 0 | 48 |
| 31 | 90 | 0 | 0 | 0 |
| 33 | 0 | 8 | 41 | 70 |
| 0 | 45 | 71 | 0 | 64 |

In the next step, as few rows or column lines as possible may be drawn to connect all the 0 values in the Table 4. From the non-zero elements of the matrix shown in Table 5 below, find the smallest value.

TABLE 5

| 54 | 19 | 33 | 54 | 78 |
| 71 | 48 | 15 | 0 | 48 |
| 31 | 90 | 0 | 0 | 0 |
| 33 | 0 | 8 | 41 | 70 |
| 0 | 45 | 71 | 0 | 64 |

In the next step, subtract the smallest value (e.g., 15 in Table 5) from all the elements that are not stuck, leaving the rest alone. The resulting table is shown below as Table 6.

TABLE 6

| 0 | 4 | 18 | 54 | 63 |
| 71 | 33 | 0 | 0 | 33 |
| 46 | 90 | 0 | 15 | 0 |
| 48 | 0 | 8 | 56 | 70 |
| 0 | 30 | 56 | 0 | 49 |

In the next step, identify the points in the table. If the points are missing, repeat the step that resulted in Table 5.

TABLE 7

| 0 | 4 | 18 | 54 | 63 |
| 71 | 33 | 0 | 0 | 33 |
| 46 | 90 | 0 | 15 | 0 |
| 48 | 0 | 8 | 56 | 70 |
| 0 | 30 | 56 | 0 | 49 |

In the pose recovery or pose estimation algorithm, a physical pose of the aerial vehicle may be estimated based on the identified points and points associated in the data association steps described above. In some embodiments, the relative pose (attitude and position) of the camera with respect to the landing surface may be calculated using a Perspective-n-Point (PnP) algorithm. Various implementations of PnP algorithms are available (e.g., such as within the OpenCV library). The accuracy of the PnP calculation may be enhanced when the constellation points are not coplanar. In some cases, the vertiport constellation may be coplanar, so the robustness of various PnP approaches to coplanarity may be explored. The PnP calculation is relatively fast in comparison to the detection and association steps and will not likely limit the speed of the pose recovery pipeline (detection, association, pose recovery). PnP will produce camera pose estimates at the frame rate of the camera. Because the pose of the camera with respect to the aircraft is known, the pose of the aircraft with respect to the landing site can be calculated from the camera pose information.

PnP technique functions by minimizing the reprojection error of 2D points observed in an image with respect to 3D points reprojected into the image while optimizing over the 3D pose (position and orientation) of the camera. Various algorithms exist to solve this optimization and may be solved by non-linear least squares techniques.

In addition to geometry-based approaches, it may be desirable to fuse PnP type pose solutions with inertial measurement unit (IMU) information using an approach such as an Extended Kalman Filter (EKF). This fusing approach may provide several advantages including, enabling pose solutions to be calculated at higher update rates than those of the onboard camera, and providing increased redundancy and robustness to the pose recovery process, allowing outlier PnP solutions to be rejected in a mathematically rigorous way.

In some embodiments, a tightly coupled moving-horizon estimation (MHE) formulation where raw camera imagery and IMU information are processed simultaneously may be used. The MHE formulation approach is less sensitive to nonlinearities and thus can be more accurate than the loosely coupled EKF approach, while possessing the same advantages.

In some embodiments, other image-based navigation aids are used to augment the accuracy of the system such as using visual odometry, optical flow, or using interim homography information derived from the images generated by the camera. Measurements of the aircraft velocity and rate of change of attitude can be fused (i.e., with a Kalman Filter or other sensor fusion techniques) with the pose estimate to increase the overall accuracy of the system.

In some embodiments, one or more characteristics of light emitted from the active light sources may be used to improve detection via background subtraction. Reference is now made to FIGS. 26A-26C, which illustrate exemplary waveforms representing intensity modulation and camera shutter speed operation used for encoding/decoding information algorithms, consistent with some embodiments of the present disclosure.

For background subtraction, it may be desirable to have one frame with the light on at 100% intensity and another frame with the light completely off or 0% intensity. The maximum difference in the intensity of the light emitted from the light source allows to subtract each pixel between two frames removing all constant sources of light. One of several ways to do this would be to toggle the lights on and off at ½ the shutter speed of the camera, as shown in FIG. 26A. In the FIG. 26A, Tm indicates the modulation period and Ts indicates the shutter period. However, such a technique may be limited by the timing alignment issues. For example, when the camara sample rate, also referred to herein as camera capture rate aligns with the transition of the active light source, as shown in FIG. 26B. In such a case, since the camera exposure is not instant, the camera may capture ½ on ½ off resulting in a 50% pixel value. This not only reduces the total signal strength, but may also affect the background subtraction algorithm as every frame will be at the same 50% value, thereby potentially rendering a fiducial undetectable.

To mitigate issues related to the timing alignment between the camera capture rate and the transition of the active light source, the camera capture speed may be synchronized with the modulation frequency of the light source. However, there may be several issues associated with the synchronization process such as, all the lights would have to be synchronized together so the camera could synchronize as well, and synchronizing to the pulses may be complicated because a fiducial has to be identified before the synchronization can happen, among other things. While it can be done, it may add enormous complexity to the algorithm.

In some embodiments, the timing alignment between the camera capture rate and the transition of the active light source may be overcome by blinking at a different rate than the shutter speed, as shown in FIG. 26C. While this overcomes the issue of 50% pixel value for every frame, it doesn't completely remove partial frames and may introduce two sequential frames at the same exposure rate (shown as two consecutive dark bars in FIG. 26C). One of several ways to mitigate the issue of same exposure may be to increase the sampling size from 2 to 3 images. In such a case, for background subtraction, instead of subtracting frame 2 from frame 1, we take the maximum and minimum pixel value for a given pixel location across all three images and subtract them. Though, for a given set of 3 images, one image may be at 100% intensity, and another at 0% intensity, the third frame may have partial exposure, or two subsequent frames at the same exposure rate. By setting the blink frequency at a non-multiple of the shutter speed, we can show mathematically that every batch of three images will have at least 1 image on and one image off.

In some embodiments, the capture rate of the camera is at least 100 frames per second. In some embodiments, an adjustment of the capture rate of the camera is based on a modulation of the light sources. The adjustment of the capture rate may comprise synchronization of the capture rate of the camera with the modulation rate of the light sources. In some embodiments, the blink rate of the light source is approximately 30 Hz. In some embodiments, the blink rate of the light source may be adjusted based on the capture rate of the camera.

In some embodiments, the controller is configured to adjust the capture rate of the camera based on a modulation of the light sources. The controller may be further configured to adjust the blink rate of the light sources based on the capture rate of the camera. The controller may be further configured to adjust the bit transmission rate of the camera, wherein the bit transmission rate of the camera is 10 Hz or more.

In some embodiments, the controller is further configured to generate an output signal comprising information associated with the position and the orientation of the aerial vehicle based on the output signal from the camera. The information associated with the position of the aerial vehicle may include GPS coordinates of the aerial vehicle. The controller may be further configured to transmit the information associated with the position and the orientation of the aerial vehicle to the external processor.

In some embodiments, one or more characteristics of light emitted from the active light sources may be used to transmit information associated with the light source, or the landing surface with which the light source is associated. Conventional techniques for data transmission may have several drawbacks including, but not limited to, a universal clock signal to trigger sampling may be needed, the binary values of a on=1 and off=0 may be inadequate, and clockless transmission patterns require synchronous sampling, among other things.

In some embodiments, the duty cycle of the active light source may be adjusted. An example bit wise transmission pattern where 1 indicates a 70% duty cycle and 0 indicates a 30% duty cycle. For the fiducial though, it would alternate the duty cycle at a rate lower than the blink rate of the light source. As an example, a value of 9 in binary may be represented as four bits 1001, as shown in FIG. 27A. Once a fiducial is identified by a camera, the intensity of the light could be averaged over a number of samples to calculate the average duty cycle of the period and a bit value assigned for that period, as illustrated in FIG. 27B. The transmission and averaging can be changed to fit the requirements for transmission rate and robustness to noise. Alternatively, the same averaging technique can be used to calculate the average duty cycle and a 1 or a 0 can be represented by a rising or a falling edge, as illustrated in FIG. 27C.

In some embodiments, the camera capture rate and the blinking frequency of the active light source may be synchronized to reduce errors that would occur if the image were captured during a transition, as shown in FIG. 26B. In some embodiments, each active light source may be synchronized by a synchronization pulse sent via a connected wired network. In some embodiments, the synchronization pulse may be sent wirelessly through RF transmission. The frequency of the synchronization pulse may be appropriately chosen. In some embodiments, the synchronization may be performed via optical sensors associated with each active light source. In such cases, each active light source would need to be able to detect the light transmission from at least one other light source. As each light is synchronized with its adjacent light source, all the active light sources may be synchronized.

In some embodiments, if the active light sources are synchronized, the camera may be synchronized with the active light sources by a synchronization pulse sent wirelessly through RF transmission. In some embodiments, the on-board processor (e.g., processor 312) may adjust the frame rate of the camera based on the quality of the fiducial detections.

Association Synthesis

As previously described, more than one algorithms may be used for data association to associate each identified fiducial in the two-dimensional image to the three-dimensional location of a fiducial on the ground. Some of those algorithms include ICP, TPS-RPM, Point Tracking, Linear Cross-Ratios, Angular Cross-Ratios, and Grid Association. Each data association algorithm, when used individually, may offer several advantages but at the same time may also raise challenges. Because of their disparate strengths and applicability, it may be desirable to combine two or more of the data association algorithms to produce a more reliable and robust association for use in precise landing and take-off operations of eVTOLs in GPS-denied environments.

Reference is now made to FIG. 28, which is a flowchart illustrating an example method 2800 for data association synthesis, consistent with disclosed embodiments. The exemplary method shown in FIG. 28 comprises capturing images of light sources (fiducials) of a vertiport laid out on the ground using a camera mounted on the aircraft, determining the pixel location of each fiducial in the image (detection step), associating each identified fiducial in the two-dimensional image to the three-dimensional location of a fiducial on the ground (data association step), determining the orientation and location of the aircraft based on the association (pose estimation step) and validating the pose, performing one or more sampling algorithms (e.g., RANSAC) to reject outliers, and generating a pose of the aircraft by performing Perspective-n-point transformations and applying pose filters.

In some embodiments, data association synthesis pipeline may comprise performing one or more data association algorithms to generate associations between identified fiducial in the 2D image and the 3D location of the fiducial on the ground. In a preferred embodiment, two or more data association algorithms may be performed to generate associations. The generated associations may be compiled, for example, in a data storage server, or a memory, to form an aggregated data list or a larger set of information related to the generated associations.

In some embodiments, for each data association algorithm performed, a PnP algorithm may also be performed to accurately determine the pose (attitude and orientation) generated based on the associations. Additionally, or alternatively, for each data association algorithm performed, the determined pose may be validated by, for example, confirming that the location of the aircraft is above the ground, confirming that the aircraft is within some distance of the assigned vertiport or a landing surface, confirming that the aircraft is pointed in the correct general direction, among other things. Upon validation of the determined pose, the associated information may be added to the aggregated data list.

Data association synthesis pipeline may further include identifying all unique points from the aggregated data list to form a second aggregated data list and performing a sampling method (e.g., RANSAC sampling) or a similar algorithm to remove outliers. A third aggregated data list including association information after removing the outliers, may form a final aggregated data list, which may be used to perform a full PnP transformation to generate the pose estimation of the aircraft. In some embodiments, one or more pose filters such as, but not limited to, Kalman Filter, Extended Kalman Filter, or other suitable pose filters, may be used to generate a pose estimation of the aircraft.

Reference is now made to FIG. 29, which is a flowchart illustrating an example method 2900 for data association synthesis, consistent with disclosed embodiments. The exemplary method shown in FIG. 28 comprises capturing images of light sources (fiducials) of a vertiport laid out on the ground using a camera mounted on the aircraft, determining the pixel location of each fiducial in the image (detection step), associating each identified fiducial in the two-dimensional image to the three-dimensional location of a fiducial on the ground (data association step), determining the orientation and location of the aircraft based on the association (pose estimation step) and validating the pose, performing one or more sampling algorithms (e.g., RANSAC) to reject outliers, and generating a pose of the aircraft by performing Perspective-n-point transformations and applying pose filters.

In comparison with method 2800, in some embodiments, each data association algorithm performed may be treated as an independent sensor, as illustrated in FIG. 29. For each data association algorithm performed, a full PnP transformation and a RANSAC sampling may be performed prior to combining all measurements using a pose filter such as, a Kalman Filter.

Data association algorithms such as Grid Association and TPS-RPM may be computationally intensive and iterative in nature, respectively. To overcome these and other issues, an association pipeline having a dual mode operation may be implemented. The two modes in the dual mode operation may be the "Lost in Space" mode and "Tracking" mode.

The Lost in Space mode may be useful when there is no prior information available, for example, during a first flight of the aerial vehicle, or newly installed light sources, loss of connectivity, or loss of attitude information due to transmission challenges. The Lost in Space mode may run at a lower rate and may run Grid Association and TPS-RPM algorithms to associate the detected lights with a known pattern, thereby providing a set of associated points to the pose estimation (PnP) algorithm configured to generate a pose estimate. Based on the confidence level in the associations provided by the "Lost in Space" mode, the processor may be configured to switch to a Tracking mode, which runs at a higher rate than the Lost in Space mode.

The Tracking mode may be useful when prior information is available or obtained from the Lost in Space mode. In the Tracking mode, tracking algorithms such as, but not limited to, local association point tracking, pose-based point tracking, and ICP may be seeded with the previously calculated pose and associations. These algorithms may generate associations which can be fed either individually or as a synthesized superset to the pose estimation. Such pose estimates can be outputted by the system at a higher rate.

To further improve the association throughput, the Lost in Space association algorithm may be executed in parallel after switching to the Tracking mode to provide corrections. The overall pose estimation may be improved because the association algorithms are not dependent on the previous state and do not accumulate error. Based on the confidence metric of the system, a threshold may be determined. If the confidence metric exceeds the predetermined threshold value, the system may switch to the Lost in Space mode until a better pose measurement from the sensor is obtained. In some embodiments, the switching between Lost in Space mode and the Tracking mode may be performed by the system automatically or autonomously. However, in some embodiments, the switching may be performed manually by a user intervention or a user input. Therefore, it may be beneficial to provide an association pipeline having a dual mode operation which allows switching between the modes depending on the available information or association throughput.

Linear Light Sources

As previously discussed, the active light sources in a vertiport or fiducials laid out on the ground may be point sources, e.g., a LED. The point sources of light such as LEDs may be easy to install and modulate, however, in some situations, it may be desirable to enhance the overall signal-to-noise ratio of the light signal originating from the light sources on the ground. While the amount of light emanating from the light sources may be enhanced by installing more LEDs, point sources cannot emit light spread out over a large area, rendering them inadequate for high SNR applications. Therefore, systems and methods of enhancing the signal intensity and SNR of the light from the light sources and received by the light detector may be desirable.

Reference is made to FIG. 30, which is a schematic illustration of an exemplary arrangement of line-shaped lights in a constellation of light sources, consistent with disclosed embodiments. Landing surface 3000 may comprise a plurality of point sources 3030 and a plurality of linear sources 3020. In some embodiments, landing surface 3000 may include linear light sources instead of or in addition to point sources 3030. In some embodiments, landing surface 3000 may be a rectangular, a square, a triangular, a circular, or an elliptical landing area, or any other suitable shape. In some embodiments, linear light sources 3020 may be arranged along all sides of landing surface 3000 (e.g., a rectangular or a square shaped landing surface). Each side of landing surface 3000 may include a plurality of collinear line segments, each line segment comprising a linear light source. In some embodiments, adjacent linear light sources of the plurality of line segments may be separated by a point source. In some embodiments, no light source may be disposed between adjacent linear light sources of the plurality of line segments such that a discontinuous row of linear sources may be formed along a side of landing surface 3000.

Using linear light sources may offer several advantages including, but not limited to, higher signal-to-noise ratio due to the larger spread of light generated from linear sources compared to point sources, more robust line detection algorithms, higher data throughput from linear light sources compared to point sources, compatibility with a range of algorithms, easy and reliable encoding schemes, among other advantages.

One of several benefits of employing linear light sources in the constellation of light sources on the ground includes compatibility with detection algorithms, data association algorithms, PnP transformations, and pose recovery or pose estimation algorithms, and data encoding. For example, background subtraction techniques, point detection algorithms (if using point sources in conjunction with linear sources), and performing line detection after background subtraction, may be unchanged and directly transferrable from point source detection algorithms.

FIG. 31A is a schematic illustration of an exemplary data encoding scheme 3100 using the linear light sources as shown in landing surface 3000, consistent with disclosed embodiments. Each of the sides can be segmented into a number of collinear line segments without impacting the detection or association algorithms. In some embodiments, each line segment may be used to represent a single bit of data. As an example, landing surface 3000, including four sides of four line segments each, may be configured to transmit 16 bits of data per transmission period. It is to be appreciated that the number of line segments may be varied, as appropriate.

An exemplary encoding scheme such as an On/Off scheme, is illustrated in FIG. 31A. In an On/Off encoding scheme, since line detection and association would work with only a single segment being lit on each line, the encoding could be performed by stopping the blinking of the line segment. Further, at least one line segment may be required to be blinking during the transmission of any binary representation to perform pose recovery. Alternatively, a number of fixed segments that always blink may be used for pose recovery, but may be excluded from transmission. As an example, in the four-segment encoding shown in FIG. 31A, the segment closest to the corner for each line may be always toggled so that the inner segments may be used to transmit data, without impacting the integrity of pose recovery. The encoded binary bits shown in exemplary scheme 3100 represents a value of 13. In some embodiments, the blinking of line segments may be programmed to represent a predefined value associated with the identity of the landing surface.

Reference is now made to FIG. 31B, which illustrates an exemplary encoding scheme 3150 for data transmission using a combination of linear shaped lights and point sources, consistent with some disclosed embodiments. An exemplary combination landing surface such as landing surface 3110 may include a plurality of linear light sources 3120 forming the edges of a pattern, for example, a rectangle, a square, a triangle, etc., and a plurality of point light sources 3125 distributed within the area bound by linear light sources 3120. In some embodiments, point light sources 3125 may be distributed in a predetermined pattern with known locations, or in a randomly generated pattern with unknown locations of point light sources.

In some embodiments, data transmission between the landing surface and an aerial vehicle configured to land on or takeoff from the landing surface may include providing an encoding scheme. Encoding scheme 3150 may include labeling the intersections of linear light sources 3120. The labeling scheme may include using heading information from INS or one or more previous iterations to label the points in a predetermined known order. As an example, in a rectangular pattern shown in FIG. 31B, North-East may be labeled as "0," South-East may be labeled as "1," South-West may be labeled as "2," and North-West may be labeled as "3." As another example, an intersection may be labeled based on the number of point light sources nearby. The corner with least number of point light sources nearby may be labeled "0," and the corner with the greatest number of point light sources nearby may be labeled "3." It is to be appreciated that although only two labeling schemes are discussed, other suitable labeling schemes may be applied.

The data transmission may further include projecting the light sources onto a normalized grid 3130. One of several ways to project the light sources includes calculating and applying a homography matrix to remove distortion associated with projection. Normalized grid 3130 may be divided into a plurality of predetermined subspaces 3140. Although normalized grid 3130 is shown to be divided into nine subspaces 3140, normalized grid 3130 may be divided into any number of subspaces based on the number of point light sources, the density of point light sources, the area point light sources, or as appropriate. For each subspace, if a point light source is detected (i.e., activated or turned on), it may be labeled "1" and if a point light source is not detected it may be labeled "0." Labels of each subspace may be combined in a predetermined order to generate a binary value which may be configured to represent or identify the landing space. As an example, shown in normalized grid 3130, labels of nine subspaces 3140 may be combined to form a binary value 100010011, which represents the number 275. In some embodiments, the number 275 may represent an identification associated with the landing surface, or a spatial orientation of the landing surface, or an authentication code which may be used to validate user identity or aircraft identification, among other things.

FIG. 31C illustrates a flow chart for an exemplary method 3160 for pose estimation using linear light sources, consistent with some disclosed embodiments. Method 3160 may be performed in combination with or instead of the method for pose estimation using point light sources (as previously described).

Method 3160 includes, but is not limited to, the steps of: receiving at least two images from a camera mounted on the aerial vehicle; performing background subtraction from the received images; performing line detection using a line detection algorithm such as Hough Transform, line detection filters, etc.; determining the locations where the lines intersect; labeling each intersection using a labeling scheme; performing PnP transformation algorithms using the labeled points; and selecting valid poses from the results. The steps represented by shaded blocks such as background subtraction, connected components, centroiding, association, and PnP, are processes that exist in pose estimation methods using point light sources. One or more steps for pose estimation using point light sources may be used additionally, or alternatively, for pose estimation using linear light sources.

In some embodiments, the labeling scheme may include using heading information from INS or one or more previous iterations to label the points in a predetermined known order. As an example, in a rectangular pattern shown in FIG. 31B, North-East may be labeled as "0," South-East may be labeled as "1," South-West may be labeled as "2," and North-West may be labeled as "3." As another example, an intersection may be labeled based on the number of point light sources nearby. The corner with least number of point light sources nearby may be labeled "0," and the corner with the greatest number of point light sources nearby may be labeled "3."

Data Augmentation

In urban environments, GPS signals may be delayed, occluded, distorted, or completely undetectable due to reflections or blockages from densely located structures, such as, tall buildings, towers, etc. GPS signals may be reflected by buildings, walls, vehicles, and in some cases even the ground. It is known that glass, metal, and wet surfaces are strong reflectors of light. These reflected signals can interfere with reception of the signals received directly from the satellites and may be received via multiple paths, for example, by reflections off of other surfaces and structures in the vicinity of the aircraft, a phenomenon known as Multipath Interference or Multipath Effect, as illustrated in FIG. 32B. In some cases, however, the direct signal from GPS satellites (e.g., GPS satellite 3220) may be blocked or hindered, for example, by a tall building 3210, and only a reflected signal may be received, a phenomenon known as Non-Line-of-Sight (NLOS) reception, as illustrated in FIG. 32A.

In the context of this disclosure, multipath effects may raise several challenges and may be more troublesome than the NLOS reception because the measurements from the GPS signals may not be just distorted but also may be undetectable. In some cases, a single signal can be received twice, or the signal may be substantially delayed which may directly affect the Time of Arrival (TOA) calculations needed to generate a position. These effects may be accentuated during landing and take-off positions when the aerial vehicles are closer to landing surfaces and at a height where the signals may be blocked, reflected, or distorted by the surrounding structures. The proposed precise landing and takeoff (PLaTO) systems and methods may be used to reject one or more of these effects to improve overall accuracy of the position measurement, as disclosed in some embodiments herein.

a. Using GPS to Augment PLaTO

As previously described, algorithms used in PLaTO may be iterative in nature, and resultantly, convergence time and signal delays may be reduced by providing an initial guess. In some of the existing systems and methods, if an initial guess is not available, performing one or more steps of the algorithm may take several milliseconds, up to a few seconds, thereby rendering the algorithm inefficient and negatively impacting the data throughput. In some embodiments, however, GPS signals may be used to reduce the commute time while in the "Lost in Space" mode by seeding the algorithms with initial guesses for the current position of the aircraft. Even if the guess is inaccurate, it could contribute to expedite the algorithms by reducing the number of iterations needed to achieve convergence.

Reference is now made to FIG. 33, which illustrates a pipeline 3300 for data augmentation configured to augment the accuracy or speed of aircraft level localization by combining GPS and Inertial Navigation Systems (INS) measurements, consistent with disclosed embodiments. In practice, the aircrafts may be configured to have some form of GPS localization in use and information from INS may also be available.

Data augmentation pipeline 3300 may include receiving information associated with position of aircraft based on GPS signals from one or more GPS satellites. In some embodiments, the position information may include location coordinates of the aircraft. Pipeline 3300 may further include receiving information associated with the position of the landing surface or the vertiport, which may be already existing in a database. In some embodiments, the location of the landing surface may be originally determined based on GPS signals and stored in a database accessible for later use. Pipeline 3300 may further include receiving information associated with the attitude (pose, position, and orientation) of the aircraft based on INS measurements. Using information related to the position of the aircraft in 3D space, position of the landing surface in 3D space, and the orientation of the camera configured to determine the attitude of the aircraft, may allow determining an area-of-interest 3350. In this context, the "area of interest" is the region assigned as landing space or the vertiport for the eVTOL aircraft. In some embodiments, region 3355 (indicated by pixelated region around area of interest 3350) may be excluded from consideration to reduce processing time. In some embodiments, as previously described, the GPS information associated with the position of the aircraft may not have to be accurate and even an initial guess may help reduce the processing time.

b. Using PLATO to Augment GPS Measurements

Reference is now made to FIG. 34, which illustrates a pipeline 3400 for data augmentation configured to augment the GPS measurements using information from PLaTO system, consistent with disclosed embodiments.

As previously described, multipath effects in dense urban environments raise several challenges related to receiving GPS signals, and thereby negatively impact the accuracy of position measurement. In some embodiments, PLaTO system may be used to help alleviate some of these problems to improve overall accuracy of position measurement by GPS.

In some embodiments, pipeline 3400 may comprise using a position measurement from PLaTO system to bound the position estimate provided by the GPS signal. In some cases, the GPS signal may be impacted by multipath effect, NLOS reception, or both, and therefore, the GPS signal may only provide position estimates but not accurate measurements. For a reliable GPS signal, at least five satellites may be desirable. In some scenarios where there are more than five satellites, one or more satellites may be rejected if its use results in a position reference outside the bounds of PLaTO's estimate. As shown in FIG. 34, pipeline 3400 if the number of satellites detected (N) is less than the minimum number of satellites required to generate reliable GPS signals, one or more satellites may be validated. If the number of satellites exceeds the minimum number of satellites, one or more satellites may be rejected, and the GPS signal may be calculated.

In some embodiments, if the GPS satellites cannot be validated, they are deemed incapable of providing position estimates, or poorly performing satellites and may be rejected from consideration. In such a case, the position may be calculated using the remaining satellites. In some embodiments, validating existing satellites may include estimating GPS signals from the available GPS satellites, determining, for each satellite, whether the error between the PLaTO signal and the GPS signal is less than a predefined threshold error limit, upon determining, calculating the position based on signals received from the satellites. If the error is more than the predefined threshold limit, the signal from the satellite and the satellite may be rejected from consideration.

In some embodiments, from a given position measurement from PLaTO, the position of the individual satellites may be determined. The information associated with the position of individual satellites may be used to reject multipath effects or synthesize satellite signals. One or more of the following steps may be performed to achieve rejection of multipath effects.

i. Providing a number of satellite measurements such as Time Difference of Arrival (TDOA) and a position measurement from PLaTO system ii. Calculating the expected TDOA signal for each satellite given the position reported by the PLaTO system iii. Comparing the measured TDOA signals to the expected TDOA signals and rejecting outliers that fall outside of a given range iv. Using one or more expected TDOA to calculate positions to allow GPS to calculate position with fewer than normally required satellites.

In some embodiments, based on the position measurement from PLaTO and less than a minimum number of GPS satellites (e.g., two satellites), the positional probability distributions of the two measurements may be combined with a Kalman Filter to reduce measurement error lower than either system could produce individually.

c. Using PLATO to Augment INS Measurements

In the context of this disclosure, using the last known location and extrapolating it based on INS measurements is known as Dead Reckoning Navigation. This method may be useful when traveling short distances, but for larger distances, drift in the INS sensors will result in large errors accumulating over a long period of time. This may be due to the fact that INS measures acceleration directly, and produces a velocity and position estimate by integrating the acceleration over time. Therefore, small offsets in the acceleration may accumulate into large position errors over time. In some embodiments, measurements from the PLaTO may be used to augment the INS measurements, as illustrated in FIG. 35.

In some embodiments, absolute correction of the position of the aircraft over time may be obtained from the PLaTO system. This may be accomplished by fusing estimates of position and velocity from PLaTO system and the INS measurements to generate high fidelity measurement. One or more camera images from the PLaTO system may be used to perform visual odometry to augment the INS measurements. In the context of this disclosure, "visual odometry" is similar to point tracking described in the data association algorithms above, but the end result is a change in position between frames instead of a position. One of several advantages of visual odometry is that it does not require fiducials present in the frame to work, which means that it can be used even when the landing surface or vertiport is not in the vicinity during normal flight of the aircraft. The visual odometry algorithm may include the following steps:

1. Providing image (a) and image (b) captured at times ta and tb, respectively;
2. Identifying distinguishing features in image (a) and image (b);
3. Associating features in image (a) to features in image (b) using nearest-neighbor or a suitable algorithm; and
4. Estimating the change in position of the camera between image (a) and image (b).

In some embodiments, the results of visual odometry algorithm may be used to correct the drift that occurs over the time range between ta and to when the pictures were captured. In some embodiments, the difference between ta and tp is unity such that the images captured at ta and tb are successive images. The change in the position may be similarly integrated over time to generate a relative position from a starting point. Another advantage of visual odometry may be that it is less prone to drift effect because it is tied to the visual range of the camera and the environment, but not the acceleration measurement.

d. INS Aided by Light-Localization System

Reference is now made to FIG. 36, which is an exemplary pipeline 3600 for data augmentation method, consistent with some disclosed embodiments. Pipeline 3600 represents a method of using a fixed-lag smoother algorithm to assist INS measurements by a light-localization system. In some embodiments, light-localization system using a fixed-lag smoother algorithm may be used on the aircraft in conjunction with the INS to provide a more accurate position estimation than used individually. A standard filtering implementation would utilize Extended Kalman filter (EKF) to fuse light-localization-pose solution with inertial navigation systems data. However, as an alternative to the EKF, pose-graph optimization approaches such as, for example, a fixed-lag smoother may be used to allow optimal position estimates to be calculated using sensor data across a window of time, rather than just an instant of time. In some embodiments, using a fixed-lag smoother algorithm may improve position estimation accuracy at higher frequencies, for example, at 500 Hz.

e. Integrating PLATO with the Aircraft

Reference is now made to FIG. 37, which illustrates an exemplary system 3700 showing integration of PLaTO system with an aircraft to support piloted or pilotless flights, consistent with some disclosed embodiments. An electric propulsion system for an eVTOL may include an electric engine that provides mechanical shaft power to a propeller assembly to produce thrust. In some embodiments, the electric engine of an electric propulsion system may include a High Voltage Power System supplying high voltage power to the electric engines and/or a Low Voltage System supplying low voltage direct current power to an electric engine. Some embodiments may include the electric engine(s) digitally communicating with a Flight Control System ("FCS") comprising Flight Control Computers ("FCC") 3750 that may send and receive signals to and from the electric engine including commands and responsive data or status. Some embodiments may include an electric engine capable of receiving operating parameters from and communicating operating parameters to the FCC, including speed, voltage, current, torque, temperature, vibration, propeller position, and any other value of operating parameters.

In some embodiments, a flight control system may include a system capable of communicating with an electric engine to send and receive analog/discrete signals to the electric engine and controlling an apparatus capable of redirecting thrust of the tilt propellers between a primarily vertical direction during vertical flight mode to a mostly horizontal direction during forward-flight mode. In some embodiments, this system may be referred to as a Tilt Propeller System ("TPS") and may be capable of communicating and orienting additional features of the electric propulsion system.

In some embodiments, system 3700 may communicate the measured pose (position and orientation) with FCC 3750. In some embodiments, FCC 3750 may fuse the estimated pose from other sources such as GPS 3710, INS 3720, Altimeter 3710, PLaTO 3740, etc., to generate an optimal estimate for the pose of the aircraft. This may be performed using a number of sensor fusion techniques such as a Kalman Filter, Extended Kalman Filter, a fixed-lag smoother, or other method for performing sensor fusion.

In a piloted aircraft, the final position estimate of the aircraft may be used to provide visual feedback to the pilot. In a pilotless aircraft, the final position estimate may be used to calculate flight control commands such as motor commands, flight surface controls 3770, or other control signals used to maneuver the aircraft in flight.

Example—EKF Utilizing Position Data from PLaTO

FIGS. 38-41 illustrate real-time flight test results from tests with the Extended Kalman Filter utilizing position data from PLaTO system. FIG. 38 illustrates the comparison of altitude estimates plotted as a function of horizontal distance as measured by RTK-GPS truth data and EKF. As shown in FIG. 38, the EKF line (dotted) mostly adheres closely to the RTK line (solid). FIG. 39 illustrates the comparison of altitude above ground of the aircraft measured by EKF and RTK-GPS ground truth data and corresponding error. As shown in FIG. 39, the EKF line (dotted) mostly adheres closely to the RTK line (solid). FIG. 40 illustrates the east estimates as a function of ground truth and corresponding error plot. As shown in FIG. 40, the EKF line (dotted) mostly adheres closely to the RTK line (solid). FIG. 41 illustrates north estimates plot as a function of ground truth and corresponding error plot. As shown in FIG. 41, the EKF line (dotted) mostly adheres closely to the RTK line (solid).

Reference is now made to FIG. 42, which is a flowchart illustrating an example method 4200 for estimating a pose for an aerial vehicle, consistent with some embodiments of the present disclosure. Method 4200 may be implemented with computing apparatus and systems, such as those disclosed herein. In some embodiments, method 4200 may be performed by at least one processor of a computer-implemented system. The respective steps and operations of these components for method 4200 are described below. It will be appreciated that the components and operations may be combined, modified, and/or rearranged depending on the application and system embodiment.

As illustrated in FIG. 42, at step 4210, a landing surface including light sources arranged in a predetermined pattern may be provided. The landing surface may be a vertiport for an eVTOL aerial vehicle. Each of the light source may be an active light source configured to emit light and one or more characteristics of the emitted light may be modulated over time. The light sources may be arranged in a predetermined pattern where the location of each light source is a known location. The constellation design of the arranged light sources may include an arrangement of the light sources defining a set of intersecting virtual lines, the light sources arranged on each virtual line, wherein a distance between adjacent light sources on each virtual line is non-uniform.

At step 4220, one or more characteristics of the light source on the landing surface may be modulated over time. The characteristics of the light source may include an intensity, a frequency, an amplitude, a wavelength, a phase, a bandwidth, or a duty cycle of the emitted light. Modulating one or more characteristics of the emitted light may be configured to identify a landing surface, identify a light source, identify a location of the light source, identify an operational status of the landing surface, or encode a signal authenticating the landing surface. The characteristics of the light source may be modulated by a controller on the landing surface.

At step 4230, a camera mounted on the aerial vehicle may receive an input signal associated with the light emitted from the light sources. The camera is mounted on the aerial vehicle at a known position and in a known orientation. The camera may use an optical filter or a lens to permit a range of wavelengths.

At step 4240, based on the input signal received, camera may generate an output in the form of a still image, a series of still images, or a streaming video of the information captured from the landing surface and the surroundings.

At step 4250, a processor may determine the location and orientation of the aerial vehicle based on the information from the captured image by the camera. Determining the location and orientation of the aerial vehicle may include detecting at least one of the light sources in the image, determining which of the light sources arranged in the predetermined pattern the detected light source is, and determining the location and the orientation of the aerial vehicle based on the determination of which of the light sources arranged in the predetermined pattern the detected light source is. The processor may be configured to perform one or more algorithms to estimate the pose of the aerial vehicle based on the information received from the camera.

FIG. 44 is an illustration of a perspective view of an exemplary VTOL aircraft, consistent with disclosed embodiments. FIG. 45 is another illustration of a perspective view of an exemplary VTOL aircraft in an alternative configuration, consistent with embodiments of the present disclosure. FIGS. 44 and 45 illustrate a VTOL aircraft 4400, 4500 in a cruise configuration and a vertical take-off, landing and hover configuration (also referred to herein as a "lift" configuration), respectively, consistent with embodiments of the present disclosure. Elements corresponding to FIGS. 44 and 45 may possess like numerals and refer to similar elements of the aircrafts 4400, 4500. The aircraft 4400, 4500 may include a fuselage 4402, 4502, wings 4404, 4504 mounted to the fuselage 4402, 4502 and one or more rear stabilizers 4406, 4506 mounted to the rear of the fuselage 4402, 4502. A plurality of lift propellers 4412, 4512 may be mounted to wings 4404, 4504 and may be configured to provide lift for vertical take-off, landing and hover. A plurality of tilt propellers 4414, 4514 may be mounted to wings 4404, 4504 and may be tiltable between the lift configuration in which they provide a portion of the lift required for vertical take-off, landing and hovering, as shown in FIG. 45, and the cruise configuration in which they provide forward thrust to aircraft 4400 for horizontal flight, as shown in FIG. 44. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In embodiments, lift propellers 4412, 4512 may be configured for providing lift only, with all horizontal propulsion being provided by the tilt propellers. Accordingly, lift propellers 4412, 4512 may be configured with fixed positions and may only generate thrust during take-off, landing and hover phases of flight. Meanwhile, tilt propellers 4414, 4514 may be tilted upward into a lift configuration in which thrust from propellers 4414, 4514 is directed downward to provide additional lift.

For forward flight, tilt propellers 4414, 4514 may tilt from their lift configurations to their cruise configurations. In other words, the orientation of tilt propellers 4414, 4514 may be varied from an orientation in which the tilt propeller thrust is directed downward (to provide lift during vertical take-off, landing and hover) to an orientation in which the tilt propeller thrust is directed rearward (to provide forward thrust to aircraft 4400, 4500). The tilt propellers assembly for a particular electric engine may tilt about an axis of rotation defined by a mounting point connecting the boom and the electric engine. When the aircraft 4400, 4500 is in full forward flight, lift may be provided entirely by wings 4404, 4504. Meanwhile, in the cruise configuration, lift propellers 4412, 4512 may be shut off. The blades 4420, 4520 of lift propellers 4412, 4512 may be held in low-drag positions for aircraft cruising. In some embodiments, lift propellers 4412, 4512 may each have two blades 4420, 4520 that may be locked for cruising in minimum drag positions in which one blade is directly in front of the other blade as illustrated in FIG. 474. In some embodiments, lift propellers 4412, 4512 have more than two blades. In some embodiments, tilt propellers 4414, 4514 may include more blades 4416, 4516 than lift propellers 4412, 4512. For example, as illustrated in FIGS. 44 and 45, lift propellers 4412, 4512 may each include, e.g., two blades, whereas and tilt propellers 4414, 4514 may each include more blades, such as the five blades shown. In some embodiments, each of the tilt propellers 4414, 4514 may have 2 to 5 blades, and possibly more depending on the design considerations and requirements of the aircraft.

In some embodiments, the aircraft may include a single wing 4404, 4504 on each side of fuselage 4402, 4502 (or a single wing that extends across the entire aircraft). At least a portion of lift propellers 4412, 4512 may be located rearward of wings 4404, 4504 and at least a portion of tilt propellers 4414, 4514 may be located forward of wings 4404, 4504. In some embodiments, all of lift propellers 4412, 4512 may be located rearward of wings 4404, 4504 and all of tilt propellers 4414, 4514 may be located forward of wings 4404, 4504. According to some embodiments, all lift propellers 4412, 4512 and tilt propellers 4414, 4514 may be mounted to the wings—i.e., no lift propellers or tilt propellers may be mounted to the fuselage. In some embodiments, lift propellers 4412, 4512 may be all located rearwardly of wings 4404, 4504 and tilt propellers 4414, 4514 may be all located forward of wings 4404, 4504. According to some embodiments, all lift propellers 4412, 4512 and tilt propellers 4414, 4514 may be positioned inwardly of the ends of the wing 4404, 4504.

In some embodiments, lift propellers 4412, 4512 and tilt propellers 4414, 4514 may be mounted to wings 4404, 4504 by booms 4422, 4522. Booms 4422, 4522 may be mounted beneath wings 4404, 4504, on top of the wings, and/or may be integrated into the wing profile. In some embodiments, lift propellers 4412, 4512 and tilt propellers 4414, 4514 may be mounted directly to wings 4404, 4504. In some embodiments, one lift propeller 4412, 4512 and one tilt propeller 4414, 4514 may be mounted to each boom 4422, 4522. Lift propeller 4412, 4512 may be mounted at a rear end of boom 4422, 4522 and tilt propeller 4414, 4514 may be mounted at a front end of boom 4422, 4522. In some embodiments, lift propeller 4412, 4512 may be mounted in a fixed position on boom 4422, 4522. In some embodiments, tilt propeller 4414, 4514 may mounted to a front end of boom 4422, 4522 via a hinge. Tilt propeller 4414, 4514 may be mounted to boom 4422, 4522 such that tilt propeller 4414, 4514 is aligned with the body of boom 4422, 4522 when in its cruise configuration, forming a continuous extension of the front end of boom 4422, 4522 that minimizes drag for forward flight.

In some embodiments, aircraft 4400, 4500 may include, e.g., one wing on each side of fuselage 4402, 4502 or a single wing that extends across the aircraft. According to some embodiments, the at least one wing 4404, 4504 is a high wing mounted to an upper side of fuselage 4402, 4502. According to some embodiments, the wings include control surfaces, such as flaps and/or ailerons. According to some embodiments, wings 4404, 4504 may have designed with a profile that reduces drag during forward flight. In some embodiments, the wing tip profile may be curved and/or tapered to minimize drag.

In some embodiments, rear stabilizers 4406, 4506 include control surfaces, such as one or more rudders, one or more elevators, and/or one or more combined rudder-elevators. The wing(s) may have any suitable design. In some embodiments, the wings have a tapering leading edge.

In some embodiments, lift propellers 4412, 4512 or tilt propellers 4414, 4514 may canted relative to at least one other lift propeller 4412, 4512 or tilt propeller 4414, 4514. As used herein, canting refers to a relative orientation of the rotational axis of the lift propeller/tilt propeller about a line that is parallel to the forward-rearward direction, analogous to the roll degree of freedom of the aircraft. Canting of the lift propellers and/or tilt propellers may help minimize damage from propeller burst by orienting a rotational plane of the lift propeller/tilt propeller discs (the blades plus the hub onto which the blades are mounted) so as to not intersect critical portions of the aircraft (such areas of the fuselage in which people may be positioned, critical flight control systems, batteries, adjacent propellers, etc.) or other propeller discs and may provide enhanced yaw control during flight.

FIG. 46 is an illustration of a top plane view of an exemplary VTOL aircraft, consistent with embodiments of the present disclosure. Aircraft 4600 shown in the figure may be a top plan view of the aircraft 4400, 4500 shown in FIGS. 44 and 45, respectively. As discussed herein, an aircraft 4600 may include twelve electric propulsion systems distributed across the aircraft 4600. In some embodiments, a distribution of electric propulsion systems may include six forward electric propulsion systems 4614 and six aft electric propulsion systems 4612 mounted on booms forward and aft of the main wings 4604 of the aircraft 4600. In some embodiments, a length of the rear end of the boom 4624 from the wing 4604 to the lift propeller 4612 may comprise a similar rear end of the boom 4624 length across the numerous rear ends of the booms. In some embodiments, the length of the rear ends of the booms may vary across the, exemplary, six rear ends of the booms. For example, each rear end of the boom 4624 may comprise a different length from the wing 4604 to the lift propeller 4612, or a subset of rear ends of booms may be similar in length. In some embodiments, a front end of boom 4622 may comprise various lengths from the wing 4604 to the tilt propeller 4614 across the front ends of booms. For example, as shown in FIG. 46, a length of the front end of boom 4622 from the tilt propellers 4614 nearest the fuselage to the wing 4604 may comprise a greater length than the length of the front end of the boom 4622 from the wing 4604 to the tilt propellers 4614 furthest from the fuselage. Some embodiments may include front ends of the booms with similar lengths across the, exemplary, six front ends of booms or any other distribution of lengths of the front ends of booms from the wing 4604 to tilt propellers 4614. Some embodiments may include an aircraft 4600 possessing eight electric propulsion systems with four forward electric propulsion systems 4614 and four aft electric propulsion systems 4612, or any other distribution of forward and aft electric propulsion systems, including embodiments where the number of forward electric propulsion systems 4614 is less than or greater than the number of aft electric propulsion systems 4612. Further, FIG. 46 depicts an exemplary embodiment of a VTOL aircraft 4600 with forward propellers 4614 in a horizontal orientation for horizontal flight and aft propeller blades 4620 in a stowed position for a forward phase of flight.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems.

FIG. 47 is a schematic diagram illustrating exemplary propeller rotation of a VTOL aircraft, consistent with disclosed embodiments. Aircraft 4700 shown in the figure may be a top plan view of the aircraft 4400, 4500, and 4600 shown in FIGS. 1, 2, and 3, respectively. An aircraft 4700 may include six forward electric propulsion systems with three of the forward electric propulsion systems being of CW type 4724 and the remaining three forward electric propulsion systems being of CCW type. In some embodiments, three aft electric propulsion systems may be of CCW type 4728 with the remaining three aft electric propulsion systems being of CW type 4730. Some embodiments may include an aircraft 4700 possessing four forward electric propulsion systems and four aft electric propulsion systems, each with two CW types and two CCW types. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 4700 possessing forward and aft electric propulsion systems where the amount of CW types 4724 and CCW types 4726 is not equal among the forward electric propulsion systems, among the aft electric propulsion systems, or among the forward and aft electric propulsion systems.

FIG. 48 is a schematic diagram illustrating exemplary power connections in a VTOL aircraft, consistent with disclosed embodiments. A VTOL aircraft may have various power systems connected to diagonally opposing electric propulsion systems. In some embodiments, the power systems may include high voltage power systems. Some embodiments may include high voltage power systems connected to electric engines via high voltage channels. In some embodiments, an aircraft 4800 may include six power systems, including batteries 4826, 4828, 4830, 4832, 4834, and 4836 stored within the wing 4870 of the aircraft 4800. In some embodiments, the aircraft 4800 may include six forward electric propulsion systems having six electric engines 4802, 4804, 4806, 4808, 4810, and 4812 and six aft electric propulsion systems having six electric engines 4814, 4816, 4818, 4820, 4822, and 4824. In some embodiments, a battery may be connected to diagonally opposing electric engines. In such a configuration, first power system 4826 may provide power to electric engines 4802 via power connection channel 4838 and electric engine 4824 via power connection channel 4840. In some embodiments, first power system 4826 may also be paired with a fourth power system 4832 via a power connection channel 4842 possessing a fuse to prevent excessive current from flowing through the power systems 4826 and 4832. Further to this embodiment, VTOL aircraft 4800 may include a second power system 4828 paired with a fifth power system 4834 via power connection channel 4848 possessing a fuse and may provide power to electric engines 4810 and 4816 via power connection channels 4844 and 4846, respectively. In some embodiments, a third power system 4830 may be paired with a sixth power system 4836 via power connection channel 4854 possessing a fuse and may provide power to electric engines 4806 and 4820 via power connection channels 4850 and 4852, respectively. The fourth power system 4832 may also provide power to electric engines 4808 and 4818 via power connection channels 4856 and 4858, respectively. The fifth power system 4834 may also provide power to electric engines 4804 and 4822 via power connection channels 4860 and 4862, respectively. The sixth power system 4836 may also provide power to electric engines 4812 and 4814 via power connection channels 4864 and 4866, respectively.

As disclosed herein, an electric propulsion system may include an electric engine connected to a High Voltage Power System, such as a battery, located within the aircraft, via high voltage channels or power connection channels. Some embodiments may include various batteries being stored within an aircraft wing with high voltage channels traveling throughout the aircraft, including the wing and boom, to an electric propulsion system. In some embodiments, multiple high voltage power systems may be used to create an electric propulsion system with multiple high voltage power supplies to avoid the risk of a single point of failure. In some embodiments, an aircraft may include multiple electric propulsion systems that may be wired in a pattern to various batteries or power sources stored throughout the aircraft. It is recognized that such a configuration may be beneficial as to avoid the risk of a single point of failure where one battery or power source failure could lead to a portion of the aircraft not being able to maintain a required amount of thrust to continue flight or perform a controlled landing. For example, if a VTOL possessed two forward electric propulsion systems and two aft propulsion systems, the forward and the aft electric propulsion systems on opposite sides of the VTOL aircraft may be connected to the same high voltage power system. In such a configuration, if one high voltage power system were to fail, a forward and an aft electric propulsion system on opposite sides of the VTOL aircraft would remain in working order and may provide a more balanced flight or landing compared to a forward and aft electric propulsion system failing on the same side of a VTOL aircraft. Some embodiments may include four forward electric propulsion systems and four aft electric propulsion systems where diagonally opposing electric engines are connected to a common battery or power source. Some embodiments may include various configurations of electric engines electrically connected to high voltage power systems such that a risk of a single point of failure is avoided in the case of a power source failure and the phase of flight during which a failure occurs may continue or the aircraft may perform an alternative phase of flight in response to the failure.

As discussed above, an electric propulsion system may include an electric engine that provides mechanical shaft power to a propeller assembly to produce thrust. In some embodiments, the electric engine of an electric propulsion system may include a High Voltage Power System supplying high voltage power to the electric engines and/or a Low Voltage System supplying low voltage direct current power to an electric engine. Some embodiments may include the electric engine(s) digitally communicating with a Flight Control System ("FCS") comprising Flight Control Computers ("FCC") that may send and receive signals to and from the electric engine including commands and responsive data or status. Some embodiments may include an electric engine capable of receiving operating parameters from and communicating operating parameters to the FCC, including speed, voltage, current, torque, temperature, vibration, propeller position, and any other value of operating parameters.

In some embodiments, a flight control system may include a system capable of communicating with an electric engine to send and receive analog/discrete signals to the electric engine and controlling an apparatus capable of redirecting thrust of the tilt propellers between a primarily vertical direction during vertical flight mode to a mostly horizontal direction during forward-flight mode. In some embodiments, this system may be referred to as a Tilt Propeller System ("TPS") and may be capable of communicating and orienting additional features of the electric propulsion system.

FIG. 49 illustrates block diagram of an exemplary architecture and design of an electric propulsion unit 4900 consistent with disclosed embodiments. In some embodiments, an electric propulsion system 4902 may include an electric engine subsystem 4904 that may supply torque, via a shaft, to a propeller subsystem 4906 to produce the thrust of the electric propulsion system 4902. Some embodiments may include the electric engine subsystem 4904 receiving low voltage DC (LV DC) power from a Low Voltage System (LVS) 4908. Some embodiments may include the electric engine subsystem 4904 receiving high voltage (HV) power from a High Voltage Power System (HVPS) 4910 comprising at least one battery or other device capable of storing energy. In some embodiments, a High Voltage Power System may include more than one battery, or other device capable of storing energy, supplying high voltage power to the electric engine subsystem 4904. It is recognized that such a configuration may be advantageous as to not risk a single point of failure where a single battery failure leads to an electric propulsion system 4902 failure.

Some embodiments may include an electric propulsion system 4902 including an electric engine subsystem 4904 receiving signals from and sending signals to a flight control system 4912. In some embodiments, a flight control system 4912 may comprise a flight control computer capable of using Controller Area Network ("CAN") data bus signals to send commands to the electric engine subsystem 4904 and receive status and data from the electric engine subsystem 4904. It should be understood that while CAN data bus signals are used between the flight control computer and the electric engine(s), some embodiments may include any form of communication with the ability to send and receive data from a flight control computer to an electric engine. In some embodiments, a flight control system 4912 may also include a Tilt Propeller System ("TPS") 4914 capable of sending and receiving analog, discrete data to and from the electric engine subsystem 4904 of the tilt propellers. A tilt propeller system 4914 may include an apparatus capable of communicating operating parameters to an electric engine subsystem 4904 and articulating an orientation of the propeller subsystem 4906 to redirect the thrust of the tilt propellers during various phases of flight using mechanical means such as a gearbox assembly, linear actuators, and any other configuration of components to alter an orientation of the propeller subsystem 4906.

As discussed throughout, an exemplary VTOL aircraft may possess various types of electric propulsion systems including tilt propellers and lift propellers, including forward electric engines with the ability to tilt during various phases of flight, and aft electric engines that remain in one orientation and may only be active during certain phases of flight (i.e., take off, landing, and hover).

In some embodiments, a flight control system may include a system capable of controlling control surfaces and their associated actuators in an exemplary VTOL aircraft. FIG. 50 is an illustration of a top plane view of an exemplary VTOL aircraft 5000, consistent with embodiments of the present disclosure. Aircraft 5000 shown in the figure may be a top plan view of the aircraft 4400, 4500 shown in FIGS. 44 and 45, respectively. In some embodiments, aircraft 5000 may be similar to aircraft 4600 of FIG. 46. In aircraft 5000, the control surfaces may include, in addition to the propeller blades discussed earlier, flaperons 5072 and ruddervators 5074. Flaperons 5072 may combine functions of one or more flaps, one or more ailerons, and/or one or more spoilers. Ruddervators 5074 may combine functions or one or more rudders and/or one or more elevators. In some embodiments, control surfaces may comprise, e.g., flaps, ailerons, spoilers, rudders or elevators. In aircraft 5000, the actuators may include, in addition to the electric propulsion systems discussed earlier, control surface actuators (CSAs) associated with, e.g., flaperons 5072 and ruddervators 5074.

Embodiments of the present disclosure may further be described with respect to the following clauses:

1. A system, comprising:
    a landing surface for an aerial vehicle, the landing surface comprising:
        a plurality of light sources arranged in a predetermined pattern, wherein a characteristic of light emitted from each of the light sources is configured to be modulated with respect to time.
2. The system of clause 1, wherein the light sources comprise a first set of light sources arranged in a first predetermined pattern, and wherein each of the first set of light sources is configured to be in a field of view of a camera associated with the aerial vehicle when the aerial vehicle is at a first distance from the landing surface.
3. The system of clause 2, wherein the light sources comprise a second set of light sources arranged in a second predetermined pattern, and wherein each of the second set of light sources is configured to be in the field of view of the camera when the aerial vehicle is at a second distance from the landing surface.
4. The system of clause 3, wherein each of the first set of light sources is configured to be out of the field of view of the camera when the aerial vehicle is at the second distance from the landing surface.
5. The system of clause 3, wherein an area covered by the first set of light sources is larger area than an area covered by the second set of light sources.
6. The system of clause 3, wherein an intensity of the first set of light sources is configured to be higher than an intensity of the second set of light sources.
7. The system of clause 1, wherein the predetermined pattern of the light sources is associated with the landing surface.
8. The system of clause 1, wherein the light sources are arranged such that one of the light sources is uniquely identifiable in the predetermined pattern.
9. The system of clause 1, wherein the modulation of the characteristic of the emitted light is configured to identify the landing surface.
10. The system of clause 1, wherein the modulation of the characteristic of the emitted light is configured to identify one of the light sources.
11. The system of clause 1, wherein the modulation of the characteristic of the emitted light is configured to identify a location of one of the light sources.
12. The system of clause 1, wherein the modulation of the characteristic of the emitted light is configured to identify a status of the landing surface.
13. The system of clause 1, wherein the modulation of the characteristic of the emitted light is configured to encode a signal authenticating the landing surface.
14. The system of clause 1, wherein the modulation of the characteristic of the emitted light comprises modulation of an intensity, a frequency, an amplitude, a wavelength, a phase, a bandwidth, or a duty cycle of the emitted light.
15. The system of clause 1, wherein a wavelength of the emitted light from the light sources is in a range from 800 nm to 850 nm.
16. The system of clause 15, wherein the wavelength of the emitted light is about 810 nm.
17. The system of clause 15, wherein the wavelength of the emitted light is about 1310 nm.
18. The system of clause 15, wherein the wavelength of the emitted light is about 1550 nm.
19. The system of clause 1, wherein the landing surface is a portable landing surface comprising a re-deployable landing mat, a fabric, or a tarp.
20. The system of clause 1, further comprising a controller circuit configured to operate the light sources.
21. The system of clause 1, wherein each of the light sources is recessed with respect to the landing surface.
22. The system of clause 1, wherein each of the light sources comprises an optical sensor configured to detect a portion of the light emitted from at least one other light source of the light sources.
23. The system of clause 1, further comprising a plurality of landing surfaces, wherein each landing surface comprises a plurality of light sources arranged in a predetermined pattern, and wherein a characteristic of light emitted from each of the light sources is configured to be modulated with respect to time.
24. The system of clause 23, wherein the landing surfaces are horizontally displaced from each other.
25. The system of clause 23, wherein the landing surfaces are vertically displaced from each other.
26. The system of clause 23, wherein the landing surfaces are horizontally and vertically displaced from each other.
27. A system, comprising:
    an aerial vehicle, comprising:
        a camera configured to generate images based on information transmitted by a plurality of light sources located adjacent a landing surface for the aerial vehicle; and
        a controller circuit configured to:
            receive the generated images; and
            determine a position and an orientation of the aerial vehicle based on the received images,
            wherein the light sources are arranged in a predetermined pattern on the landing surface, and
            wherein a characteristic of light emitted from each of the light sources is modulated with respect to time.
28. The system of clause 27, wherein the camera is configured to provide a plan view of the light sources on the landing surface.
29. The system of clause 27, wherein the camera is configured to provide a forward-looking view of the light sources on the landing surface.
30. The system of clause 27, wherein the camera comprises an optical filter, the optical filter configured to permit a range of wavelengths of the light emitted from each of the light sources.

31. The system of clause 30, wherein the permitted range of wavelengths is between 800 nm to 850 nm.
32. The system of clause 30, wherein the permitted range of wavelengths is about 810 nm.
33. The system of clause 30, wherein the permitted range of wavelengths is about 1310 nm.
34. The system of clause 30, wherein the permitted range of wavelengths is about 1550 nm.
35. The system of clause 30, wherein the optical filter comprises a band-pass filter, the band-pass filter configured to permit the range of wavelengths of the light emitted from each of the light sources.
36. The system of clause 27, wherein the controller is further configured to adjust a capture rate of the camera based on a modulation rate of the light sources.
37. The system of clause 36, wherein an adjustment of the capture rate comprises synchronization of the capture rate of the camera with the modulation rate of the light sources.
38. The system of clause 36, wherein the capture rate of the camera is at least 100 frames per second (Hz).
39. The system of clause 36, wherein the controller is further configured to adjust a blink rate of the light source based on the capture rate.
40. The system of clause 39, wherein the blink rate of the light source is 30 Hz.
41. The system of clause 36, wherein the controller is further configured to adjust a bit transmission rate of the camera.
42. The system of clause 41, wherein the bit transmission rate of the camera is 10 Hz or more.
43. The system of clause 27, wherein the modulation of the characteristic of light emitted from each of the light sources comprises modulation of an intensity, a frequency, an amplitude, a wavelength, a phase, a bandwidth, or a duty cycle of the emitted light.
44. The system of clause 36, wherein the controller is further configured to transmit a synchronization pulse to synchronize the capture rate of the camera with the modulation rate of the light sources.
45. The system of clause 27, wherein the camera is configured to be activated based on an activation signal from an external processor associated with the aerial vehicle, an operator of the aerial vehicle, or the controller.
46. The system of clause 27, wherein the controller is further configured to generate an output signal, the output signal comprising information associated with the position and the orientation of the aerial vehicle.
47. The system of clause 46, wherein the information associated with the position of the aerial vehicle comprises global positioning system (GPS) coordinates of the aerial vehicle.
48. The system of clause 46, wherein the information associated with the orientation of the aerial vehicle comprises an orientation of the aerial vehicle with respect to the landing surface.
49. The system of clause 46, wherein the controller is further configured to transmit the information associated with the position and the orientation of the aerial vehicle to the external processor.
50. The system of clause 27, wherein the camera is a color, a monochrome, or a hyperspectral camera.
51. The system of clause 27, wherein the camera is configured to be activated after the aerial vehicle is within a predetermined distance from the landing surface.
52. The system of clause 51, wherein the predetermined distance is 500 m or less.
53. A system, comprising:
a plurality of light sources arranged at a landing surface for an aerial vehicle, the arrangement of the light sources defining a set of intersecting virtual lines, the light sources arranged on each virtual line, wherein a distance between adjacent light sources on each virtual line is non-uniform.
54. The system of clause 53, wherein an equal number of light sources are arranged on each virtual line.
55. The system of clause 53, wherein a linear cross-ratio for each virtual line is independent of a viewing angle.
56. The system of clause 53, wherein the intersecting virtual lines define a plurality of areas, and wherein an area cross-ratio for each area is independent of a viewing angle.
57. A method for estimating a pose for an aerial vehicle, comprising:
providing a landing surface comprising light sources arranged in a predetermined pattern;
modulating a characteristic of light emitted from the light sources with respect to time;
receiving, using a camera mounted on the aerial vehicle, an input signal associated with the light emitted from the light sources;
generating an image of the light sources based on the received input signal;
determining a location and an orientation of the aerial vehicle based on the image, wherein determining the location and the orientation of the aerial vehicle comprises:
detecting at least one of the light sources in the image;
determining which of the at least one of the light sources arranged in the predetermined pattern the detected light source is; and
determining the location and the orientation of the aerial vehicle based on the determination of which of the at least one of the light sources arranged in the predetermined pattern the detected light source is.
58. The method of clause 57, further comprising encoding information associated with the at least one of light source in the characteristic of the modulated light emitted from the light source.
59. The method of clause 57, wherein determining which of the at least one of the light sources arranged in the predetermined pattern the detected light source is comprises decoding, using a processor, the encoded information associated with the light source.
60 The method of clause 57, wherein detecting the at least one of light source in the image further comprises background subtraction and thresholding.
61. The method of clause 57, wherein detecting the at least one of light source in the image further comprises image filtering techniques.
62. The method of clause 61, wherein the image filtering comprises temporal filtering, spatial filtering, or a combination thereof.
63. The method of clause 57, further comprising storing information associated with the predetermined pattern in a database.
64. The method of clause 63, wherein determining which of the at least one of the light sources arranged in the predetermined pattern the detected light source is comprises matching a point in the image with a point in the database.

65. The method of clause 57, wherein the predetermined pattern comprises an arrangement of the light sources defining a set of intersecting virtual lines, the light sources arranged on each virtual line, and wherein a distance between adjacent light sources on each virtual line is non-uniform.

66. The method of clause 57, wherein determining which of the at least one of the light sources arranged in the predetermined pattern the detected light source is further comprises computing a cross-ratio of the location of the corresponding light sources.

67. The method of clause 65, wherein a linear cross-ratio for each virtual line is independent of a viewing angle.

68. The method of clause 65, wherein the intersecting virtual lines define a plurality of areas, and wherein an area cross-ratio for each area is independent of a viewing angle.

69. The method of clause 57, wherein modulating the characteristic of light emitted comprises modulating an intensity, a frequency, an amplitude, a wavelength, a phase, a bandwidth, or a duty cycle of the emitted light.

70. A computer-implemented system for estimating a pose of an aerial vehicle, the system comprising:
   a landing surface comprising light sources arranged in a predetermined pattern; and
   at least one processor configured to:
      modulate a characteristic of light emitted from the light sources with respect to time;
      activate a camera mounted on the aerial vehicle to receive an input signal associated with the light emitted from the light sources;
   enable the camera to generate an image of the light sources based on the received input signal;
   determine a location and an orientation of the aerial vehicle based on the generated
   image, wherein determining the location and the orientation comprises:
      detecting at least one of the light sources in the image;
      determining which of the at least one of the light sources arranged in the predetermined pattern the detected light source is; and
      determining the location and the orientation of the aerial vehicle based on the determination of which of the at least one of the light sources arranged in the predetermined pattern the detected light source is.

71. A computer-implemented method of estimating a pose of an aerial vehicle, the method comprising the following operations performed by at least one processor:
   modulating, with respect to time, a characteristic of light emitted from light sources arranged in a predetermined pattern on a landing surface for the aerial vehicle;
   activating a camera mounted on the aerial vehicle to enable receiving an input signal associated with the light emitted from the light sources;
   enabling the camera to generate an image of the light sources based on the received input signal;
   determining location and an orientation of the aerial vehicle based on the image, wherein determining the location and the orientation comprises:
      detecting at least one of the light sources in the image;
      determining which of the at least one of the light sources arranged in the predetermined pattern the detected light source is; and
      determining the location and the orientation of the aerial vehicle based on the determination of which of the at least one of the light sources arranged in the predetermined pattern the detected light source is.

72. A non-transitory computer-readable medium that stores a set of instructions that is executable by at least one processor of an apparatus to cause the apparatus to perform a method, the method comprising:
   modulating, with respect to time, a characteristic of light emitted from light sources arranged in a predetermined pattern on a landing surface for an aerial vehicle;
   activating a camera mounted on the aerial vehicle to enable receiving an input signal associated with the light emitted from the light sources;
   enabling the camera to generate an image of the light sources based on the received input signal;
   determining a location and an orientation of the aerial vehicle based on the image, wherein determining the location and the orientation comprises:
      detecting at least one of the light sources in the image;
      determining which of the at least one of the light sources arranged in the predetermined pattern the detected light source is; and
      determining the location and the orientation of the aerial vehicle based on the determination of which of the at least one of the light sources arranged in the predetermined pattern the detected light source is.

73. The method of clause 57, wherein determining the location and the orientation of the aerial vehicle comprises:
   detecting at least four light sources in the image;
   determining which of the at least four light sources arranged in the predetermined pattern the detected light sources are; and
   determining the location and the orientation of the aerial vehicle based on the determination of which of the four light sources arranged in the predetermined pattern the detected light sources are.

74 The method of clause 57, wherein determining the location and the orientation of the aerial vehicle comprises:
   detecting at least five light sources in the image;
   determining which of the at least five light sources arranged in the predetermined pattern the detected light sources are; and
   determining the location and the orientation of the aerial vehicle based on the determination of which of the five light sources arranged in the predetermined pattern the detected light sources are.

75. The computer-implemented method of clause 71, wherein determining the location and the orientation of the aerial vehicle comprises:
   detecting at least four light sources in the image;
   determining which of the at least four light sources arranged in the predetermined pattern the detected light sources are; and
   determining the location and the orientation of the aerial vehicle based on the determination of which of the four light sources arranged in the predetermined pattern the detected light sources are.

76. The computer-implemented method of clause 71, wherein determining the location and the orientation of the aerial vehicle comprises:
   detecting at least five light sources in the image;

determining which of the at least five light sources arranged in the predetermined pattern the detected light sources are; and determining the location and the orientation of the aerial vehicle based on the determination of which of the five light sources arranged in the predetermined pattern the detected light sources are.

77. The non-transitory computer-readable medium of clause 72, wherein the set of instructions executable by the at least one processor of the apparatus causes the apparatus to determine the location and the orientation of the aerial vehicle, and wherein determining the location and the orientation of the aerial vehicle comprises:

detecting at least four light sources in the image;

determining which of the at least four light sources arranged in the predetermined pattern the detected light sources are; and determining the location and the orientation of the aerial vehicle based on the determination of which of the four light sources arranged in the predetermined pattern the detected light sources are.

78. The non-transitory computer-readable medium of clause 72, wherein the set of instructions executable by the at least one processor of the apparatus causes the apparatus to determine the location and the orientation of the aerial vehicle, and wherein determining the location and the orientation of the aerial vehicle comprises:

detecting at least five light sources in the image;

determining which of the at least five light sources arranged in the predetermined pattern the detected light sources are; and determining the location and the orientation of the aerial vehicle based on the determination of which of the five light sources arranged in the predetermined pattern the detected light sources are.

79. A computer-implemented method for locating a light source of a landing surface for an aerial vehicle, the method comprising the following operations performed by at least one processor:

activating a camera mounted on the aerial vehicle to enable receiving an input signal associated with light emitted from light sources arranged in a predetermined pattern on the landing surface for the aerial vehicle, the light having a characteristic that is modulated with respect to time;

enabling the camera to generate at least two images of the light sources based on the received input signal;

enabling a detector to detect, using a detection algorithm, at least one of the light sources in the at least two images, wherein the detection algorithm comprises the steps of:

determining, using a subtraction algorithm, a difference in pixel intensity values of the at least two images;

applying a predetermined threshold pixel intensity to a difference frame to generate a mask;

identifying, using the mask, a location of a pixel in the image representing the light source; and computing, using a centroiding algorithm, a location of the light source on the landing surface based on the location of the pixel in the image.

80. The computer-implemented method of clause 79, wherein the detection algorithm further comprises generating the difference frame based on the determined difference in pixel intensity values of the at least two images.

81. The computer-implemented method of clause 79, wherein the characteristic of light is modulated to fully activate the light sources in a first image of the at least two images and to fully deactivate the light sources in a second image of the at least two images.

82. The computer-implemented method of clause 81, wherein the first image comprises a signal image and the second image comprises a background image.

83. The computer-implemented method of clause 81, wherein the first image and the second image comprise consecutive images.

84. The computer-implemented method of clause 81, wherein the detection algorithm further comprises performing image registration to enable background subtraction by aligning the first image and the second image.

85. The computer-implemented method of clause 84, wherein the image registration is performed using a technique comprising feature matching, translation matching, current state estimation, or a combination thereof.

86. The computer-implemented method of clause 79, wherein the detection algorithm further comprises tracking the identified location of the pixel representing the light source, by extrapolating, based on a combination of information of a velocity of the aerial vehicle and time elapsed between capturing the at least two images.

87. The computer-implemented method of clause 79, wherein the aerial vehicle comprises an electric vertical takeoff and landing aircraft.

88. A computer-implemented method of mapping a location in an image to a location on a landing surface for an aerial vehicle, the method comprising the following operations performed by at least one processor:

detecting, using a detection algorithm, light sources in the image, the light sources arranged on the landing surface and configured to emit light detectable by a camera mounted on the aerial vehicle;

associating, using a first association algorithm, locations in the image representing the detected light sources to corresponding locations of the light sources on the landing surface, wherein the association algorithm comprises the steps of:

normalizing the locations in the image representing the detected light sources in a cartesian coordinate space;

transforming the normalized locations to curves in a polar coordinate space, wherein collinear normalized locations in the cartesian coordinate space form curves intersecting at a common point in the polar coordinate space;

discretizing the polar coordinate space into a plurality of bins, each bin represented by a value indicating the number of times a curve passes through a location of the bin;

transforming, upon determining whether the bin value exceeds a predetermined threshold, the location of the bin in the polar coordinate space to the cartesian coordinate space;

forming lines in the cartesian coordinate space, each line connecting at least a number of points equal to the value of the corresponding bin;

grouping, using a clustering algorithm, substantially parallel lines and forming a rectangular frame for an integer grid space from the grouped lines;

calculating a homography matrix configured to move the points from the cartesian coordinate space to the integer grid; and mapping each point to the integer grid using the calculated homography matrix.

89. The computer-implemented method of clause 88, wherein normalizing the locations in the image comprises constructing a transformation matrix to compute a mean of the locations and setting the variance of the locations to unity.

90. The computer-implemented method of clause 88, wherein normalizing the locations in the image further comprises rotating the cartesian coordinate space by an angle to compensate a rotation caused by an angle of approach of the aerial vehicle toward the landing surface.

91. The computer-implemented method of clause 88, wherein the bin value increments by one for every instance of a curve passing through the location of the bin.

92. The computer-implemented method of clause 88, wherein the first association algorithm further comprises refining one or more lines in the cartesian coordinate space by rejecting the one or more lines based on a fit to the detected locations of the light sources in the image.

93. The computer-implemented method of clause 92, wherein the first association algorithm further comprises iteratively refining the one or more lines.

94. The computer-implemented method of clause 88, further comprising labeling each location on the integer grid with a reference character.

95. The computer-implemented method of clause 94, wherein the labeling is based on a predefined sequence.

96. The computer-implemented method of clause 88, wherein mapping each point to the integer grid indicates an offset distance, the offset distance being a distance between a reference location on the integer grid and a corresponding mapped point.

97. The computer-implemented method of clause 96, further comprising rejecting a false detection from the association based on the offset distance.

98. The computer-implemented method of clause 97, wherein rejecting the false detection comprises comparing the offset distance to a threshold offset distance.

99. The computer-implemented method of clause 98, further comprising:
identifying, as a false detection, the mapped points for which the offset distance is larger than the threshold offset distance; and
rejecting the association upon determining that the number of false detections exceeds an allowable threshold.

100. The computer-implemented method of clause 88, further comprising associating, using a second association algorithm, locations in the image representing the detected light sources to the corresponding locations of the light sources on the landing surface.

101. The computer-implemented method of clause 100, wherein the first association algorithm comprises a grid-association algorithm and the second association algorithm comprises a iterative closest point (ICP) algorithm, a thin-plate spline robust point matching (TPS-RPM) algorithm, a point tracking algorithm, or a combination thereof.

102. A system, comprising:
a first plurality of light sources arranged in a predetermined pattern on a landing surface for an aerial vehicle; and
a second plurality of light sources disposed along a flight path of the aerial vehicle to guide the aerial vehicle, wherein a characteristic of light emitted from each of the first and the second plurality of light sources is configured to be modulated with respect to time, and wherein the modulated light emitted from each of the first and the second plurality of light sources is configured to be detectable by a camera mounted on the aerial vehicle.

103. The system of clause 102, wherein the second plurality of light sources is disposed atop a building, a pole, a tower, a natural structure, or a roof of a structure located along the flight path.

104. A system, comprising:
a landing surface for an aerial vehicle, the landing surface comprising:
a predetermined pattern of linear light sources on the landing surface for the aerial vehicle, wherein a characteristic of light emitted from the plurality of linear light sources is configured to be modulated with respect to time, and wherein the modulation is configured to encode a signal representing an identity of the landing surface.

105. The system of clause 104, further comprising a plurality of point light sources arranged in a predetermined pattern on the landing surface for the aerial vehicle, wherein a characteristic of light emitted from the plurality of point light sources is configured to be modulated with respect to time.

106. The system of clause 104, wherein a shape of the predetermined pattern of linear light sources is rectangular.

107. The system of clause 106, wherein an edge of the rectangular predetermined pattern of the linear light sources comprises two or more collinear line segments, wherein each line segment is configured to represent a single bit of information based on an activation state of the linear light source in the line segment.

108. The system of clause 104, further comprising an aerial vehicle comprising a camera mounted on the aerial vehicle, the camera being configured to receive the encoded signal.

109. The system of clause 108, further comprising a processor communicatively associated with the camera, the processor configured to decode the encoded signal received by the camera and to generate an output based on the decoding.

110. The system of clause 106, wherein a shape of the predetermined pattern of linear light sources is triangular, circular, elliptical, polygonal, or a combination thereof.

111. A method of identifying a landing surface for an aerial vehicle, the method comprising:
receiving, by a camera mounted on the aerial vehicle, an encoded signal from a plurality of linear light sources arranged in a first predetermined pattern on the landing surface for the aerial vehicle, wherein the encoded signal represents an identity of the landing surface, and the encoded signal is encoded by modulating a characteristic of light emitted from the linear light sources; and decoding, using a processor associated with the camera, the received encoded signal to generate an output comprising information associated with the identity of the landing surface,
wherein the first predetermined pattern of linear light sources comprises collinear line segments, each line segment is configured to represent a single bit of information based on an activation state of the linear light source in the line segment.

112. The method of clause 111, wherein in a first activation state, the line segment represents a bit value of one, and wherein in a second activation state, the line segment represents a bit value of zero.

113. The method of clause 112, wherein the first activation state is an ON state and the second activation state is an OFF state of the linear light source in the line segment.

114. The method of clause 111, further comprising receiving, by the camera mounted on the aerial vehicle, light emitted from point light sources in a second predetermined pattern on the landing surface for the aerial vehicle, wherein a characteristic of light emitted from the point light sources is modulated with respect to time.

115. A method for estimating a pose of an aerial vehicle, the method comprising:
providing a constellation of light sources on a portable landing surface at a landing site for the aerial vehicle;
calibrating relative positions of light sources using ultra-wideband signals between the light sources to determine a configuration of the constellation;
transmitting information associated with the determined constellation configuration of light sources to an aerial vehicle approaching the landing site.

116. The method of clause 115, further comprising estimating the pose of the aerial vehicle based on the constellation configuration and images of the landing surface captured by a camera mounted on and associated with the aerial vehicle.

117. The method of clause 115, wherein the portable landing surface comprises a rapidly deployable landing surface, a re-deployable landing surface, a rollable mat, a fabric, a tarp, a netting, or a mesh.

118. The method of clause 115, wherein the portable landing surface is configured to conform to a contour of the landing site.

119. The method of clause 115, wherein the constellation of light sources comprises point light sources and linear light sources.

120. The method of clause 115, wherein the constellation of light sources comprises battery-powered light sources configured to be operated remotely.

121. A method for estimating a pose of an aerial vehicle, the method comprising:
providing a constellation of light sources on a portable landing surface in a predetermined pattern;
disposing the portable landing surface on a landing site having a contour, the portable landing surface configured to conform to the contoured landing site;
estimating a configuration of constellation of light sources in the disposed portable landing surface; and
estimating the pose of the aerial vehicle based on the estimated constellation configuration and images of the landing surface captured by a camera mounted on and associated with the aerial vehicle.

122. The method of clause 120, wherein the portable landing surface comprises a rapidly deployable landing surface, a re-deployable landing surface, a rollable mat, a fabric, a tarp, a netting, or a mesh.

123. The method of clause 120, wherein the constellation of light sources comprises a combination of point light sources and linear light sources.

124. The method of clause 120, wherein the constellation of light sources comprises point light sources and linear light sources.

125. The method of clause 120, wherein the constellation of light sources comprises battery-powered light sources configured to be operated remotely.

126. An aerial vehicle, comprising:
a camera configured to generate images based on information received from a plurality of light sources located on a landing surface for the aerial vehicle;
a processor associated with the camera and configured to receive the images and to perform the following operations:
detecting, using a detection algorithm, light sources in the image, the light sources arranged on the landing surface and configured to emit light detectable by the camera;
performing association of locations in the image representing the detected light sources to corresponding locations of the light sources on the landing surface, wherein the processor is configured to perform the association in a first mode of operation and a second mode of operation;
executing one or more association algorithms in the first mode of operation and generating a confidence score of the association;
executing one or more tracking algorithms in the second mode of operation, based on the confidence score obtained from the first mode of operation; and
determining one of a location or orientation of the aerial vehicle based on the performed association.

127. The aerial vehicle of clause 126, wherein the processor is further configured to automatically switch between the first and the second modes of operation based on a predetermined threshold confidence score.

128. The aerial vehicle of clause 127, wherein the processor is further configured to request user input to switch between the first and the second modes of operation based on a predetermined threshold confidence score.

129. The aerial vehicle of clause 126, wherein the processor is further configured to execute the first and the second modes of operation sequentially.

130. The aerial vehicle of clause 126, wherein the processor is further configured to:
switch from the first mode of operation to the second mode of operation, and
after switching from the first mode of operation to the second mode of operation, execute the first and the second modes of operation in parallel.

131. The aerial vehicle of clause 126, wherein the one or more association algorithms comprises a grid association algorithm, a Thin Plate Spline Robust Point Matching (TPS-RPM) association algorithm, or an Iterative Closest Point (ICP) algorithm.

132. The aerial vehicle of clause 126, wherein the one or more tracking algorithms comprises local association point tracking or pose-based point tracking.
133. The aerial vehicle of clause 126, wherein the detection algorithm is configured to detect a modulation of a characteristic of the plurality of light sources with respect to time.
134. The aerial vehicle of clause 133, wherein the plurality of light sources comprises a combination of linear light sources and point light sources.
135. The aerial vehicle of clause 134, wherein the linear light sources and point light sources are arranged in a predetermined pattern on the landing surface.
136. The aerial vehicle of clause 135, wherein the landing surface comprises a portable landing surface, a rollable landing surface, a re-deployable landing surface, a tarp, a netting, a mesh, or a combination thereof.
137. The aerial vehicle of clause 126, wherein executing the one or more association algorithms comprises the steps of:
    normalizing the locations in the image representing the detected light sources in a cartesian coordinate space;
    transforming the normalized locations to curves in a polar coordinate space, wherein collinear normalized locations in the cartesian coordinate space form curves intersecting at a common point in the polar coordinate space;
    discretizing the polar coordinate space into a plurality of bins, each bin represented by a value indicating the number of times a curve passes through a location of the bin;
    transforming, upon determining whether the bin value exceeds a predetermined threshold, the location of the bin in the polar coordinate space to the cartesian coordinate space;
    forming lines in the cartesian coordinate space, each line connecting at least a number of points equal to the value of the corresponding bin;
    grouping, using a clustering algorithm, substantially parallel lines and forming a rectangular frame for an integer grid space from the grouped lines;
    calculating a homography matrix configured to move the points from the cartesian coordinate space to the integer grid; and
    mapping each point to the integer grid using the calculated homography matrix.
138. The aerial vehicle of clause 137, wherein the processor is further configured to normalize the locations in the image by constructing a transformation matrix to compute a mean of the locations and setting the variance of the locations to unity.
139. The aerial vehicle of clause 137, wherein the processor is further configured to normalize the locations in the image by rotating the cartesian coordinate space by an angle to compensate a rotation caused by an angle of approach of the aerial vehicle toward the landing surface.
140. The aerial vehicle of clause 137, wherein the processor is further configured to increment the bin value by one for every instance of a curve passing through the location of the bin.
141. The aerial vehicle of clause 137, wherein the processor is further configured to refine one or more lines in the cartesian coordinate space by rejecting the one or more lines based on a fit to the detected locations of the light sources in the image.
142. The aerial vehicle of clause 137, wherein the processor is further configured to label each location on the integer grid with a reference character, and wherein the labels are based on a predefined sequence.
143. The aerial vehicle of clause 137, wherein the processor is further configured to map each point to the integer grid indicating an offset distance, the offset distance being a distance between a reference location on the integer grid and a corresponding mapped point.
144. The aerial vehicle of clause 137, wherein the processor is further configured to reject a false detection from the association based on the offset distance, the rejection of the false detection comprises comparing the offset distance to a threshold offset distance.
145. The aerial vehicle of clause 137, wherein the processor is further configured to identify, as a false detection, the mapped points for which the offset distance is larger than the threshold offset distance, and to reject the association upon determining that the number of false detections exceeds an allowable threshold.
146. The aerial vehicle of clause 126, wherein determining the location of the aerial vehicle or the orientation of the aerial vehicle is further based on information from one or more of a global positioning system (GPS) or an internal navigation system (INS).
147. The aerial vehicle of clause 126, wherein determining one of the location or orientation of the aerial vehicle based on the performed association comprises determining both the location and the orientation of the aerial vehicle.
148. The aerial vehicle of clause 126, further comprising:
    a lift propeller; and
    a controller configured to acuate the lift propeller based on the determined location or orientation of the aerial vehicle.
149. The aerial vehicle of clause 126, further comprising:
    a tilt propeller; and
    a controller configured to acuate the tilt propeller based on the determined location or orientation of the aerial vehicle.
150. The aerial vehicle of clause 126, further comprising:
    a tilt actuator; and
    a controller configured to acuate the tilt actuator based on the determined location or orientation of the aerial vehicle.
151. The aerial vehicle of clause 126, further comprising:
    a control surface; and
    a controller configured to acuate the control surface based on the determined location or orientation of the aerial vehicle.
152. The aerial vehicle of clause 151, wherein the control surface comprises one of a flaperon or a ruddervator.
153. A navigation system for an aerial vehicle, comprising:
    a camera configured to generate images based on information received from a plurality of light sources arranged in a predetermined pattern on a landing surface for an aerial vehicle;
    a processor associated with the camera and configured to receive the images and to perform the following operations:
        activating, using the processor, a camera mounted on the aerial vehicle to enable receiving an input signal associated with light emitted from light sources arranged in a predetermined pattern on the landing surface for the aerial vehicle, the light having a characteristic that is modulated with respect to time;

enabling the camera to generate at least two images of the light sources based on the received input signal;

detecting, using a detection algorithm, the light sources in the at least two images;

performing an association of locations in the image representing the detected light sources to corresponding locations of the light sources on the landing surface, wherein the processor is configured to perform the association in a first mode of operation and a second mode of operation;

executing one or more association algorithms in the first mode of operation;

executing one or more tracking algorithms in the second mode of operation, based results obtained from the first mode of operation; and determining one of a location or an orientation of the aerial vehicle based on the performed association.

154. The navigation system of clause 153, further comprising:
the plurality of light sources arranged in the predetermined pattern on the landing surface.

155. The navigation system of clause 154, wherein a characteristic of light emitted from each of the light sources is modulated with respect to time.

156. The navigation system of clause 153, further comprising a controller configured to actuate a lift propeller based on the determined location or an orientation of the aerial vehicle.

157. The navigation system of clause 153, further comprising a controller configured to actuate a tilt propeller based on the determined location or an orientation of the aerial vehicle.

158. The navigation system of clause 153, further comprising a controller configured to actuate a tilt actuator based on the determined location or an orientation of the aerial vehicle.

159. The navigation system of clause 153, further comprising a controller configured to actuate a control surface based on the determined location or an orientation of the aerial vehicle.

160. The navigation system of clause 159, wherein the control surface comprises one of a flaperon or a ruddervator.

161. A system, comprising:
a landing surface for an aerial vehicle; and
a plurality of light sources arranged in a predetermined pattern, a characteristic of light emitted from each of the light sources is configured to be modulated with respect to time,
wherein the plurality of light sources comprises linear light sources and point light sources, and
wherein the landing surface comprises a portable landing surface.

162. The system of clause 161, further comprising:
a first processor configured to modulate the characteristic of light emitted from the light sources with respect to time; and
a second processor configured to:
activate a camera mounted on the aerial vehicle to receive an input signal associated with the light emitted from the light sources;
enable the camera to generate an image of the light sources based on the received input signal;
determine one of a location or an orientation of the aerial vehicle based on the generated image, wherein determining the location or the orientation comprises:
detecting at least one of the light sources in the image;
determining which of the at least one of the light sources arranged in the predetermined pattern the detected light source is; and
determining the location or the orientation of the aerial vehicle based on the determination of which of the at least one of the light sources arranged in the predetermined pattern the detected light source is.

163. The system of clause 162, further comprising a controller configured to actuate a lift propeller based on the determined location or an orientation of the aerial vehicle.

164. The system of clause 162, further comprising a controller configured to actuate a tilt propeller based on the determined location or an orientation of the aerial vehicle.

165. The system of clause 162, further comprising a controller configured to actuate a tilt actuator based on the determined location or an orientation of the aerial vehicle.

166. The system of clause 162, further comprising a controller configured to actuate a control surface based on the determined location or an orientation of the aerial vehicle.

167. The system of clause 162, wherein the control surface comprises one of a flaperon or a ruddervator.

168. The system of clause 161, wherein the portable landing surface is configured to conform to a contour of a landing site.

169. The system of clause 164, wherein the plurality of light sources comprises battery-powered light sources configured to be operated remotely.

170. The system of clause 161, wherein the portable landing surface comprises a re-deployable landing surface, a rollable mat, a fabric, a tarp, a netting, or a mesh.

The system of clause 165, wherein the second processor is further configured to calibrate relative positions of light sources using ultra-wideband signals between the light sources.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The invention claimed is:

1. An aerial vehicle, comprising:
a camera configured to generate images based on information received from a plurality of light sources located on a landing surface for the aerial vehicle;
a processor associated with the camera and configured to receive the images and to perform the following operations:
detecting, using a detection algorithm, light sources in the image, the light sources arranged on the landing surface and configured to emit light detectable by the camera;
performing association of locations in the image representing the detected light sources to corresponding locations of the light sources on the landing surface, wherein the processor is configured to perform the association in a first mode of operation and a second mode of operation;

executing one or more association algorithms in the first mode of operation and generating a confidence score of the association;

executing one or more tracking algorithms in the second mode of operation, based on the confidence score obtained from the first mode of operation; and determining one of a location or orientation of the aerial vehicle based on the performed association.

2. The aerial vehicle of claim 1, wherein the processor is further configured to automatically switch between the first and the second modes of operation based on a predetermined threshold confidence score.

3. The aerial vehicle of claim 2, wherein the processor is further configured to request user input to switch between the first and the second modes of operation based on a predetermined threshold confidence score.

4. The aerial vehicle of claim 1, wherein the processor is further configured to execute the first and the second modes of operation sequentially.

5. The aerial vehicle of claim 1, wherein the processor is further configured to:

switch from the first mode of operation to the second mode of operation, and after switching from the first mode of operation to the second mode of operation, execute the first and the second modes of operation in parallel.

6. The aerial vehicle of claim 1, wherein the one or more association algorithms comprises a grid association algorithm, a Thin Plate Spline Robust Point Matching (TPS-RPM) association algorithm, or an Iterative Closest Point (ICP) algorithm.

7. The aerial vehicle of claim 1, wherein the one or more tracking algorithms comprises local association point tracking or pose-based point tracking.

8. The aerial vehicle of claim 1, wherein the detection algorithm is configured to detect a modulation of a characteristic of the plurality of light sources with respect to time.

9. The aerial vehicle of claim 8, wherein the plurality of light sources comprises a combination of linear light sources and point light sources.

10. The aerial vehicle of claim 1, wherein executing the one or more association algorithms comprises the steps of:

normalizing the locations in the image representing the detected light sources in a cartesian coordinate space;

transforming the normalized locations to curves in a polar coordinate space, wherein collinear normalized locations in the cartesian coordinate space form curves intersecting at a common point in the polar coordinate space;

discretizing the polar coordinate space into a plurality of bins, each bin represented by a value indicating the number of times a curve passes through a location of the bin;

transforming, upon determining whether the bin value exceeds a predetermined threshold, the location of the bin in the polar coordinate space to the cartesian coordinate space;

forming lines in the cartesian coordinate space, each line connecting at least a number of points equal to the value of the corresponding bin;

grouping, using a clustering algorithm, substantially parallel lines and forming a rectangular frame for an integer grid space from the grouped lines;

calculating a homography matrix configured to move the points from the cartesian coordinate space to the integer grid; and mapping each point to the integer grid using the calculated homography matrix.

11. The aerial vehicle of claim 10, wherein the processor is further configured to normalize the locations in the image by constructing a transformation matrix to compute a mean of the locations and setting the variance of the locations to unity.

12. The aerial vehicle of claim 10, wherein the processor is further configured to normalize the locations in the image by rotating the cartesian coordinate space by an angle to compensate a rotation caused by an angle of approach of the aerial vehicle toward the landing surface.

13. The aerial vehicle of claim 10, wherein the processor is further configured to increment the bin value by one for every instance of a curve passing through the location of the bin.

14. The aerial vehicle of claim 10, wherein the processor is further configured to refine one or more lines in the cartesian coordinate space by rejecting the one or more lines based on a fit to the detected locations of the light sources in the image.

15. The aerial vehicle of claim 10, wherein the processor is further configured to label each location on the integer grid with a reference character, and wherein the labels are based on a predefined sequence.

16. The aerial vehicle of claim 10, wherein the processor is further configured to map each point to the integer grid indicating an offset distance, the offset distance being a distance between a reference location on the integer grid and a corresponding mapped point.

17. The aerial vehicle of claim 10, wherein the processor is further configured to reject a false detection from the association based on the offset distance, the rejection of the false detection comprises comparing the offset distance to a threshold offset distance.

18. The aerial vehicle of claim 10, wherein the processor is further configured to identify, as a false detection, the mapped points for which the offset distance is larger than the threshold offset distance, and to reject the association upon determining that the number of false detections exceeds an allowable threshold.

19. The aerial vehicle of claim 1, wherein determining the location of the aerial vehicle or the orientation of the aerial vehicle is further based on information from one or more of a global positioning system (GPS) or an internal navigation system (INS).

20. The aerial vehicle of claim 1, further comprising:

a controller configured to acuate a component of the aerial vehicle based on the determined location or orientation of the aerial vehicle;

wherein the component comprises one of a lift propeller, a tilt propeller, a tilt actuator, or a control surface.

21. A method of operating an aerial vehicle, comprising:

generating images with a camera based on information received from a plurality of light sources located on a landing surface for the aerial vehicle;

detecting, using a detection algorithm, light sources in the image, the light sources arranged on the landing surface and configured to emit light detectable by the camera;

performing association of locations in the image representing the detected light sources to corresponding locations of the light sources on the landing surface, wherein performing the association comprises a first mode of operation and a second mode of operation, wherein
- the first mode of operation comprises executing one or more association algorithms and generating a confidence score of the association;
- the second mode of operation comprises executing one or more tracking algorithms based on the confidence score obtained from the first mode of operation; and determining one of a location or orientation of the aerial vehicle based on the performed association.

22. A navigation system for an aerial vehicle, comprising:
a camera configured to generate images based on information received from a plurality of light sources arranged in a predetermined pattern on a landing surface for an aerial vehicle;
a processor associated with the camera and configured to receive the images and to perform the following operations:
- activating, using the processor, a camera mounted on the aerial vehicle to enable receiving an input signal associated with light emitted from light sources arranged in a predetermined pattern on the landing surface for the aerial vehicle, the light having a characteristic that is modulated with respect to time;
- enabling the camera to generate at least two images of the light sources based on the received input signal;
- detecting, using a detection algorithm, the light sources in the at least two images;
- performing an association of locations in the image representing the detected light sources to corresponding locations of the light sources on the landing surface, wherein the processor is configured to perform the association in a first mode of operation and a second mode of operation;
- executing one or more association algorithms in the first mode of operation;
- executing one or more tracking algorithms in the second mode of operation, based results obtained from the first mode of operation; and
- determining one of a location or an orientation of the aerial vehicle based on the performed association.

23. The navigation system of claim 22, further comprising:
the plurality of light sources arranged in the predetermined pattern on the landing surface.

24. The navigation system of claim 23, wherein the landing surface comprises a landing surface of a vertiport.

25. The navigation system of claim 23, wherein the landing surface comprises a portable landing surface, the portable landing surface comprising one of a re-deployable landing surface, a rollable mat, a fabric, a tarp, a netting, or a mesh.

26. The navigation system of claim 23, wherein a characteristic of light emitted from each of the light sources is modulated with respect to time.

27. The navigation system of claim 22, further comprising:
a controller configured to actuate a component of the aerial vehicle based on the determined location or an orientation of the aerial vehicle,
wherein the component comprises one of a lift propeller, a tilt propeller, a tilt actuator, or a control surface.

\* \* \* \* \*

UNITED STATES PATENT AND TRADEMARK OFFICE
CERTIFICATE OF CORRECTION

PATENT NO. : 12,205,484 B1
APPLICATION NO. : 18/451055
DATED : January 21, 2025
INVENTOR(S) : Anthony Hunter et al.

Page 1 of 1

It is certified that error appears in the above-identified patent and that said Letters Patent is hereby corrected as shown below:

On the Title Page

Item (72), Line 1: "Anthony Hunter, San Jose (CA)" should read --Anthony Hunter, San Jose, CA (US)--

Item (72), Line 2: "Timothy Mclain, Provo, UT (US)" should read --Timothy McLain, Provo, UT (US)--

Signed and Sealed this
Twenty-fifth Day of March, 2025

Coke Morgan Stewart
*Acting Director of the United States Patent and Trademark Office*